United States Patent
Lutnick et al.

(10) Patent No.: US 8,393,954 B2
(45) Date of Patent: Mar. 12, 2013

(54) TOP PERFORMERS

(75) Inventors: Howard W. Lutnick, New York, NY (US); Dean P. Alderucci, Westport, CT (US); Geoffrey M. Gelman, Brooklyn, NY (US); Kevin Burman, Hunters Hill (AU)

(73) Assignee: CFPH, LLC, New York, NY (US)

( * ) Notice: Subject to any disclaimer, the term of this patent is extended or adjusted under 35 U.S.C. 154(b) by 329 days.

(21) Appl. No.: 11/618,426

(22) Filed: Dec. 29, 2006

(65) Prior Publication Data

US 2008/0161101 A1    Jul. 3, 2008

(51) Int. Cl.
*A63F 9/24* (2006.01)
*A63F 13/00* (2006.01)

(52) U.S. Cl. ............... 463/25; 463/16; 463/20; 463/21; 463/42

(58) Field of Classification Search ............... 463/1, 25, 463/29, 40–42; 273/138.1–2, 143 R
See application file for complete search history.

(56) References Cited

U.S. PATENT DOCUMENTS

| | | |
|---|---|---|
| 4,446,424 A | 5/1984 | Chatanier et al. |
| 4,531,187 A | 7/1985 | Uhland |
| 4,540,174 A | 9/1985 | Coppock |
| 4,861,041 A | 8/1989 | Jones et al. |
| 5,098,107 A | 3/1992 | Boylan et al. |
| 5,314,194 A | 5/1994 | Wolf |
| 5,350,175 A | 9/1994 | DiLullo et al. |
| 5,374,061 A | 12/1994 | Albrecht |
| 5,390,934 A | 2/1995 | Grassa |
| 5,397,128 A | 3/1995 | Hesse et al. |
| 5,411,258 A | 5/1995 | Wilson et al. |
| 5,494,296 A | 2/1996 | Grassa |
| 5,615,888 A | 4/1997 | Lofink et al. |
| 5,636,843 A | 6/1997 | Roberts |
| 5,673,917 A | 10/1997 | Vancura |
| 5,713,793 A | 2/1998 | Holte |
| 5,722,893 A | 3/1998 | Hill et al. |
| 5,728,002 A | 3/1998 | Hobert |
| 5,738,583 A | 4/1998 | Comas et al. |
| 5,762,552 A | 6/1998 | Vuong et al. |
| 5,769,714 A | 6/1998 | Wiener et al. |
| 5,785,321 A | 7/1998 | Van Putten et al. |
| 5,788,574 A | 8/1998 | Ornstein et al. |
| 5,800,268 A | 9/1998 | Molnick |
| 5,806,846 A | 9/1998 | Lofink et al. |

(Continued)

FOREIGN PATENT DOCUMENTS

| | | |
|---|---|---|
| AU | 2004202895 | 1/2005 |
| CA | 2472735 | 1/2005 |

(Continued)

OTHER PUBLICATIONS

"Bill Gates' Goldrush—Rowanlea Report", (http://www.rowanlea.com/report/2/historyofbgates.html), download date: Dec. 28, 2006.

(Continued)

*Primary Examiner* — Dmitry Suhol
*Assistant Examiner* — Ryan Hsu
(74) *Attorney, Agent, or Firm* — Mark Miller

(57) ABSTRACT

In various embodiments, a player may participate in a game of a top performing player.

44 Claims, 9 Drawing Sheets

U.S. PATENT DOCUMENTS

| | | | |
|---|---|---|---|
| 5,810,360 A | 9/1998 | Srichayaporn | |
| 5,826,976 A | 10/1998 | Skratulia | |
| 5,830,067 A | 11/1998 | Graves et al. | |
| 5,836,586 A | 11/1998 | Marks et al. | |
| 5,863,041 A | 1/1999 | Boylan et al. | |
| 5,868,392 A | 2/1999 | Kraft | |
| 5,999,808 A | 12/1999 | LaDue | |
| 6,024,643 A | 2/2000 | Begis | |
| 6,045,129 A | 4/2000 | Cooper et al. | |
| 6,062,565 A | 5/2000 | Chadband et al. | |
| 6,068,552 A | 5/2000 | Walker et al. | |
| 6,070,878 A | 6/2000 | Jones et al. | |
| 6,120,031 A | 9/2000 | Adams | |
| 6,126,166 A | 10/2000 | Lorson et al. | |
| 6,135,453 A | 10/2000 | Srichayaporn | |
| 6,146,272 A | 11/2000 | Walker et al. | |
| 6,158,741 A | 12/2000 | Koelling | |
| 6,165,069 A | 12/2000 | Sines et al. | |
| 6,177,905 B1 | 1/2001 | Welch | |
| 6,183,366 B1* | 2/2001 | Goldberg et al. | 463/42 |
| 6,206,373 B1 | 3/2001 | Garrod | |
| 6,217,447 B1 | 4/2001 | Lofink et al. | |
| 6,227,969 B1 | 5/2001 | Yoseloff | |
| 6,270,404 B2 | 8/2001 | Sines et al. | |
| 6,285,987 B1 | 9/2001 | Roth et al. | |
| 6,299,533 B1 | 10/2001 | Parra et al. | |
| 6,325,716 B1 | 12/2001 | Walker et al. | |
| 6,341,305 B2 | 1/2002 | Wolfe | |
| 6,341,778 B1 | 1/2002 | Lee | |
| 6,358,150 B1* | 3/2002 | Mir et al. | 463/28 |
| 6,503,145 B1 | 1/2003 | Webb | |
| 6,508,709 B1 | 1/2003 | Karmarkar | |
| 6,508,710 B1 | 1/2003 | Paravia et al. | |
| 6,517,073 B1 | 2/2003 | Vancura | |
| 6,520,856 B1 | 2/2003 | Walker et al. | |
| 6,523,829 B1 | 2/2003 | Walker et al. | |
| 6,530,835 B1 | 3/2003 | Walker et al. | |
| 6,533,662 B2* | 3/2003 | Soltys et al. | 463/25 |
| 6,536,767 B1 | 3/2003 | Keller | |
| 6,540,230 B1 | 4/2003 | Walker et al. | |
| 6,540,609 B1 | 4/2003 | Paige | |
| 6,569,015 B1 | 5/2003 | Baerlocher et al. | |
| 6,571,279 B1 | 5/2003 | Herz et al. | |
| 6,575,465 B2 | 6/2003 | Lo | |
| 6,575,834 B1 | 6/2003 | Lindo | |
| 6,575,843 B2 | 6/2003 | McCabe | |
| 6,616,142 B2 | 9/2003 | Adams | |
| 6,625,578 B2 | 9/2003 | Spaur et al. | |
| 6,628,939 B2 | 9/2003 | Paulsen | |
| 6,648,762 B2* | 11/2003 | Walker et al. | 463/25 |
| 6,679,497 B2 | 1/2004 | Walker et al. | |
| 6,692,003 B2 | 2/2004 | Potter et al. | |
| 6,692,360 B2* | 2/2004 | Kusuda et al. | 463/42 |
| 6,695,700 B2 | 2/2004 | Walker et al. | |
| 6,712,702 B2 | 3/2004 | Goldberg et al. | |
| 6,733,387 B2 | 5/2004 | Walker et al. | |
| 6,769,986 B2 | 8/2004 | Vancura | |
| 6,789,800 B2 | 9/2004 | Webb | |
| 6,790,141 B2 | 9/2004 | Muir et al. | |
| 6,790,142 B2 | 9/2004 | Okada et al. | |
| 6,808,173 B2 | 10/2004 | Snow | |
| 6,811,488 B2 | 11/2004 | Paravia et al. | |
| 6,845,981 B1 | 1/2005 | Ko | |
| 6,846,238 B2 | 1/2005 | Wells | |
| 6,857,957 B2 | 2/2005 | Marks et al. | |
| 6,863,274 B2 | 3/2005 | Webb | |
| 6,877,745 B1 | 4/2005 | Walker et al. | |
| 6,896,618 B2 | 5/2005 | Benoy et al. | |
| 6,902,167 B2 | 6/2005 | Webb | |
| 6,912,398 B1 | 6/2005 | Domnitz | |
| 6,921,331 B2* | 7/2005 | Gatto et al. | 463/6 |
| 6,923,446 B2 | 8/2005 | Snow | |
| 6,929,264 B2 | 8/2005 | Huard et al. | |
| 6,991,544 B2* | 1/2006 | Soltys et al. | 463/42 |
| 7,000,921 B2 | 2/2006 | Schultz | |
| 7,029,009 B2 | 4/2006 | Grauzer et al. | |
| 7,055,822 B2 | 6/2006 | Lo | |
| 7,066,465 B2 | 6/2006 | Daines | |
| 7,201,654 B1 | 4/2007 | Jarvis et al. | |
| 7,229,354 B2 | 6/2007 | McNutt et al. | |
| 7,255,351 B2 | 8/2007 | Yoseloff et al. | |
| 7,264,546 B2 | 9/2007 | Marshall et al. | |
| 7,300,348 B2 | 11/2007 | Kaminkow et al. | |
| 7,311,600 B2* | 12/2007 | Sundstrom | 463/17 |
| 7,311,605 B2 | 12/2007 | Moser | |
| 7,316,615 B2* | 1/2008 | Soltys et al. | 463/25 |
| 7,344,136 B2 | 3/2008 | Schultz | |
| 7,379,886 B1 | 5/2008 | Zaring et al. | |
| 7,394,405 B2 | 7/2008 | Godden | |
| 7,534,169 B2 | 5/2009 | Amaitis et al. | |
| 7,585,217 B2 | 9/2009 | Lutnick et al. | |
| 7,637,810 B2 | 12/2009 | Amaitis et al. | |
| 7,658,673 B2 | 2/2010 | Baerlocher et al. | |
| 7,811,172 B2 | 10/2010 | Asher et al. | |
| 7,833,101 B2 | 11/2010 | Lutnick et al. | |
| 7,904,333 B1 | 3/2011 | Perkowski | |
| 7,997,973 B2 | 8/2011 | Lutnick et al. | |
| 8,070,582 B2 | 12/2011 | Lutnick et al. | |
| 8,142,283 B2 | 3/2012 | Lutnick et al. | |
| 2001/0007828 A1 | 7/2001 | Walker et al. | |
| 2001/0014619 A1* | 8/2001 | Kusuda | 463/6 |
| 2001/0019965 A1* | 9/2001 | Ochi | 463/25 |
| 2001/0024970 A1 | 9/2001 | McKee et al. | |
| 2001/0041609 A1 | 11/2001 | Oranges et al. | |
| 2002/0010023 A1* | 1/2002 | Kusuda et al. | 463/42 |
| 2002/0013167 A1 | 1/2002 | Spaur et al. | |
| 2002/0013174 A1 | 1/2002 | Murata | |
| 2002/0019253 A1 | 2/2002 | Reitzen et al. | |
| 2002/0032049 A1 | 3/2002 | Walker et al. | |
| 2002/0072993 A1 | 6/2002 | Sandus et al. | |
| 2002/0077905 A1 | 6/2002 | Arndt et al. | |
| 2002/0082983 A1 | 6/2002 | Oshiba et al. | |
| 2002/0094869 A1* | 7/2002 | Harkham | 463/42 |
| 2002/0098829 A1 | 7/2002 | Tendler | |
| 2002/0125639 A1 | 9/2002 | Wells | |
| 2002/0147042 A1 | 10/2002 | Vuong et al. | |
| 2002/0169019 A1 | 11/2002 | Walker et al. | |
| 2002/0196342 A1 | 12/2002 | Walker et al. | |
| 2002/0198044 A1* | 12/2002 | Walker et al. | 463/25 |
| 2002/0198052 A1 | 12/2002 | Soltys et al. | |
| 2003/0003988 A1 | 1/2003 | Walker et al. | |
| 2003/0006931 A1 | 1/2003 | Mages | |
| 2003/0008662 A1 | 1/2003 | Stern et al. | |
| 2003/0032471 A1 | 2/2003 | Darder | |
| 2003/0040922 A1 | 2/2003 | Bodin | |
| 2003/0040944 A1 | 2/2003 | Hileman | |
| 2003/0046158 A1 | 3/2003 | Kratky | |
| 2003/0047871 A1 | 3/2003 | Vancura | |
| 2003/0050106 A1 | 3/2003 | Lyfoung | |
| 2003/0060276 A1 | 3/2003 | Walker et al. | |
| 2003/0064807 A1* | 4/2003 | Walker et al. | 463/42 |
| 2003/0069054 A1 | 4/2003 | D'Aurora et al. | |
| 2003/0069058 A1 | 4/2003 | Byrne | |
| 2003/0073480 A1 | 4/2003 | Thomas et al. | |
| 2003/0090063 A1 | 5/2003 | Jarvis et al. | |
| 2003/0114217 A1 | 6/2003 | Walker et al. | |
| 2003/0119579 A1 | 6/2003 | Walker et al. | |
| 2003/0148812 A1 | 8/2003 | Paulsen et al. | |
| 2003/0157977 A1* | 8/2003 | Thomas et al. | 463/13 |
| 2003/0187736 A1 | 10/2003 | Teague et al. | |
| 2003/0190941 A1 | 10/2003 | Byrne | |
| 2003/0216170 A1 | 11/2003 | Walker et al. | |
| 2003/0224852 A1 | 12/2003 | Walker et al. | |
| 2004/0002374 A1 | 1/2004 | Brown et al. | |
| 2004/0005918 A1 | 1/2004 | Walker et al. | |
| 2004/0015429 A1 | 1/2004 | Tighe et al. | |
| 2004/0043807 A1 | 3/2004 | Pennington | |
| 2004/0044567 A1 | 3/2004 | Willis | |
| 2004/0053664 A1 | 3/2004 | Byrne | |
| 2004/0068439 A1 | 4/2004 | Elgrably | |
| 2004/0106454 A1 | 6/2004 | Walker et al. | |
| 2004/0127277 A1 | 7/2004 | Walker et al. | |
| 2004/0143496 A1 | 7/2004 | Saenz | |
| 2004/0147308 A1 | 7/2004 | Walker et al. | |
| 2004/0148221 A1 | 7/2004 | Chu | |
| 2004/0162144 A1 | 8/2004 | Loose et al. | |
| 2004/0176162 A1 | 9/2004 | Rothschild | |

| | | |
|---|---|---|
| 2004/0204026 A1 | 10/2004 | Steer et al. |
| 2004/0204247 A1 | 10/2004 | Walker et al. |
| 2004/0210507 A1 | 10/2004 | Asher et al. |
| 2004/0219969 A1 | 11/2004 | Casey et al. |
| 2004/0229671 A1 | 11/2004 | Stronach et al. |
| 2004/0242332 A1 | 12/2004 | Walker et al. |
| 2004/0243519 A1 | 12/2004 | Perttila et al. |
| 2004/0259621 A1 | 12/2004 | Pfeiffer et al. |
| 2004/0264916 A1 | 12/2004 | Van De Sluis et al. |
| 2005/0003878 A1 | 1/2005 | Updike |
| 2005/0003886 A1 | 1/2005 | Englman et al. |
| 2005/0003888 A1 | 1/2005 | Asher et al. |
| 2005/0003893 A1 | 1/2005 | Hogwood et al. |
| 2005/0004842 A1 | 1/2005 | Mammen |
| 2005/0023758 A1 | 2/2005 | Noyes |
| 2005/0043094 A1 | 2/2005 | Nguyen et al. |
| 2005/0064926 A1 | 3/2005 | Walker et al. |
| 2005/0073102 A1 | 4/2005 | Yoseloff et al. |
| 2005/0075164 A1 | 4/2005 | Krynicky |
| 2005/0082756 A1 | 4/2005 | Duncan |
| 2005/0113161 A1 | 5/2005 | Walker et al. |
| 2005/0144065 A1 | 6/2005 | Calabria et al. |
| 2005/0151319 A1 | 7/2005 | Berman et al. |
| 2005/0159212 A1 | 7/2005 | Romney et al. |
| 2005/0170876 A1 | 8/2005 | Masci et al. |
| 2005/0173863 A1 | 8/2005 | Walker et al. |
| 2005/0194742 A1 | 9/2005 | Donaldson |
| 2005/0233803 A1 | 10/2005 | Yang |
| 2005/0253334 A1 | 11/2005 | Friedman |
| 2005/0253338 A1 | 11/2005 | Daines |
| 2005/0255919 A1 | 11/2005 | Nelson |
| 2005/0275166 A1 | 12/2005 | Wirth |
| 2005/0282614 A1 | 12/2005 | Gauselmann |
| 2006/0009283 A1 | 1/2006 | Englman et al. |
| 2006/0019745 A1 | 1/2006 | Benbrahim |
| 2006/0025192 A1 | 2/2006 | Walker et al. |
| 2006/0025206 A1 | 2/2006 | Walker et al. |
| 2006/0025208 A1 | 2/2006 | Ramsey |
| 2006/0035707 A1 | 2/2006 | Nguyen et al. |
| 2006/0035708 A1 | 2/2006 | Nguyen et al. |
| 2006/0036449 A1 | 2/2006 | Araki et al. |
| 2006/0036495 A1 | 2/2006 | Aufricht et al. |
| 2006/0046816 A1 | 3/2006 | Walker et al. |
| 2006/0046853 A1 | 3/2006 | Black |
| 2006/0052148 A1 | 3/2006 | Blair et al. |
| 2006/0052156 A1 | 3/2006 | Yates et al. |
| 2006/0052168 A1 | 3/2006 | Shacham |
| 2006/0063580 A1 | 3/2006 | Nguyen et al. |
| 2006/0063587 A1 | 3/2006 | Manzo |
| 2006/0073882 A1 | 4/2006 | Rozkin et al. |
| 2006/0079321 A1 | 4/2006 | Walker et al. |
| 2006/0111168 A1 | 5/2006 | Nguyen et al. |
| 2006/0111175 A1 | 5/2006 | Walker et al. |
| 2006/0111178 A1 | 5/2006 | Gallaway et al. |
| 2006/0131809 A1 | 6/2006 | Lancaster et al. |
| 2006/0148551 A1 | 7/2006 | Walker et al. |
| 2006/0160614 A1 | 7/2006 | Walker et al. |
| 2006/0189382 A1 | 8/2006 | Muir et al. |
| 2006/0211474 A1* | 9/2006 | Walker et al. .................. 463/16 |
| 2006/0247037 A1 | 11/2006 | Park |
| 2006/0247039 A1 | 11/2006 | Lerner et al. |
| 2006/0252482 A1 | 11/2006 | Walker et al. |
| 2006/0252515 A1 | 11/2006 | Walker et al. |
| 2006/0252530 A1 | 11/2006 | Oberberger et al. |
| 2006/0253481 A1 | 11/2006 | Guido et al. |
| 2006/0287054 A1* | 12/2006 | Walker et al. .................. 463/17 |
| 2006/0287075 A1 | 12/2006 | Walker et al. |
| 2007/0014252 A1 | 1/2007 | Chung et al. |
| 2007/0015571 A1 | 1/2007 | Walker et al. |
| 2007/0021181 A1 | 1/2007 | Nelson et al. |
| 2007/0038516 A1 | 2/2007 | Apple et al. |
| 2007/0050243 A1 | 3/2007 | Kralik |
| 2007/0054739 A1 | 3/2007 | Amaitis et al. |
| 2007/0060099 A1 | 3/2007 | Ramer et al. |
| 2007/0060305 A1 | 3/2007 | Amaitis et al. |
| 2007/0060306 A1 | 3/2007 | Amaitis et al. |
| 2007/0060355 A1 | 3/2007 | Amaitis et al. |
| 2007/0060358 A1 | 3/2007 | Amaitis et al. |
| 2007/0060374 A1 | 3/2007 | Youm et al. |
| 2007/0073585 A1 | 3/2007 | Apple et al. |
| 2007/0077981 A1 | 4/2007 | Hungate et al. |
| 2007/0078706 A1 | 4/2007 | Datta et al. |
| 2007/0087834 A1 | 4/2007 | Moser et al. |
| 2007/0088852 A1 | 4/2007 | Levkovitz |
| 2007/0093296 A1 | 4/2007 | Asher et al. |
| 2007/0105613 A1 | 5/2007 | Adams et al. |
| 2007/0190494 A1 | 8/2007 | Rosenberg |
| 2007/0191090 A1 | 8/2007 | O'Halloran et al. |
| 2007/0243928 A1 | 10/2007 | Iddings |
| 2007/0259709 A1 | 11/2007 | Kelly et al. |
| 2007/0270224 A1 | 11/2007 | Abbott |
| 2007/0299723 A1 | 12/2007 | Willis et al. |
| 2008/0005055 A1 | 1/2008 | Horvitz |
| 2008/0020848 A1 | 1/2008 | Muir et al. |
| 2008/0033640 A1 | 2/2008 | Amano |
| 2008/0051171 A1 | 2/2008 | Lutnick et al. |
| 2008/0058048 A1 | 3/2008 | Lutnick et al. |
| 2008/0058049 A1 | 3/2008 | Lutnick et al. |
| 2008/0065481 A1 | 3/2008 | Immorlica et al. |
| 2008/0070667 A1 | 3/2008 | Lutnick et al. |
| 2008/0076505 A1 | 3/2008 | Nguyen et al. |
| 2008/0076512 A1 | 3/2008 | Aida |
| 2008/0076572 A1 | 3/2008 | Nguyen et al. |
| 2008/0085769 A1 | 4/2008 | Lutnick et al. |
| 2008/0096628 A1 | 4/2008 | Czyzewski et al. |
| 2008/0102956 A1 | 5/2008 | Burman et al. |
| 2008/0102957 A1 | 5/2008 | Burman et al. |
| 2008/0113765 A1 | 5/2008 | DeWaal |
| 2008/0139306 A1 | 6/2008 | Lutnick et al. |
| 2008/0149705 A1 | 6/2008 | Giobbi et al. |
| 2008/0154629 A1 | 6/2008 | Breed et al. |
| 2008/0154673 A1 | 6/2008 | Connolly et al. |
| 2008/0167106 A1 | 7/2008 | Lutnick et al. |
| 2008/0172781 A1 | 7/2008 | Popowich et al. |
| 2008/0191418 A1 | 8/2008 | Lutnick et al. |
| 2008/0195312 A1 | 8/2008 | Aaron et al. |
| 2008/0195478 A1 | 8/2008 | Yoon et al. |
| 2008/0200251 A1 | 8/2008 | Alderucci et al. |
| 2008/0214286 A1 | 9/2008 | Lutnick et al. |
| 2008/0215415 A1 | 9/2008 | Willms |
| 2008/0224399 A1 | 9/2008 | Schambelan |
| 2008/0248849 A1 | 10/2008 | Lutnick et al. |
| 2008/0254881 A1 | 10/2008 | Lutnick et al. |
| 2008/0288350 A1 | 11/2008 | Iris et al. |
| 2008/0311994 A1 | 12/2008 | Amaitis et al. |
| 2009/0017913 A1 | 1/2009 | Bell et al. |
| 2009/0018918 A1 | 1/2009 | Moneypenny et al. |
| 2009/0024452 A1 | 1/2009 | Martinez et al. |
| 2009/0029780 A1 | 1/2009 | Amaitis et al. |
| 2009/0061974 A1 | 3/2009 | Lutnick et al. |
| 2009/0063463 A1 | 3/2009 | Turner et al. |
| 2009/0070215 A1 | 3/2009 | Strzeletz |
| 2009/0093300 A1 | 4/2009 | Lutnick et al. |
| 2009/0098829 A1 | 4/2009 | Jensen |
| 2009/0106085 A1 | 4/2009 | Raimbeault |
| 2009/0131151 A1 | 5/2009 | Harris et al. |
| 2009/0138460 A1 | 5/2009 | Gorti et al. |
| 2009/0157473 A1 | 6/2009 | Belz et al. |
| 2009/0171748 A1 | 7/2009 | Aven et al. |
| 2009/0179733 A1 | 7/2009 | Hattori et al. |
| 2009/0182677 A1 | 7/2009 | Otto et al. |
| 2009/0198579 A1 | 8/2009 | Lewis et al. |
| 2009/0215469 A1 | 8/2009 | Fisher et al. |
| 2009/0216682 A1 | 8/2009 | Foladare et al. |
| 2009/0265105 A1 | 10/2009 | Davis et al. |
| 2009/0265431 A1 | 10/2009 | Jania et al. |
| 2009/0291732 A1 | 11/2009 | Lutnick et al. |
| 2009/0327077 A1 | 12/2009 | Kim |
| 2010/0005520 A1 | 1/2010 | Abbot et al. |
| 2010/0030643 A1 | 2/2010 | Sion |
| 2010/0030646 A1 | 2/2010 | Riise et al. |
| 2010/0036970 A1 | 2/2010 | Sidi et al. |
| 2010/0048302 A1 | 2/2010 | Lutnick et al. |
| 2010/0070171 A1 | 3/2010 | Barbeau et al. |
| 2010/0076841 A1 | 3/2010 | Rajpure et al. |
| 2010/0106603 A1 | 4/2010 | Dey et al. |
| 2010/0124960 A1 | 5/2010 | Lutnick et al. |
| 2010/0124967 A1 | 5/2010 | Lutnick et al. |

| | | | |
|---|---|---|---|
| 2010/0124980 | A1 | 5/2010 | Acres |
| 2010/0125490 | A1 | 5/2010 | Kiciman et al. |
| 2010/0148442 | A1 | 6/2010 | Walker et al. |
| 2010/0161432 | A1 | 6/2010 | Kumanov et al. |
| 2010/0169153 | A1 | 7/2010 | Hwacinski et al. |
| 2010/0211431 | A1 | 8/2010 | Lutnick et al. |
| 2010/0223111 | A1 | 9/2010 | Maekawa |
| 2011/0034228 | A1 | 2/2011 | Lutnick et al. |
| 2011/0065490 | A1 | 3/2011 | Lutnick et al. |
| 2011/0130197 | A1 | 6/2011 | Bytnar et al. |
| 2011/0263310 | A1 | 10/2011 | Lutnick et al. |
| 2011/0275432 | A1 | 11/2011 | Lutnick et al. |
| 2011/0281627 | A1 | 11/2011 | Lutnick et al. |
| 2012/0052939 | A1 | 3/2012 | Lutnick et al. |

FOREIGN PATENT DOCUMENTS

| | | |
|---|---|---|
| CA | 2656934 | 2/2008 |
| EP | 1158821 A1 | 11/2001 |
| JP | 2002-109376 | 4/2002 |
| WO | WO 97/44105 | 11/1997 |
| WO | WO 99/48308 | 9/1999 |
| WO | WO 00/79467 A2 | 12/2000 |
| WO | WO 02/060546 | 8/2002 |
| WO | WO 2004/064258 A2 | 7/2004 |
| WO | WO 2004/076011 | 9/2004 |
| WO | WO 2006/020413 | 2/2006 |

OTHER PUBLICATIONS

"The Don't Pass Bet", Craps-Info.Net, (http://www.craps-info.net/the_dont_pass_bet.html), download date: Aug. 28, 2006.
"New Side Bet May Assist Gaming Industry in Search of a Booster Shot for Table Games", Hotel-OnLine.com, (http://www.hotel-online.com/News/PressReleases1998_3rd/Sept98_Streak.html), download date: Dec. 28, 2006.
Smith, Rod, "Ironically, Lawsuit Filed Against Some Nevada Casinos for Card Counting; Computerized Card Counting System Boosts the House's Odds of Winning at Blackjack", Hotel Online, Oct. 19, 2004.
"Card Counting", (http://www.homepokergames.com/cardcounting.php), download date: Sep. 7, 2006.
"The Vegas Guy—Dodge City Saloon" (http: www.joebobbriggs.com/vegasguy/vg20020910.html), download date: Sep. 7, 2006.
"Who's Holding the Aces Now?", (http://www.wired.com/news/games/0,2101,60049,00.html), Sep. 7, 2006.
"Top Rated Online Casinos—Find the Best Casinos on the Net—Gambling-Win.com," (http://www.gambling-win.com/most-popular-casinos.html), download date: Dec. 4, 2007.
"My Multimonitor Setup: Three Screens for One Computer," (http://daggle.com/060223-231233.html), download date: Dec. 4, 2007.
"E Ink Corporation—Technology—Electronic Paper Displays," (http://www.eink.com/technology/), download date: Dec. 4, 2007.
Notification of Transmittal of the International Search Report and the Written Opinion of the International Searching Authority for International Application No. PCT/US07/86661; 12 pages; May 12, 2008.
Webpage: "Dynamic In-Game Advertising", (http://www.wheii.com/2005_05_01_archive.php), download date: Dec. 11, 2006.
Webpage: "Meet Steven Spielberg, hardboiled cynic", (http://diLsalon.com/story/entimovies/review12002/06121Iminority_report/index. html), download date: Dec. 11, 2006.
Susan Chaityn Lebovits, "Free-Play Site Draws Card Players After Crackdown," Boston Globe, Boston, MA, p. E1, Nov. 5, 2007.
"William Hill Steps Up Mobile Betting for Closer Targeting," Precision Marketing, London, p. 6, Dec. 19, 2003.
"Ladbrokes Uses Mobile Ads to Push Grand National Betting," (mobile advertising) (brief article), New Media Age, p. 4, Apr. 3, 2008.
"Mobile Lotteries an Odds-On Favourite," Precision Marketing, London, p. 12, Jan. 9, 2004.
"Gambling Revolution Held Back by Red Tape," Precision Marketing, London, p. 11, Sep. 19, 2003.
U.S. Appl. No. 12/512,730, filed Jul. 30, 2009, Lutnick et al.
USPTO Notice of Allowance for U.S. Appl. No. 11/470,250, Jul. 24, 2009 (4 pages).
Notification Concerning Transmittal of International Preliminary Report on Patentability and Written Opinion for International Application No. PCT/US07/76298; 7 pages; Mar. 5, 2009.
Notification of Transmittal of the International Search Report and the Written Opinion of the International Searching Authority for International Application No. PCT/US07/77021; 10 pages; Apr. 14, 2008.
Notification of Transmittal of the International Search Report and the Written Opinion of the International Searching Authority for International Application No. PCT/US08/74220; 14 pages; Nov. 17, 2008.
U.S. Appl. No. 12/693,668, filed Jan. 26, 2010, Lutnick et al.
U.S. Appl. No. 12/693,524, filed Jan. 26, 2010, Lutnick et al.
USPTO Office Action for U.S. Appl. No. 11/733,902, May 6, 2010 (6 pages).
USPTO Office Action for U.S. Appl. No. 12/512,730, Jul. 20, 2010 (6 pages).
USPTO Office Action for U.S. Appl. No. 11/567,322, Apr. 30, 2009 (7 pages).
USPTO Office Action for U.S. Appl. No. 11/567,322, Mar. 29, 2010 (14 pages).
USPTO Examiner Interview Summary for U.S. Appl. No. 11/567,322, Jul. 23, 2010 (3 pages).
USPTO Office Action for U.S. Appl. No. 11/621,369, Apr. 27, 2010 (6 pages).
USPTO Office Action for U.S. Appl. No. 11/680,764, Mar. 24, 2010 (19 pages).
Australian Examiner's Report for Application No. 2008201004, dated Aug. 21, 2009 (5 pages).
Australian Examiner's Report for Application No. 2007286884, dated Jul. 12, 2010 (3 pages).
Australian Examiner's Report for Application No. 2009201702, dated Jul. 15, 2010 (2 pages).
Australian Examiner's Report for Application No. 2007329314, dated Jul. 22, 2010 (3 pages).
Australian Examiner's Report for Application No. 2009201701, dated Jul. 23, 2010 (2 pages).
Players Rating System, II Dado at: http://web.archive.org/web/20040228122341/http://www.ildado.com/players_rating_system.html, dated: Feb. 28, 2004 (2 pages).
U.S. Appl. No. 12/759,757, filed Apr. 14, 2010, Inventors: Howard W. Lutnick, et al. For "Game of Chance Systems and Methods" (443 pages).
International Preliminary Report on Patentability for International Application No. PCT/US07/86661, dated Jun. 10, 2009 (9 pages).
Notification of Transmittal or Search Report and Written Opinion of the ISA, or the Declaration for International Application No. PCT/US08/55209, dated Jul. 31, 2008 (8 pages).
International Preliminary Report on Patentability for International Application No. PCT/US08/55209, dated Sep. 1, 2009 (6 pages).
Notification of Transmittal or Search Report and Written Opinion of the ISA, or the Declaration for International Application No. PCT/US07/76298, dated Sep. 17, 2008 (8 pages).
International Preliminary Report on Patentability for International Application No. PCT/US07/76298, dated Feb. 24, 2009 (6 pages).
International Preliminary Report on Patentability for International Application No. PCT/US08/74220, dated Mar. 2, 2010 (10 pages).
USPTO Office Action for U.S. Appl. No. 11/468,809, Aug. 17, 2010 (7 pages).
USPTO Office Action for U.S. Appl. No. 11/567,322, Aug. 12, 2010 (13 pages).
USPTO Office Action for U.S. Appl. No. 11/539,518, Aug. 20, 2010 (8 pages).
USPTO Office Action for U.S. Appl. No. 11/533,300, Aug. 20, 2010 (7 pages).
U.S. Appl. No. 11/675,182, filed Feb. 15, 2007, Alderucci et al.
PCT Search Report and Written Opinion for International Application No. PCT/US08/54128, Sep. 10, 2008 (12 pages).
USPTO Office Action for U.S. Appl. No. 11/675,182, May 21, 2009 (6 pages).
USPTO Office Action for U.S. Appl. No. 11/675,182, Sep. 4, 2009 (8 pages).
USPTO Office Action for U.S. Appl. No. 11/675,182, Apr. 13, 2010 (12 pages).
International Preliminary Report on Patentability for International Application No. PCT/US08/54128, Aug. 19, 2009 (6 pages).
Australian Examination Report for Application No. 2008216057, Jun. 28, 2010 (2 pages).
Michael Friedman, Bet on Poker? Bodog takes bets on the 2005 WSOP, dated Jun. 24, 2005, http://www.pokernews.com/news/2005/06/bet-on-poker-bodog-wsop.htm.
USPTO Pre-Brief Appeal Conference Decision for U.S. Appl. No. 11/680,764, Sep. 27, 2010 (2 pages).

USPTO Office Action for U.S. Appl. No. 11/733,902, Oct. 6, 2010 (13 pages).
U.S. Appl. No. 12/897,954, filed Oct. 5, 2010, Inventor: Howard W. Lutnick for "Secondary Game" (126 pages).
USPTO Office Action for U.S. Appl. No. 11/680,764, Aug. 31, 2009 (10 pages).
USPTO Office Action for U.S. Appl. No. 11/567,322, Sep. 16, 2009 (9 pages).
USPTO Office Action for U.S. Appl. No. 11/621,369, Sep. 29, 2009 (11 pages).
U.S. Appl. No. 12/962,828, filed Dec. 8, 2010, Lutnick et al.
USPTO Office Action for U.S. Appl. No. 11/621,369, Nov. 10, 2010 (16 pages).
USPTO Office Action for U.S. Appl. No. 11/674,232, Oct. 28, 2010 (6 pages).
USPTO Office Action for U.S. Appl. No. 11/680,764, Dec. 7, 2010 (22 pages).
USPTO Pre-Brief Appeal Conference Decision for U.S. Appl. No. 11/675,182, Nov. 10, 2010 (2 pages).
USPTO Office Action for U.S. Appl. No. 11/468,809, Apr. 27, 2011 (12 pages).
USPTO Notice of Allowance and Fees Due for U.S. Appl. No. 12/512,730, Apr. 8, 2011 (6 pages).
USPTO Office Action for U.S. Appl. No. 11/533,300, May 10, 2011 (5 pages).
USPTO Office Action for U.S. Appl. No. 11/567,322, May 31, 2011 (32 pages).
USPTO Office Action for U.S. Appl. No. 11/674,232, Jun. 7, 2011 (8 pages).
USPTO Office Action for U.S. Appl. No. 12/147,005, Apr. 20, 2011 (8 pages).
USPTO Office Action for U.S. Appl. No. 11/697,024, Apr. 11, 2011 (6 pages).
USPTO Examiner's Answer to Appeal Brief for U.S. Appl. No. 11/675,182, Jun. 23, 2011 (17 pages).
USPTO Office Action for U.S. Appl. No. 12/693,668, Jul. 14, 2011 (6 pages).
USPTO Notice of Allowance and Fees Due and Examiner Interview Summary for U.S. Appl. No. 11/680,764, Jul. 25, 2011 (12 pages).
USPTO Pre-Brief Appeal Conference Decision for U.S. Appl. No. 11/680,764, Aug. 5, 2011 (2 pages).
USPTO Office Action for U.S. Appl. No. 11/733,902, Sep. 7, 2011 (16 pages).
USPTO Office Action for U.S. Appl. No. 11/846,696, Aug. 26, 2011 (6 pages).
USPTO Notice of Allowance and Fees Due for U.S. Appl. No. 12/194,593, Oct. 19, 2011 (9 pages).
Australian Notice of Acceptance for Application No. 2008216057, Aug. 5, 2011 (3 pages).
EPO Communication and Supplementary European Search Report for Application No. 07854996.1, dated Oct. 7, 2011 (7 pages).
Canadian Examiner's Report for Application No. 2653330, dated Sep. 27, 2011 (3 pages).
USPTO Pre-Brief Appeal Conference Decision for U.S. Appl. No. 11/468,809, Jan. 13, 2012 (2 pages).
USPTO Office Action for U.S. Appl. No. 12/147,005, Nov. 17, 2011 (110 pages).
USPTO Office Action for U.S. Appl. No. 11/697,024, Jan. 6, 2012 (12 pages).
USPTO Office Action for U.S. Appl. No. 11/868,013, Dec. 22, 2011 (7 pages).
USPTO Office Action for U.S. Appl. No. 12/759,757, Nov. 16, 2011 (7 pages).
Canadian Examiner's Report for Application No. 2656934, dated Oct. 17, 2011 (3 pages).
Australian Examination Report for Application No. 2007329314, Nov. 23, 2011 (2 pages).
Australian Notice of Acceptance for Application No. 2007329314, Jan. 5, 2012 (3 pages).
Australian Examiner's Report for Application No. 2009201702, dated Dec. 1, 2011 (4 pages).
Australian Examiner's Report for Application No. 2007286884, dated Nov. 7, 2011 (2 pages).
European Communication and Search Report for Application No. 07841094.1, dated Sep. 22, 2011 (8 pages).
Canadian Examiner's Report for Application No. 2623765, dated Oct. 17, 2011 (7 pages).
USPTO Office Action for U.S. Appl. No. 11/468,809, Jan. 27, 2012 (9 pages).
USPTO Office Action for U.S. Appl. No. 12/693,668, Jan. 27, 2012 (9 pages).
Australian Examiner's Report for Application No. 2009201701, dated Nov. 17, 2011 (3 pages).
USPTO Notice of Allowance and Fees Due for U.S. Appl. No. 11/674,232, Feb. 27, 2012 (11 pages).
USPTO Office Action for U.S. Appl. No. 12/897,954, Feb. 15, 2012 (11 pages).
USPTO Office Action for U.S. Appl. No. 11/846,696, Feb. 16, 2012 (18 pages).
Australian Examiner's Report for Application No. 2007286884, dated Mar. 8, 2012 (2 pages).
Australian Examiner's Report for Application No. 2009201701, dated Mar. 14, 2012 (3 pages).
USPTO Office Action for U.S. Appl. No. 11/539,518, Dec. 8, 2011 (2 pages).
USPTO Office Action for U.S. Appl. No. 12/147,005, Jun. 21, 2012 (124 pages).
USPTO Pre-Brief Appeal Conference Decision for U.S. Appl. No. 11/733,902, May 23,2012 (2 pages).
USPTO Notice of Allowance and Fees Due for U.S. Appl. No. 11/468,809, Sep. 14, 2012 (9 pages).
USPTO Office Action for U.S. Appl. No. 13/177,901, Aug. 27, 2012 (8 pages).
USPTO Office Action for U.S. Appl. No. 11/533,300, Jul. 27, 2012 (9 pages).
USPTO Office Action for U.S. Appl. No. 11/533,300, Oct. 12, 2012 (10 pages).
USPTO Notice of Allowance for U.S. Appl. No. 12/693,668, Aug. 7, 2012 (8 pages).
USPTO Notice of Allowance for U.S. Appl. No. 11/539,518, Jul. 20, 2012 (9 pages).
USPTO Notice of Allowance and Fees Due for U.S. Appl. No. 11/618,426, Sep. 17, 2012 (9 pages).
USPTO Notice of Allowance and Fees Due for U.S. Appl. No. 11/697,024, Sep. 17, 2012 (9 pages).
USPTO Office Action for U.S. Appl. No. 11/733,902, Oct. 11, 2012 (14 pages).
USPTO Office Action for U.S. Appl. No. 11/846,696, Oct. 11, 2012 (11 pages).
USPTO Office Action for U.S. Appl. No. 12/759,757, Aug. 6, 2012 (8 pages).
USPTO Office Action for U.S. Appl. No. 12/759,757, Aug. 31, 2012 (3 pages).
Australian Examiner's Report for Application No. 2011250845, dated Sep. 13, 2012 (3 pages).
Canadian Examiner's Report for Application No. 2678362, dated Sep. 10, 2012 (3 pages).
USPTO Office Action for U.S. Appl. No. 12/962,828, Nov. 15, 2012 (8 pages).
USPTO Office Action for U.S. Appl. No. 12/897,954, Oct. 25, 2012 (7 pages).
USPTO Notice of Allowance for U.S. Appl. No. 11/468,809, Sep. 14, 2012 (9 pages).
USPTO Notice of Allowance for U.S. Appl. No. 12/693,524, Nov. 19, 2012 (9 pages).
USPTO Notice of Allowance for U.S. Appl. No. 12/693,668, Nov. 26, 2012 (10 pages).
Japan Office Action for Application No. 2009-540479, dated Nov. 14, 2012 (6 pages).
Australian Examiner's Report for Application No. 2012202130, dated Nov. 15, 2012 (4 pages).
Canadian Examiner's Report for Application No. 2653330, dated Jun. 20, 2012 (5 pages).

* cited by examiner

Database Entry for a Primary Player 700

Player Identifier: P234567 — 705
Player Name: Sam Hunter — 710

| Game Identifier | Date | Time | Amount Bet | Amount Won | Profits, Trailing 100 Games |
|---|---|---|---|---|---|
| G11112222 | 8/7/2011 | 7:21:03 AM | $1 | $0 | $40 |
| G11112297 | 8/7/2011 | 7:21:09 AM | $1 | $0 | $39 |
| G11112350 | 8/7/2011 | 7:21:16 AM | $1 | $4 | $42 |
| G11112412 | 8/7/2011 | 7:21:21 AM | $2 | $0 | $40 |
| G11112490 | 8/7/2011 | 7:21:27 AM | $1 | $0 | $39 |
| G11112545 | 8/7/2011 | 7:21:37 AM | $1 | $0 | $38 |
| G11112610 | 8/7/2011 | 7:21:44 AM | $3 | $30 | $65 |
| G11112699 | 8/7/2011 | 7:21:52 AM | $1 | $0 | $64 |
| G11112770 | 8/7/2011 | 7:22:00 AM | $1 | $1 | $64 |

TOP PERFORMERS

BRIEF DESCRIPTION OF THE DRAWINGS

FIG. 7 shows a database entry including various games played by a player.

DETAILED DESCRIPTION

Figure 1:
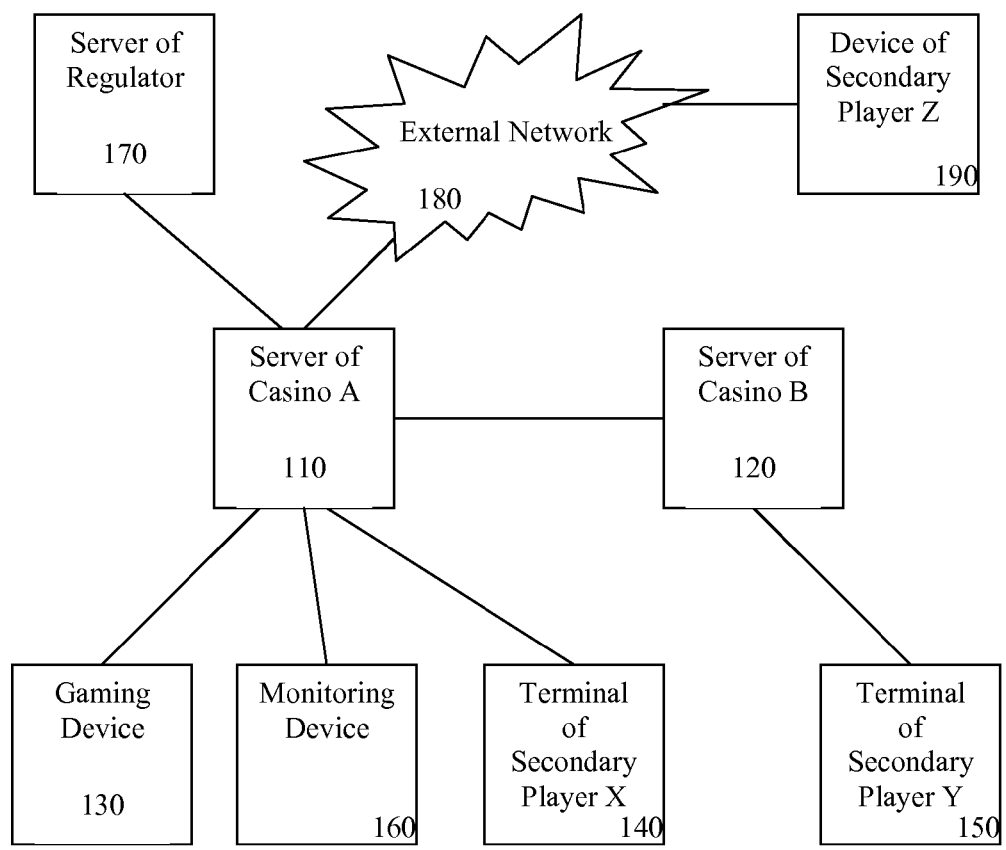
FIG. 1 shows a system according to some embodiments.

The following sections I-IX provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things, does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Indication

The term "indication" is used in an extremely broad sense. The term "indication" may, among other things, encompass a sign, symptom, or token of something else.

The term "indication" may be used to refer to any indicia and/or other information indicative of or associated with a subject, item, entity, and/or other object and/or idea.

As used herein, the phrases "information indicative of" and "indicia" may be used to refer to any information that represents, describes, and/or is otherwise associated with a related entity, subject, or object.

Indicia of information may include, for example, a code, a reference, a link, a signal, an identifier, and/or any combination thereof and/or any other informative representation associated with the information.

In some embodiments, indicia of information (or indicative of the information) may be or include the information itself and/or any portion or component of the information. In some embodiments, an indication may include a request, a solicitation, a broadcast, and/or any other form of information gathering and/or dissemination.

IV. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

V. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g., weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required. Although process steps, algorithms or the like may be described in a particular sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

VI. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VII. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

VIII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

IX. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application.

X. Embodiments of the Invention

Terms

As used herein, the term "viewing window" includes an area of a gaming device at which symbols or outcomes are visible. The area may, for instance, include a pane of glass or other transparent material situated over reels of the gaming device. Thus, only the portion of the reels under the transparent material may be visible to the player. A viewing window may include a display screen, in some embodiments. The symbols or outcomes visible in the viewing window may include the symbols or outcomes that determine the player's winnings.

Encryption

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back in to plaintext. An example of an asymmetric key algorithm is the RSA algorithm.

It will be appreciated that other methods besides encryption may be used to hide or obscure information, such as encoding or steganography. Such methods may also be used in conjunction with cryptography.

Encryption may be used to:
Send a message only specific recipients can read. For example, Alice and Bob may both be in possession of the same secret key. Alice may encrypt a plaintext message with the secret key. She may transmit the resultant ciphertext to Bob. Bob may then decrypt the cyphertext using the secret key so as to view the plaintext version of the message.

Allow messages to be encrypted by many and decrypted only one (e.g., PGP). For example, Alice may possess a public and a private key. Bob may wish to send Alice a message that only Alice will be able to read. Bob may create a message in plaintext and encrypt it using Alice's public key. Bob may send the resultant ciphertext to Alice. Alice may then decrypt the ciphertext using her private key, and may thereby view the plaintext message.

Should Cindy intercept the ciphertext message on its way from Bob to Alice, Cindy would not be able to decrypt the message since Cindy would not have access to Alice's private key. Alice's public key, although available to Cindy, would not be sufficient to decrypt the ciphertext message in a practicable amount of time.

Authenticate the sender of a message. This use of encryption may include having the sender create a digital signature. For example, Alice would like to send a message to Bob in such a way that Bob can be confident that the message has come from her. Alice may construct a plaintext message and encrypt the plaintext into ciphertext using her private key. Alice may then send the ciphertext message to Bob. Bob may then use Alice's public key to decrypt the ciphertext back in to plaintext. Since Alice's public key only works to decrypt a ciphertext message created using Alice's private key, and since presumably only Alice has access to her own private key, Bob can be confident that the message originated from Alice.

Allow for non-repudiation. If a sender has applied a digital signature to a message, or portion of a message, then the sender will not later be able to claim he did not send the message.

Guarantee a time/data sent. See hashing below.

Guarantee receipt by recipient. See hashing below.

Verify that a message has not been altered after being sent by the sender. See hashing below.

Hashing is a process whereby input data, typically of arbitrary length, is transformed into output data, typically of shorter length and/or of fixed length. A hash function is a function that performs the transformation. Often, useful hash functions will be one-way functions. That is, for a given input, the output can be computed readily. However, for a given output, the input which produced the output will be difficult to calculate. Also, useful hash functions will often have the property that two differing inputs rarely produce the same output. Hashing can be used for the following purposes:

To perform data redundancy checks. For example, a database may contain a large number of names. The names may be of arbitrary length. To check for redundant names, hash values for the names may be created. The hash values may be of smaller size than the names and may all be of the same length. Thus, it may be easier to compare the hash values of the names that it will be to compare the names themselves.

To verify that a message has not been altered. For example, Alice can send a plaintext message to Bob along with a hash value of the message. Alice can apply a digital signature to the hash value so as to assure Bob that the hash value has been sent by Alice. When Bob receives the plaintext message from Alice, Bob can compute the hash value of the message. If the hash value that Bob computes is the same as the hash value that Alice has sent to Bob, then Bob can be fairly confident that the message has not been altered en route from Alice to Bob.

To prove possession of a message without having to reveal the message. For example, Alice can send a message to Bob. Bob can take the hash of the message and send it back to Alice. Alice may thus be assured that Bob has the message without the risk of the message being intercepted en route from Bob to Alice.

To prove possession of a message at a certain time without having to reveal the message. For example, Alice might have a great idea and wish to prove she came up with it at a certain time without having to reveal the idea. Thus, Alice might write out the idea in the form of text, and take a hash value of the text. Alice can then publish the hash of the text in a newspaper. It will then be readily apparent that Alice had possession of the idea at least on the date of the newspaper's publication.

To timestamp a document. For example, a document may be sent to a time-stamping service. The service may then determine the hash value of the document. The service may append the then current date and time to the hash value of the document and apply a digital signature to the result. The digitally signed hash value plus date and time may then be published. So long as the time-stamping service can be trusted to provide accurate dates and times (e.g., not to use old dates and times) then the published timestamp may serve as proof that the document was in existence as of the date and time provided by the time-stamping service. Further precautions may ensure that it becomes very difficult for even the time-stamping service to provide fake times and dates. For example, the time-stamping service may add a sequence number, (e.g., 1, 2, 3, etc.) to each document it timestamps. If the service wishes to provide an old date, the service would have to find an older sequence number. The older sequence number would have to fit between two sequence numbers used immediately before and immediately after the desired fake date. However, no such sequence number would be available if, e.g., no numbers had been skipped in the first place.

FIG. 1 shows a system according to some embodiments. According to some embodiments, Casino A and Casino B may represent facilities where participation in games of chance or in other contests is permitted. In various embodiments, in Casinos A and B, players may place bets on games or contests, and/or may win or lose money based on games or contests. The system of FIG. 1 may permit secondary players in Casino A and secondary players in Casino B to participate in the games of primary players who are at Casino A. Further, the system of FIG. 1 may permit a secondary player outside of Casinos A or B to participate in games of primary players at casino A. Further, the system of FIG. 1 may permit regulators to track various data related to the games of primary players played at Casino A, to the participation in games by secondary players who are at Casino A, to the participation in games by secondary players who are at Casino B, and to the participation in games by secondary players who are at neither Casino A nor Casino B. According to some embodiments, Casino A may include a server 110. The server may be in communication with a gaming device 130, a monitoring device 160, and a terminal of secondary player X 140, each of which may lie within the premises of Casino A. Server 110 may further be in communication with server 120 of Casino B, with a server of a regulator 170, and with a device of a secondary player Z 190, where the secondary player device 190 is not located on the premises of Casino A nor Casino B. Communication between server 110 and the device 190 may occur through an external network 180, e.g., through the Internet. Casino B may include a server 120 which is in communication with server 110, with the server of a regulator 170, and with a terminal of secondary player Y 150, which may lie within the premises of Casino B.

In some embodiments, the server of Casino A 110 may receive data about a game from gaming device 130 or from monitoring device 160. A monitoring device may include a device such as a camera or microphone which may monitor a game at Casino A and transmit data about the game to the server of Casino A. The server of Casino A may transmit data received from gaming device 130 or monitoring device 160 to the terminal of a secondary player X 140 so as to allow the terminal 140 to recreate the game, to accept bets from secondary player X on the game, and to pay winnings to secondary player X based on the game.

The server of Casino A 110 may further transmit received data about a game to the server of Casino B 120. The server of Casino B may, in turn, transmit such data to the terminal of a secondary player Y 150 so as to allow the terminal 150 to recreate the game, to accept bets from secondary player Y on the game, and to pay winnings to secondary player Y based on the game.

The server of Casino A 110 may further transmit received data about a game to the device of secondary player Z 190, e.g., through the Internet. The device of secondary player Z 190 may, in turn, recreate the game for secondary player Z, receive bets on the game from secondary player Z, and/or credit winnings to secondary player Z based on the game.

The server of Casino A 110 may further transmit received data about a game to the server of the regulator 170. Such data may allow the regulator to monitor the fairness of games, to watch for illegal gaming, to track taxable income of the casino, or to perform any other desired function.

In various embodiments, the terminal of secondary player X 140 may transmit to the server of Casino A 110 data about the activities of secondary player X at the terminal. Further, the terminal of secondary player Y 150 may transmit to the server of Casino B 120 data about the activities of secondary player Y at the terminal. The server of Casino B 120 may transmit such data to the server of Casino A 110. Further, the device of secondary player Z 150 may transmit to the server of Casino A 110 data about the activities of secondary player Z at the device. Data received by the server of Casino A 110 from terminals 140 and 150, and from device 190 may allow the server of Casino A to tracking winnings and losses of secondary players X, Y, and Z; to determine which data (e.g., data about which games) to transmit to the terminals or device; to determine an amount owed to Casino A by Casino B for use of data from Casino A; and so on. Further, data received by the server of Casino A 110 from terminals 140 and 150, and from device 190 may be forwarded to the server of the regulator 170. The regulator may use such data to track the bets of secondary players, to check for illegal gambling, to monitor the fairness of games, etc.

It should be appreciated that the system of FIG. 1 represents a system according to some embodiments, and that other servers, devices, terminals, networks, and communication links may be present in various embodiments.

Figure 2:
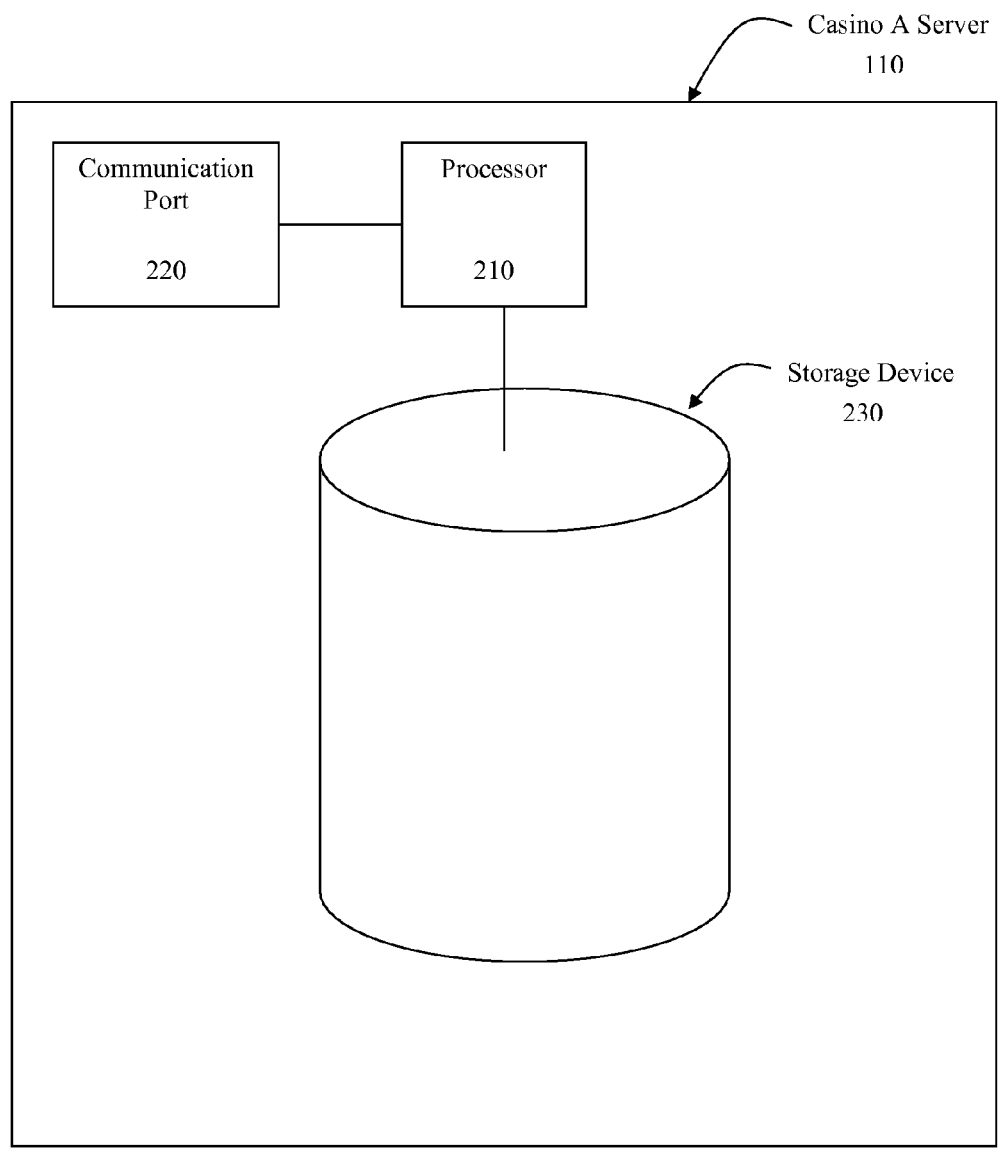
FIG. 2 shows a casino server according to some embodiments.

FIG. 2 shows the Casino A server according to some embodiments. In various embodiments a similar server may constitute the Casino B server, or the server of any other casino. The storage device 230 may store program data. The program data may be used to direct the processor 210 to execute algorithms in accordance with various embodiments. The storage device 230 may store other types of data. Such data may include data received from the play of games; data that can be used to recreate games; data describing bets, wins, and loss of primary and secondary players; data describing the current locations or activities of primary or secondary players; data describing amounts owed to a casino; and so on. Communication port 220 may be used to transmit and/or to receive data. Communication port 220 may include an antenna, a wireless transmitter, a signal generator, a router, or any other communication device. Any data transmitted or received may be stored, at least at some point, in storage device 230.

Figure 3:
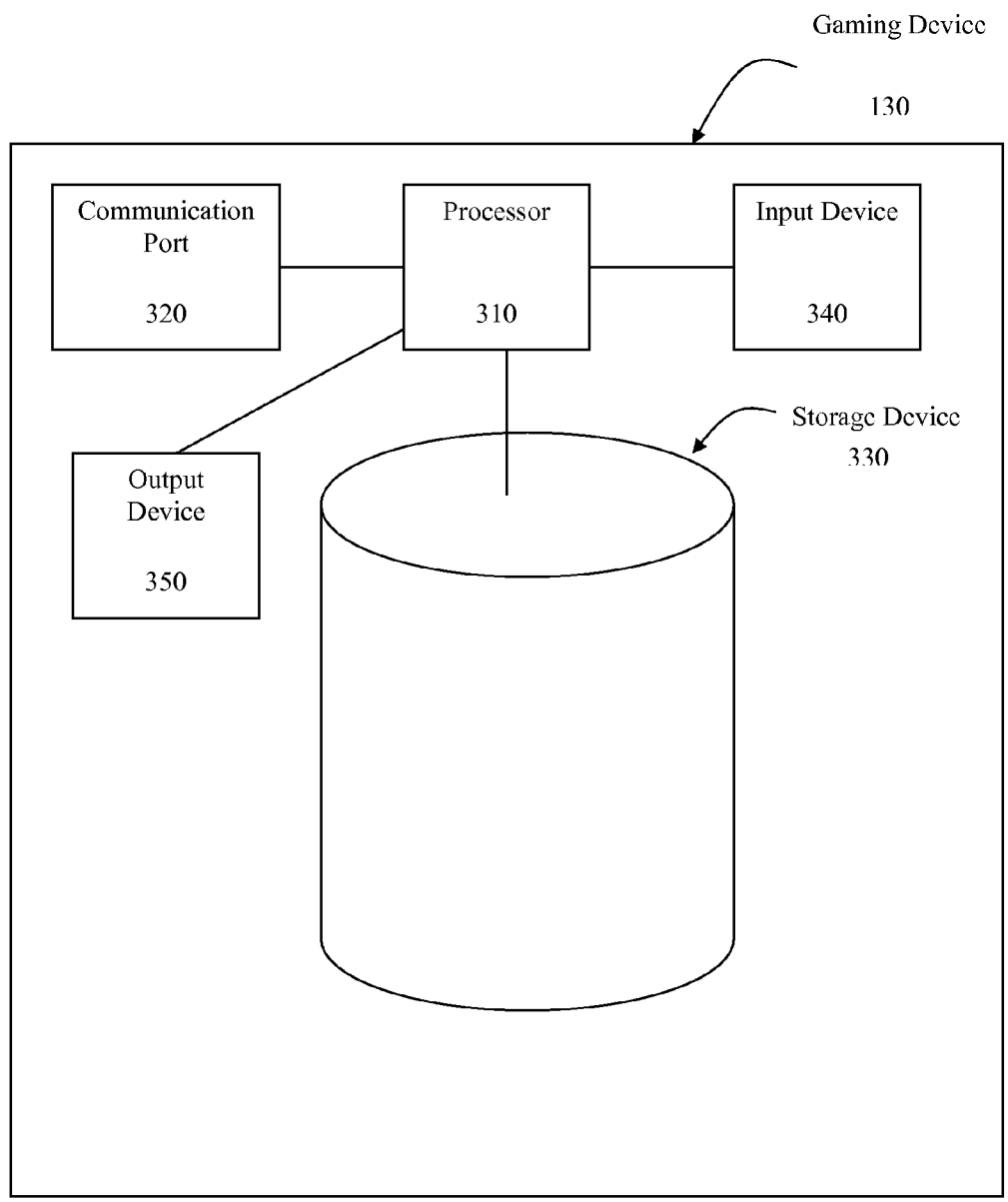
FIG. 3 shows a terminal for use by a secondary player, according to some embodiments.

FIG. 3 shows a gaming device 130 according to some embodiments. The storage device 330 may store program data. The program data may be used to direct the processor 310 to execute algorithms in accordance with various embodiments. Program data may include data used to generate graphics, to determine game outcomes, to compute winnings, and so on. The storage device 330 may store other types of data. Such data may include data describing bets, wins, and losses by a primary player at gaming device 130. Input device 340 may include sensors, buttons, touch screens, microphones, bill validators, coin acceptors, card readers, and any other means by which a primary player or other party may interact with gaming device 130. For example, the input device 340 may include a "bet" button.

The output device 350 may include display screens, microphones, lights, coin dispensers, buzzers, and any other means by which a gaming device may provide a signal to the secondary player. The communication port 320 may be used to transmit and/or to receive data.

Figure 4:
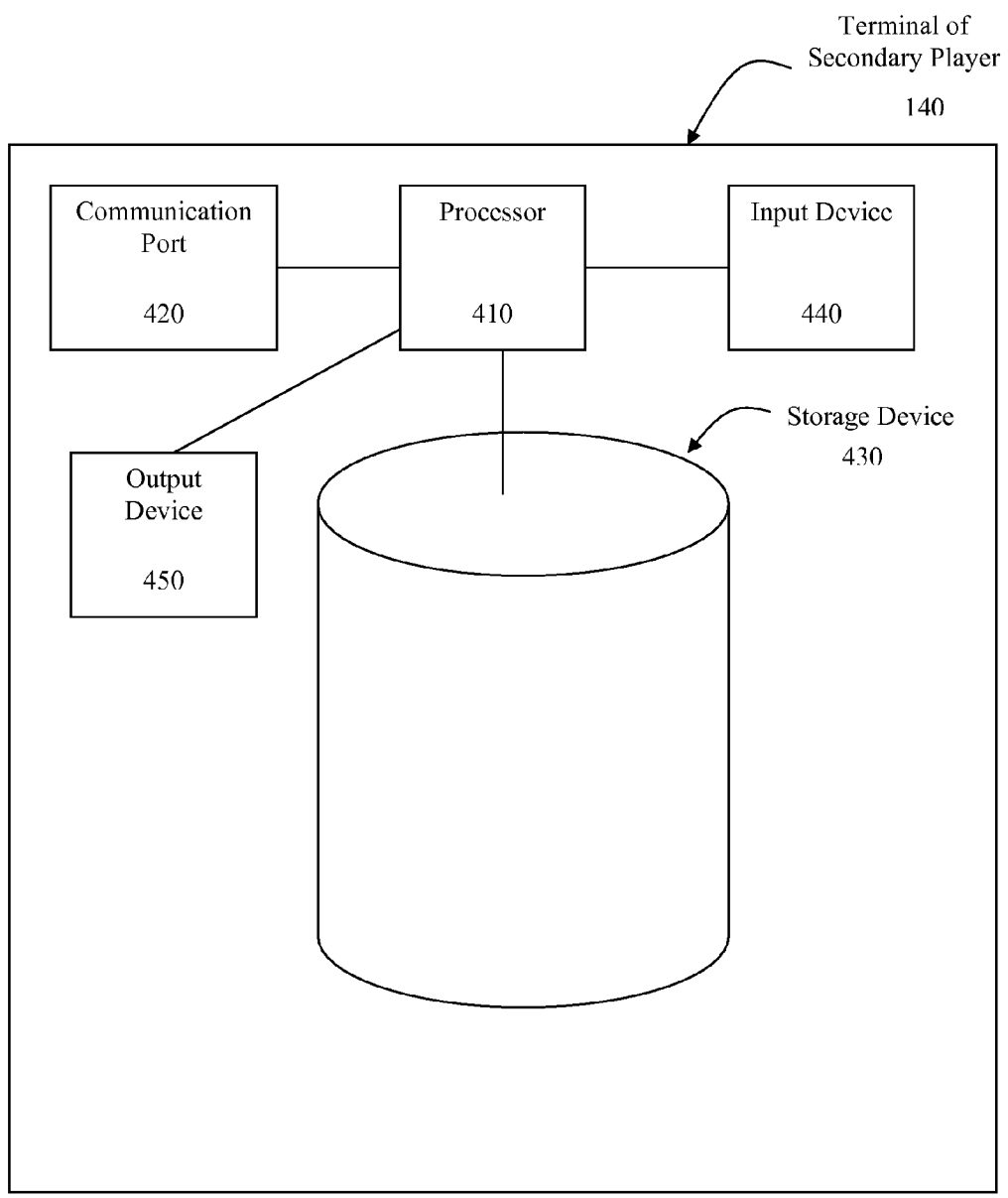
FIG. 4 shows a gaming device according to some embodiments.

FIG. 4 shows a terminal 140 for use by a secondary player, according to some embodiments. The storage device 430 may store program data. The program data may be used to direct the processor 410 to execute algorithms in accordance with various embodiments. Program data may include data used to a recreate games or depictions of games based on data received about original games. Program data may include data used to generate graphics, to display game outcomes, to compute winnings, and so on. The storage device 430 may store other types of data. Such data may include data describing bets, wins, and losses by a secondary player at terminal 140. Input device 340 may include sensors, buttons, touch screens, microphones, bill validators, coin acceptors, card readers, and any other means by which a secondary player or other party may interact with terminal 130. For example, the input device 340 may include a "bet" button.

The output device 350 may include display screens, microphones, lights, coin dispensers, buzzers, and any other means by which terminal 140 may provide a signal to the secondary player. The communication port 320 may be used to transmit and/or to receive data.

Figure 5:
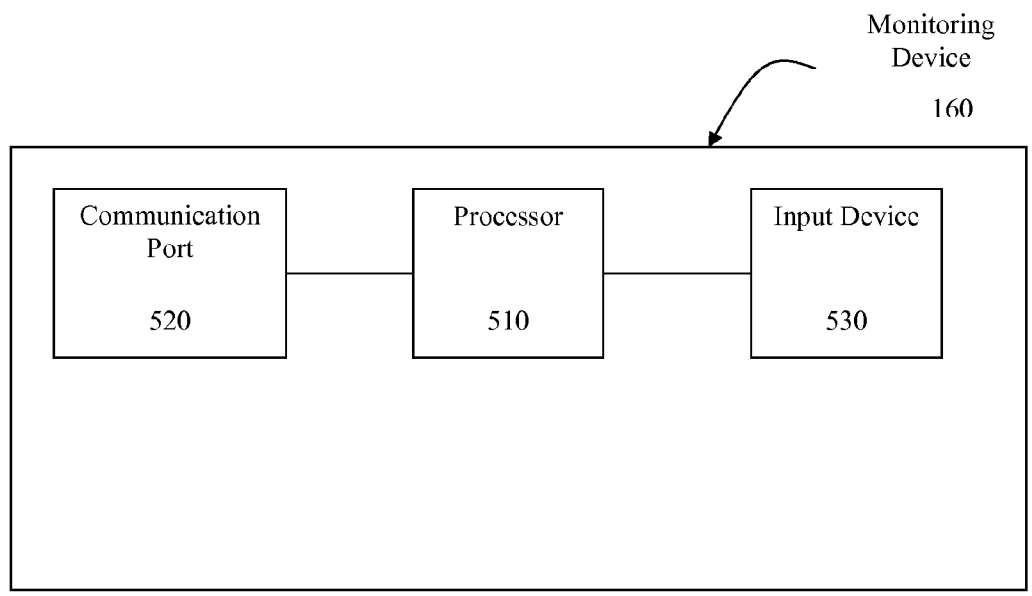
FIG. 5 shows a monitoring device (e.g., camera, card reader) according to some embodiments.

FIG. 5 shows a monitoring device 160 according to some embodiments. The monitoring device may receive data about a game via input device 530. The input device 530 may include a camera, microphone, pressure sensor, bar code scanner, sensor, button, and so on. For example, an input device may include a camera that is pointed at a table where a game of blackjack is being played. For example, an input device may include a camera that is pointed at the viewing window of a slot machine. Communication port 520 may be used to transmit data received by the input device to e.g., a casino server. In various embodiments, the monitoring device may serve multiple purposes, some of which may not involve receiving data about a game. For example, a monitoring device may include a camera which also serves security purposes at casinos.

Figure 6:
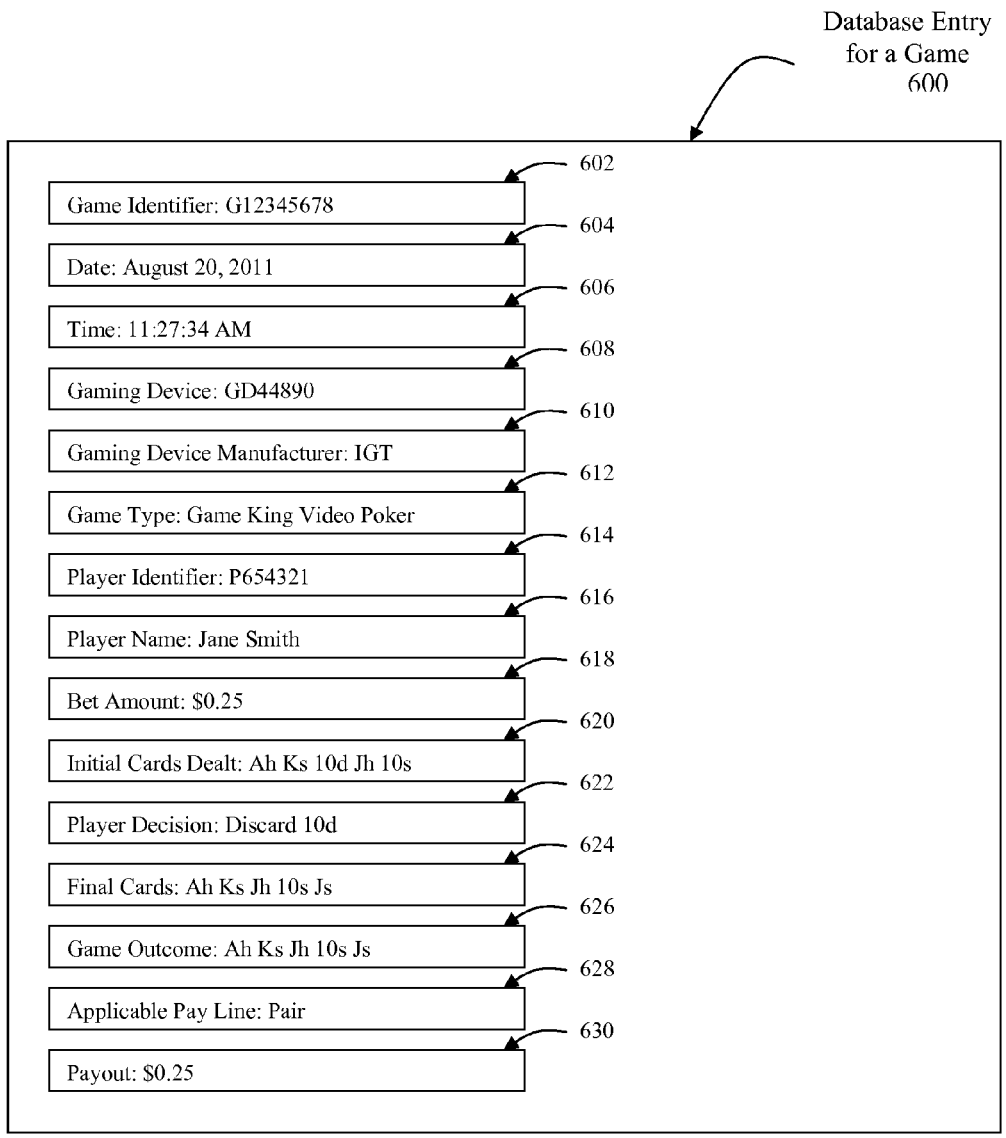
FIG. 6 shows a database entry including various information about a game (e.g., date, time, outcome, player, bet amount)

FIG. 6 shows a database entry 600 including various information about a game. The database entry may store various aspects of a game played by primary player (e.g., by Jane Smith). Such data may later be used to allow a secondary player to participate in the game.

FIG. 7 shows a database entry 700 including various games played by a player. The player may be a primary player. The data in database entry 700 may allow a secondary player to examine historical data about the games of a primary player (e.g., about the games of Sam Hunter), including statistics about the games (e.g., the profits made in the last 100 games).

Figure 8:
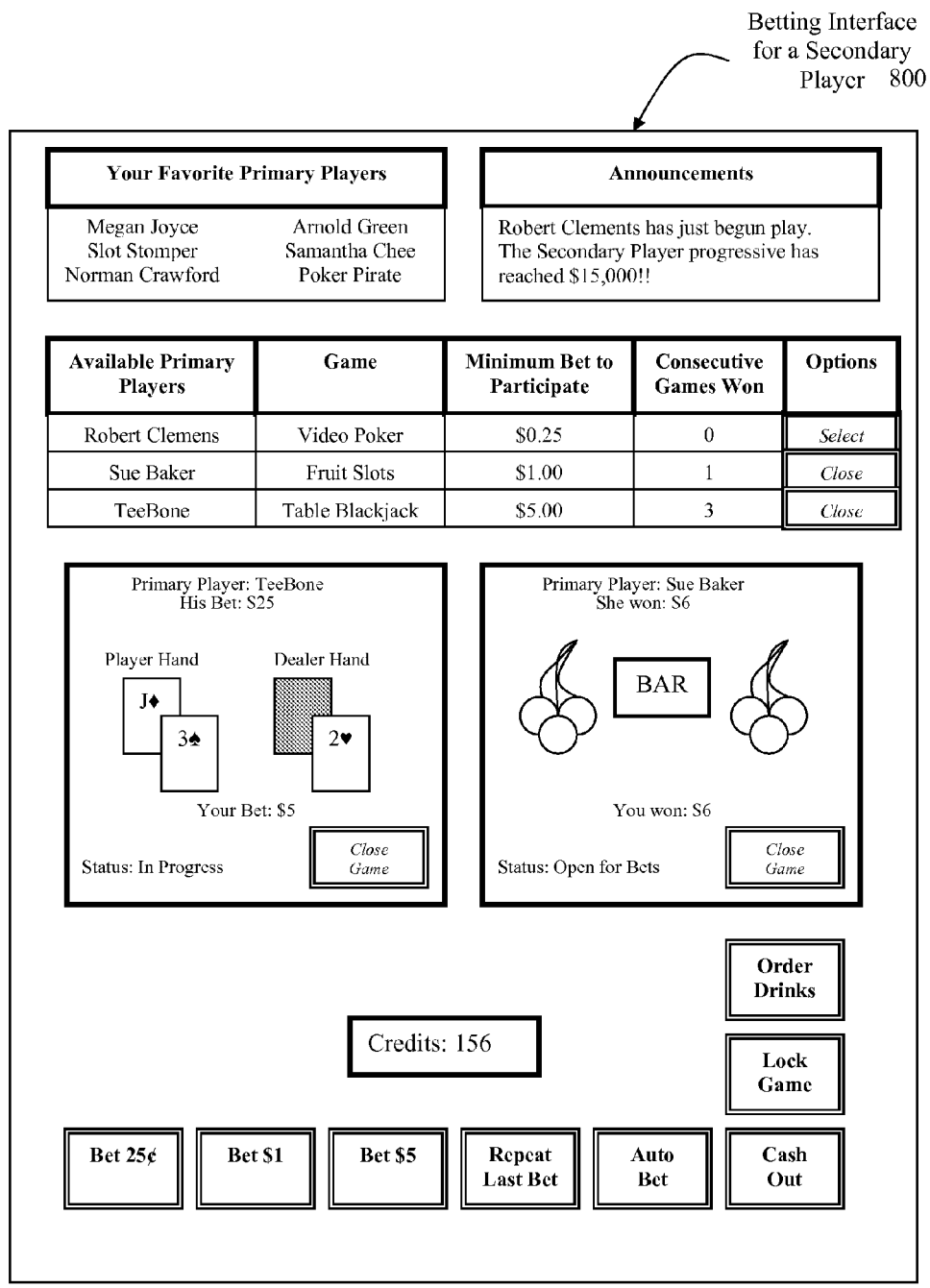
FIG. 8 shows a touch screen display for entering betting information and tracking the progress of a game, according to some embodiments.

FIG. 8 shows a display screen for entering betting information and tracking the progress of a game, according to some embodiments. The display screen may be sensitive and/or responsive to touch and may thereby function as a touch screen, in some embodiments. One area of the display screen lists the favored primary players of the secondary player currently viewing the display. Presumably, the secondary player has logged in or otherwise identified himself to the terminal or device to which the display belongs. The secondary player may have previously indicated his favored primary players. The casino may thus track the whereabouts of the favored primary players and alert the secondary player when a favored primary player begins play.

Another area of the display screen includes an announcements area. The casino may make announcements to the secondary player. Such announcements may include promotional announcements. For example, such announcements may include announcements of discounts at casino or other restaurants, announcements of discounts on shows, announcements about upcoming concerts or boxing matches, announcements about discounts on hotel rooms, and so on. Announcements may include promotions for other products, such as automobiles, toothpaste, or plane flights to the Caribbean. Announcements may further include announcements about primary players in which the secondary player may be interested. For example, an announcement may indicate that a favored primary player of the secondary player has just begun play.

Another area of the display screen includes a list of primary players that are available in the sense that the secondary player may participate in the games of these primary players. This display area may identify the primary player, either by real name or by an alias, such as "TeeBone". The alias may allow a primary player to maintain some anonymity or privacy. This display area may further indicate a game which the primary player is playing (and thus the game the secondary player would be participating in), a minimum bet required of the secondary player to participate in the game, and one or more statistics related to the primary players. For example, statistics may indicate a number of consecutive games won by the primary players. This display area may further include areas where a secondary player can touch in order to begin participating in the games of a primary player. For example, by touching an area labeled "select" next to primary player Robert Clements, the secondary player may begin participating in the games of Robert Clemens.

Another area of the display screen includes windows where a secondary player may track the progress of games in which he is participating. FIG. 8 depicts a first window where the secondary player can follow the game of primary player "TeeBone", in whose game the secondary player is participating. The game is blackjack, and the secondary player has a bet of $5 riding on the game. The game is currently in progress. FIG. 8 depicts a second window where the secondary player can follow the game of primary player Sue Baker. The game is a slot machine game. The game has just finished with an outcome of "cherry-bar-cherry". The secondary player has just won $6 on the game. Now, the secondary player has the opportunity to place bets on the next game, as indicated by the status "open for bets".

Another area of the display screen includes a display of the credit balance of the secondary player. These credits may be used to bet on games in which the secondary player is participating. Each credit may correspond, for example, to $0.25 in value. The secondary player may place bets using the betting areas of the display screen, including a "Bet 25¢" area, a "Bet $1" area, a "Bet $5" area, a "Repeat Last Bet" area, and an "Auto Bet" area. When touched, such areas may apply to only the game which has a status of "Open for Bets". For example, touching the "Bet 1" may cause a bet of $1 to be placed on the game of Sue Baker, since it is that game which has the status of "Open for Bets". In this way, there need not be a separate set of betting buttons for every game in which the secondary player is participating. The "Repeat Last Bet" area may allow the secondary player to easily repeat a prior bet that may take extra effort to enter using the other betting areas. For example, rather than touching the "Bet $1" area 4 times to enter a $4 bet, the secondary player might simply touch the "Repeat Last Bet" area to repeat a prior bet of $4. The "Auto Bet" area may allow the secondary player to continue making the same bet on each new game, for example, without having to always enter a bet. In some embodiments, the secondary player may program in a particular betting strategy and then touch the "Auto Bet" area to have the strategy executed automatically by the terminal of the secondary player. The "Lock Game" area may allow the secondary player to prevent access to the terminal by other secondary players while he steps away for a break. The "Order Drinks" area may allow the secondary player to order drinks or other items and have them delivered to his terminal without ever leaving.

As will be appreciated, the various areas of the touch screen that allow touch interaction may also be implemented using ordinary buttons or any other interactive technology.

It should be appreciated that the figures do not necessarily show everything that might be included in a system, object, machine, device, etc. For example, although not shown in FIG. 3, gaming device 130 may include a coin hopper.

1. One player bets on the outcome of a game of another player. For example, one player bets on whether a winning outcome will be achieved in the game of another player. For example, one player bets on whether another player will win. In various embodiments, one player may place a bet and either win or lose money based on the results of a game played by another player. As used herein, "primary player", "primary players", and the like, may refer to a player or players who most directly participate in a game, such as a casino game. A primary player may, for example, be physically located at a slot machine and may participate in a game at the slot machine by inserting a coin, indicating a bet amount, and pulling a handle of the slot machine. A primary player may also be physically located at a table game, such as a game of blackjack with a live dealer. In various embodiments, a primary player directly initiates a game in which he participates, e.g., by pulling the handle of slot machine or physically placing a bet at a table game and motioning to a dealer that he is interested in playing. In various embodiments, a particular game would not occur but for the actions of the primary player.

As used herein, "secondary player", "secondary players", and the like, may refer to a player or players who participate or may come to participate in games played by primary players or by other secondary players. For example, a secondary player places a bet on a game in which a primary player is involved. The secondary player wins if the primary player wins, and the secondary player loses if the primary player loses. In another example, a secondary player places a bet for a game that has already occurred. When placing the bet, the secondary player does not know the outcome of the game. Once the secondary player has placed the bet, the outcome of the game may be revealed to the secondary player, and the secondary player may be paid if the outcome is a winning outcome. In another embodiment, secondary player A places a $10 bet on secondary player B, betting that secondary player B will win a game on which secondary player B has placed a $20 bet. If secondary player B wins the $20 bet, then secondary player A will win the $10 bet. In various embodiments, the secondary player does not initiate the game in which he participates. In various embodiments, a game in which the secondary player participates would occur whether or not the secondary player chose to bet on the game. The game in which a secondary player participates may be initiated by a primary player or may be initiated automatically, e.g., by a computer program. Where ever data is used herein, it should be understood that such data may be stored, such as in a database or in any other suitable medium, format, or data structure. Data may be stored in either a fixed location or throughout distributed locations. Data may be stored either in a single location or in multiple locations (e.g., in multiple redundant locations). The data may be retrieved as needed from its storage location. When data is generated but not immediately needed, such data may be stored for later retrieval. Data may be accessible by reference to any part of the data, including any tag or label associated with the data. For example, if some data elements of a set of data elements are known, the remaining data elements from the set of data elements may be retrieved based on the known data elements. For example, the known data elements may serve as a search key for finding the remaining data elements in the set of data elements.

In all applicable embodiments described herein, any data generated, transmitted, stored, retrieved, or used may also be stored for auditing purposes. Such data may be made available to regulators to casinos (e.g., to casinos generating the data; e.g., to casinos using the data), or to any other relevant party. Data that may be stored may include data describing the size of a bet made by a primary player on a game, the type of bet made by a primary player on a game, intermediate events that occurred during a game (e.g., rolls prior to the final roll in a game of craps), the date of a game, the decision options that were available in a game (e.g., hit, stand in blackjack), the decisions that were made in a game, the outcome of a game, the amount paid to the winner of a game, and so on.

In various embodiments, data may be collected and stored relating to any searches of game related data. For example, suppose a secondary player searches for all games in which a payout of more than 100 coins was won. Accordingly, data indicating the search criteria may be stored so that it may be possible to determine in the future that a secondary player searched for all games in which a payout of more than 100 coins was won. Further data describing the results of a search may be stored. For example, if the search by the secondary player yielded 1218 games, then this fact may be stored. Further identifiers for each game identified by the search may be stored.

1.1. One player places bets on a game in which another player participates. In various embodiments, a secondary player may place a bet on the outcome of a game itself. For example, a secondary player may place a bet on the outcome of a slot machine game. If the outcome "bar-bar-bar" occurs in the game, then the secondary player may receive ten times his bet. The secondary player need not, in various embodiments, place the same type of bet as does the primary player. For example, the primary player may initiate a craps game with a "pass" bet. The secondary player may bet on the same craps game, but may place a "don't pass" bet. Thus, though the secondary player and the primary player have placed bets on the same game, the primary player may lose and the secondary player may win.

1.2. One player places bets on how another player will do. In various embodiments, a secondary player may place a bet on what will happen to a primary player in a game. The secondary player does not, in various embodiments, bet on the outcome of the game itself, but only on how the outcome of the game effects the primary player given the primary player's bet on the game. For example, the secondary player may bet that the primary player will win the game. If the primary player wins, then the secondary player's bet may be a winning bet and the secondary player may receive a payment. If, however, the primary player loses, then the secondary player may lose.

In various embodiments, the secondary player may bet that the primary player will lose. The secondary player may thus receive a payment for a winning bet if the primary player loses, but the secondary player may lose his bet if the primary player wins.

It should be noted that often, a bet placed by a primary player will provide the house or casino with an advantage. This is how the house may make money, on average. Thus, if a secondary player is permitted to place a bet against a primary player, then the secondary player may enjoy the same advantage as the house. In various embodiments, the secondary player may be charged a fee for betting against the primary player. The fee may provide the house with an advantage in a bet that might otherwise favor the secondary player. The fee may be a flat fee. The fee may be a percentage of the secondary player's bet. The fee may be taken only from payments of winnings received by the secondary player. For example, if the secondary player wins a payment of $10 based on a $10 bet placed, 50 cents may be deducted from the payment and kept by the house.

In various embodiments a fee charged to the secondary player may be set at an amount which provides to the house the same advantage as the house had against the primary player. As used herein, a "house advantage" or "house edge" may be defined as a ratio of the expected amount won by a casino to the initial amount bet by a player. Suppose that a house advantage on a game is 1.41%. Thus, a primary player who bets $1 could expect to receive $0.98.59 back, on average. Further, suppose that a primary player initially bets $1 and may receive back $0 (for a net loss of $1) or may receive back $2 (for a net gain of $1). An exemplary such bet would be a $1 pass bet in the game of craps. The secondary player, in this example, may bet $1 against the primary player. The secondary player would then expect to receive back $1.01.41, on average. In order to give the house the same advantage against the secondary player that it had against the primary player, the secondary player may be charged a fee of $0.02.82. This fee may be rounded to $0.03, or may be varied over a large number of secondary player bets so as to average out to $0.02.82. With the fee taken into account, the secondary player might expect to receive $0.98.59 back per dollar bet, providing the house with the same advantage against the secondary player as it had against the primary player.

In various embodiments, the secondary player may not be allowed to take exactly the opposite position as does the primary (e.g., where all wins for the primary player are losses for the secondary player, and vice versa). In various embodiments, an outcome that causes the primary player to lose may not result in a win for the secondary player, even though the secondary player has bet against the primary player. For example, an outcome of "plum-orange-cherry" may cause the primary player to lose, but may also cause the secondary player to lose. In various embodiments, an outcome that caused the primary player to lose may result in a push or tie for the secondary player. In this way, the house may maintain an edge against the secondary player even if the house also had an edge against the primary player. In various embodiments, the outcomes which are losing for the primary player and not winning for the secondary player may be chosen in such a way that the house is given the same advantage over the secondary player that it had over the primary player. For example, suppose that a particular game provides the primary player with the potential to either win $1 net, or lose $1 net. Suppose further that the game has a 2% house edge. Suppose further that outcomes X and Y in the game are both losing outcomes for the primary player. Outcome X occurs with probability 0.03, and outcome Y occurs with probability 0.01. With a bet of $1 against the primary player, the secondary player would ordinarily expect to win $1.02, for an average net profit of $0.02. However, in various embodiments, outcomes X and Y may also be counted as ties for the secondary player. The secondary player's expected payment is then reduced by the probability of X times the amount that would have been won (beyond the bet amount) upon the occurrence of X, plus the probability of Y times the amount that would have been won (beyond the bet amount) upon the occurrence of Y. This reduction is equal to $0.03 \times \$1 + 0.01 \times \$1 = \$0.04$. The secondary player's expected winnings have thus been brought down from $1.02 to $0.98. This reduction provides the house with the same 2% edge against the secondary player as it had in the original game against the primary player.

In various embodiments, the secondary player may bet against an outcome that would ordinarily be winning in a game. For example, in a game of blackjack, the secondary player may bet that the dealer will win. In various embodiments, the house may then alter the probabilities of various outcomes in the game so as to return an edge to the house. For example, if a secondary player bets on the dealer in a game of blackjack, the house may remove cards with low point values from the deck. This may reduce the probability of a dealer win, and thus may reduce the probability that the secondary player may win when betting on the dealer. In various embodiments, a game where the secondary player bets on the house may not be a game that was actually played by a primary player. Rather, the game may be a game that is or was simulated by the house with probabilities of various outcomes altered from the standard probabilities of the game.

In various embodiments, a secondary player may take the house's position, or approximately the house's position, and bet against a primary player. The secondary player may thereby lose whatever the primary player wins, and win whatever the primary player loses. For example, if the primary player loses his bet of $1, then the secondary player may win $1. However, if the primary player wins $10, the secondary loses $10. In order that the house may be sure of collecting $10 from the secondary player in the event that the primary player wins $10, the house may require the secondary player to place a sufficient deposit with the house to cover possible losses of the secondary player. The deposit might come in the form of a credit balance that the secondary player has accumulated (e.g., as a result of inserting bills, or as a result of winning bets), in the form of a financial account that the house is free to charge in order to collect on the secondary player's obligations (e.g., the secondary player may provide a credit card number), in the form of a check that the secondary player has provided to the house, or in any other suitable form. In various embodiments, the house may require a deposit or other commitment from the secondary player equal to the maximum possible payout that may be received by the primary player. For example, suppose the primary player participates in a game in which the primary player may win up to $100. If the secondary player bets against the primary player, then the secondary player may risk losing up to $100 in a game. The house may thus require the secondary player to have a credit balance of as much as $100 in order to bet against the primary player. In various embodiments, the house may require the secondary player to confirm (e.g., by pressing a button) that the secondary player is aware he has the potential to lose up to X amount, where X is the maximum the secondary player might lose from participating in a game.

In various embodiments, a secondary player may bet against a primary player while not mirroring the payouts of the primary player. For example, the secondary player may bet $1 on a game in which the secondary player bets that the primary player will lose. If the primary player does lose the game, the secondary player may receive $1.25, for a net profit of $0.25. If, the primary player wins, the secondary player may lose his bet of $1, for a net loss of $1. The secondary player may lose $1 regardless of the amount that the primary player wins. For example, the secondary player may lose $1 whether the primary player wins $1 or whether the primary player wins $100.

In various embodiments, the secondary player may bet that a primary player will win a certain multiple of the primary player's bet in a given game. For example, the secondary player may bet $5 that the primary player will win at least triple the primary player's bet of $2 in a game. The secondary player may win $20 if the primary player wins at least $6. Otherwise, the secondary player may lose his bet of $5.

In various embodiments, the secondary player may be paid according to a table or function that maps every possible result of a primary player to a payment for the secondary player. For example, the secondary player may receive $3 if the primary player wins $0, $5 if the primary player wins $1, $0 if the primary player wins $2, $0 if the primary player wins $3, $1 if the primary player wins $4, and so on. As will be understood, the function need not perform a linear or continuous mapping.

In various embodiments, a secondary player may be forbidden and/or prevented from placing a bet that would provide the secondary player with an edge. For example, a secondary player may be prevented from betting against a primary player, where the house had an edge versus the primary player.

1.3. A player places bets for games from the past. In various embodiments, a secondary player may place a bet on a game that has occurred in the past. With respect to the game, at least one of the following may have occurred in the past (e.g., before the secondary player placed a bet on the game): (a) the game's start; (b) the game's conclusion; (c) collection of a bet from the primary player who played the game; and (d) payment of winnings to the primary player who played the game.

When a game is originally played, a record of the game may be created. The record may include data sufficient to recreate all or part of the game. Such data may include: (a) one or more seeds or random numbers used to generate outcomes for the game; (b) one or more outcomes of the game (e.g., "cherry-bell-lemon"; e.g., a sequence of five cards, such as cards constituting a poker hand; e.g., a set of hands of cards, such as a player hand and dealer hand, or such as a player hand and hands of the player's opponent; e.g., the number or numbers showing on one or more dice, such as in a game of craps; e.g., a sequence of numbers showing on a sequence of dice rolls; e.g., a set of numbers in a game of keno; e.g., the payouts achieved in a bonus round; e.g., the level achieved in a bonus round); (c) one or more symbols comprising an outcome of the game; (d) one or more cards; (e) reel positions for one or more reels of a slot machine; (f) a number of decks used; (g) a decision made by a primary player of the game; (h) one or more algorithms used to generate an outcome of the game; (i) an identifier for the gaming device used in the game; (j) a pay table used for the game; (k) a make, model, or year for the gaming device used in the game; (l) a date or time when the game was played; (m) a location where the game was played; (n) a dealer involved in the game; (O) a position of the primary player at a table used in playing the game; (p) an identifier (e.g., a name) for the primary player who played the game; (q) an identifier of another player in the game (e.g., another player at a blackjack table where the game was played); (r) a bet made by a primary player of the game; (s) winnings received by the primary player in the game; (t) video footage of the game; (u) audio footage of the game; and (v) an order of cards dealt from a deck of cards. Video footage of the game may include video footage from various perspectives. In some embodiments, video footage may show or focus on cards, dice, or reels, or other items which determine and/or reveal the outcome of a game. Video footage may include footage of actions in a game, such as footage of a player making bets, making decision, and/or collecting winnings. Such video footage may focus on a player's hands, for example. In some embodiments, video footage may show or focus on a dealer or other casino representative in charge of a game. In some embodiments, video footage may show or focus on a player's face or body. For example, video footage may show a player's facial expressions or body language during a game. In some embodiments, video footage may focus on spectators. In some embodiments, video footage is recorded from a live game. In some embodiments, video footage is generated. Video footage may be generated based on stored data about a game.

Video footage may be generated in a number of ways. In some embodiments, video footage may be generated by assembling stock video clips. For example, one stock video clip may show a primary player (e.g., an actor acting as a primary player) making a bet. Another stock video clip may show a primary player rolling the dice. There may be stock video clips of every possible outcome in a game. For example, there may be a stock video clip showing the every possible roll of two dice. To assemble video footage of a complete game, the casino may e.g., put together a video clip of a bet being made, a video clip of an outcome being rolled corresponding to the outcome that actually occurred in the original game the secondary player is betting on, and a video clip of a player collecting his winnings. In some embodiments, stock video footage may include video footage of entire games. Should a similar game later occur, the same video footage may be used for the similar game when the secondary player is participating in the similar game.

In some embodiments, video footage is generated using computer algorithms. For example, computer algorithms may generate footage showing a simulated primary player placing a bet and rolling dice, the dice bouncing and landing, a simulated croupier paying winnings, and so on. In various embodiments, video may be generated so as to be true, as much as practicable, to the data of the game. For example, video may be generated to show a video or animated depiction of an outcome that actually occurred in a game of a primary player.

In various embodiments, video may be generated based on data about a game. Data indicating the bet amount of a primary player may be used to generate video of a primary player (e.g., a simulated primary player) making a bet of the same bet amount. Data indicating an outcome of a game may be used to generate video showing the same outcome being generated. Data indicating intermediate symbols or indicia that appear during a game may be used to generate video showing those same intermediate symbols or indicia. For example, data indicating that a particular position at a blackjack table was dealt the seven of hearts may be used to generate video showing the simulated dealing of the seven of hearts on a simulated blackjack table. Data indicating the identity of a primary player may be used to generate video. For example, based on a stored photo of a primary player, the casino may generate cartoon caricatures of the primary player playing a game. Data indicating the age or other demographic of a primary player may be used to generate video. For example, if the primary player is a 60 year-old female, the casino may generate a cartoon caricature of a 60 year-old female playing a game. In some embodiments, demographic data about a player may be used to retrieve stock footage of a player with similar characteristics. For example, stock footage of a 60 year-old female player may be retrieved.

The record of the game may be stored by a gaming device, casino server, third party server, or other device. Subsequently, a secondary player may place a bet on the game, or on some aspect of the game. Once the secondary player has placed a bet, data stored in the record may be used to recreate the game, or to recreate some aspect of the game. For example, video footage of the game may be shown to the secondary player. In some embodiments, the outcome of the game may simply be displayed for the secondary player.

Based on the outcome of the game, and based on the bet placed by the secondary player, the secondary player may lose his bet, lose a portion of his bet, break even, or be paid winnings. For example, if the outcome of the game is a winning outcome, then the secondary player may be paid based on the standard rules of the game. For example, if the secondary player bets $10 on a game of blackjack, and the primary player in the game received 20 points to the dealer's 19, then the secondary player may win $10 in addition to keeping his bet.

If the secondary player has placed a bet on what would happen to the primary player, then the winnings and/or losses of the primary player may be revealed to the secondary player. For example, if the secondary player bet against the primary player, and the primary player lost, the secondary player may win. If the secondary player made a bet whereby the secondary player receives twice the winnings of the primary player, and the primary player wins $20, then the secondary player may receive $40

1.4. A primary player on which a secondary player was betting is no longer available. In various embodiments, a secondary player may participate in one or more games played by a primary player. For example, the secondary player may place bets on the games played by the primary player. The primary player may, at some point, terminate his playing session. The secondary player may, on the other hand, wish to continue his participation in the games of the primary player, and may thus find himself deprived of opportunities to make bets on the games of the primary player.

1.4.1. A primary player is asked to stay. In various embodiments, the primary player may signal his intention to terminate a playing session. For example, the primary player may stand up, cash out, refrain from placing a bet even though he is at a table game, and so on. The secondary player may signal his desire to continue participating. For example, the secondary player may press a button labeled "continue session" on a betting interface. The secondary player may communicate his desire verbally (e.g., to a casino representative), via text (e.g., via a text message sent to a casino representative) or in any other manner. Regardless of whether the secondary player actually signals his desire to continue participating, the primary player may be contacted. For example, a representative of the casino may contact the primary player. Such a representative may include a waitress, pit boss, dealer, etc. The primary player may be asked to stay and to continue playing. The primary player may be offered a benefit for staying, such as cash, goods or services, a free meal, show tickets, improved odds, comp points, and so on. The primary player may be informed that there is a secondary player who appreciates the results of the primary player and wishes for the primary player to remain.

In some embodiments, a primary player who has signaled an intent to leave may be asked to stay only if one or more criteria are satisfied. For example, the primary player may be asked to stay only if at least three secondary players have been participating in the games of the primary player. Other criteria may include: (a) there are at least X secondary players watching the games of the primary player; (b) there are at least X secondary players who are interested in participating in the games of the primary player;

(c) there has been at least X dollar amount of bets placed by secondary players on each game of the primary player; (d) there has been a total of at least X dollar amount of bets placed by secondary players on games of the primary player during a particular period of time, number of games, particular playing session, etc.; (e) the casino has made at least X dollars of profit from secondary players having participated in the games of the primary player; (f) the casino has made at least X dollars of theoretical win or profits from secondary players having participated in the games of the primary player; and so on. It will be appreciated that a casino may require any combination of the above criteria to be met in order for a primary player to be asked to stay. There may be multiple ways of meeting the above criteria, including by partially satisfying two or more of the criteria. It will further be appreciated that there may be other criteria that a casino may use based on whose satisfaction the casino may ask a primary player to continue with a playing session.

In various embodiments, a casino may offer a primary player an opportunity to play a fair game (i.e., where the primary player's expected winnings accounting for the cost of betting are exactly 0), if the primary player will continue to play.

1.4.2. The casino plays automatically. In some embodiments, when a primary player terminates a playing session, the casino or house may play in place of the primary player. For example, a dealer at a blackjack table may continue to deal a hand to the position where the primary player had been. The dealer may make decisions for the hand, such as hit or stand decisions. The decisions may be made according to optimum strategy. The decisions may also be made based on inputs from the secondary player. Another representative of the casino may also stand in for the primary player. For example, the other representative may sit at the table or slot machine where the primary player had been, and may resume play.

In some embodiments, game outcomes may be generated automatically once the primary player leaves. For example, a slot machine that the primary player has left may continue to generate outcomes. The secondary player may thus continue to place bets on the outcomes.

In some embodiments, a computer algorithm may make decisions in a game. The computer algorithm may substitute in for a primary player in a game so that a secondary player may participate in the game without the presence of a human primary player. In some embodiments a computer algorithm may act as a primary player even when a secondary player had not been participating in games of a prior human primary player.

In other words, a computer algorithm need not necessarily substitute in for a primary player, but may serve as a simulated or artificial primary player from the get go. A computer algorithm may make decisions in a game. The computer algorithm may make decisions of how much to bet; decisions of what types of bets to make (e.g., the computer algorithm may decide whether or not to make an insurance get in a game of blackjack); decisions of whether to check, bet, raise, call, or fold (e.g., in a game of poker); decisions about whether or not to receive additional cards (e.g., in games of blackjack or video poker); and any other decisions that may be made in a game. The computer algorithm may refer to a stored set of rules for making decisions in a game. For example, the computer algorithm may refer to a table which lists one or more possible situations which might arise in a game and which lists a corresponding decision that should be made should that situation arise. The computer algorithm may also include procedures, logic, or other computational methods for computing a decision given a game state. For example, in a game of video poker, a computer algorithm may compute expected winnings given each of several possible decisions. The computer may determine which of the decisions leads to the highest expected winnings and make that decision.

In various embodiments, a computer algorithm may be programmed to make decisions which yield the highest expected winnings, payouts, and/or profits in a game. In various embodiments, a computer algorithm may be programmed to approximate the play of a human player. The computer algorithm may be programmed to, at least occasionally, favor strategies with emotional or intuitive appeal over those that are optimal. For example, a computer algorithm may be programmed to pursue a high paying hand in a game of video poker even when expected winnings would be optimized by pursuing a lower paying but more certain hand. In various embodiments, computer algorithms may be programmed with different personalities. Some might be programmed to take big risks in the strategies they use. Some might be programmed to play conservatively. Some computer algorithms may be programmed to bet frequently (e.g., in games of poker). Some computer algorithms may be programmed to bet infrequently, and only with very good hands (e.g., in games of poker).

1.4.3. An interrupted session of the primary player is resumed when primary player returns. In some embodiments, when a primary player leaves, the session of the secondary player may be put on hold. That is, for the time being, the secondary player may not have the opportunity of placing bets and participating in games played by the primary player. However, the secondary player may have the opportunity to resume playing when the primary player returns and initiates new games.

1.4.3.1. An alert is given to the secondary player when primary player returns. In some embodiments, the secondary player may be sent an alert when the primary player has returned, or when the primary player is soon to return, or when the primary player is likely to return. The alert may take the form of a phone call, email, text message, verbal alert by a casino representative, and so on.

1.4.4. In some embodiments, a secondary player may indicate a primary player in whose games the secondary player may be interested in participating. The secondary player may thereby "tag" or "bookmark" the primary player as a player in whose games the secondary player may wish to participate. In various embodiments, the casino may allow the secondary player to easily determine when a bookmarked primary player is playing (e.g., is seated at a gaming device or gaming table; e.g., has inserted a player tracking card at a gaming device or gaming table; e.g., has played one or more games in the recent past). For example, a secondary player may peruse a list of bookmarked primary player. The secondary player may select one of the primary players from the list and may then be shown whether or not the primary player is currently playing, what game the primary player is playing, where the primary player is playing, or any other information of interest. In some embodiments, the casino may alert the secondary player anytime a bookmarked primary player has begun playing. In some embodiments, the casino may keep track of various statistics related to primary players that the secondary player has bookmarked. The casino may report such statistics to the secondary player when the secondary player makes contact with the casino (e.g., sits at terminal from which the secondary player may participate in games of the primary player), or at any other time. Statistics may include statistics about recent games played, recent wins, recent losses, recent large payouts, recent profits, and so on. Statistics need not necessarily be recent, but may be recent if the secondary player has previously learned of older statistics about the primary player. In various embodiments, if a secondary player is ready to begin participating in the games of a primary player, the secondary player may be offered (e.g., by default) the opportunity to participate in games of a bookmarked primary player. The secondary player may be offered the opportunity to participate in the games of a first bookmarked primary player (e.g., a primary player that is first on the secondary player's list of favorite primary players). If the secondary player declines, the secondary player may be offered the opportunity to participate in games of a second bookmarked primary player (e.g., a primary player that is second on the secondary player's list of favorite primary players), and so on. In various embodiments, secondary players may share tags or bookmarks of primary players amongst themselves. For example, a secondary player may publish a list of whom he thinks are "lucky" primary players. Other secondary players may view the list and decide to participate in the games of the listed primary players.

1.4.5. An expected value is paid to the secondary player. In various embodiments, a secondary player may have placed a bet on results of a primary player spanning more than one game. For example, the secondary player may have bet that a primary player would be ahead monetarily after one hour of play. If, however, the primary player leaves prior to completing one hour of play, there is the potential that the secondary player's bet remains unresolved. In various embodiments, the secondary player's bet is settled for the expected value (EV) of the secondary player's winnings. For example, if, based on the current time, the current winnings of the primary player, and the odds of the game that the primary player has been playing, the expected winnings of the secondary player are $8, then the secondary player may be paid $8 when the primary player terminates his session. The bet may also be settled for various functions of the EV, such as for the EV less a processing fee, 50% of the EV, and so on.

1.4.6. Bets are returned to the secondary player. In some embodiments, when the primary player terminates a session, a bet made be the secondary player that was dependent on the primary player finishing the session may be returned to the secondary player.

1.4.7. Options to participate in the games of other primary players are shown to the secondary player. In some embodiments, when the primary player terminates a session, the secondary player may be presented with other primary players on whom or on whose games the secondary player might bet. By selecting one or more of the new primary players, the secondary player may continue participating in games. For the purposes of a bet that required the completion of the session by the original primary player, the new primary player may be treated as if he was continuing where the original primary player left off. For example, the new primary player may be treated as if he has lost $6 during the past half hour, as the original primary player actually did. If the new primary player subsequently wins $10 in the next half hour, a bet made by the secondary player that the original primary player would be ahead after an hour of play would be a winning bet.

When a selection of new primary players is presented to the secondary player, primary players presented may be chosen by the casino based on similarities to the original primary player. For example, suppose the original primary player was from Texas. When the original primary player terminates his session, new primary players may be presented wherein each is also from Texas. Other characteristics that the original and new primary players may share include: (a) both may play the same type game (e.g., both may play IGT's Wheel of Fortune® slot machines); (b) both may be of the same gender; (c) both may be the same age; (d) both may have the same occupation; (e) both may have the same geographic location of residence or origin; (f) both may have common interests (e.g., in music, food, sports, etc.); and (g) both may share common birthdays.

1.4.8. The secondary player is given the opportunity to become a primary player. He's told where he can sit down and start playing. In some embodiments, when a primary player terminates his session, the secondary player is offered the chance to become a primary player. For example, the secondary player is shown the location of the slot machine or table game where the primary player had been playing. The secondary player may be offered the opportunity to take the seat and/or take the place of the primary player.

1.4.9. Historical games of the primary player are found. In some embodiments, when the primary player terminates a session of play, the secondary player may be offered the opportunity to participate in historical games of the primary player. In various embodiments, the historical games may include games in which the secondary player has not already participated. The secondary player may thereby have the opportunity to continue benefiting from the skill, luck, or other value he associates with the primary player.

1.5. Maintenance of player privacy. In various embodiments, the identity of a primary player may be shielded from the secondary player. This may prevent a secondary player from finding out sensitive financial information about the primary player, from scolding the primary player for unfavorable outcomes, or for otherwise causing harm or discomfort to the primary player.

1.5.1. The secondary player doesn't see who he is betting on. In various embodiments, facial features or any other potentially identifying features of a primary player are hidden from the secondary player. For example, in video footage of the game of the primary player, the face is blurred, covered, or completely omitted from the field of view. Voices may be edited out or masked.

1.5.2. The secondary player does not know the location of the person he is betting on. In various embodiments, the location of the primary player is disguised or kept hidden. Otherwise, especially for a live game, it would be conceivable that the secondary player could find the primary player by simply going to the location of the primary player. Thus, in various embodiments, video footage of the game of the primary player may omit distinguishing characteristics of the primary player's location. Such characteristics may include identifiable features of a casino, such as pictures, sculptures, fountains, names of restaurants, signs for a bathroom, signs for a poker room or other casino sector, and so on. Distinguishing features of a table game may also be disguised or omitted. For example, a unique design or color of a table may be omitted. In various embodiments, games or locations with readily identifiable and/or unique characteristics may be ineligible for participation by secondary players.

1.5.3. Limits to how many times a secondary player can bet on one particular person. In various embodiments, there may be a limit as to the number of games of a primary player in which a secondary player may participate. This may lessen the likelihood of the secondary player developing any strong feelings towards the primary player one way or the other. In various embodiments, there is a limit to the amount of time that the secondary player is allowed to spend participating in the games of a given primary player.

In various embodiments, a secondary player may be switched from participating in the games of a first primary player to participating in the games of a second primary player. The secondary player may be switched without the secondary player knowing that he has been switched. For example, the secondary player may receive data about a game that includes the symbols, indicia, and/or outcomes generated during the game. However, the secondary player may not necessarily receive identifying information about a primary player of the game. Thus, when the secondary player is switched from participating in the games of a first primary player to participating in the games of a second primary player, the secondary player may not be aware of the switch since the secondary player may have no access to identifying information for either the first or second primary players. In various embodiments, the secondary player may be switched form participating in the games of a first primary player to participating in the games of a second primary player after a predetermined number of games. For example, after participating in 25 games of a first primary player, the secondary player may be switched to participating in the games of a second primary player. In various embodiments, a switch may occur at random. For example, after every game played by a first primary player, the casino may randomly generate a number between 1 and 100. If the number is greater than 80, the casino may switch the secondary player from participating in the games of the first primary player to participating in the games of a second primary player. In some embodiments, the switch may occur after a random number of games with an upper boundary. For example, if the secondary player has not been switched after 20 games with a first primary player, the secondary player may be switched automatically. In some embodiments, a secondary player may be switched upon his own request. In various embodiments, when a secondary player is switched between the games of different primary players with reasonable frequency, the chances with which a primary player's privacy becomes compromised may be reduced. In some embodiments, a secondary player may be informed when he has been switched from the games of a first primary player to the games of a second primary player. In some embodiments, the secondary player is not informed of the switch.

1.5.4. Introduction of a time delay so that the primary player is no longer located where he had been by the time the secondary player begins participation in the games of the primary player. In various embodiments, a secondary player is restricted to betting on games that have occurred a predetermined amount of time in the past, e.g., one day or more in the past. In this way, the secondary player is unlikely to be able to contact the primary player, as the primary player may no longer be in the vicinity. In various embodiments, the secondary player is restricted to betting on games that have been played by a primary player who has already left the location in which the games were originally played.

1.6. A secondary player or spectator is provided with knowledge about what the next cards will be, or what the primary player's opponent holds. The secondary player may watch the primary player struggle with a decision while the secondary player already knows the correct decision. In various embodiments, a secondary player may be informed of some information about a game that the primary player does not know, or at least did not know at the time the primary player was participating in the game. For example, a primary player may be engaged in a game of video poker. The secondary player may watch the progress of the game from a remote terminal. The secondary player may be informed that the next four cards in the deck are all aces. However, this information is not known to the primary player. Thus, the secondary player may experience the excitement of hoping the primary player will draw four cards.

1.6.1. The secondary player knows the next cards, the symbols that will occur on reels, the proper door to open in a bonus game, etc. In various embodiments, a secondary player may be informed of one or more of the following at a point in a game prior to when a primary player finds out (or found out): (a) an outcome of a game (e.g., "cherry-cherry-cherry"); (b) a payment that the primary player will receive based on the game; (c) a game result (e.g., win, lose); (d) a reel position; (e) a symbol that will appear on a reel (e.g., the secondary player may know that the third reel of a slot machine will show a symbol "bar" that will complete a winning outcome of "bar-bar-bar" prior to when the primary player finds out); (f) a card that will be received by the primary player; (g) a card that will be received by a dealer; (h) a card that is at or near the top of the deck being used in a game of cards; (i) a hand of cards that will be achieved by a primary player should the primary player make a particular decision (e.g., a hit decision in blackjack); (j) an order of cards in a deck of cards (k) a payment, result, or outcome that would result from a particular choice in a bonus game of a gaming device (e.g., the primary player would win 200 coins by choosing door number 3 in a bonus game); (l) a card that will be received by the primary player's opponent; (m) a card held by the primary player's opponent (e.g., in a poker hand); (n) a number that will appear on a die in a game (e.g., in craps); (O) a number that will come up in the game of roulette; and so on.

1.6.2. The secondary player may make a new bet at apparently good odds if the primary player is not likely to make a decision that would win for the secondary player. In various embodiments, a secondary player may be allowed to place a bet on a game being played by the primary player after finding out information about the game. The bet may be made at odds apparently favorable to the primary player. For example, suppose that a primary player holds an initial hand of video poker comprising the Ks, Kc, 10h, 3c and 7d. Unbeknownst to the primary player, but known to the secondary player, the next four cards in the deck are the Ah, Kh, Qh, and Jh. Thus, were the primary player to discard the Ks, Kc, 3c, and 7d, the primary player would achieve a royal flush, the highest paying outcome, in various embodiments. The secondary player may be allowed to bet four coins on the game. The secondary player may win 1 coin for a pair, jacks or better, 2 coins for two-pair, 3 coins for three-of-a-kind, and 800 for a royal flush. Thus, the secondary player may bet 4 coins with an apparent potential to win 800 coins. Indeed, it is possible that the second player will win 800 coins. However, it would be very unlikely for the primary player to discard a pair of kings in order to draw four cards to the 10h. Thus, it is more likely the primary player will keep his pair of kings, draw three cards, and end up with three kings, providing the secondary player with a payout of 3 coins. Thus, in various embodiments, the strategy of a primary player may be predicted, e.g., by the casino server. The predicted strategy may be, e.g., an optimal strategy given lack of any knowledge about future results or outcomes (e.g., future cards in a deck). Based on predictions of the primary player's strategy, the casino server may provide betting opportunities for the secondary player such that the house will maintain an advantage given the predicted strategies. The same betting opportunities provided to the secondary player may have provided the house with a disadvantage if the primary player were to be able to utilize knowledge of future results or outcomes (e.g., future cards in a deck). Accordingly, a secondary player may make certain bets on a game in the hopes that the primary player will deviate from optimal or conventional strategy.

1.6.3. The secondary player may provide hints. In various embodiments, a secondary player may have the opportunity to convey a hint to the primary player. A hint may take the form of a suggested decision. For example, a hint may indicate that the primary player should discard the first and third cards in his hand of video poker. A hint may take the form of a veto. For example, the primary player may first indicate a particular choice of strategy, such as a particular combination of cards to discard in a game of video poker. The secondary player may provide an indication that such a strategy should not be followed. The secondary player may be allowed only one veto, or may be allowed up to a predetermined number of vetoes. A hint may take the form of information about a symbol, result, or outcome of a game. For example, in the bonus round of a slot machine game, the secondary player may inform the primary player of the number of coins behind door 2. It may happen that there are more coins behind door 3, but the secondary player may only be allowed to give a hint about door 2, in some embodiments.

1.6.4. The secondary player may watch the primary player for entertainment purposes. The secondary player may watch facial expressions during good outcomes or during near-misses. In various embodiments, the secondary player may derive entertainment or other gratification from watching the experiences of the primary player. The secondary player may, for instance, watch a primary player play a game in which the primary player will win a large payout. The secondary player can watch the expression on the face of the primary player (e.g., from video footage) and see the expression change from neutral to an expression of surprise and elation. The secondary player may choose to participate in games that are likely to have or to have had an emotional impact on the primary player. The secondary player may thus choose games in which a payment above a predetermined amount was won, in which a certain outcome (e.g., a winning outcome) was achieved, in which a jackpot was achieved, in which a bonus round was played, and so on. A secondary player may also choose a game in which the primary player comes close, or apparently comes close to achieving a large payment. For example, the secondary player may choose a game in which the primary player has four cards to a royal flush in video poker, and will draw a fifth card. The secondary player may also choose a game in which two out of three reels of a slot machine line up on jackpot symbols.

1.6.5. A search is performed to find games that include near misses of high paying outcomes, or any other characteristic. In various embodiments, a secondary player may receive information about various games that will happen, are in progress, or have happened already. Based on the information, the secondary player may choose a game in which to participate, or which to watch. The secondary player may have a preferred game he likes to play, a preferred primary player he likes to bet with (or on), a preferred dealer in whose game he wishes to participate, and so on. The secondary player may also wish to participate in games where he knows something about the outcome, results, or other information about the game. For example, the secondary player may wish to participate in games where the first two reels of a slot machine show the jackpot symbols.

In various embodiments, the secondary player may indicate a desired criterion, or desired criteria about the game. Various games satisfying the criterion or criteria may then be made available for the secondary player to participate in. The secondary player may then choose one or more of the games to participate in. In various embodiments, once the secondary player has indicated a criterion or criteria, the secondary player may automatically begin participating in a game matching the criterion or criteria. Criteria indicated for a game by a secondary player may include one or more of the following: (a) the game has a particular dealer; (b) the game has a particular number of players; (c) the game is played at a particular gaming device; (d) the game is played at a particular type of gaming device; (e) the game is played by a particular primary player; (f) the game is played by a primary player with a particular characteristic (e.g., age, race, marital status, nationality, area of residence, occupation, etc.); (g) the game has a potential payout above a particular level (e.g., the game has a payout of more than 1000 times the bet); (h) the game has an expected payout above a certain level (e.g., an expected payout of more than 95% of the original bet); (i) the game has a bonus round; (j) the game is played in a certain location; (k) the game is played at a certain time or date; (l) the game is, or will be a winning game (e.g., the game will pay at least three times an initial bet of the primary player); (m) the game will feature an outcome that has almost all the required symbols necessary for a large payout (e.g., a game of video poker has four cards to a royal flush); and so on.

1.6.6. Preventing collaboration. In various embodiments, measures may be taken to prevent collaboration between the primary player and the secondary player. Particularly if the secondary player knows information about the game, such as hidden cards in a deck, the secondary player would be able to confer an advantage to the primary player and to himself by communicating with the primary player. As discussed previously, the identity of the primary player may be shielded from the secondary player. Similarly, the identity of the secondary player may be shielded from the primary player. One or both of the primary and secondary players may be kept in an enclosure, such as a sound-proof room or Faraday cage, that reduces the possibility of communication. Signal detectors, such as antennas, may be placed near the primary or secondary players to detect possible communications between the two. Cell phones, pagers, Blackberries™ and other communication devices may be temporarily confiscated from either or both of the primary and secondary players. The secondary player may participate in the game only after one or more, including all game decisions have been made in the game.

1.7. What happens if a machine needs servicing in the middle of a roll? What happens if the primary player is taking too long to finish a game? In various embodiments, the completion of a game may be delayed or prevented. For example, a gaming device may break down in the middle of a game. A primary player may get into a discussion with a friend in the middle of a video poker game, and may thus delay a decision in the game for several minutes. A secondary player participating in a delayed game may find the delay frustrating and may wish to complete the game in some other manner.

1.7.1. A game is completed automatically. In various embodiments, the game may be completed automatically, e.g., by the casino. The game that is completed automatically may, in fact, be a copy of the original game, so that the primary player can complete the original game on his own. However, the secondary player may receive a payment based on the automatically completed game. The game may be completed using a predetermined strategy, such as optimal strategy. The game may be completed using a random strategy where, for example, one of several possible strategies is selected at random.

1.7.2. The secondary player makes the decisions in a game. In some embodiments, the secondary player may have the opportunity to complete the game by making his own decisions. For example, if the game is blackjack, the secondary player may indicate decisions such as "hit" or "stand" so as to complete the game. The secondary player may, in various embodiments, complete a copy of the original game, so that the primary player may complete the original game on his own. A copy of the original game may include a second game with one or more similar parameters or aspects to the first game. For example, in the copied version of the game, one or more of the player hand, the dealer's hand, the order of cards in a deck, the prizes available behind certain doors in a bonus game, etc., may be the same as in the original game.

1.7.3. A bet is returned to the secondary player. In various embodiments, when a game is delayed, the bet placed by the secondary player on the game may be returned to the secondary player.

1.7.4. The secondary player is provided with an expected value of his winnings at that point in the game. In various embodiments, when a game is delayed, the expected payment or the expected winnings to be paid the secondary player may be provided to the secondary player. In some embodiments, a function of the expected payment is provided, such as the expected payment less a fee.

1.8. Communication between the secondary player and the primary player. In some embodiments, the primary player and the secondary player may be given the opportunity to communicate. Communication may occur via text, voice, or any other means. Communication may occur through the casino server. Communication may be monitored by the casino, such as by a computer program or a casino representative. Communication may be edited or prevented if there is inappropriate or threatening language and/or if communication somehow provides either the primary player or secondary player with an unfair advantage.

1.8.1. The secondary player sends help to the primary player. For example, "you should hit here" In some embodiments, the secondary player may send help to the primary player. The secondary player may help the primary player with strategy in a game such as blackjack, video poker, or live poker. In video poker, the secondary player may suggest which cards the primary player should discard. In blackjack, the secondary player may suggest whether to hit, stand, double down, split, etc. In a live game of poker, the secondary player may advise the primary player whether to check, bet, raise, fold, or call. The secondary player may also suggest an amount of a bet or raise. The secondary player may provide other suggestions or opinions, such as suggesting that another player is probably bluffing. The secondary player may provide additional information, such as the probabilities of various events occurring given a particular strategy. For example, the secondary player may indicate that the primary player would have roughly 2 to 1 odds against making a flush should he continue in a game of poker.

1.8.2. The secondary player takes over the game. In various embodiments, a secondary player may take the place of a primary player in making decisions in a game. For example, the secondary player may transmit signals that cause game decisions to be made without additional input by the primary player. For example, the primary player may press a button on a gaming device labeled "defer to secondary player". The secondary player may then select, e.g., cards to discard from a remote terminal. The remote terminal may, in turn, transmit to the gaming device indications of which cards the secondary player has chosen to discard. The chosen cards may then be removed from the primary player's hand and replaced with new cards. The primary player may win or lose, and may receive payments based on the decisions made by the secondary player.

1.8.3. Sending a tip to the primary player. In various embodiments, the secondary player may send a tip, other consideration, or other token of gratitude to the primary player. For example, if the primary player has just won a large payment, thereby causing the secondary player also to win a large payment, the secondary player may be grateful and wish to tip the primary player. The secondary player may provide an indication that he wishes to tip the primary player, e.g., by pressing a button on a remote terminal. The casino server may then deduct the amount of the tip from an account associated with the secondary player, and add such amount to an account associated with the primary player. The casino server may also cause the amount of the tip to be paid out at the primary player's gaming device or table, e.g., in the form of a coin or cashless gaming receipt. In some embodiments, the primary player may pay to have something delivered to the primary player. For example, the secondary player may pay for a bottle of wine. A casino representative, such as a waitress, may then deliver the bottle of wine to the primary player at the location of the primary player.

1.9. Betting interfaces. A secondary player may participate in the game of a primary player using various interfaces. The interfaces may allow the secondary player to select a game in which to participate, including selecting various aspects of a game, such as the machine on which the game is played, the primary player playing the game, the time, and so on. The interface may allow the secondary player to select a bet type. For example, the secondary player can bet for a primary player to win, or for a primary player to lose. The interface may allow the secondary player to select a bet amount. The interface may allow the secondary player to insert cash or other consideration, to identify himself (e.g., for the purposes of receiving comp points), and to cash out winnings or remaining balances.

1.9.1. Internet A secondary player may participate using a network, such as the internet or a casino intranet. The secondary player may employ a computer, such as a personal computer, for this purpose. The secondary player may view a selection of games to participate in, progress of a current game, credit balances, etc., using a computer monitor. The secondary player may input decisions using a mouse, computer keyboard, or any other computer input device. For example, the secondary player may key in a bet amount using a numeric keypad on a computer keyboard. The secondary player may also use a device such as a phone, a cell phone, personal digital assistant, or Blackberry™. The contents of the following United States patent applications, listed with serial numbers, titles, and matter numbers in parenthesis, are incorporated by reference herein for all purposes: (a) Ser. No. 10/835,995 System and Method for Convenience Gaming (075234.0121); (b) Ser. No. 11/063,311 System and Method for Convenience Gaming (075234.0136); (c) Ser. No. 11/199,835 System and Method for Wireless Gaming System with User Profiles (075234.0173); (d) Ser. No. 11/199,831 System for Wireless Gaming System with Alerts (075234.0174); (e) Ser. No. 11/201,812 System and Method for Wireless Gaming with Location Determination (075234.0176); (f) Ser. No. 11/199,964 System and Method for Providing Wireless Gaming as a Service Application (075234.0177); (g) Ser. No. 11/256,568 System and Method for Wireless Lottery (075234.0178); (h) Ser. No. 11/210,482 System and Method for Peer-to-Peer Wireless Gaming (075234.0179); (i) 60/697,861 Enhanced Wireless Gaming System (075234.0183). The device used by the secondary player for participating in games may communicate with a casino server via the network, as is commonly known in the art. Messages may be exchanged back and forth between a device used by the secondary player and the casino, the messages taking the form of streams of bits represented by electronic pulses, optical pulses, or any other practical representation.

1.9.2. Felt table with live dealer. In various embodiments a secondary player may participate in a game by sitting at a table and interacting with a casino representative. The table at which the secondary player sits may be different from the table the primary player sits at. Thus the game activities of the primary player may occur elsewhere from the location of the secondary player. However, the secondary player may store cash or chips at his table, and may indicate bets by placing chips at certain parts of the table. From this table, the secondary player may watch the action in the game of the primary player, e.g., using closed circuit television. Based on the outcome of the game played by the primary player, the secondary player may receive payments at his table. Thus, for example, the casino representative at the table of the secondary player may collect bets from the secondary player, and may pay winnings to the secondary player if the outcome of the game of the primary player is winning for the primary player. The table of the secondary player may appear similar to that of the primary player. For example, the table may have the same shape and surface markings. The secondary player may even sit at the same position with respect to his table as the primary player sits with respect to the primary player's table. The secondary player may enjoy a similar experience to that of the primary player, only, perhaps, without the cards, dice, or other game apparatus used at the table of the primary player. In various embodiments, the table of the secondary player may serve as a means for the secondary player to make bets, receive winnings, and possibly to view the game of the primary player. In some embodiments, the secondary player uses the same table or gaming device as does the primary player. For example, the secondary player may place a bet beside the hand of the primary player. The secondary player may then receive payments based on the outcome of the game of the primary player.

1.9.3. Machine at the casino. In some embodiments, a secondary player may participate in a game using a machine or terminal configured to allow participation in a separate game. The terminal may include a coin slot, bill validator, credit card reader, and/or other means for accepting consideration. The terminal may include buttons, keys, roller balls, and/or other input devices that may be used by the secondary player for selecting a game in which to participate, for selecting bet amounts, for selecting bet types, and so on. The terminal may be in communication with the device that conducts the actual game. For example, the terminal of the secondary player may be in communication with a gaming device at which the primary player is playing. The terminal may thus receive from the device of the primary player an indication of games played by the primary player, amounts bet, outcomes received, and other pertinent information. The terminal of the secondary player may be in direct communication with the device of the primary player, or may be in communication with the casino server which, in turn, communicates with the device of the primary player. The terminal of the secondary player may also be in communication with sensors, detectors, and/or other monitoring devices at a game played by the primary player, such as at a blackjack game. For example, the terminal of the secondary player may receive feeds from cameras located at a blackjack game being played by the primary player. In various embodiments, a dealer or other casino representative may report information about a game of the primary player. For example, a dealer may input into keypad connected to the casino server that a primary player has been dealt an ace and a ten in a game of blackjack. Such information may subsequently be received at the terminal of the secondary player, and may be used in determining a payment for the secondary player. The terminal of the secondary player may be a mobile device, e.g., a mobile device as set forth in Nevada bill AB471.

In some embodiments, the terminal of the secondary player may be constructed or configured to look like a gaming device. Betting interfaces at the terminal may be designed to mimic or appear similar to those at the gaming device. Graphics shown on the housing or the screen may also be similar. However, the terminal may simply recreate and redisplay games and outcomes generated by the gaming device. The terminal may not, in various embodiments, generate games or outcomes of its own, e.g., using its own processor or locally stored algorithms. In various embodiments, the terminal may comprise a kiosk.

1.9.4. Casino desk. In various embodiments, a secondary player may visit a casino desk, casino cage, or other casino venue where bets may be placed in person. The secondary player may there select a game in which to participate. The secondary player may place a bet. The secondary player may receive some record of his bet. The record may be a paper receipt, for example. The record may include the name of the secondary player, the name of the primary player, the type of game, the time of the game, the machine or location at which the game was played, the amount of the bet, the terms of the bet (e.g., what outcomes constitute winning outcomes), and any other pertinent information. Upon resolution of the game, the secondary player may return to the desk and receive payment of any winnings.

1.9.5. How bets are entered. In various embodiments bet amounts and bet selections may be entered using buttons, keyboards, microphones, computer mice, joysticks, or any other input devices. A secondary player may also place bets and indicate bet amounts according to rules. Rules may include instructions that may be followed by a computer algorithm, the instructions indicating rules or conditions specifying when and how much to bet. By betting according to rules, the secondary player may save himself the effort of repeatedly indicating a desire to place a bet. Rules may include the following: (a) continue betting $1 on each new game until the secondary player provides an indication to stop; (b) continue betting $1 on each new game for the next 20 games; (c) bet $1 on the game following every win, and double the prior bet following every loss; (d) continue betting until a credit balance reaches either 0 or $100; and so on. In some embodiments, rules may be entered explicitly by the secondary player. In some embodiments, different sets of rules may be predefined. A secondary player need then only select one of the predefined sets of rules to have betting done automatically on his behalf according to the selected set of rules. In some embodiments, a set of rules indicates that the prior bet should be repeated. A secondary player may simply need to confirm each new bet before it is made. For example, for a first game, a secondary player may bet 5 coins on each of 7 pay lines of a slot machine game. For a second game, the secondary player may simply press a "repeat prior bet" button in order to once again bet 5 coins on each of 7 pay lines. Without pressing such a button, the process of entering the bet again might be time consuming. Further, the primary player may have continued on with the next game before the secondary player had time to enter the bet a second time. In various embodiments, a secondary player may specify a bet with reference to a prior bet. For example, the secondary player may indicate a desire to bet twice his prior bet, or to make the same bet he made two games ago.

1.9.5.1. Layout of the betting screen and the graphical user interface. In various embodiments a secondary player may choose a bet type; choose a bet amount; follow the progress of a game; follow the progress of a primary player; view statistics related to a gaming device, table, dealer, primary player, casino, etc.; all using a betting interface on a display screen. The display screen may also function as a touch screen so that the secondary player may interact with the screen by touching it in certain locations. A first location of the screen may include a selection area. Shown in the selection area may be any number of attributes pertaining to a game. For example, a selection area may list a number of primary players. The secondary player may select one of the primary players to indicate that the secondary player would like to participate in the game of the selected primary player. The selection area may present a selection of: (a) primary players; (b)

gaming devices; (c) times; (d) dates; (e) casinos; (f) game types (e.g., video poker, slot, etc); (g) dealers; (h) opponents; (i) game results (e.g., ranges of payouts provided by the game, such as games which paid 0-2 coins, games which paid 3-4 coins, games which paid 5-6 coins, etc); and so on. Possible selections may be presented as a menu, a list, a scroll bar, or any other presentation. The secondary player may go through various layers of selection until he has completely specified a game in which to participate. For example, the secondary player may first select a primary player, then a gaming device, then a time of a game. Each set of choices may be presented as a new menu.

A second location of the screen may include a betting area. In the betting area, the secondary player may indicate an amount to bet on a game. The secondary player may specify a number of outcomes to bet on, such as a number of pay lines to bet on, or a number of hands of video poker on which to bet. The secondary player may also specify an amount to bet on each pay line or each outcome. If different types of bets may be made (e.g., a main bet and an insurance bet in blackjack, or pass line and hard eight in craps), then the secondary player may specify which of such bets he wishes to make. A secondary player may specify bets to be made on the primary player. For example, the secondary player may specify a bet that the primary player will lose or will win, or may specify a bet that the primary player will win more than a certain amount.

A third location of the screen may include an area where information about a game is displayed. The area may allow the secondary player to follow the progress of the game. In this area, the secondary may watch as new symbols (e.g., cards in a card game or symbols on slot reels) arise, as new bets are made by the primary player and/or his opponent(s), as decisions are made by the primary player, as decisions are made by the dealer, as hidden symbols are revealed (e.g., as a dealer's down card is turned face up in the game of blackjack), as bets are collected (e.g., from the primary player), and as winnings are paid out (e.g., to the primary player). The third location of the screen may include live video, animations depicting a reenactment of the game, pre-recorded video of the game, pre-recorded video depicting a game similar to the game in which the secondary player is participating, or any other video depiction. The third location may include text descriptions of events in the game. For example, a text description may read, "Joe Smith has just been dealt a pair of kings."

A fourth location of the screen may allow a secondary player to view statistics related to a gaming device, table, dealer, primary player, casino, etc. For example, the fourth location may show the number of times a primary player has won or lost in his last 100 games, a graph depicting the bankroll of the primary player over the last two hours, the number of times a particular gaming device has paid more than 20 coins in the last day, and so on. Statistics may be presented in any conceivable form, such as using tables, graphs, bar graphs, line graphs, pie charts, and so on.

A fifth location of the screen may allow a secondary player to communicate with the primary player, with a casino representative, with other secondary players, or with others. The fifth location may comprise a chat area, for example, where text conversations are tracked, and where different statements are labeled with the name of the originator of the statement.

A sixth location of the screen may allow the secondary player to follow his own progress. For example, the secondary player may see his account balance and statistics about his own wins or losses.

A seventh location of the screen may allow the secondary player to cash out a portion of his winnings and/or account balances.

An eighth location of the screen may allow the secondary player to summon a casino representative, e.g., to order food.

As will be appreciated, the locations described above may be overlapping. All locations need not have the same function at once, but may alternate. For example, at a first point in time, the screen may be occupied completely with video footage of a game. When the game finishes, the video footage may be replaced with statistics about the player. It will be further appreciated that there may be additional locations on the screen.

1.9.6. In order to participate in the games of a primary player, a secondary player may provide identifying information about himself. Identifying information may include a name, age, state of residence, nationality, driver's license number, social security number, and/or any other identifying information. The casino may use such identifying information in order to verify that the secondary player is authorized to place bets and/or to participate in games as a secondary player. For example, the casino may use identifying information to verify that a secondary player is over 21 years of age. The casino may only permit the secondary player to participate in games of the primary player if the secondary player is over 21 years of age.

In various embodiments, a secondary player may be identified automatically by the casino. For example, the secondary player may seek to participate in a game while situated at a remote terminal or device. The remote terminal or device may be configured to check the identity of the secondary player prior to communicating with the casino. The terminal or device may only communicate with the casino, in some embodiments, if the secondary player is a particular player. Thus, the casino may automatically identify a secondary player by virtue of the terminal or device at which the secondary player is situated. If a terminal or device is configured only to communicate with the casino when a particular secondary player has identified himself to the terminal or device, then the casino can be assured that a particular secondary player is desirous of participating in games. The particular secondary player may be, for example, a particular secondary player that is authorized to participate in games. In some embodiments, a remote device or terminal may constitute a mobile device (e.g., a mobile device as set forth in Nevada bill AB471).

The mobile device may be programmed to be used only by a particular secondary player. Therefore, if the secondary player is authorized to make bets, and the mobile device is configured to communicate with the casino only when the particular secondary player is using it, then the casino may assume that it is an authorized secondary player that is placing bets through the mobile device.

1.10. The secondary player bets on outcomes on which the primary player did not. In various embodiments, a secondary player may place bets on results or outcomes that were not bet on by the primary player. As will be appreciated, for a given game, there can be many possible outcomes, and many types of bets placed on the various outcomes. For example, in craps, many different bets can be placed in the same game, among them pass and don't pass.

1.10.1. The secondary player bets on a pay-line that the primary player did not. In various embodiments, the secondary player may bet on a pay-line of a slot machine that was not bet on by the primary player. For example, a slot machine may include three pay-lines, e.g., lines 1, 2, and 3. The primary player may bet on pay-line 1. The secondary player may bet on pay-line 2 and/or pay-line 3. The secondary player may, in various embodiments, bet on pay-line 1 as well. In some embodiments, the secondary player is only allowed to bet on pay-lines that the primary player has not already bet on. Such embodiments may help prevent a secondary player from determining a game in which the primary player has achieved a winning pay-line, and then betting on the same pay-line. In some embodiments, a secondary player may bet on pay-lines that were not available to the primary player when he played. For example, the secondary player may bet on a custom pay-line consisting of the top two symbols on a first reel, and the bottom symbol on a second reel of a slot machine. In some embodiments, the secondary player may bet on a pay-line that was not even visible to the primary player during his play of the game. For example, a slot machine may only show one symbol on each reel in a viewing window. The symbol on each reel that is one position above the viewing window may not be visible. Nevertheless, the secondary player may have the opportunity to bet on a pay-line comprising the row of symbols one position above the viewing window. Similarly, the secondary player may bet on a pay-line comprising the row of symbols one position below the viewing window. In various embodiments, any other pay-line or outcome may be constructed using visible and non-visible symbols. For example, a pay-line may be constructed using some symbols that were visible, and some symbols that were not visible to the primary player.

1.10.2. In various embodiments, the secondary player may place bets on symbols that were never even shown to the primary player. Such symbols may have occurred, for example, well above the viewing window. In some embodiments, such symbols may be shown to the secondary player.

1.10.3. Play a card game with unused cards. For example, in video poker, only the top 10 cards may be used during a game. The secondary player could play another game using cards from the bottom of the deck. In various embodiments, a secondary player may play a game using cards, symbols, or other indicia that were not revealed to the primary player. For example, a primary player may participate in a game of video poker. The primary player may use the top nine cards from a shuffled deck during the game (e.g., the primary player receives an initial deal of five cards, and subsequently draws four additional cards). However, in a standard 52-card deck, 43 cards would remain in the deck. The secondary player may play a new game using the 43 remaining cards. The secondary player may thus engage in a game for which no person yet knows the outcome. This may help to avoid situations where a secondary player can choose to participate in a game where he knows the outcome will be favorable to him. In various embodiments, a secondary player may participate in a new game using cards remaining after a game of blackjack, after a game of poker, after a game of casino war, or after any other game. In various embodiments, the secondary player may make his own decisions in the game, e.g., rather than relying upon decisions of the primary player. In various embodiments, a secondary player may use cards remaining in a deck for a game other than the game for which the deck was first used. For example, after a deck is used for a video poker game of the primary player, the secondary player may use the remaining cards in the deck for a game of blackjack.

1.10.4. The secondary player bets on some function of the data from a game. In some embodiments, a secondary player may bet on some function or transformation of the outcomes, results, or other data used in a game played by a primary player. As used herein, the term "function" may refer to a process or procedure for relating any acceptable input to an output, such that there is only one output per unique input. The output and input may be numerical or non-numerical. As used herein, a "function of" an input may refer to the resultant output when the function is used to relate the input to the output. As used herein, the term "transformation" may refer to a process or procedure for relating any acceptable input to an output.

1.10.4.1. An outcome is generated using a function of a random number used in generating an outcome in the primary game. Suppose a random number 10232 was used to generate an outcome in a game of a primary player. The random number+1 could be used, such that the number 10233 is used. This could yield a completely different outcome. Various games played at a casino utilize random number generators. For example, a slot machine may utilize a random number generator to choose a random number for each reel of the slot machine. Each random number is then used to determine the symbol that should be revealed by the corresponding reel. In various embodiments, a game played by a secondary player may use a new set of random numbers generated based on some function of the random numbers used in a game played by the primary player. For example, the random numbers used in the game played by the secondary player may consist of the random numbers used in the game played by the primary player with one added to each. Thus, {10245, 31189, 19320} may be transformed to {10246, 31190, 19321}. The new set of random numbers may be used as inputs to an algorithm (e.g., the same algorithm used in the game played by the primary player), to generate the symbols or outcomes of the game played by the secondary player. As will be appreciated, any function of the random numbers in the primary player's game may be used to come up with random numbers in the secondary player's game. For example, one may be subtracted from each random number, the order of the random numbers may be changed (e.g., so each random number now corresponds to different one of the reels), each random number may be multiplied by a factor, and so on.

In various embodiments, seed numbers may be used in the generation of random numbers. Thus, in some embodiments, a seed number used in a game played by a primary player may be transformed according to some function (e.g., one may be added) in order to generate a seed to be used in the game played by the secondary player.

In various embodiments, a game played by a primary player may result in a first outcome with a first associated payout. The game may be disguised by changing the first outcome to a second outcome with the same payout. Thus, the primary player may view the first outcome while he plays the game, but the secondary player may view the second outcome when he participates in the game. Monetarily, the primary player and the secondary player may have had the same experiences. In other words, given identical bets, both the primary player and the secondary player will have had the same payouts, in various embodiments. However, the primary player and the secondary player will have seen different representations of the game. For example, suppose a slot machine game includes several possible outcomes. Among the possible outcomes are "bar-bar-bar" with an associated payout of 10 coins, and "cherry-cherry-cherry", also with an associated payout of 10 coins. The primary player may play the game and achieve the outcome "bar-bar-bar". The secondary player may also participate in the game. When the game is presented to the secondary player, the secondary player may be shown an outcome of "cherry-cherry-cherry".

Thus, in various embodiments, a first outcome of a game may be generated for a primary player. The casino may determine what other outcomes have the same payout as the first outcome. From among the other outcomes, the casino may select one to present to a secondary player who has participated in the game.

In various embodiments the outcome presented to a secondary player may differ both in terms of the constituent symbols and in terms of the payout from the outcome that was seen by the primary player. However, over the course of two or more games, a secondary player may be presented with outcomes whose associated payouts sum to the same total as do the payouts associated with the outcomes presented to the primary player over the course of the same two or more games. For example, both a primary player and a secondary player may participate in the same two games. In the first game, the primary player may be presented with outcome A and receive an associated payout of 4 coins. For the first game, the secondary player may be presented with outcome C and receive an associated payout of 3 coins. In the second game, the primary player may be presented with outcome B and receive an associated payout of 6 coins. For the second game, the secondary player may be presented with outcome D and receive an associated payout of 7 coins. Thus, neither the primary and secondary players have been presented with different outcomes over the course of the two games. However, after two games, both have received the same total payouts, each having received 10 coins in total.

In various embodiments, a secondary player may view what is essentially the same game that the primary player is playing. However, the game may be disguised by replacing symbols from the presentation to the primary player with new symbols for presentation to the secondary player. For example, a "cherry" when viewed by the primary player becomes a "dog" when viewed by the secondary player. In terms of underlying logic, however, the games may remain the same. For example, "cherry" may always map to "dog", and likewise there may be a consistent function which maps the symbols shown to the primary player to the symbols shown to the secondary player. The pay tables on display for the primary and secondary players may exhibit a similar functional relationship. For example, suppose the primary player's pay table includes a line showing a payout of 15 for "cherry-cherry-cherry". A corresponding line on the pay table for the secondary player may include a line showing a payout of 15 for "dog-dog-dog". In various embodiments, other graphics may be altered. For example, a background coloration of the game viewed by the primary player may be blue, whereas the background coloration of the same game viewed by the secondary player may be green.

In various embodiments, a second game presented to the secondary player may be a different type of game from that presented to the primary player. However, an outcome may be chosen for presentation to the secondary player that has the same payout as an outcome that occurred in a game played by the primary player. For example, a primary player may be involved in a game of Casino War. The secondary player may view the outcomes of the games of the primary player, but disguised as the game of craps. For example, if the primary player wins a game of Casino War (e.g., by being dealt a card with a higher rank than the card dealt to the dealer), then the secondary player may be shown an animated sequence of dice rolling a seven during the first roll of the game (i.e., a winning outcome in craps). If, however, the primary player loses the game of Casino War, then the secondary player may be shown an animated sequence of dice rolling a two on the first roll of the game (i.e., a losing outcome in craps).

The various methods of disguising a game described herein may provide an advantage, in certain embodiments, of making it difficult for the secondary player to determine details about the original game in which he is participating.

For example, this may make it difficult for the secondary player to vary his bets based on advanced knowledge about the outcome of the original game.

1.10.4.2. The same random number may be used, but a different reel configuration. In various embodiments, a gaming device may store an internal table or function which maps random numbers to symbols or outcomes. For example, the random number 1293 may map to the symbol of "cherry" on reel 1 of a slot machine. In various embodiments, a game played by a secondary player may utilize the same random numbers used in a game played by a primary player. However, the game of the secondary player may include a different table or matching function between random numbers and symbols. Thus, for example, in the game played by the secondary player, the number 1293 may map to the symbol "bell" instead of "cherry". Accordingly, using the same random numbers, the game of the secondary player may arrive at different symbols or outcomes than those that occurred in the game of the primary player.

In various embodiments, a gaming device may store an internal table or function which maps random numbers to reel positions. For example, the random number 2451 may instruct a gaming device to stop reel 1 with position 12 visible in the viewing window of the gaming device. Each position on a reel may feature a symbol. For example, a reel may have ten positions, each position corresponding roughly to 36 degrees of arc of the circular reel. Thus, by instructing a gaming device to stop a reel at a certain position, a random number will also instruct the reel to display the symbol featured at the certain position. In various embodiments, the game played by the secondary player may utilize the same random numbers utilized by the game played by the primary player. However, the positions and/or ordering of one or more symbols may be changed. Thus, the same reel position in the game of the secondary player may corresponding to a different symbol than it did in the game of the primary player. Thus, using the same set of random numbers, the game of the secondary player may nevertheless result in different symbols or outcomes than does the game of the primary player.

1.10.4.3. What if all cherries were transformed into bars? A secondary player may bet on real outcomes, but with one aspect altered into another. In some embodiments, one or more symbols obtained in a game played by a primary player may be mapped to other symbols in a game played by a secondary player. For example, any "cherry" symbol in a game of a primary player may be transformed into a "bar" symbol in a game of a secondary player. Thus, if the primary player receives the outcome of "cherry-bell-cherry", the secondary player will receive the outcome of "bar-bell-bar". The pay table, between the two games, may remain the same. In embodiments where the pay table remains the same, it is possible for a winning outcome to be mapped to a losing outcome, and for a losing outcome to be mapped to a winning outcome. In some embodiments, a first card in one game is transformed into a second card in another game. For example, the two of hearts becomes the king of diamonds. In some embodiments, an entire outcome in a game of the primary player may be mapped to a different outcome in a game of the secondary player. For example, the outcome of "bell-lemon-plum" may map to "cherry-cherry-cherry". In various embodiments, when one symbol in a game played by a primary player is mapped to another symbol in a game presented to a secondary player, the same mapping may also occur in the pay table. For example, suppose the symbol "lemon" in a game played by the primary player is mapped to the symbol "tree" in a game presented to the secondary player. If there is a line in the pay table of the primary player indicating a payout of 100 associated with the outcome "lemon-lemon-lemon", then there may be a corresponding line in the pay table of the secondary player indicating a payout of 100 associated with the outcome "tree-tree-tree".

1.10.4.4. A secondary player may bet on original deals of cards, but with 7s now wild. In some embodiments, symbols in a game played by the primary player can take new meaning in the game of the secondary player. For example, in a game of cards, any seven dealt in the game of the primary player may count as a wild card in the game of the secondary player. Thus, for example, the primary player may receive a final poker hand of Qs Qh Jd 3h 7s. The primary player may then be paid based on having a hand with a pair, jacks or better. The secondary player may be paid based on having a hand with three of a kind, since the 7s, as a wild card, may count as a queen.

1.10.4.5. A secondary player may bet on a blackjack hand occurring with poker, or vice versa. In various embodiments, the secondary player may use the same symbols or outcomes obtained by the primary player, but to play a different game. For example, the primary player may be engaged in a game of blackjack. The secondary player may use the cards received by the primary player to form a poker hand. Thus, if the primary player receives the 2s 7s 3s As and 6s, yielding 19 points in the game of blackjack, the secondary player may receive a flush (all spades) in a game of poker.

1.10.4.6. A secondary player may bet on shifted data. For instance, an outcome consists of the last two reels from one slot pull, and then the first reel of the next slot pull. Or a hand of poker consists of the last three cards from one hand and the first two cards from the next hand. In various embodiments, data, symbols, or outcomes from two or more games of a primary player may be combined to create a single game for the primary player. For example, three cards used in a first game of the primary player, and two cards used in a second game of the primary player may be combined to form a single hand of cards for a single game of the secondary player. Data used in consecutive games of the primary player may be treated as a stream of data frames, each frame including all the data from one game. For example, each frame may include the three symbols appearing on the pay-line of a slot machine. A new stream of data frames may be created by shifting the frame limits over (e.g., left or right) by some number of data points, e.g., by some number of symbols. Thus, for example, each frame in the new stream of data frames may include symbols from reels two and three followed by a symbol from reel one. In other words, new games have been created by using the last two symbols in a first game of the primary player and the first symbol in a second game of the primary player. Thus, by shifting data frames used in a sequence of games of a primary player, a new sequence of games may be generated for a secondary player.

1.10.4.7. A secondary player may bet on the same outcome, but with a different pay structure. For example, a secondary player may lose on a royal flush. In some embodiments, a secondary player may receive the same outcomes as does a primary player. However, the pay table that applies to the secondary player may differ from that which applies to the primary player. For example, in a game of video poker, the primary player may win 5 coins with a flush, but the secondary player may only win 2 coins.

1.11. A secondary player may bet on an aggregate outcome of a primary player. For example, a secondary player may bet that a primary player will be ahead or behind after an hour. In some embodiments, a secondary player may place a bet that depends on multiple games or outcomes of a primary player. For example, the secondary player may bet that the primary player will win the next three games in a row, or that the primary player will win the next game but lose the following game. The secondary player may bet that the winnings or losses of the primary player will satisfy one or more conditions after a designated period of time. The secondary player may bet that the winnings of the primary player will total more than a given amount in the next hour. The secondary player may bet that the losses of the primary player will exceed more than $1000 in the next 6 hours. The secondary player may bet that primary player will either lose more than $100 or will win more than $200 in the next 15 minutes. Winnings and losses may be net of each other (e.g., a $20 win and $10 loss may net to a $10 win) or may count separately (e.g., a winnings total is the sum of all amounts won regardless of bets lost). The secondary player may bet on any statistic pertaining to outcomes received by the primary player. For example, the secondary player may bet that the primary player will receive more than 10 payouts of more than 20 coins each in the next 25 minutes. The secondary player may bet that the primary player will achieve 4 full-houses in the next 50 games. In various embodiments, the secondary player may track the net winnings or net losses of the primary player. Thus, for example, if the primary player has lost $200 after an hour, the secondary player will also have lost $200. If the primary player has won $734, the secondary player will also have won $734.

1.11.1. A secondary player may take the upside of a primary player, but not his downside. In some embodiments, the secondary player may make a payment or place a bet that entitles the secondary player to an amount equal to the primary player's winnings, if any, over a period of time, but does not obligate the secondary player for anything if the primary player has net losses. For example, if the primary player achieves winnings over the next hour of $50, the secondary player may also receive $50. However, if the primary player loses in the next hour, the secondary player does not owe anything beyond his initial bet or payment. In various embodiments, the secondary player may receive, or owe monies based on more complicated functions of the primary player's winnings and losses. For example, the secondary player may receive three times the primary player's winnings (if there are any) for the next hour, but may owe 1.5 times the primary player's losses if the there are losses.

1.11.2. In some embodiments, a secondary player may bet that a primary player will receive five payouts of over 20 coins.

1.12. A secondary player may bet the difference between what a primary player bet and what the primary player could have bet. A secondary player may complete a partial bet and thereby win only the extra payouts that resulted from the extra amount bet. In some embodiments, a secondary player may place a bet that a primary player could have made but did not. This includes completing a bet that the primary player made. The secondary player may, in this fashion, win any payments that a primary player would have won, beyond those the primary player actually did win, had the primary player made the bet.

1.12.1. For example, many machines require three coins bet to win the jackpot. If a primary player bets only two coins, then a secondary player may bet the 3rd and then win the difference of what someone would win with three coins versus two coins bet. Various gaming devices include pay tables that are based on the number of coins bet. For example, if a player bets one coin and receives the outcome "bell-bell-bell", then the player wins 100 coins. If, however, the player bets two coins and receives the same outcome, then the player wins 200 coins. Many gaming devices provide better payout odds for each incremental coin bet. Thus, in the prior example, if the player bets three coins and receives the outcome "bell-bell-bell", then the player wins 400 coins. Thus, the incremental payout odds for the third coin bet are better than those for the second coin bet, at least with respect to "bell-bell-bell". Accordingly, for example, if a primary player bets only two coins in a game, a secondary player may take advantage of the better incremental payout odds offered for the third coin bet by betting the third coin himself. If the outcome of "bell-bell-bell" occurs, the secondary player may thus receive the difference between the payout for three coins bet and the payout for two coins bet, i.e., the difference between 400 coins and 200 coins, equal to 200 coins.

In various embodiments, a secondary player may add to or complete a bet on a game made by a primary player so that the total bet of both the primary and secondary player would result in a higher set of payouts. The secondary player may receive any extra payouts associated with his bet. Thus, if the payout associated with the primary player's bet alone is X, and the payout associated with the primary player's bet plus the secondary player's bet is Y, then the primary player may receive X, and the secondary player may receive Y-X.

1.12.2. In craps, placing bets behind the bets of other people. In various embodiments, a primary player in a game of craps is given additional opportunities to bet during the course of a game. For example, when the primary player establishes a point for a pass line bet, he has the opportunity to place bets behind his pass line bet, called "odds bets". The odds bets often have no house edge, and therefore are typically more advantageous to a player than almost any other bet in a casino. However, a player at a craps table often does not make an odds bet, or does not make the full amount of an odds bet that he is allowed. In various embodiments, a secondary player is allowed to make an odds bet that a primary player could have made. The secondary player may then be paid for the odds bet if the odds bet wins. Accordingly, the secondary player may enjoy the opportunity to make a bet at true odds, without the requirement of first making a disadvantageous pass line bet.

1.12.3. In various embodiments, a secondary player may make odds bets or may make partial bets such as betting the third coin at a slot machine, even if the primary player has already made such bets. The secondary player may nevertheless receive the incremental payouts associated with such bets. For example, the secondary player may bet a single coin which counts as the third coin bet at a slot machine. The secondary player may thus be eligible to win the difference in payouts between the payout for three coins bet and the payout for two coins bet.

1.13. Primary players might see who or how many people are betting on them. In various embodiments, a primary player may be made aware of a secondary player who is participating in the game of the primary player, or who subsequently participates in the game of the primary player. The primary player may receive a name, an image, and description of various attributes (e.g., age, occupation, area of residence, etc.) of the secondary player. The primary player may also receive an indication of the performance of the secondary player while participating in the games of the primary player. For example, the primary player may see how much the secondary has won or lost, what types of bets he has made, how many games he has participated in, for how long he has been participating in the games of the primary player, and so on. The primary player may derive a measure of satisfaction or gratification from the participation of secondary players. For example, a primary player may feel proud that a large number of secondary players have participated in his games. He may feel proud to have won money for them. In various embodiments, the primary player may have the opportunity to communicate with a secondary player. For example, the casino server may provide the primary player with contact information for a secondary player.

In various embodiments, a primary player may be compensated based on participation by secondary players in the games of the primary players. The primary player may be compensated per secondary player and per game. For example, the primary player may receive 0.5 cents per secondary player per game. Thus, if three secondary players each participate in two games of the primary player, the primary player may receive 0.5 cents×3 secondary players×2 games=3 cents. Thus, the primary player benefits by having more secondary players and by increasing the number of games in which each secondary player participates. The primary player may be compensated with a percentage of the bets made by secondary players participating in his games. The primary player may be compensated with some percentage of expected winnings to be derived from the bets of secondary players participating in the games of the primary player.

A primary player may thus be encouraged to convey some value to secondary player so as to attract secondary players to participating in his games. The primary player may convey value by employing good strategy, for example. The primary player may also attempt to provide entertainment, e.g., by telling jokes or by making commentary about his games.

In various embodiments, the games of a primary player, and/or data from the games of a primary player may be made available for participation and/or for viewing by interested secondary players. Data from the games of a primary player may be made available on an ongoing, continuous, and/or real-time basis. Secondary players may, at their leisure or pleasure, view or participate in the games. As such, data from the games of the primary player may be broadcast or transmitted in an analogous fashion to programs on a television or radio show, or analogously to periodically updated Web pages. Secondary players may tune in or out as desired. Each primary player may constitute a "channel" or "station". A secondary player may, for example, view a list of primary players just as he would a list of television stations. The secondary player may then decide which primary player or "station" he wants to participate with. When selecting a primary player, the secondary player may also have the opportunity to review data about historical games played by the primary player. For example, the secondary player may be able to review the primary player's wins and losses over the prior 20 games.

In various embodiments, a casino may select from a subset of available primary players to choose primary players for whose games data will be made available to secondary players. In some embodiments, a casino may serve as a "disc jockey" by choosing which primary players will have their data made available to others. The disc jockeys may be humans (e.g., casino employees), or may be computer algorithms which automatically select certain primary players based, for example, upon a defined set of rules. The disc jockey or jockeys may select primary players based on any number of factors. A primary player may be selected based on: (a) recent results (e.g., recent wins or high payouts); (b) based on long term results (e.g., long term profits); (c) based on skill at playing a game (e.g., based on his use of basic strategy in blackjack); (d) based on his celebrity status (e.g., based on whether his name has been published in any newspaper in the past year); (e) based on a history of being favored by secondary players; and so on. At any given time, a disc jockey may decide to stop making data available from certain primary players, and/or to commence making data available from other primary players. For example, a disc jockey may decide that a primary player has hit a string of losses and therefore would not be of interest to any secondary player. The disc jockey may accordingly stop making data from the primary player available. For example, a disc jockey may decide that a given primary player has just won a large payout and therefore would be of interest to secondary players. Accordingly, the disc jockey may commence making data from the primary player available.

In various embodiments, the data about the games of a primary player may be made available across one or more casinos. A first casino may broadcast or transmit data from the games of one or more primary players to a second casino. The broadcast may occur via the radio or television spectrums, via mobile wireless frequencies, via microwave frequencies, via metal or optical cables, or via any other means. Secondary players in one or more of the casinos may view the data (e.g., may view games that are reconstructed based on the data). The data may be made available on the Internet, on one or more radio stations, on television, on interactive television, and so on. For example, a secondary player may visit a web page on which are listed names or identifiers for one or more primary players. The secondary player may click on an identifier in order to view data about games of the corresponding primary player. In some embodiments, a secondary player may set the channel on his television to a particular channel whereby identifiers for various primary players are listed on a menu. The secondary player may select an identifier from the menu (e.g., using a remote control) and may thereby call up on the television screen further data pertaining to the games of the primary player.

In various embodiments, data about the game of a primary player may originate in a first casino. For example, the primary player may play the game in the first casino. Data about the game may be transmitted to a second casino. From the second casino (e.g., from a terminal located in the second casino), a secondary player may participate in the game. The second casino may thereby derive revenue from the secondary player by using data originating from the first casino. In various embodiments, the first casino and the second casino may split revenue, win, profits, theoretical win, or any other financial gain that has been derived from the use of the data at the secondary casino. For example, 50% of the theoretical win from a bet by the secondary player (i.e., the casino advantage on the bet multiplied by the amount bet by the secondary player) may be given to the first casino by the second casino. The financial gain may be split with one percentage going to the first casino and another percentage going to the second casino. In some embodiments, the second casino pays a flat fee to the first casino for the use of the data. The flat fee may cover all possible uses of the data (i.e., uses of the data in as many games as the second casino desires) or may cover a single use of the data (i.e., in one game). In some embodiments, the second casino keeps a fixed financial gain from the use of the data and pays any remaining financial gain to the first casino. For example, the second casino may keep 2 cents of theoretical win per game in which the data is used, and give the remaining portion of the theoretical win to the first casino. As will be appreciate, financial gain may be split between the first and second casinos in many other ways.

1.14. A secondary player watches games in progress. The secondary player may have various ways of watching or following the game or games in which he is participating. Following a game may include receiving information about the outcome or result of the game, receiving information about symbols or indicia that have arisen in the game (e.g., cards that have been dealt), receiving information about outcomes or results received by a dealer or opposing players, receiving information about decisions that are available or have been made in a game (e.g., decisions by a primary player to hit or stand), receiving information about player mannerisms in a game (e.g., facial expressions of a primary player or his opponents), information about amounts bet on a game (e.g., amounts bet by the primary player or the secondary player), information about amounts won on a game (e.g., amounts won by the primary player or the secondary player); and so on.

1.14.1. A split screen allows the secondary player to see all the roulette wheels in the casino at once. In various embodiments, the secondary player may follow the progress of one or more games in which he participates using one or more display screens. Display screens may include cathode ray tubes, flat panel displays, plasma displays, liquid crystal displays, diode displays, light-emitting diode displays, organic light-emitting diode displays, projection displays, rear projection displays, front projection displays, digital light processing (DLP) displays, surface-conduction electron-emitter (SED) displays, electronic ink displays (e.g., E-Ink Corp's display technology), holographic displays, and so on. A secondary player may follow the progress of a game using a device such as a Blackberry®, iPod®, personal digital assistant, mobile phone, laptop computer, camera, personal computer, television, electronic book (eBook) and so on. A single screen may contain information about a single game in which the secondary player participates. A single screen may also contain information about multiple games in which the secondary player participates. The display screen may display information about one game on one part of the screen, and about another game on another part of the screen. For example, the screen may be divided into four quadrants, each quadrant showing information about a different game that the secondary player is participating in. A secondary player participating in two games may view a first of the two games on one display screen, and a second of the two games on another display screen. A secondary player may thus watch or follow the progress of games using multiple displays screens.

1.14.2. Views come from overhead cameras. In various embodiments, a secondary player may follow the progress of a game in which he participates using video and/or audio feeds from the proximity of the game. For example, a camera may capture the progress of a blackjack game played by a primary player. By watching a video feed, the secondary player may see the cards dealt in the game, the decisions made by the primary player, the decisions made by the dealer, and the result of the game (e.g., win for the primary player, win for the dealer, blackjack for the primary player, tie). In various embodiments, video or audio feeds may be live, delayed, or may be stored and played back at a later time for the secondary player.

1.14.3. Data is piped electronically from the slot machines. In various embodiments, data may be captured from a gaming device or live table game, encoded into electronic form, and transmitted to a display device, speaker, or other output device used to present the data to the secondary player. The output devices may decode the electronic data and present it in a sensible form for human viewing. The presentation may include a text description of occurrences in the game. For example, text may read, "At 9:02 pm, slot machine number 1423 achieved the outcome of bar-bar-bar. Congratulations, you have won 20 coins." The presentation may include a reconstruction of the game. For example, the game may be reconstructed using animated renditions of the game. For example, an animated slot machine may show animated reels spinning and stopping to show the outcome achieved by the actual slot machine which generated the game the secondary player participated in. In another example, an animated dealer using animated cards may be used to reconstruct a live table game of blackjack. In various embodiments, a computer synthesized voice may report to the secondary player occurrences in a game in which the secondary player participates.

1.14.4. Only active machines are shown to the secondary player. For example, the machine currently resolving into an outcome is shown. In various embodiments, a secondary player may participate in several games at once. The games may not necessarily all proceed at the same pace. For example, one game may finish while another is still in progress. In some embodiments, games or aspects of games may be presented to the secondary player only as important or relevant events occur in the game. For example, when a first game finishes, all or part of the game may be presented to the secondary player. For example, when the first game finishes, a depiction or an image of the final outcome (e.g., the final cards in the primary player's hand) may be flashed onto a display screen viewed by the secondary player. The image pertaining to the first game may be removed when a second game finishes. When the second game finishes, a depiction or image of the final outcome in the second game may be flashed onto the display screen. In this way, the secondary player need only view aspects of a game that are most relevant, most important, or most interesting to him. When a game is in an uninteresting stage (e.g., when the reels of a slot machine are spinning), the secondary player may view information about other games. Information that may be deemed worthy of showing to a secondary player may include: information about a decision that is to be made in a game (e.g., the primary player has received an initial hand of blackjack and must now decide to hit or stand); information about a decision that has been made in a game (e.g., the primary player has decided to hit); information about a new card, symbol, or other indicium obtained in a game (e.g., a new reel of the slot machine has stopped, showing a new symbol for the pay-line); information about a final outcome of a game; information about entry into a bonus round or bonus game (e.g., the primary player has just won the opportunity to play a bonus round); information about a symbol, card, or other indicium obtained by a dealer or by an opponent of the primary player; information about an amount bet (e.g., by the primary player or by the secondary player); and information about an amount won (e.g., by the primary player or by the secondary player).

1.15. The secondary player is alerted when his favorite primary player sits down. In various embodiments, a secondary player may prefer to participate in the games of particular primary players, in the games of particular gaming devices, in games played at particular gaming tables, in games played with particular dealers, and so on. A secondary player may explicitly record his preferences, e.g., by informing the casino. In some embodiments, the secondary player may be assumed to have certain preferences, based, for example, on a history of participating in the games of a particular primary player. For example, if a secondary player has participated in 300 games of a particular primary player, the secondary player may be assumed to prefer or to enjoy participating in the games of the primary player. In some embodiments, the casino may inform a secondary player when a game in which the secondary player may be interested in participating is or will be in progress. For example, suppose that the secondary player has indicated that he likes to participate in games played by primary player Joe Smith. When Joe Smith sits down at a gaming device and begins playing, the casino may detect the presence of Joe Smith (e.g., by means of a player tracking card inserted by Joe Smith) and may then alert the secondary player that Joe Smith has begun playing. The secondary player may then place bets on the games of Joe Smith. The casino may alert the secondary player using any number of communication means. A casino representative may call the secondary player, may send a text or email message to the secondary player, may page the secondary player, may find the secondary player in person, and so on.

1.15.1. A secondary player is alerted as to the presence of a primary player who has done well for him. A secondary player may be alerted when a primary player commences play if the secondary player has had favorable results in the past when participating in the games of the primary player. Favorable past results may mean that: the secondary player is ahead in terms of winnings based on all prior participation in the games of the primary player; the secondary player was ahead in the most recent time period during which he participated in the games of the primary player; the secondary player won more than a predetermined amount of money (e.g., more than $500) in a single session while participating in the games of the primary player; the secondary player won a jackpot or other high-paying outcome while participating in the games of the primary player; the secondary player was ahead in the most recent X number of games when participating in the games of the primary player; or any other measure of performance while participating in the games of the primary player.

1.15.2. A secondary player is alerted as to the presence of a primary player with good statistics. A secondary player may be alerted when a primary player commences play if the primary player has a certain historical record or certain statistics that may be of interest to the secondary player. The historical record may include a record of: having won one or more jackpots or other high-paying outcomes; having won money for other secondary players; having achieved profitable sessions in the most recent gaming session or in any prior gaming session; having achieved a profit during some prior time period (e.g., during the past six months); and so on. A secondary player may also be alerted if a primary player that has some measure of popularity commences play. For example, primary players may be rated, e.g., by one or more secondary players, based on the secondary players' degree of satisfaction with, or other feelings towards the primary player. A primary player may, for example, be rated highly if he has won money for many secondary players in the past. Thus, for example, if a highly rated primary player commences play, a secondary player may be alerted and may be given the opportunity to participate in the games of the primary player.

1.15.3. A secondary player is alerted when good machine is taken. In various embodiments, a secondary player may be alerted if play commences at a gaming device or table that is or may be of interest to the secondary player. The gaming device may be of interest due to a number of factors, among them: the secondary player has won a jackpot or other high-paying outcome while participating in games of the gaming device; the secondary player has had profitable sessions at the gaming device; the secondary player has had recent profitable sessions at the gaming device; the secondary player has had profitable sessions at another gaming device similar to the gaming device (e.g., at a gaming device of the same type or from the same manufacturer); one or more recent games at the gaming device have resulted in jackpots or high-paying outcomes; recent games at the gaming device have resulted in profits for the player or players at the gaming device; the gaming device is highly rated (e.g., by secondary players); and so on.

1.16. A secondary player pays a fee to participate in games. In various embodiments, a secondary player may be required to pay in order to participate in the game of a primary player. The amount paid may be based on the status, rating, historical results, or requests of the primary player. For example, if the primary player is a well-known celebrity, the fees required of a secondary player may be higher than if the primary player were a lesser-known celebrity. If the primary player has had highly favorable historical results (e.g., has made large profits in the past), then the fees required of the secondary player may be higher than if the primary player did not have such favorable historical results. In various embodiments, the primary player may also declare a fee required for secondary players to participate in his games. A portion of such fee paid by a secondary player may be paid to the primary player.

1.17. Rules for using old data in a game with real money on the line. There is opportunity of misconduct since the player and/or the casino may know the data already. The use of historical games, outcomes, and other data related to a game presents an opportunity for an advantage by any party with knowledge of a data. For example, a casino might provide secondary players with the opportunity to participate only in games whose results the casino knows are losing for the player (and therefore winning for the casino). In another example, a secondary player may have already participated in a particular game (e.g., as a primary player) and may therefore know the outcome of the game in advance. The secondary player may thus make a large bet on the game if he knows the game will result in a winning outcome for him, and will make a small bet or no bet on the game if he knows the game will result in a losing outcome for him.

1.17.1. Before the original data is generated, it may be tagged for reuse at a particular date and time in the future. That way, the casino may be afforded no discretion as to whether or not to use the data. In various embodiments, before a particular game is played for the first time, a casino designates a time, date, location, and/or any other situation or circumstance under which the game will be made available for participation by others. The situation under which the game will be made available may be chosen randomly, according to some algorithm, or in any other fashion. Once the situation or circumstances for future participation in the game have been established, the game may commence for the first time. In this way, the casino has established future circumstances under which the game may be made available for participation by others (e.g., by secondary players) before the casino is aware of the outcome of the game. The casino cannot, therefore, decide not to allow participation in the game if the game turns out to result in a jackpot for the player. In various embodiments, the establishment of future circumstances under which a game will be available for participation by others is binding upon the casino. Regulators may keep track of when games must be made available for future participation, and may verify that the games have in fact been made available. In various embodiments, players or other parties may not necessarily know the circumstances under which a game must be made available in the future. In this way, players will not be able to selectively choose games to participate in based on advanced knowledge of the outcomes. In various embodiments, a record is stored, the record including information about a game and information about circumstances under which the game is to be made available in the future for participation by others.

1.17.2. Data may be put in a queue. When it reaches the front of the queue, it must be used. In various embodiments, when a game is played or generated for the first time, data or information about the game is placed in a queue. Games from the queue are then made available for participation by secondary players based on a first-in-first-out model. Thus, a game becomes available for participation based on a relatively straightforward scheduling algorithm, and there is little discretion on the part of the casino as to when the game will become available for participation. In various embodiments, other scheduling algorithms may be used. For example, games are made available according to a last-in-first-out scheduling algorithm. Any other scheduling algorithm may be used, particularly if the casino has little control over the schedule once the outcome of a game is known.

1.17.3. One set of data may be used after and only after another set of data. In various embodiments, data about a second game may be associated with data about a first game. The association may dictate that the data about the second game may be used to allow participation in the second game by a secondary player when, and only when, the data about the first game has been used. Similarly, data about a third game may be associated with the data about the second game, such that the data about the third game may be used when, and only when, the data about the second game has been used. In this way, through a chain of association, data about different games can be made available in sequence, allowing the secondary player to participate in a sequence of games. Data about different games may be associated in many ways. For example, data about a first game and a second game can be stored in locations with sequential addresses in a semiconductor memory. The casino may access the locations in the memory sequentially by address, and thereby make available data about the first game and data about the second game in sequence. In some embodiments, data about a given game may be associated with an index. The index may be a numerical index using integer numbers, for example. With such an indexing scheme, data about a game associated with index 235, for example, would be made available once data about a game associated with index 234 had already been made available. In some embodiments, the index may be a time. The time may represent a time during which the associated data was originally generated, or a time when the data should be made available again, for example. For instance, when the time associated with a particular set of data actually comes to match the current time, the particular set of data may be made available so that a secondary player might participate in a game generated using the data.

1.17.4. The time, date, and/or the machine that generated the data may be chosen at random. In various embodiments, a game that is made available for participation by a secondary player is selected at random using one or more randomly chosen variables or parameters. For example, a time and/or date may be chosen at random. Once a time and date have been chosen, for example, a game played at that time and date may be made available for participation by the secondary player. A gaming device, player, dealer, casino, location, and type of game may also constitute parameters that are chosen at random. In various embodiments, several parameters must be chosen at once in order to narrow down the universe of games to one particular game. For example, to determine a unique game, a time, date, and machine number may be required. In various embodiments, the parameters may be chosen by the secondary player, by the casino, or by third parties, such as regulators. Parameters may, in various embodiments, be chosen after the game has been played for the first time.

1.17.5. The secondary player may choose the time and/or machine. In various embodiments, a secondary player may choose the time, date, machine, or other parameter used to select a game. The choice may not necessarily by random.

1.17.6. Regulators may choose the time and/or machine. In various embodiments, a third party, such as a gaming regulator, may select a game that will be made available for participation by a secondary player. The third party may, in particular, have no stake in the outcome of the game. Therefore the third party may not be biased towards selecting a game that is winning for the secondary player or winning for the casino. The regulator or other third party may not necessarily select the game directly. Rather the third party may select one or more parameters (e.g., a time, date, machine number) that may be used to select a game that meets the selected parameters.

1.17.7. A player who had his player tacking card in a gaming device when the data was originally generated may be prevented from playing a game based on that data. In various embodiments, the casino may verify that the secondary player was not present for a game when it was originally played and/or had no knowledge of the result of the game. The casino may verify that the player was not staying at the casino's hotel during the day or time when the game was played. For example, the casino may check records of who had checked into its hotel on the day of the game. The casino may check to see whether the player made any bets at the casino on the day of the game. For example, the casino may check to see whether the player had a player tracking card inserted into a gaming device, or otherwise on record, for the day of the game. It will be understood that the casino may verify the presence of the player not just during a particular day, but during longer or shorter time periods as well. For example, the casino may verify that there is no record of a player's presence during an entire 5 day period surrounding the day of the game. A casino may verify that a player was not in the same city where the game was played at the time the game was played. For example, the casino may verify that there is no record of the player at any other casino affiliated with the casino (e.g., under the same ownership as the casino) during the day of the game. The casino may use any practicable means to verify that the player had no knowledge of the game or the outcome of the game.

1.17.8. Disallowing variation of bet size. In various embodiments, a secondary player may be prevented from varying the sizes of his bets over the course of a gaming session. In particular, the secondary player may be prevented from varying his bet sizes if he is participating in games that were first played in the past. The secondary player may thereby be prevented from varying his bet sizes based on advanced knowledge of the outcomes of the game. For example, the secondary player may be prevented from making larger bets when he knows the outcome of a game will be favorable, and a small bet when he knows the outcome of a game will be unfavorable.

1.17.9. Bet limits on game. In various embodiments, limits may be placed on the size of bets placed on games that have already been generated or played. For example, a secondary player may be permitted to bet no more than $1 on a game that has been played in the past. In this way, the casino's losses will be limited even if the secondary player has knowledge of the outcome of the game. In some embodiments, the total amount of bets placed on a game may be limited. For example, bets placed by all secondary players participating in a particular game may be limited to totaling less than $5.

1.17.10. Limits on winnings. In various embodiments, potential winnings or payouts for a game may be capped. For example, if the payout for an outcome of "bell-bell-bell" in an original game was 2000 coins, the potential payout for the same game may be reduced to 500 coins when a secondary player is participating in the game. This may limit the potential losses to a casino for a secondary player that has knowledge of the outcome of a game.

1.17.11. Disguising a game. In various embodiments, one or more aspects of a game may be disguised before a secondary player is allowed to participate in the game. Thus a secondary player who had previously participated in the game may still fail to recognize the game and to bet accordingly. A game may be disguised in a number of ways. One or more graphics of the game may be changed to appear differently. For example, a "cherry" symbol may appear in a different shade of red or with three cherries on a stem rather than two. In some embodiments, new symbols are substituted in for old symbols. For example, rather than "cherry" symbols, a game may use "blueberry" symbols. However, outcomes containing blueberries may result in the same winnings as did outcomes with cherry symbols in the original game. In some embodiments, sound effects are changed or disguised. For example the background music in the disguised game may be different from that in the original game. In some embodiments, the animation or video sequences may be altered. For example, reels of a gaming device may appear to spin faster or slower, to appear jerkier or less jerky, etc., than they did in the original game. For live games, features of one or more players may be hidden or disguised. For example the face of a dealer at a live game may be blurred out in footage of the game. In some embodiments, a new face may be super-imposed over the old face of a dealer or player so as to heighten the effect of the disguising. As will be appreciated, there are many other possible ways of disguising a game so that its outcome is not predictable to even a player who has knowledge of the original game. As described elsewhere in this document, a game may be disguised by using a different game skin while maintaining the same underlying events, outcomes, logic, etc. In some embodiments, a game may be generated and presented using at least two steps. In a first step, the results of one or more random events are determined, leading to the determination of a final outcome and a final payout for the game. In the second step, data about the results of the random event(s), the final outcome, and the final payout are used to create a graphical presentation for the player. For example, once it is determined that a player will receive an outcome consisting of three like symbols, with an associated payout of 20 coins, such data may be fed into the second step. In the second step, a graphical rendering of slot machine reels may be created, with such rendering showing the reels spinning and finally landing on an outcome with three like symbols. Further the graphical rendering may include a flashing message that says, "Congratulations, you won 20 coins!" It will be appreciated that the first step may be performed by a first device, processor, algorithm or set of algorithms, and that the second step may be performed by a second device, processor, algorithm, or set of algorithms. Accordingly, the second device, processor, algorithm, or set of algorithms may be removed and replaced with a third device, processor, algorithm, or set of algorithms. This third device, processor, algorithm, or set of algorithms may receive the same set of data from the first step as did the second device, processor, algorithm, or set of algorithms. However, the third device, processor, algorithm, or set of algorithms may perform the second step in a different fashion. The third device, processor, algorithm, or set of algorithms may thereby generated a different set of graphics, graphical renderings, or other presentation formats than did the second device, processor, algorithm, or set of algorithms. Thus, the underlying structure of the game has remained the same, but it has been presented using a different skin.

1.18. Choosing aspects of a game. In various embodiments, a secondary player may choose a game in which to participate based on one or more attributes of the game or associated with the game. The secondary player may indirectly choose the game by first choosing an attribute, and then having the opportunity to participate in one or more games having the chosen attribute. Various attributes may be especially meaningful to a secondary player and thus a secondary player may prefer to play games having those attributes. In various embodiments, the casino may select for the secondary player a game with an attribute that is anticipated to be meaningful for the secondary player. In various embodiments, the casino may provide the secondary player with the ability to search for a game based on one or more attributes of the game.

1.18.1. Choose a special date. In various embodiments, a secondary player may find a particular date to be meaningful. Thus, the secondary player may select a game that was played on the date. If the casino knows a date to be meaningful for the secondary player, then the casino may select for the player a game played on that date.

1.18.1.1. Choose the secondary player's birthday. A meaningful date for a secondary player may be a birthday. The birthday may be the birthday of the secondary player, of a relative of the secondary player's, of a pet of the secondary player's, of a friend of the secondary player's and so on. The secondary player may indicate to the casino that such a date is meaningful to the secondary player. The casino may accordingly select a game for the secondary player that was played on the date. The casino may also have a record of the secondary player's birthday based on information already provided to the casino by the secondary player. For example, the secondary player may have provided the casino with his date of birth when signing up for a player tracking card, or when taking a loan from the casino. The casino may then select, without request from the secondary player, a game that was first played on the birthday of the secondary player.

1.18.1.2. Choose a date on which a big jackpot was won. In various embodiments, a secondary player may wish to play a game that was first played on the date that a large payout, such as a jackpot, was won. This may give the secondary player the opportunity to participate in the game in which the jackpot was won. The secondary player may indicate to the casino a desire to play a game that was first played on the day of a big jackpot. The casino may then allow the secondary player to participate in one or more games played on the day of the jackpot. The secondary player may not himself know the date when a big jackpot was won. Thus, the secondary player may request that he be allowed to participate in games from the same date as the date that the last big jackpot was won.

1.18.1.3. Choose a date when the progressive was still big. The secondary player may have a shot at the large progressive. In various embodiments, a secondary player may wish to have the opportunity to win a large progressive jackpot. As is well known, the size of a progressive jackpot may vary over time. In general, as time passes without a progressive jackpot being won, the progressive jackpot becomes larger. The current size of a progressive jackpot may not be large enough to satisfy the desires of a secondary player. Therefore, the secondary player may wish to participate in a historical game from a time that the progressive jackpot was larger. Accordingly, the secondary player may request to participate in a game that was first played at a time the progressive jackpot was in excess of a certain threshold. The casino may, accordingly, allow the secondary player to participate in such a game.

1.18.2. Choose a gaming device. In various embodiments, a secondary player may search for a gaming device having desired attributes or characteristics. Upon finding a gaming device with desired attributes or characteristics, the secondary player may choose to participate in games played at the gaming device. The secondary player may search for a gamine device using a search form. In the search form, the player may select from among various characteristics of a gaming device, some of which are described below.

1.18.2.1. A secondary player may search for a gaming device based on the historical results of the gaming device. For example, a secondary player may search for a gaming device with one or more of the following characteristics: (a) the gaming device has paid more than X amount of money in the last Y amount of time; (b) the gaming device has paid more than X amount of money in general; (c) the gaming device has paid X amount of in excess of what it has taken in, in the last Y amount of time; (d) the gaming device has made X amount in excess of what it has taken in, in general; (e) the gaming device has generated winning games for players in X % of its games in the last Y period of time; (f) the gaming device has generated winning games for players in X % of its games out of the last Y games; (g) the gaming device generated winning games for players in X of its most recent games; (h) the gaming device has paid X payouts greater than Y in the last Z games; (i) the gaming device has paid X payouts greater than Y; (j) the gaming device has paid a jackpot in the last X days (or other time period); (k) the gaming device has paid X jackpots in general; (l) the gaming device has entered X number of bonus rounds in his last Y games; (m) the gaming device has entered X number of bonus rounds ever.

1.18.2.2. A secondary player may search for a gaming device based on the type of game or based on a characteristic of a game played at the gaming device. A secondary player may search for a gaming device with one or more of the following attributes: (a) the gaming device uses mechanical reels; (b) the gaming device uses video reels; (c) the gaming device has three reels; (d) the gaming device has five reels; (e) the gaming device has X number of reels; (f) the gaming device accepts a particular denomination of bets (e.g., penny, nickel, quarter, dollar); (g) the gaming device has X number of pay-lines; (h) the gaming device has 1 pay-line; (i) the gaming device has 3 pay-lines; (j) the gaming device has more than 1 pay-line; (k) the gaming device allows multiple bets per pay-line; (l) the gaming device is made by a particular manufacturer; (m) the gaming device or a game at the gaming device was introduced in the last X years (e.g., the game is a new game); (n) the gaming device has a particular theme (e.g., I Love Lucy, Regis Philbin); (o) the gaming device features a slot game; (p) the gaming device features a video poker game; (q) the gaming device features video blackjack; (r) the gaming device is part of a particular cluster of gaming devices (e.g., a cluster of gaming devices where an outcome at one gaming device may influence an outcome at another gaming device in the cluster); and so on.

1.18.2.3. A secondary player may search for a gaming device based on one or more payouts that may be provided by the gaming device. Such payouts may be contingent on a primary player of the gaming device obtaining a particular outcome at the gaming device. A secondary player may search for a gaming device that has a top payout of over X times a bet, that has a payout of over X amount, and/or that has at least X payouts over Y amount. A secondary player may search for a gaming device that has more than X outcomes that are winning and/or a gaming device that has more than X outcomes that pay more than Y. A secondary player may search for a gaming device that has a particular or a particular range of payout frequency. For example, a secondary player may search for a gaming device that pays, on average, between once ever five games and once every seven games.

1.18.3. A simulated game matches search criteria. In various embodiments, a secondary player may specify search criteria in order to find a game in which to participate. The casino may then provide the secondary player with the opportunity to participate in a simulated game which matches the search criteria. For example, a secondary player may search for a game of blackjack in which the dealer up-card is a six. The casino may then offer the secondary player an opportunity to participate in a simulated game of blackjack in which the dealer has an up-card of six. The simulated game may have been simulated in the past. For example, the casino may have simulated numerous games in the past and stored data about the games. The casino may then find one of the games from the stored set of games such that the found game matches the secondary player's search criteria. The casino server may then offer the secondary player the opportunity to participate in the found game. In the aforementioned example, the casino server may offer the secondary player the chance to participate in a simulated game in which the dealer had an up-card of six. In various embodiments, a simulated game may include a game where player decisions were made by a computer routine. In various embodiments, a simulated game may include a game in which random events were generated using a computer routine. In various embodiments, a secondary player may perform a search for a game of a primary player matching certain criteria. The casino may, once the search criteria have been specified by the secondary player, generate one or more simulated games matching the search criteria. For example, the secondary player may search for a series of games in which a primary player has won 10 consecutive games in a row. The casino may thereupon simulate a series of games. The casino may continue simulating games until the simulated primary player has won 10 games in a row. The casino may then, for example, provide the secondary player with the opportunity to participate in the next simulated game. In various embodiments, the casino may construct one or more games that match search criteria of the secondary player. For example, if the secondary player is interested in participating in a game of craps in which the first roll of the dice is an eight, then the casino may begin a simulated game and force the first roll to be a eight. Subsequent rolls in the game may be generated at random. In embodiments described herein, any searches performed by a secondary player for a particular type of game may be satisfied by simulated games and/or by games constructed by the casino server. In various embodiments the odds, the payouts, the rules, and/or the required bet amount for a game may be changed when a secondary player has specified a criterion that the game must meet. For example, if the secondary player specifies a game of blackjack in which the primary player has a good starting hand (e.g., an 11 point total) then the payout for a winning hand may be reduced.

1.18.4. Search for a trend. In various embodiments, a secondary player may search for a particular trend or pattern among one or more games. For example, a secondary player may search for any string of 10 consecutive games played by the same primary player in which the primary player won all 10 games. Once finding the trend, the secondary player may participate in the game immediately following the trend. For example, a secondary player may find a trend of spins at a roulette wheel in which three consecutive spins resulted in the number 13. The secondary player may then participate in the spin of the roulette wheel that immediately followed the three spins in which the number 13 came up. The secondary player may not know the result of the spin which immediately followed the three spins where a 13 came up. A secondary player may search for various trends, including: (a) a series of consecutive games played by the same primary player in which the primary player has lost all the games; (b) a series of consecutive games played by the same primary player in which the primary player has won all the games; (c) a series of consecutive games played by the same primary player in which the primary player has tied in all the games; (d) a series of consecutive games played by the same primary player in which the primary player has generated at least a predetermined amount of net winnings; (e) a series of consecutive games played by the same primary player in which the primary player has generated at least a predetermined amount of gross winnings; (f) a series of consecutive games played by the same primary player for which a particular symbol (e.g., "bell") has occurred in every game; (g) a series of consecutive games played by the same primary player in which the primary player has alternated every game between winning and losing; (h) a series of consecutive spins at of a roulette wheel that have resulted in the same outcome (e.g., the number 4); (i) a series of consecutive spins at of a roulette wheel that have resulted in the same type of outcome (e.g., a red outcome); (j) a time period (e.g., a five-minute time period) during which 80% of blackjack games played by any primary player were won; (k) a time period (e.g., a one-hour period) during which three jackpot outcomes were won at slot machines in a particular casino; (l) a series of games (e.g., games played at a particular table at a casino) in which a particular starting hand occurred at least 20% of the time (e.g., in which primary players received a blackjack at least 20% of the time); and so on. In various embodiments, a secondary player may search for a primary player who is the biggest loser within a given population during a given period of time. For example, a secondary player may search for a primary player who has lost the most during a one-hour period of time at the reel slot machines. In various embodiments, a secondary player may search for a primary player who is the biggest winner within a given population during a given period of time. In various embodiments, a secondary player may search for a primary player who has had the most outcomes paying more than $50 within a given population during a given period of time. In various embodiments, a secondary player may search for a primary player who is the biggest loser over his entire playing session when compared to any other primary player. In various embodiments, a secondary player may search for a primary player who is the biggest loser over his entire playing career, at least at a particular casino. In various embodiments, a secondary player may search for a trend that is based on an area of a casino. For example, a secondary player may search for an area of a casino such that games played in that area over the last hour have resulted in net winnings for all players of $3000. In various embodiments, a secondary player may search for a trend that is based on a type of game. For example, the secondary player may search for a type of game such that, in the last X minutes, games of that type have resulted in average winnings for primary players of more than $20. In various embodiments, a secondary player may search for a trend that is based on primary players with a certain characteristic. For example, the secondary player may search for a trend in which primary players from Arkansas have won, on average, more than $50 per player over the last hour.

1.18.5. Choose a primary player. In various embodiments, a secondary player may search for a primary player having desired attributes or characteristics. Upon finding a primary player with desired attributes or characteristics, the secondary player may choose to participate in games of the primary player. The secondary player may search for a primary player using a search form. In the search form, the player may select from among various characteristics of the primary player, some of which are described below. For example, the secondary player may enter an age or age range desired in a primary player. The secondary player may also select a characteristic of a primary player from a menu. For example, the secondary player may select one of fifty states from a menu, the state indicating a desired residence location for a primary player. As will be appreciated, a secondary player may search for a primary player in many other ways. For example, a secondary player may communicate to a casino representative (e.g., via text message) a description of a primary player. The casino representative may then check records of people currently checked into its hotel or currently playing at gaming devices (e.g., with tracking cards inserted), and may attempt to locate a person matching the description provided by the secondary player. In some embodiments, a secondary player may seek a particular and unique individual, i.e., the secondary player may submit a description that can only be satisfied by one person in the world. For example, the secondary player may submit a name. In some embodiments, the secondary player may submit a description that may be satisfied by any one or a plurality of primary players. The secondary player need not have a particular individual in mind.

1.18.5.1. A secondary player may search for a primary player based on the historical results of the primary player. For example, a secondary player may search for a primary player with one or more of the following characteristics: (a) the primary player has won more than X amount of money in the last Y amount of time; (b) the primary player has won more than X amount of money in general; (c) the primary player has made X amount of profits in the last Y amount of time; (d) the primary player has made X amount of profits in general; (e) the primary player has won X % of his games in the last Y period of time; (f) the primary player has won X % of his games out of the last Y games; (g) the primary player won X of his most recent games; (h) the primary player has won X payouts greater than Y in the last Z games; (i) the primary player has won X payouts greater than Y; (j) the primary player has won a jackpot in the last X days (or other time period); (k) the primary player has won x jackpots in general; (l) the primary player has used optimal strategy in his last X games; (m) the primary player has used good or expert level strategy in his last X games; (n) the primary player has entered X number of bonus rounds in his last Y games; (O) the primary player has entered X number of bonus rounds ever.

1.18.5.2. A secondary player may search for a primary player based on a historical relationship between the primary player and the secondary player. The secondary player may search for a primary player in whose game or games the secondary player has previously participated. The secondary player may search for a primary player, where, participating in the games of the primary player: (a) the secondary player has won a jackpot; (b) the secondary player has made a profit; (c) the secondary player has entered X number of bonus rounds; (d) the secondary player has won in X of the last Y games; (e) the secondary player has won X % of the last Y games; (f) the secondary player has won X payouts more than Y amount; and so on. The secondary player may also search for a primary player where the secondary player has participated in more than X number of games with the primary player.

1.18.5.3. A secondary player may search for a primary player based on demographic characteristics of the primary player. For example, the secondary player may search for a primary player based on one or more of the primary player's: (a) age; (b) race; (c) marital status; (d) number of children; (e) number of grandchildren; (f) religion; (g) place of birth; (h) place of residence; (i) gender; (j) occupation; (k) income; (l) disability status; (m) education level; (n) high school attended; (O) college attended; and so on. For example, the secondary player may wish to participate in games of a primary player who shares one or more demographic characteristics with the secondary player.

1.18.5.4. A secondary player may search for a primary player based on hobbies enjoyed by the primary player. For example, the secondary player may search for a primary player that enjoys a particular game or sport, or for a primary player that is a fan of a particular sports team.

1.18.5.5. A secondary player may search for a primary player with whom the secondary player has some prior connection or relationship. The secondary player may search for a primary player in whose games the secondary player has previously participated. The secondary player may search for primary players in whose game the secondary player has previously won money, won a jackpot, won a large payout, or had some other result of interest to the secondary player.

1.18.6. In various embodiments, a secondary player may search for a particular game based on attributes of the game. The search may be particular to an individual game. For example, a search may distinguish between two games played by the same primary player at the same gaming device. In some embodiments, a secondary player may search for a game in which a certain amount has been bet. For example, a secondary player may search for a game in which three coins have been bet. The bet of three coins may make the primary player of the game eligible to win the jackpot. The secondary player may search for a game in which X number of pay-lines are activated, or a game in which X number of hands of video poker are being played simultaneously. A secondary player may search for a game based on the time or date on which the game was played.

1.18.6.1. In some embodiments, a secondary player may search for a game based on events that transpire within the game. For example, the game may have already occurred, or the game may be in process at the time of the secondary player's search. A secondary player may search for a game in which: (a) a particular set of cards have been dealt (e.g., a video poker game where a pair has been dealt in an initial hand, or a blackjack hand where cards totaling 11 have been dealt as a starting hand); (b) a particular symbol or symbols of an outcome have been determined (e.g., two bar symbols have appeared on the reels of a gaming device out of an outcome consisting of three symbols); (c) a bonus round has been reached; and/or (d) a certain level of a bonus round has been reached.

1.18.7. Providing a game for the secondary player to participate in. At some point, the secondary player may be ready to participate in a game with certain attributes. The attributes may be attributes specified by the secondary player. For example, the secondary player may have searched for a game with the certain attributes, or otherwise provided an indication of a desire to participate in a game with the certain attributes. In some embodiments, the casino may, for other reasons, wish to have the secondary player participate in a game with the certain attributes.

1.18.7.1. An actual historical game is provided. Given a set of attributes or characteristics, a casino may retrieve data about a historical game with the given set of attributes or characteristics. The historical game may be a game that was actually played by a real human player. For example, when a secondary player has indicated a desire to play in a game of video poker that was played by a primary player aged 60 years old, the casino may retrieve data about a game that was actually played in the past by a 60 year-old primary player and that was played at a video poker machine. The data retrieved may be used to display information about the game to the secondary player (e.g., to show screen shots of the cards being dealt in the game), to determine what the outcome of the game was, to determine whether the secondary player is a winner based on bets placed on the game by the secondary player, and to determine an amount to pay the secondary player. Data about historical games may be stored in a database or in any other storage means. Data about historical games may be indexed by different attributes, such as the age of the player or the type of game. Games may thus be searched by attributes, and data about games with attributes desired by a secondary player may be retrieved.

1.18.7.2. A historical simulated game is provided. Given a set of attributes or characteristics, a casino may retrieve data about a historical game that was simulated. The game may not ever have been played by a real human being. In some embodiments, the outcome of the game may have been determined prior to play by a real human being. However, subsequent to the outcome being generated, a person (e.g., a secondary player) may have participated in the game. As with a historical game originally played by a live player, data about a historical game that was simulated may be stored in a database and indexed by attributes. Subsequently, data about historical games may be searched according to desired attributes. The data may then be used to recreate the game for a secondary player, and to determine an outcome and an amount to be paid to a secondary player.

1.18.7.3. A current actual game is provided. Given a set of attributes or characteristics, a casino may determine a current game in progress with the given set of attributes or characteristics. For example, a 60 year-old primary player from Wisconsin may currently be involved in a game at a video poker machine in which an initial hand with a pair has been dealt. The secondary player may be allowed to participate in the game in progress. For example, the secondary player may be allowed to place a bet on what the final outcome of the game will be. In various embodiments, the secondary player need not have the benefit of the same pay table as does the primary player, since the secondary player is placing a bet in the middle of the game and has more information than the primary player did at the start of the game.

1.18.7.4. A current simulated game is provided. Given a set of attributes or characteristics, a casino may simulate a game having the given attributes or characteristics. The casino may, for example, use a computer algorithm to determine cards to deal in a card game (e.g., video poker) or to determine symbols to show in a simulated reel slot machine. For example, if a secondary player desires to participate in a game of video poker, the casino may simulate a game of video poker. If the secondary player desires to participate in a video slot machine game, the casino may simulate a video slot machine game. In various embodiments, the casino may use algorithms to simulate table games as well as games typically played on a gaming device. For example, the casino server may simulate craps, blackjack, or poker. If other players would normally be present in a game, the casino may use computer algorithms to simulate the decisions that would have been made by humans. For example, in order to simulate a game of poker, the casino may use algorithms designed to bet, call, fold, raise, or check, according to certain pre-programmed rules.

In some embodiments, a secondary player may wish to participate in a game in which certain symbols or outcomes occur. The casino may, in some embodiments, simulate multiple games until the desired symbols or outcomes occur. The secondary player may have the opportunity to participate only in the game, of the multiple games, in which the desired symbols or outcomes occurred. For example, the secondary player may indicate a desire to participate in a game in which three-of-a-kind was dealt on the initial hand in a game of video poker. The casino may deal a number of simulated hands of video poker. Only when the casino finally deals an initial hand with three-of-a-kind, e.g., due to random chance, does the casino allow the secondary player to then place a bet and to receive winnings for the final outcome of the game. In some embodiments, the casino may accept a bet from the secondary player first, simulate multiple games until a game with desired characteristics is simulated, and then pay the player based upon the outcome of the game with the desired characteristics. In some embodiments, the simulation may begin with a game of the desired attributes. For example, if a secondary player desires to play in a game of video poker with three-of-a-kind dealt on the starting hand, then the simulation may begin by immediately dealing three-of-a-kind. The simulation may randomize the remaining cards (e.g., shuffle the cards remaining after the three cards of the same rank have been dealt, the remaining cards completing a standard deck of 52 cards). The game may continue with two additional cards dealt from the randomized deck to complete the initial hand, followed by the discarding of one or two cards, followed by the replacing of the discarded cards with new cards from the randomized deck. In various embodiments, the secondary player may or may not have the opportunity to make decisions in a simulated game. For example, in some embodiments, the secondary player may choose which cards to discard in a game of video poker. In some embodiments, the cards that are discarded may be chosen automatically, e.g., by a computer algorithm employing optimal poker strategy.

1.18.7.5. An alert is provided for when a game with desired characteristics will be played. Given a set of attributes or characteristics, a casino may determine when such a game will be played or will be likely to be played. For example, a secondary player may wish to participate in a game played by a primary player at a 3-reel slot machine, the primary player having three kids and a birthday in April. The casino may determine that a primary player with three kids and a birthday in April is indeed seated at a 3-reel slot machine. The primary player may have been playing for 20 minutes already, and presumably will continue to play. Therefore, a secondary player may be permitted to participate in games of the primary player from that point forward. The casino may alert the secondary player that a primary player with desired characteristics has been found and that the secondary player may begin placing bets in the games of the primary player. Further, the casino may begin transmitting information about the games of the primary player to the secondary player.

1.19. A secondary player participates in a game where a progressive jackpot is won. In various embodiments, a secondary player may participate in a game for which the primary player is eligible to win a progressive jackpot. However, in various embodiments, a progressive jackpot constitutes a single pool of money, and therefore cannot be paid in its entirety to multiple different players.

1.19.1. The secondary player gets a fixed substitute. In various embodiments, when a primary player wins a progressive jackpot, a secondary player participating in the same game receives a fixed payment. The fixed payment may be some predetermined amount, such as $10,000.

1.19.2. The secondary player gets a fixed percentage. In various embodiments, when a primary player wins a progressive jackpot, a secondary player participating in the same game receives percentage of the progressive jackpot.

1.19.2.1. The primary player gets the full amount, or less so the secondary player can be paid. In various embodiments, when a secondary player receives a percentage of a progressive jackpot won by a primary player, the amount received by the primary player from the jackpot may be correspondingly reduced. For example, if the secondary player receives X % of a progressive jackpot, the primary player may receive 100%–X % of the progressive jackpot. In various embodiments, for each bet placed on a game with a progressive jackpot, a portion of the bet is contributed towards increasing the size of the progressive jackpot. Thus, when a primary player and a secondary player each place a separate bet on a game, a portion of the primary player's bet may add to the size of the progressive jackpot, and a portion of the secondary player's bet may contribute to the size of the progressive jackpot. For each game, a fixed contribution to the progressive jackpot may be required. Thus, if both a primary player and a secondary player participate in a game, the contribution from the primary player towards the progressive jackpot may be less for that game than if only the primary player were participating in the game. In various embodiments, the primary player may receive the full amount of the progressive jackpot. The amount received by the secondary player may be over and above the amount paid out to the primary player. Even so, the secondary player may receive an amount equal to a predetermined percentage of the progressive jackpot, such as 10% of the progressive jackpot.

1.19.3. Part of progressive amount is set aside for secondary players before it is paid out In various embodiments, a progressive jackpot is divided into two or more portions. A first portion is available to be won by primary players. A second portion is available to be won by secondary players. If a progressive jackpot is won in a game, a primary player participating in the game would win the portion of the progressive jackpot available to primary players, and a secondary player participating in the game would win the portion of the progressive jackpot available to secondary players. If there is no secondary player for the game, then the portion of the progressive jackpot available for secondary players may remain unclaimed.

1.19.4. There is a progressive just for secondary players. In various embodiments, a progressive jackpot (other similar terms used herein may include "progressive prize", "progressive prize pool", "progressive pool", "progressive payout") may grow from the contributions of only secondary players. The progressive jackpot may be available to be won only by secondary players. For example, for each bet a secondary player puts on a particular type of game, a portion of the bet may be set aside and added to a progressive jackpot. If a secondary player participating in the particular type of game later wins the progressive jackpot, the jackpot may go to the secondary player. The size of the progressive prize pool may then go down to zero. In some embodiments, once a progressive prize pool has been claimed, the next pool may be seeded with some money by a casino, e.g., with $10,000, so as to garner interest from secondary players. In various embodiments, a display visible by a secondary player may track the size of a progressive. For example, a secondary player may participate in games using a mobile device (e.g., a mobile device as set forth in Nevada bill AB471). The mobile device may maintain on its display screen a running tally of the size of the progressive pool.

In various embodiments, two or more separate progressive jackpots may be available for secondary players. In various embodiments, a secondary player may be eligible to win a progressive prize based on the location or geographic region from which the secondary player participates in games. For example, a secondary player participating while seated in Casino A may be eligible for a first progressive prize pool of $10,000. Another secondary player participating while seated in Casino B may be eligible for a second progressive prize pool of $20,000. A progressive prize pool may be available to be won by a particular secondary player based on one or more characteristics or circumstances of the secondary player, such characteristics or circumstances including: (a) a demographic of the secondary player, such as an age, birthday, birthplace, marital status, educational status, and so on (e.g., there may be a first progressive pool for secondary players aged 60 or over and a second progressive pool for secondary players aged 59 or under); (b) the particular type of game the secondary player is participating in (e.g., there may be separate progressive prizes for slot machine games and video poker games); (c) the location or geographic region from which the secondary player is participating (e.g., there may be different progressive pools for different casinos, different cities, different states, etc.); (d) the time or date during which the secondary player is participating (e.g., there may be a different progressive prize offered during each six-hour period in a day); (e) the identity of the primary player (e.g., there may be a first progressive prize pool associated with the games of a first set of primary players, and a second progressive prize pool associated with a second set of primary players); (f) a characteristic or circumstance of the primary player (e.g., demographic, location, etc. of the primary player); (g) a bet being made by the secondary player (e.g., a secondary player may be eligible for a first progressive prize if his bet is more than $3, and a second progressive prize if his bet is less than $4); and so on. In various embodiments, a progressive prize pool may be associated with a given period of time. For example, a progressive prize pool may be associated with a particular day. The progressive prize pool may be associated with a guarantee that it will be won on its associated day (or its associated period of time). According to the guarantee, the progressive prize may be claimed by the first secondary player to achieve outcome A, the first secondary player to achieve outcome B if no secondary player achieves outcome A, the first secondary player to achieve outcome C if no secondary player achieves outcomes A or B, and so on. In various embodiments, a progressive prize pool may have its probability of occurrence set so that it is likely the pool will be won during an associated time period. For example, if it is anticipated that secondary players will play 10,000 games during a given time period in which they have a chance of winning a progressive, the probability of winning for each game may be set at 1/5000. The probability that the progressive will be won during the time period may then be approximately 86%. In some embodiments, as the casino may be aware in advance of the outcomes of games to be played by a secondary player, the casino may intentionally offer for play at least one game that will result in a progressive prize being won. One such game may be offered during every period in which a progressive prize is guaranteed to be won. In various embodiments, two or more progressive prize pools may be simultaneously available to be won by a secondary player. One progressive pool may be associated with a relatively shorter period of time, while another progressive pool may be associated with a relatively longer period of time. For example, a first progressive prize pool may be won, on average, once a year. In fact, the first progressive prize pool may be guaranteed to have a winner every year. A second progressive prize pool may be won, on average, once a day. A secondary player may be eligible to win either of the progressive prize pools in the same game. In some embodiments, a secondary player may win only the first progressive prize pool while participating in a first game. In some embodiments, a secondary player may be eligible to win only the second progressive prize pool while participating in a second game.

1.19.5. A secondary player cannot play games with progressives. In various embodiments, secondary players may not be allowed to participate in games with progressive payouts.

1.19.6. A secondary player wins the full amount of the progressive. In various embodiments, when a progressive payout is won in a game, the secondary player may receive the full amount of the progressive. For example, suppose a primary player wins a progressive jackpot in a game for which the progressive jackpot is $100,000. The primary player may receive $100,000. The secondary player may also receive $100,000.

1.19.7. Making up extra funds to pay secondary players. In various embodiments, a progressive payout (e.g., a progressive jackpot) may consist of funds held in reserve for a time when the jackpot must be paid out. If a progressive jackpot is won in a game where a secondary player is participating, the progressive jackpot may go to the primary player and additional funds must be obtained by the casino to pay the secondary player. In various embodiments, the casino may pay the secondary player out of a separate pool of funds, such as an account used by the casino for general business expenses. In some embodiments, the secondary player may receive a promise of payment. The secondary player may receive a portion of contributions towards future progressive payouts. For example, the secondary player may receive 50% of all portions of bets withheld for a subsequent progressive jackpot until such time as the subsequent progressive jackpot is won.

1.20. Anti-vulture provisions. A secondary player may be prevented from playing in games with a positive expected value. Various situations may arise with respect to a gaming device or with respect to a live table game where betting circumstances are favorable to a player. Favorable circumstances may include circumstances where a player might expect to receive, on average, more than 100% of his bet from winnings in a game. For example, if a progressive jackpot or other payout at a slot machine reaches a certain level, the slot machine may return, on average, more than 100% of an amount bet. In some slot machines, certain symbols, tokens, or other objects may be accumulated from game to game. For example, Double Diamond Mine® slots, made by IGT, allow a player to accumulate diamond symbols from game to game. Once 10 diamond symbols from a particular reel have been accumulated, the player wins a payout. A slot machine in which a number of such objects have been accumulated may return, on average, more than 100% of an amount bet. In games of blackjack, such as in live table games of blackjack, a game may return more than 100% of an amount bet if the cards remaining in a deck have a predominance of one type of card (e.g., of high cards).

In various embodiments, a secondary player may be allowed to search for historical games in which the expected payout is more than 100% of the bet. For example, the secondary player may search for games at a Double Diamond Mine® slot machine where nine diamond symbols for each reel have already been accumulated. In another example, the secondary player may be allowed to search for gaming devices in which a progressive jackpot has exceeded a certain threshold. The secondary player may be allowed to participate in such games. However, in some embodiments, the secondary player may be prevented from participating in games in which an expected payout is more than 100% of the bet. In some embodiments, a secondary player may only be allowed to participate in games returning more than 100% of an amount bet if such games arise during a longer sequence or session of play. For example, a secondary player may be allowed to participate in a Double Diamond Mine® slot game for which nine diamond symbols have accumulated for each reel only if the secondary player has already participated in immediately prior games that had occurred at the same slot machine.

Tracking of game data usage. In some embodiments, a game that was originally played at a first casino or other establishment may subsequently be recreated at a second casino or establishment. For example, a secondary player at a second casino may participate in a game that was originally played at a first casino. The second casino may derive revenue, profit, or other financial gain from the recreation of the game at the second casino. For example, when a secondary player places a bet on the game at the secondary casino, the secondary casino may expect to win some portion of the bet, on average. In some embodiments, the second casino may compensate the first casino for the privilege of using or recreating the game that was first generated or played at the first casino. In various embodiments, the use of games for participation by secondary players may be tracked. The tracking of such use may allow a first casino (e.g., the casino that originally generated a game) to track how much it is owed, and a second establishment (e.g., the casino that recreated the game for play by the secondary player) to track how much it owes. The use of a game at a casino may be tracked in a number of ways. Data related to the game, e.g., a game identifier, may be stored in a database. A time during which the game was recreated may be stored. Other items stored may include: (a) an identity of a secondary player who played the game; (b) an amount bet on the game; (c) an amount won or lost by the casino recreating the game; (d) a type of bet placed on the game; (e) a number of secondary players who participated in the game; (f) a location of a secondary player who bet on the game; (g) an amount owed to the casino that originally generated the games; and so on. Data about individual games may not be stored, in some embodiments. Rather, data about blocks or groups of games may be stored. For example, a casino may store a record indicating that a group of 1000 games was recreated during the afternoon of Aug. 17, 2010, and that a total of $40,000 was bet on the games.

In various embodiments, a casino that used or recreated one or more games may send a report about the use of the games to the casino that originally generated the games. For example, the casino that recreated the games may send a printed report with each line on the report detailing, e.g., a particular game, a particular time the game was recreated, an amount bet, and an amount owed to the casino that originally generated the games. The report may be a paper or electronic report. The report may be sent by postal mail, email, fax, via download from the Internet, or via any other means. A report may cover a single game or a group of games. A report may be sent in real time (e.g., a report about the use of a game may be sent to the casino that originated the game as the game is used or immediately after the game has been used), periodically (e.g., every hour), or once (e.g., at the end of a period for which the casino using the games is authorized to use the games by the casino that first generated the games).

Data stored by a casino relating to the use or re-creation of games within the casino may be obtained from devices used for play by secondary players. For example, a terminal at which a secondary player participates in a game may store and/or transmit various data to the casino server, such as amounts bet by the secondary player, which games the secondary player played, and so on.

In various embodiments, a casino that uses data about games originally generated at another casino may track or record the use of various images associated with the game. Based on the use of images, royalties may be paid to copyright holders of the image. Also, the casino that originally generated the game may track the use of images from the game.

1.21. Bucket shop paradigm. Under this paradigm an establishment hopes to invest the least amount possible in casino infrastructure, including games, and even licenses to be a casino operator. Instead, the establishment plans to just reuse data from a real casino, set up a nice façade, and open up for business. In various embodiments, an operator may set up a gaming facility which uses solely or predominantly games or outcomes that have already been generated. The operator may thereby save various costs, possibly including the costs of purchasing gaming equipment, costs of obtaining accounting software and other infrastructure, and costs associated with meeting various regulations. For example, by reusing outcomes that have already been generated, an operator need not buy expensive gaming machines to generate original outcomes. Further, the operator need not submit such gaming machines for regulatory approval or inspection. In some embodiments, an operator of a facility that only reuses games and outcomes already generated may not be required to obtain the same types of regulatory approval as does a facility that generates original games and outcomes. The operator of the facility that reuses games and outcomes need not, in some embodiments, submit devices used by secondary players to the same process of regulatory approval that ordinary gaming devices (e.g., slot machines) are subject to. Rather the regulatory approval process may be simpler for the devices used solely by secondary players. In some embodiments, an entire facility that only reuses games or outcomes may not be subject to the same regulatory processes as is a facility that generates original outcomes. Rather, the regulatory processes may be simpler for facilities that solely reuse games or outcomes.

In some embodiments, by using outcomes already generated, an operator may use accounting data that has already been generated to account for amounts received, won, and lost based on the outcomes. Thus, the operator may save on accounting software and other accounting infrastructure, such as networks or intranets for conveying accounting related information.

1.21.1. Use of shell machines that simply display outcomes from other machines. In various embodiments, an operator may install machines or devices with simplified functionality. The machines may include currency acceptors, credit card acceptors, or other acceptors for consideration to be used for betting purposes. The machines may include output devices, such as microphones for audio output and display screens for video or graphical output. The machines may further include dispensers for cash, coins, currency, tokens, chips, cashless gaming receipts, or other consideration. Consideration may be paid to a player based on amounts won while participating in games, or based on amounts remaining from an initial deposit made by a player. The machines may further include media players and/or media storage devices. For example, the machines may include DVD players or VHS players. The machines may include VHS tapes, DVDs, CDs, flash memory, or other media storage devices. The machines may further include buttons, handles, and touch screens for use by a player to input information, such as amounts to bet. The machines may further include network interfaces for sending and receiving information via a network, such as an intranet or internet. Network interfaces may include wireless network interfaces, such as antennae. Operationally machines according to various embodiments may receive a record of historical games, stored on a media device, such as a DVD. The machines may receive currency from a player. The machines may then receive an indication of an amount to bet. The machines may then receive an initiation signal for a game from the player. The player may convey the initiation signal, for example, by pressing a button labeled "spin" on the machine. The machine may then play for the player a video or other depiction of a stored game from the DVD. For example, the machine may play a 10-second video clip from the DVD, the video clip depicting a historical game that occurred at an actual slot machine. The machine may determine an outcome of the game. For example, the DVD may store, in association with each game, information about a payout or payout ratio associated with the game. Based on the information about the payout, the machine may pay the player. The player may be paid by, e.g., dispensing currency through a dispenser of the machine, or by adding to a balance of player credits stored on the machine. In various embodiments, the machine does not itself generate any outcomes or games. The machine merely replays games that have been previously generated. In various embodiments, the machine may recreate games based on a limited amount of information about the games. For example, the machine may receive information about the outcome of a game. The machine may then display an animated sequence depicting slot reels spinning and stopping to show the outcome. In some embodiments, the machine need not store information about prior games locally on the machine. Rather, the machine may receive information about historical games via the network. As information about historical games is received, the machine may recreate the historical games for the benefit of a secondary player at the machine.

1.21.2. Simplified regulatory license. An operator is just reusing data that's already been certified. There is no need to recertify data. In various embodiments, an operator using historical outcomes may operate without one or more licenses required of a typical gaming operator. A special license may be granted for operators who use only historical outcomes. A special license may be granted for operators who use only historical outcomes which have come from licensed gaming establishments.

1.21.3. Reuse of accounting data. There is no need for an operator to generate his own accounting data. In various embodiments, a casino operator may generate a number of original games or outcomes. Based on the outcomes, the casino may generate a record of amounts won, amounts lost, amounts collected, amounts owed in taxes, and so on. Such data may constitute accounting data. The casino operator may subsequently share such accounting data with a second operator who reuses the outcomes generated by the first casino operator. Since the outcomes used are the same, the accounting data required may be the same or similar. Therefore, in some embodiments, the second operator may receive the accounting data from the first casino operator, and reuse the accounting data for its own records.

1.21.4. Pre-inspection of the data is not allowed, as then the bucket shop could be accused of knowing the outcomes in advance. In various embodiments, an operator using historical games or outcomes is forbidden by law, regulation, convention, or other policy from obtaining knowledge about the games or outcomes prior to the participation in the games by a secondary player. In this way, the operator may be discouraged from selectively making available games or outcomes that are unfavorable to the operator.

1.22. Multi-Tiered Poker Game. In various embodiments, a poker game occurs. The poker game may include a number of live players at a table at a casino. The poker game itself may be referred to as a first tier game. Based upon the first tier game, a second tier game may be played. The second tier game may involve a different set of players. In some embodiments, the second tier game includes one player for each player in the first tier game. Each person in the second tier game may be associated or matched with a person in the first tier game. In various embodiments, a person in the second tier game may bet on what his associated player will do in the first tier game. For example, the player in the second tier game may bet that his associated player in the first tier game will check, bet, raise, call or fold. Further, the person in the second tier game may place a bet on the amount that the associated person in the first tier game will bet. For example, if Joe in the second tier game is associated with Sue in the first tier game, then Joe may bet that Sue will raise by at least 30 chips. In various embodiments, a person in the second tier game cannot communicate with his associated person in the first tier game. In various embodiments, no one in the second tier game can communicate with anyone in the first tier game, and vice versa. In various embodiments, a person in the second tier game knows the cards of the associated person in the first tier game, but does not know the cards of any other player in the first tier game.

In various embodiments, a person in the second tier game may also check, bet, raise, fold, or call against other people in the second tier game. He may bluff and hope other people in the second tier game will fold. Should two or more players remain in a second tier game once the first tier game has reached its conclusion, a pot in the second tier game may be awarded to a person in the second tier based on the results of the first tier game. Namely, if a person in a second tier game is associated with the person in the first tier game who won the first tier game, then the person in the second tier game will also win in the second tier game. In some embodiments, the result or outcome of the second tier game is decided as if each person in the second tier game held the cards of his associated person in the first tier game. In various embodiments, if a player in the first tier game folds, the associated player in the second tier game folds automatically, and thus loses in the second tier game.

In various embodiments, there may be higher tiers. For example a third tier may include the same number of players as are in the second tier (or, equivalently, the first tier). Each player in the third tier may be associated with a player in the second tier. Thus, the player in the third tier may automatically be associated with the person in the first tier to whom is associated the player in the second tier that is associated with the player in the third tier. In other words, one player in each tier may be associated with a particular hand of cards, and all such players may be associated with one another. Players in the third tier may place bets on what bets will be made by associated players in the second or first tiers, and on how much will be bet by such players. Further players in the third tier may make bets against one another to be decided by results of lower tiers. A player in the third tier may win a pot if he has not folded, his associated player in the second tier has not folded, his associated player in the first tier has not folded, and his associated player in the first tier has the best poker hand at the conclusion of the first tier game. However, if an associated player in the first or second tier folds, a player in the third tier is automatically folded. Note, however, that a player in the second tier is not automatically folded if an associated player in the third tier has folded. It will be appreciated that there may be any number of tiers, with fourth, fifth, sixth, etc., tiers operating in an analogous fashion to what has been described with respect to the first three tiers. In some embodiments, a person in a tier greater than the first tier may see the cards of all players in the first tier.

1.22.1. There may be time limits on people in higher tiers so they can't stall to see what happens in the actual game. In some embodiments, a player in tier two or above may have a time limit for making bets or other game decisions. The time limit may force a player in tier two or higher to take action before the game proceeds in tier one, and thus before the player in tier two or above discovers important information from watching the first tier players that might aid him in his game decision.

1.22.2. A higher tier game may not occur in a live environment. Thus higher tier players may bet after the fact. In various embodiments, tier two, tier three, and higher tier games may occur after the tier one game has occurred. Accordingly, a playback of the action in the tier one game may be halted until all appropriate actions have been taken in the higher tier games.

1.22.3. Tiers could form among people at the pool using handheld devices. In various embodiments, a second tier, third tier, or higher tier game may form amongst players that are remote from a poker table. For example, players located poolside at a casino may engage in a second tier game using handheld devices, such as personal digital assistants. Thus, the second tier players may benefit from the work of a dealer and from the use of physical cards, but without having to be physically present at a poker table.

1.23. In various embodiments, a first secondary player may receive an alert regarding the activities of a primary player and/or of a second secondary player. An activity that may trigger an alert may include: (a) the primary player inserts a tracking card into a gaming device; (b) the primary player inserts currency or other consideration into a gaming device; (c) the primary player presents a tracking card or other identification at a table game (e.g., at a blackjack game); (d) the primary player buys chips at a table game; (e) the primary player places a bet in a slot machine game; (f) the primary player places a bet in a game; (g) the primary player participates in a game; (h) the primary player receives a payout in a game; (i) the primary player checks into a hotel; (j) the primary player pays for a meal at a restaurant (thereby identifying himself with a credit card, for example); and so on. Similar activities by the second secondary player may trigger an alert for the first secondary player. An alert may be sent to the secondary player if the primary player was or is flagged for any reason, such as being of interest to the first secondary player. For example, the first secondary player may have indicated that the primary player is the favorite player of the secondary player. Thus, the first secondary player may wish to be alerted any time the primary player is playing or will begin playing so that the first secondary player may have the opportunity to participate in the games of the first primary player. An alert may be transmitted to a device of the second secondary player, including a cell phone, personal digital assistant, Blackberry®, laptop, personal computer, television, and so on.

An alert may also be transmitted to the first second secondary player under other triggering conditions. An alert may be sent to the first secondary player if a primary player of interest: (a) is playing a particular game (e.g., a favored game of the second secondary player); (b) has had a streak, such as a winning streak or losing streak (e.g., the primary player has won 10 games in a row; e.g., the primary player has lost games in a row); (c) the primary player has won a certain amount (e.g., the primary player has won more than $100); and so on. An alert may be sent to the first secondary player based on similar triggering conditions involving the second secondary player.

1.24. Embodiments disclosed herein need not apply only to casino gaming. Rather, where applicable, disclosed embodiments may apply to a wide variety of games, contests, sporting events, random events, unknowns, and so on. Where applicable, disclosed embodiments may apply to anything that may be the subject of a bet. Disclosed embodiments may apply to table games, video games, boxing matches, sporting events, the price movements of equities, the price movement of bonds, the movements of other market securities, the results of elections, the weather, the temperature, the average test scores of a body of students, and so on. For example, a secondary player may place a bet on whether a stock price will go up or down in the next ten minutes. Note that, in various embodiments, a primary player need not be explicitly present. For example, a secondary player may bet on the temperature a day in the future even though there is no primary player per se who effects the temperature.

1.25. Embodiments described herein need not apply only to complete games. Where applicable, embodiments described herein may apply to events within games. For example, a secondary player may bet on the next card that a primary player will receive in a game. A secondary player may bet on the next roll of the dice, on how many times a player will hit in a game of blackjack, on the point total of the dealer's hand in a game of blackjack, on the contents of a flop in a poker game of Texas Hold'em, and so on. A secondary player may be alerted when certain sequences of events have occurred. For example, a secondary player may be alerted when the last ten cards dealt in a game were red cards (i.e., hearts or diamonds). A secondary player may view historical data about events within a game or games. For example, the secondary player may examine historical data about the number of times the number 12 has been rolled in craps in the last 10 minutes.

1.26. A secondary player just watches a primary player. In various embodiments, a secondary player may wish to watch the play of a primary player, watch the games of a primary player, watch the facial expressions of the primary player, follow the strategies of the primary player, examine the historical results of the primary player, or otherwise track the primary player. The secondary player may wish to track the primary player without betting or risking any money on the games of the primary player. For example, a secondary player may wish to watch the games of a primary player who is a celebrity. Simply watching the celebrity player may provide entertainment for the secondary player.

A secondary player may search for a primary player based on any number of criteria, such as those mentioned above. A secondary player may search for a primary player based on a name (e.g., Ben Affleck); based on a demographic; based on a celebrity status (e.g., a name that generates more than 1000 hits in a Google search); based on a typical amount bet (e.g., a secondary player may search for any player who bets more than $100 per game); based on a history of wins or losses; based on strategies employed; based on facial expressions (e.g., a computer algorithm may score the expressiveness of a primary player's face and allow the secondary player to search for the most expressive faces); and/or based on any other criteria.

In various embodiments, a secondary player may pay a fee for watching the games of primary players. A fee paid by the secondary player may allow the casino to profit from the secondary player even if the secondary player does not place any bets. The secondary player may pay a fee per game watched, per time period during which he watches, or based on any other metrics. In various embodiments, the primary player may receive a portion of the fee paid by the secondary player.

In various embodiments, the primary player's permission must be obtained before a secondary player may track the play of the primary player.

2. Bet on a smaller aspect of someone else's game. For example, bet on what the next card will be, what the next roll of the dice will be, etc. In various embodiments, a person who does not directly participate in a game at a casino may nevertheless place bets on various events in the game. An event may include the rolling of a die, the drawing of a card, the spinning of a roulette wheel, the spinning of a reel of a slot machine, and so on. An event may come to a resolution in the form of a number revealed on the top face of a die, in the form of a rank or suit of a card drawn, in the form of a number achieved at a roulette wheel, in the form of a symbol appearing on a reel at a pay-line, and so on. An event may also include a decision or action made by a player who is directly involved in the game. For example, an event may include a player making a decision to hit or stand in blackjack, a player making a decision to bet or fold in poker, a player making a decision of which prize door to choose in a bonus round of a slot machine game, and so on. Such an event may come to a resolution in the form of an actual decision made. For example, a resolution may include an actual decision made by a player, such as "hit", "draw", or "fold". An event may include a dealer making a decision in a game. For example, in a game of Pai Gow poker an event may include an arranging of the dealer's seven cards into a two-card hand and a five-card hand. The resolution of the event may take the form of an actual five-card hand and an actual two-card hand that the dealer has arranged.

As used herein, the term "payout odds" may refer to a statement of an amount a player will receive, in the event of a win, per amount bet. For example, 3:2 payout odds means that a player will receive 3 units per 2 units bet (in addition to keeping his original bet), provided the player wins the bet. It will be understood that a payout ratio may be readily determined from payout odds and vice versa via mathematical operations. Therefore, it will be understood that embodiments described herein using payout ratios could readily be performed with payout odds, and vice versa.

For a given event, an appropriate set of payout ratios may be determined. For example, if a secondary player is betting on a two as the resolution of a roll of a six-sided die, the secondary player may stand to win five times his initial wager (a payout ratio of 5) if the two is in fact rolled. Note that the player is assumed to give up his bet initially, so his net profit would be 4 times his initial wager if a two occurs. A set of payout ratios may be determined based on the inherent probabilities of various possible resolutions of the event. In the above example, the inherent probability of a two being rolled is 1/6. Thus, a payout ratio of five seeks to provide the player with a payout commensurate with the inverse of the probability of the resolution that would be winning for the player, while still allowing for a casino profit, on average.

Once the event has resolved, it may be determined whether the secondary player has won. For example, suppose a secondary player has bet that the next card dealt in a game of poker will be the ace of spades. Once the next card has been dealt, it may be determined whether the card is in fact the ace of spades, and therefore whether the secondary player has won. If the secondary player has won, the secondary player may be paid according to the payout odds.

In various embodiments, an event on which a secondary player bets does not constitute a complete game for the primary player of the game. For example, a secondary player may bet on what the next card will be in a game of video poker. However, the outcome of the game of video poker is not solely based on the next card, but rather is based on at least four other cards making up a complete hand of poker. Thus, a primary player may place a bet and may be paid based on his bet and based on the resolutions of a first and a second event in a game. A secondary player may place a bet on the same game and may be paid based on his bet and based on only the resolution of the second event in the game.

In various embodiments, the secondary player may be remote from the game. For example, the primary player may participate in the game while physically present at a slot machine, video poker machine, table game, or other game location. However, the secondary player may be remote from the primary player, such as 50 feet away, such as in a different room, such as in a different building, such as in different city, and so on.

In various embodiments, the secondary player may bet on an event in a game after the game has been completed. For example, the secondary player may bet on an event in a game completed the prior week. The events of the game may be unknown to the secondary player, since the secondary player may not have been observing or participating in the game when it was originally played.

Figure 9:
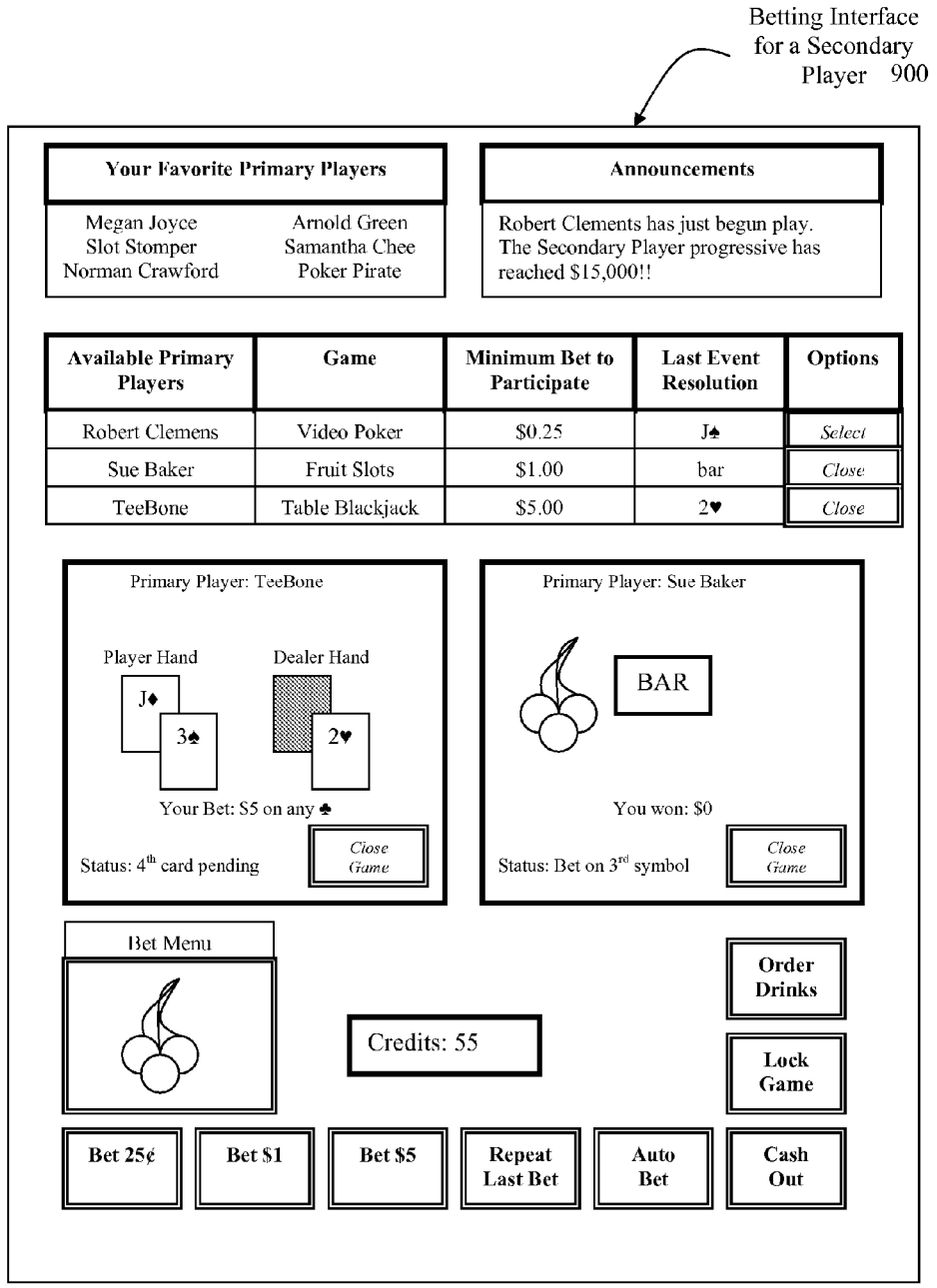
FIG. 9 shows a touch screen display for entering betting information and tracking the progress of a game, according to some embodiments.

2.1. Betting interface. In various embodiments, a secondary player may use a betting interface to make bets on events within a game. The betting interface may be a graphical user interface, and may include interactive features such as buttons, microphones, touch areas, mice, keyboards, and any other features for receiving designations of a secondary player's bet. An exemplary betting interface is shown in FIG. 9. The betting interface depicted in FIG. 9 includes an area where the names of available primary players are listed. The secondary player may elect to bet on events for the games played by these primary players. Next to each primary player is listed an indication of the last event resolution. For example, next to primary player Robert Clemens is listed the J♠, , or the jack of spades. This indicates that in the most recent event of Robert Clemens' game, the event being the dealing of a card, the resolution to the event was that a jack of spades was dealt. Next to Sue Baker is listed a "bar". This indicates that in the most recent event of Sue Baker's game, the event being the random determination of a symbol to show in a viewing window of a slot machine game, the resolution to the event was that a bar occurred. In the case of TeeBone, the most recent card dealt was the two of hearts. The betting interface depicted in FIG. 9 includes two game windows in which a secondary player may bet on events within a game. In the game of TeeBone, the secondary player has just bet $5 that the next card dealt in the game will be a club. In the game of Sue Baker, two symbols have already appeared in the viewing window of the slot machine game in which Sue Baker is involved. The status of the game is such that the secondary player may bet on the third symbol that is yet to come in the same game of Sue Baker. The secondary player may use the "Bet Menu" area of the screen to select a symbol to bet on. At present, a "cherry" symbol appears in the Bet Menu area. The secondary player may, however, scroll through additional symbols in the menu and select (e.g., by touching three times in rapid succession) a symbol on which to bet.

2.2. Determining pay tables. In various embodiments, payout ratios may be determined for an event within a game. Payout ratios may be based on the probability that a bet on the event becomes a winning bet. Payout ratios may also be determined based on a number of other factors. Payout ratios may be displayed or otherwise presented for a secondary player. In some embodiments, payout ratios are displayed in the form of a pay table. The pay table may include a first column depicting various possible resolutions of an event, and a second column depicting the amount to be paid per amount wagered on each of the possible resolutions.

2.2.1. Determining appropriate odds. In various embodiments, payout ratios may be determined based on a desired average amount to be won by a casino per bet received by the casino (e.g., based on a desired house advantage), on a house advantage of the game within which the event is occurring, and/or based on jurisdictional rules pertaining to allowable house advantages.

2.2.1.1. A desired house advantage. In various embodiments, a casino may determine a desired house advantage for a bet on an event in a game. It will be appreciated that the casino may determine any number of equivalent desired metrics, where such equivalent metrics may be determined through deterministic mathematical transformations of a house advantage. For example, a casino may equivalently determine a desired average amount that a player will win per unit wagered. Exemplary house advantages may be 15%, 10%, and 5%. The desired house advantage may be determined based on any number of factors, including perceptions as to what house advantages would be attractive to players while still providing the casino with adequate profits.

2.2.1.2. Same as the gaming device. In various embodiments, a house advantage for an event within a game is determined based on the house advantage for the game itself. For example, the house advantage for a bet on an event in a game may be the same as for the house advantage for a bet on the game. In various embodiments, the house advantage for an event within a game may be close, but not identical to the house advantage of the game. For example, the house advantage of the event may differ by 2 percentage points from the house advantage of the game. Achieving identical house advantages may not be practical due, for example, to a requirement for integer payouts or to a limited number of possible resolutions of an event (e.g., there are only 6 resolutions to the roll of a die).

2.2.1.3. Amount wagered. In various embodiments, the house advantage for an event within a game may be determined based on the amount bet on the event. In some embodiment, the greater the amount bet, the less the house advantage. This provides the player with an incentive to bet more.

2.2.1.4. Jurisdiction minimum. In various embodiments, laws, rules, policies, or other conventions may dictate a maximum allowable house advantage for a gaming device. Accordingly, a house advantage for an event may be determined which is less than or equal to the maximum allowable house advantage.

2.2.2. Player preferences affecting the pay table. In various embodiments, an event in a game may have more than two possible resolutions. For example, the rolling of a die may have six possible resolutions, while the drawing of a card from a deck may have 52 possible resolutions. Payout ratios may be associated with each of the possible resolutions. Thus, a pay table may be formed for the event, where the pay table details payout ratios for one or more of the possible resolutions. In various embodiments, it may be possible to form many different pay tables for the same event. Further, many different pay tables may result in the same or similar house advantages. For example, a first pay table for a roll of a die may provide a payout ratio of 5 for a roll of a 6, and a payout ratio of 0 for any other roll. A second pay table for a roll of a die may provide a payout ratio of 3 for a roll of 6, a payout ratio of 2 for a roll of 5, and a payout ratio of 0 for any other roll. With the first pay table, the player may expect to win 5 times his wager with probability 1/6, yielding an expected payout of 5/6 times his wager, which yields a house advantage of $(1-5/6)/1=16.67\%$. With the second pay table, the player may expect to win 3 times his wager with probability 1/6, or two times his wager with probability 1/6, yielding an expected payout of $3/6+2/6=5/6$. Thus, the second pay table has the same house advantage of 16.67%.

2.2.2.1. Player selects pay tables from range of pay tables. In various embodiments, a secondary player may select among various possible pay tables to use for an event. For example, when betting on the draw of a card, a secondary player may choose a pay table which pays 48 times an initial wager only if an ace of spades is drawn, or the secondary player may choose a pay table which pays 12 times an initial wager if any ace is drawn. In one embodiment, a secondary player may choose between a pay table which provides a relatively high payout with a relatively low probability and a pay table which pays a lower payout or payouts, but with greater probability. Over a set of repeated games, the former pay table would tend to provide less frequent but greater rewards, while the latter pay table would tend to provide more frequent but smaller rewards. A secondary player might therefore decide on his preferred method of receiving rewards. A secondary player may be given the opportunity to select among a range or continuum of possible pay tables, each with approximately the same house advantage, but each having different maximum payouts and/or different frequencies for providing payouts. A player may select a pay table by selecting a maximum payout. Typically, though not necessarily always, a pay table with a relatively higher maximum payout ratio will tend to pay less frequently than does a pay table with a relatively lower maximum payout ratio. A player may also select a pay table based explicitly on a payout frequency associated with a pay table. In some embodiments, the player may adjust a dial, where one limit on the dial is associated with a pay table with one or more relatively high payouts and a relatively low frequency of payout, and an opposite limit of the dial is associated with a pay table with one or more relatively low payouts and a relatively higher frequency of payout.

2.2.3. Determining odds of a particular symbol in a slot machine on a reel. In some embodiments, a player may bet on the occurrence of a particular symbol or indicium during a game. In some embodiments, the probability of occurrence of a symbol may be determined. In some embodiments, the probability of occurrence of a symbol at a particular position may be determined. For example, the probability of occurrence of a particular symbol in the first position across a pay-line of a slot machine may be determined. The determination of a probability of occurrence of a symbol or of a symbol at a particular location may allow the determination of a payout ratio that is commensurate with the probability. For instance, if the probability is determined to be lower, then the payout ratio may be set relatively higher, and vice versa.

2.2.3.1. Monte Carlo. In some embodiments, the probability of occurrence of a particular symbol may be determined through a large number of trials, where each trial may include the playing of a game, or a simulated game. The game may be played at an actual gaming device, at a table game, or on a computer executing game software. The game may be played or run with actual money at risk (e.g., in the form of bets) or with no money at risk. For example, a game at a slot machine may be played ten thousand times. A program may track statistics of interest from the game, such as how often a "cherry" symbol occurred in the first position of the pay-line, how often a "bar" symbol occurred in general, and so on. The probability that a symbol occurs at a particular location on a pay-line may then be determined as the number of trials in which the symbol occurred at the particular location divided by the number of trials. Analogously, the probability of any an event coming to a particular resolution can be determined or estimated through a large number of trials in which the event occurs, and measuring the proportion of the trials in which the particular resolution occurred.

2.2.3.2. Going through virtual pay table. In some embodiments, the probability of occurrence of a particular symbol at a particular location on a pay-line may be deduced with reference to an internal algorithm used by a gaming device for generating game outcomes. In some embodiments, the algorithm used may employ one or more "virtual reels". A virtual reel may comprise a table with one column of outcomes (e.g., a set of symbols), and with one column of ranges of numbers, each range of numbers corresponding to an outcome. A random number generator may generate a random number. The random number may then be matched to an outcome from the virtual reels based on the range of numbers in which the random number falls. Each outcome may thus be assumed to have a probability of occurrence that is proportional to the size of the corresponding range of numbers. For example, an outcome with a corresponding range of numbers of 100-299 is twice as likely to occur as an outcome with a corresponding range of numbers of 300-399, since the first range includes 200 numbers that may be generated by the random number generator, and the second range includes only 100 numbers that may be generated by the random number generator. With reference to the virtual reel, the probability of occurrence of each possible outcome may be determined. Then, the probabilities of all outcomes which include a particular symbol may be added up, thus yielding the probability of the occurrence of that symbol in a game. The probabilities of all outcomes which include a symbol in a particular location may similarly be added to determine the probability of occurrence of that symbol at that particular location. For example, to determine the probability that a "bell" symbol occurs at position 3 in an outcome, the probabilities of occurrence of all outcomes containing the "bell" symbol at position 3 may be added.

2.2.4. Odds of a particular card. In various embodiments, the probability that a particular card will constitute the resolution of a particular event may be determined as follows. First, the number of unknown or unrevealed cards may be determined. Unknown cards may include cards that have not already been shown face-up in a game. Provided the card of interest has not already been shown, the probability may be determined to be equal to one divided by the number of unknown cards.

2.3. Distinguishing between two dice. In various embodiments, a secondary player may wish to place a bet that would have an ambiguous resolution during conventional play of a game. For example, a secondary player may wish to bet that a particular die in a game of craps will show a six. However, the way craps is often played conventionally, it may be difficult or impossible to distinguish between the two dice used in a game. Thus, once the two dice land following a roll, it might conventionally be ambiguous as to which was the die that the player bet on.

2.3.1. Distinguishing two otherwise similar objects. In various embodiments, two or more similar objects used in the play of a game may be made to appear distinct. In a game of craps, two dice may be colored differently. For example, one die may be colored green, while the other is colored red. In this way, a secondary player would be able to bet on either the red die or the green die without worry of an ambiguous result. In a game with three dice, such as in Sic Bo, there may be three dice of different colors. In a game of roulette involving the use of two balls at once, the two balls may include different patterned markings. A player may thereby bet on, e.g., the striped ball or the spotted ball. In some embodiments, two or more similar objects may be made detectably distinct, even if the distinction cannot be made visually. For instance, radio frequency identification (RFID) tags may be placed in or on objects. Two dice with different RFID tags inside them would be distinguishable by an RFID tag reader from the differing signals coming from the tags.

2.3.2. Bet that the lower die will be above two. In some embodiments, a secondary player may place a bet on a resolution of one of several events, in which the one event becomes distinguishable only after all of the events have been resolved. For example, a secondary player bets that the higher of two dice rolled in a game of craps will show a 6. In this example, two events may be deemed to occur, each event constituting the rolling of a die. However, the actual die a player is betting on becomes clear only after both events have resolved. In other words, only after both dice have been rolled and have come to rest can it be determined which is the higher die. A secondary player may, in some embodiments, bet on the lower of two dice, on the middle die (e.g., in a game with three dice), on the roulette ball showing the highest number, and so on. In various embodiments, a secondary player's bet may comprise at least two parts. The first part may be a method to distinguish between two or more events to determine which of the two or more events the secondary player is betting on. The second part may be an indication of what will constitute a winning or losing resolution for the secondary player. For example, suppose that a secondary player bets that the higher of two dice will show a five. The first part of the bet is a way to distinguish the rolling of one die from the rolling of the other die, and indicating which of the now distinct events the secondary player has bet on. The second part of the bet indicates that a winning resolution will be for the die that the player has bet on to show a five.

2.3.3. Specify a position of a card. For example, the third card drawn is the Ace of spades. In some embodiments, in order to clarify the specific event that a secondary player is betting on, a position, location, sequence number, or other clarification may be specified. For example, rather than betting that "a" card will be an ace of spades, a secondary player may bet that "the third card dealt" will be an ace of spades. In a game of video poker, a secondary player may bet that a card in a specified position in a video poker hand (e.g., the fourth card in the final hand), will be of a certain rank and suit. In a game of a blackjack, a secondary player may bet, for example, on the first card dealt to a player, the second card dealt to a player, the third card dealt to a player, etc. The secondary player may also bet, for example, on the first card dealt to the dealer, the second card dealt to the dealer, etc. The player may also specify an event by means of an orientation. For example, in a game of blackjack, the secondary player may bet on the dealer card that is face down, or on the dealer card that is face up.

2.4. Receive aids in your prediction. In various embodiments, a secondary player may be provided with data, hints, or other aids in making bets on an event in a game. Data may include historical data relevant to the game at hand. For example, if a secondary player is to bet on the decision that will be made by a primary player, data about the decision of the primary player in prior games might aid the secondary player in his bet.

2.4.1. The sequence of what occurred in the past. In various embodiments, a secondary player may be shown or otherwise provided with data from games or events within games that were played prior to the game that includes the event on which the secondary player is betting. The data may help the secondary player to choose a resolution of the event which will constitute a winning resolution. A secondary player who is to bet on a particular event in a particular game played by a particular primary player may be shown data about other events that have occurred. Other events may include events that have occurred: (a) in games played by the same particular primary player; (b) in games under similar circumstances to those which are present in the particular game (e.g., the same initial two cards occurred in a prior game of blackjack as have in the particular game, and the particular event of interest is the dealing of the third card in the particular game); (c) in games played at the same gaming device that the particular game is or was played at; (d) in the recent past (e.g., events that have occurred in the five minutes prior to the time that the secondary player bets on the particular event); (e) just prior to when the particular event originally occurred (e.g., events occurring in games that had been played in the five minutes prior to the particular game); (f) in games played at the same gaming device that the particular game is or was played at, where such games constitute a sequence of games that immediately preceded the particular game (e.g., such games were the five games played before the particular game); and (g) in games played by the same particular primary player, where such games constitute a sequence of games that the primary player played immediately preceding the particular game.

2.4.2. What would perfect strategy be here? In various embodiments, a secondary player may be provided with an indication of a decision that would be made according to some strategy. For example, if a secondary player is betting on the decision that will be made by a primary player in a game of blackjack, the secondary player may be shown what decision would be made using Basic Strategy (i.e., the strategy used to maximize expected winnings without any special knowledge of what cards have already been dealt). For example, the secondary player may be told that the proper decision according to Basic Strategy is for the primary player to hit. As another example, if a secondary player is betting on what cards will be discarded by a primary player in a game of video poker, the secondary player may be told which combination of discards would maximize the expected winnings for the primary player. In various embodiments, the secondary player may be told what decision would be made according to a strategy that is not a perfect or optimal strategy. For example, a secondary player might be told which decision would be made according to a strategy that aims for the highest payout in a game.

2.4.3. What has this player done in similar situations? In various embodiments, a secondary player may be provided with an indication of what decisions a primary player has made in situations which are similar to the situation of the game in which the secondary player is participating. Games in which a primary player was in a similar situation may include games in which the primary player: (a) had the same cards; (b) had the same point total (e.g., in a game of blackjack); (c) had the same hand ranking (e.g., in a game of poker); (d) had the same sequence of initial events (e.g., in a game of craps, the primary player had the same three initial rolls as he does in the game situation under consideration); (e) was in the same seat position (e.g., the primary player was just to the left of the dealer); (f) faced the same opponent or opponents; (g) was at the same gaming device; (h) faced the same bet or bets from opponents (e.g., in a game of poker, the primary player may have faced the same bets that he does at present); and so on. Games in which the primary player was in a similar situation may include games in which the dealer had a similar hand (e.g., in a game of blackjack, the dealer had the same card showing), or games in which an opponent of the primary player had a similar card to what the primary player's opponent has in the game under consideration. In some embodiments, the secondary player may be provided with an indication of what the primary player did in games with similar external contexts, such as games played at the same time of day, games played at the same table, games played at the same casino, games played just after a big loss for the primary player, and so on.

2.4.4. What cards have been dealt already? In various embodiments, a secondary player may be provided with an indication of what cards have already been dealt in a game. For example, in a game of blackjack, the secondary player may be told what cards have been dealt from a deck in prior games where the deck was used. If, for example, the secondary player thinks the primary player has been counting cards, the secondary player may use information about prior cards dealt in order to predict the reaction by the primary player to the card count. In a game of poker, the secondary player may have the opportunity to view cards that have been dealt, e.g., as part of an initial hand. Looking at the cards of the initial hand may then help the secondary player to better predict a primary player's decision.

2.4.5. The secondary player is provided with a probability. In various embodiments, a secondary player may be provided with the probability of a particular resolution to an event. For example, if the secondary player is betting on the roll of a die, the secondary player may be told that the probability of a six being rolled is 1/6.

2.4.6. Regulatory requirements for hints. In various embodiments, regulations may dictate whether or not a hint must be provided. In some embodiments, regulations may dictate that the probability of a resolution be provided. In some embodiment, regulations may require that a secondary player be given a probability that an event comes to a particular resolution if there would be no way for the secondary player to know such a probability. For example, while it is possible for a secondary player to know the probability that a 6-sided die will land in a certain way, a secondary player may have no way of knowing that a reel of a slot machine will display a certain symbol since the reel may be controlled by a secret algorithm. In some embodiments, regulations may dictate that a hint not mislead a secondary player. For example, in game of video poker, a hint inform a secondary player of a decision that would be made by a primary player using a particular strategy. However, the strategy may not be a strategy that would typically be employed by any player, and thus the hint would not likely give the secondary player the proper direction. In some embodiments, regulations may dictate the form in which a hint must be provided. Regulations may require that a hint be given in multiple languages. Regulations might require that a player have the option of which language will be used to view the hint.

2.4.7. Form of hints (for example, secondary players are simply not allowed to make certain bets). In some embodiments, a hint may take the form of preventing a secondary player from making certain bets. Such bets may be disadvantageous for the secondary player or for the casino. For example, a graphical user interface may display options for what resolutions the secondary player can bet on. In a game of blackjack, such options may include a "hit" option for betting that a primary player will hit, a "stand" option for betting that a primary player will stand, and a "double down" option for betting that a primary player will double down. If the primary player has been dealt an initial hand with a point total of 10, then the "stand" option may be grayed out such that the secondary player cannot bet that the primary player will stand. This is because it would make no sense for the primary player to stand when the primary player can hit, increase his point total, and have no risk of busting.

2.5. Setting the odds on an event. In some embodiments, the casino may set the payout odds on an event by reference to historical data. Historical data may be used to arrive at a probability of a resolution of an event. For example, historical data may be used to determine the probability with which a primary player will make a particular decision in a game. This probability may be used, in turn, to provide payout odds to a secondary player who wants to bet that the primary player will make the particular decision.

2.5.1. Data not including the current game. In some embodiments, the casino may use data from historical games of primary players in order to determine a probability that a primary player will make a particular decision. For example, the casino may examine a set of historical games in which various primary players had hands with 16 points against a dealer's 10 points showing. The casino may determine the number of primary players who hit and the number of primary players who stood in order to arrive an estimated probability for what a primary player will do in a particular game under consideration. For example, the casino may look at 100 historical games and may find that 45 times the primary player hit, and 55 times the primary player stood. Thus, the casino may determine that there is a 45% chance that a primary player will hit and a 55% chance that a primary player will stand under a similar situation. Once the casino has an estimate of the probabilities of various outcomes, the casino may set payout odds in order to create a positive house advantage. For example, in the aforementioned example, the casino may set payout odds of 1:1 if the secondary player bets on "hit", and 3:4 odds if the secondary player bets on stand. In various embodiments, historical data may include data about historical games of the primary player who is involved in the particular game in question. For example, to determine the probability that a particular primary player will make a decision, the casino may look at historical data for that primary player.

2.5.2. Data including the current game. In some embodiments, payout odds may be set for a game based on a set of games which include that game. For example, the casino may use a set of games that include X (e.g., 1000) games in which a player had a pair of nines and the dealer showed an 8 in a game of blackjack. The casino may determine how many times the player with the nines split, and how many times the player just stood. The casino may thus know, with certainty, the probability that the nines would be split and the probability that the primary player would stand for a game randomly selected from the set of X games. Accordingly, the casino could then set payout odds for a bet on standing and a bet on splitting. The casino could set such payout odds in order to create a positive house advantage. The casino may then allow a secondary player to bet on a decision of a primary player in a game from the set of 1000 games, such as from a randomly selected game of the set of 1000 games.

2.6. Bet on a random action in the game. In various embodiments, a secondary player may bet on the resolution of any desired event. For example, in a table game of craps, the secondary player may bet that one die will bounce off the table. In a game of poker, the secondary player may bet that one of the primary players will throw his cards, that a primary player will get ejected from the game, that a primary player will bet out of order, or that any other resolution to an event will occur. In some embodiments, a secondary player may bet on any resolution that is external to the normal play of a game. For example, the secondary player may bet that a player will spill a drink at a gaming table.

2.7. Bet on a particular sub-outcome. There are many events on which a secondary player may bet. For each event, there may be one or more resolutions on which the secondary player may bet.

2.7.1. blackjack. In a game of blackjack a secondary player may bet on: (a) the rank or suit of a particular card, such as the first, second, third, etc. player card or the first, second, third, etc. dealer card; (b) a decision that will be made by a primary player (e.g., hit, stand); (c) a decision that will be made by a dealer; (d) whether a primary player will bust; (e) whether a dealer will bust; (f) whether the primary player will receive two identical cards; (g) whether the primary player will receive two or more cards of the same suit; (h) whether two primary players in a game receive the same cards; (i) a starting point total for a primary player; (j) a starting point total for a dealer; (k) whether a primary player's ending point total will fall within a particular range; and so on.

2.7.2. Roulette. In a game of roulette, a secondary player may bet on (a) red; (b) black; (c) a particular number; (d) a particular range of numbers; (e) the occurrence of a number in a particular sector of a wheel; (f) an amount that a primary player will bet; (g) a number that a primary player will bet on; (h) green; and so on.

2.7.3. Slot machines. In a slot machine game a secondary player may bet on: (a) the occurrence of a symbol on a reel; (b) the occurrence of a set of symbols on a set of reels (e.g., the secondary player bets that the first reel will show a "bar" and the second reel will show a "lemon"); (c) whether a bonus round will be reached; (d) the level of a bonus round that will be reached; (d) a decision that a primary player will make in a bonus round; (e) a resolution of a bonus round (e.g., how much money the primary player will win from the bonus round); (f) the amount that the primary player will bet; (g) the number of pay-lines that the primary player will bet; (h) the number of pay-lines that will win, and so on.

2.7.4. Card Games. In a card game, such as a game of poker, a secondary player may bet on: (a) the occurrence of a particular card in a hand of cards; (b) the occurrence of a particular combination of cards in a hand of cards (e.g., the occurrence of a pair); (c) an order in which cards are dealt (e.g., the secondary player may bet that each card dealt will have a higher rank than the last card dealt); (d) a position in which a card will be dealt (e.g., an ace will be dealt as the first card in a player's hand; and so on.

2.7.4.1. Poker. In a game of poker, a secondary player may bet on what bets will be made by primary players in the game. A secondary player may bet on whether a bet will be a check, call, bet, raise, or fold; on how much a primary player will bet; on how many callers there will be for a bet or raise; on how many times a pot will be raised; on how many rounds of betting there will be; on how many players will be all-in; and so on. In some embodiments, a secondary player may bet on the total size of a pot. In some embodiments, a secondary player may bet on whether there will be a tie. In some embodiments, a secondary player may bet on the size of a side-pot.

2.7.5. Dice Games. In a game of dice, a secondary player may bet on one roll of the dice. For example, the secondary player may bet that two dice rolled will total to 12. In a game of Sic Bo, a player may bet that one of the three dice rolled will show a 4.

2.8. Bet on length of the game. In various embodiments, a secondary player may bet on the length of a game.

2.8.1. Time. A secondary player may bet on the time that a game will last. A game may be counted to start when a primary player makes a bet, when a first random event occurs in a game, when a first card is dealt, when a first roll of the dice is made, when a first player decision is made, and so on. A game may be counted to end when a payout is made, when a player's bet is collected, when a last random outcome is generated, when objects used in a game are collected (e.g., when cards are collected), when a payout is announced), or when a subsequent game starts.

2.8.2. Number of cards required. In some embodiments, a secondary player may bet on the number of cards that will be dealt in a game. A secondary player may bet on the number of cards that will be dealt to a particular hand (e.g., to a player hand in blackjack; e.g., to a dealer hand in blackjack); or to a particular combination of hands (e.g., to the hands of both the player and the dealer; e.g., to three players in a game of blackjack). A secondary player may bet on the number of cards that will be dealt as common cards.

For example, regarding a game of Texas Hold'em, the secondary player may bet that all five common cards will be dealt. In other words the secondary player may bet that at least two people will remain in the game until the fifth common card is dealt.

2.8.3. Number of rolls of dice required. In various embodiments, a secondary player may bet on the number of rolls of dice that will occur in a game. For example, a secondary player may bet that there will be seven rolls of dice in a game of craps. In other words, the secondary player may bet that the primary player will set a point and then take six additional rolls to either roll the point number again or achieve a seven.

2.8.4. Number of bonus round levels reached. In various embodiments, a secondary player may bet on the number of levels that a primary player will reach in a bonus round, e.g., in a bonus round of a slot machine game. A bonus round may have a plurality of separate levels. If a primary player does well in earlier levels, e.g., by correctly choosing the location of hidden treasures, the primary player may make it to later levels. However, if the primary player does poorly in earlier levels, the primary player may not reach later levels. Thus, the number of levels reached in a bonus round may be effectively random. In some embodiments, a secondary player may bet on the number of spaces a character will advance on a game board in a bonus round. For example, regarding a bonus round in a game of Monopoly®, a secondary player may bet on the number of spaces that a game character will traverse on the game board. In some embodiments, a secondary player may bet on the space or spaces on which a game character will land in a game. For example, a secondary player may bet that a game character will land on Boardwalk in a game of Monopoly®.

2.9. Bet on a different game within the game. E.g., bet on poker within blackjack. In some embodiments, a secondary player may bet on the occurrence of an outcome from a first game, but in the context of a second game. For example, a secondary player may bet that a primary player who is involved in a game of blackjack will receive cards that create a poker hand which is three-of-a-kind. In a game of Sic-bo, a secondary player may bet that two of three dice used will form a winning roll in a game of craps.

2.10. Bet on the order in which people will remain in the game. Various games include multiple primary players. In some multi-player games, players may be eliminated or may drop out of the games. For example, in a game of poker, players may drop out of the game as they fold. In various embodiments, a secondary player may bet on the manner in which primary players are eliminated.

2.10.1. Who will be the first one out? In various embodiments, a secondary player may bet on which primary player will be the first primary player eliminated. A secondary player may bet on who will be the second primary player eliminated, the third primary player eliminated, or who will be the primary player eliminated in any other spot.

2.10.2. Who will be the last two standing? In various embodiments, the secondary player may bet on which primary player will be the last one remaining. The secondary player may bet on who will be the second to last primary player remaining, who will be the third to last remaining, and so on. The secondary player may bet on who will be the last two primary players remaining. In various embodiments, the secondary player may bet on any combination of primary players and on any combination of places (e.g., last, second to last) in which primary players are eliminated. The secondary player may win the bet if the designated combination of primary players was eliminated in the designated combination of places. A secondary player may bet that a particular three primary players will be the last three remaining, regardless of the order in which they are eliminated after the final three. In some embodiments, the secondary player may bet not only that a particular group of primary players will be the last three remaining, but also on the order in which the last three will be eliminated (e.g., players A, B, and C will be the last three, player A will be the last, and player B will be the second to last remaining).

2.10.3. Who will be the three in after the flop? In various embodiments, a secondary player may bet on the number of primary players that will be remaining in a game at a certain point in the game. For example, a secondary player may bet on the number of primary players that will be remaining by the flop in a game of Texas Hold'em poker, or by fifth street in a game of seven-card stud poker. A secondary player may bet on how many primary players will be remaining in a game after X number of cards have been dealt in the game, regardless of whom the cards have been dealt to. A secondary player may bet that a particular primary player will remain in a game at a certain point in the game. For example, a secondary player may bet that primary player Joe Smith will be remaining in the game after the flop.

2.10.4. Which three people won't bust? In various embodiments, a secondary player may bet on a combination of people who will bust in a game of blackjack. For example, a secondary player may bet that, of a particular group of three primary players in a game of blackjack, all will bust. A secondary player may bet that one player will not bust. A secondary player may bet that of a group of primary players, none will bust during a game.

2.11. Bet on what the primary player himself will do. In some embodiments, a secondary player may bet on a decision that will be made by a primary player in a game.

2.11.1. The primary player will hit here. In some embodiments, a secondary player may bet on a decision that a primary player will make in a game of blackjack. A secondary player may bet that a primary player will do one or more of the following: (a) hit; (b) stand; (c) surrender; (d) split; (e) double down; (f) take insurance.

2.11.2. The primary player will draw to the flush. In some embodiments, a secondary player may bet on a strategy that a primary player will employ in a game of video poker. The strategy may be specified with a specification of which cards a primary player will discard. For example, the secondary player may specify that the primary player will discard the first, third, and fourth cards from a starting hand. In some embodiments, the secondary player may specify one or more cards that will be discarded while not excluding the possibility that additional cards might be discarded. For example, the secondary player may specify that the primary player will discard the second card in his hand. The secondary player may then win his bet if the primary player discards the second card, regardless of other cards that the primary player might discard. A secondary player may specify the strategy of a primary player in terms of a goal attributable to the strategy. For example, the secondary player might specify that the primary player will "draw to a flush" or "draw to a straight".

2.11.3. How much will the primary player bet? In some embodiments, a secondary player may bet on the amount that a primary player will bet. For example, the secondary player may bet that a primary player will bet $5 in a slot machine game. For example, the secondary player may bet that the primary player will raise by $25 in a game of poker.

2.11.4. What bet will the primary player make? In various embodiments, a secondary player may bet on a particular bet that a primary player will make in a game. For example, in a game of craps, there are many possible bets that a primary player can make, including a pass bet a don't pass bet, an "any seven" bet, an "any eleven" bet, a "horn bet", and so on. The secondary player may bet on which of these, or other possible bets, the primary player will make.

2.11.5. Which pay-lines will the primary player activate? In various embodiments, a secondary player may bet on whether or not a primary player will bet on a particular pay-line at a gaming device. For example, a gaming device may have three pay-lines. A secondary player may bet that the primary player will bet on the third pay line.

2.11.6. Bet on primary players' heart rate, breathing, and other bio signatures. In various embodiments, a secondary player may bet on a vital sign of a primary player. The secondary player may bet on the heart rate, breathing rate, blood pressure, skin conductivity, body temperature, pupil dilation, muscle tension, or any other indicator tied to the primary player. For example, the secondary player may bet that the peak heart rate of a primary player will be 120 during a game of poker. For example, a secondary player may bet that a primary player will take 5 breaths in the next minute. The secondary player, by betting on the vital signs of a primary player, may indirectly bet on the stress level of a game and/or the primary player's response to stressful stimuli.

2.11.7. When will the primary player stop playing? Now? After five games? In various embodiments, a secondary player may bet on the length of a playing session of a primary player. The length may be measured in terms of time, the number of games played, the number of bets made, the number of cards dealt during a session, the number of times dice are rolled, or in terms of any other metric. For example, a secondary player may bet that a primary player will play five more games before quitting. For example, a secondary player may bet that a primary player will play for 40 more minutes before quitting. A session may be defined as having ended after: (a) a primary player has stopped playing for X amount of time; (b) a primary player has left the location of a game; (c) a primary player has cashed out; (d) a primary player has exchanged chips for money; (e) a primary player has run out of money; and so on.

2.11.8. What drink will the primary player order? In various embodiments, a secondary player may bet on a service that the primary player will receive. A secondary player may bet on a drink a primary player will order, on the type of food the primary player will order, on the price of a primary player's food or drink, on the amount that a primary player will tip a casino representative, and so on.

2.11.9. How many pulls will the primary player complete in an hour? In various embodiments, a secondary player may bet on the speed with which a primary player plays. A secondary player may bet on: (a) the number of handle pulls that a primary player makes in an hour or in any period of time; (b) the time between two handle pulls; (c) the time between the start of two games of blackjack; (d) the time between the placing of a bet in a game and the time of the provision of a payout; and so on.

2.11.10. Any combination of what primary players will do. For example, five primary players split. In various embodiments, a secondary player may bet on any combination of decisions that will be made by primary players in a game. For example, a secondary player may bet that at least 3 primary players will split in a game of blackjack; a secondary player may bet that a particular group of three primary players will split in a game of blackjack; a secondary player may bet that exactly three primary players in a game of blackjack will hit and that exactly one will split; and so on. Regarding a game of poker, a secondary player may bet that exactly two primary player will call a particular bet. In various embodiments, a secondary player may bet that certain decisions will or will not be made without regard to who makes the decisions. For example, regarding a game of poker, a secondary player may bet that one primary player will bet and that three primary players will call, without specifying which primary players will be the ones to bet and call. The secondary player may win his bet if any primary player bets and if any three primary players call.

2.12. Bet only on the third pay-line. Unlike the primary player, the secondary player does not have to bet on pay-lines 1 and 2 before betting on pay-line 3. In various embodiments, a secondary player may bet on an event in isolation on which the primary player was not allowed to bet in isolation. For example, the secondary player may bet on only the third pay-line of a slot machine. However, the primary player may have been required to bet on the first and second pay-lines at the slot machine before he could bet on the third pay-line. In a game of craps, a secondary player may be allowed to make an odds bet even without making a pass-line bet. Often, a primary player must first make a pass-line bet before making an odds bet.

2.13. Bet on what ad shows on the gaming device. In various embodiments, a secondary player may bet on an advertisement that will be displayed on a gaming device. In various embodiments, a gaming device may display an advertisement. In various embodiments, a gaming device may display an advertisement occasionally or periodically. An advertisement may be displayed at random or according to a schedule that is unknown to the secondary player. Accordingly, the secondary player may bet on what advertisement will be shown at a gaming device. For example, a secondary player may bet that an advertisement for vitamin water will be displayed on a gaming device. An advertisement may take the form of text, a still image, a video, or any other output that serves to promote a product or service, either directly or indirectly. A secondary player may specify a bet on an advertisement by specifying the product that will be promoted. For example, a secondary player may specify that Triscuit crackers will be advertised. A secondary player may specify a bet in terms of a general product category, such as crackers or snack foods. A secondary player may specify a bet on an advertisement by specifying a brand for a product or a name of a manufacturer for a product. In some embodiments, a secondary player may specify a bet on an advertisement through a multiple choice selection, where the secondary player may specify from among multiple possible different products to bet on. In some embodiments, a secondary player may bet on the time until the next advertisement. In some embodiments, a secondary player may bet on when the next advertisement for a particular product will be.

2.14. Combine sub-outcomes from several games to form larger outcomes. In some embodiments, a secondary player may bet on the outcome of a game which is created synthetically using events from more than one game. For example, synthetic game may be created for the secondary player using a first set of cards that was dealt in a first game for a primary player, and a second set of cards that was dealt in a second game for the primary player. As another example, a synthetic game may be created using a first roll of two dice from a first craps game, and a second roll of two dice from a second craps game. As another example, a synthetic slot machine game may be created using the symbol appearing on reel 1 in a first game, the symbol appearing on reel 2 in a second game, and the symbol appearing on reel 3 in a third game. If, for example, all three symbols are "cherry", then the secondary player may be paid as if all three cherries had occurred on the same spin on adjacent reels.

2.15. Bet on a machine malfunction, or coin refill. In various embodiments, a secondary player may bet on the occurrence of a machine malfunction. For example, a secondary player may bet that a machine will malfunction within the next hour. In various embodiments, a secondary player may bet that a gaming device will need a coin refill. For example, the secondary player may bet that a gaming device will need a coin refill within the next 10 minutes.

Embodiments described herein with respect to complete games or outcomes may similarly apply to events within a game. For example, just as a secondary player may search for games having particular characteristics, a secondary player may search for events within a game having particular characteristics, or a secondary player may search for games with particular characteristics so as to bet on events within such games. A secondary player may search for particular primary players and bet on events within the games of such primary players.

In some embodiments, a secondary player may seek to view historical or current games. The secondary player may desire to participate in the games. The secondary player may, in some embodiments, perform a search for games which satisfy a first set of criteria. For example a secondary player may search for games which were played by a particular primary player. The search may yield a plurality of games. The games may then be sorted using a second set of criteria. The plurality of games may be sorted according to: (a) the time at which the games were played (e.g., the games may be sorted from the most recently played to the one played the furthest in the past); (b) the amounts won in the games (e.g., the games may be sorted from the game with the highest payout to the game with the lowest payout); (c) the amounts bet on the games; (d) the rankings of hands dealt in the games (e.g., games of poker may be sorted according to the poker ranking of the initial hand; e.g., games of blackjack may be sorted according to the point total of the final hand); (e) the results of the games (e.g., the primary player won; e.g., the dealer won); (f) the initial number rolled on a die in each game of the games; (g) the location in which the games were played (e.g., games may be sorted according to the floor in the casino where the games were played); (h) the name of the gaming devices on which the games were played (e.g., games may be sorted such that the gaming devices on which the games were played are in alphabetical order); (i) the name of the primary players who initially played the games; (j) the number of secondary players who participated in each of the games; and so on.

Any physical game described herein may be implemented electronically in various embodiments. For example, embodiments pertaining to the play of blackjack at a physical card table may pertain as well to a game of blackjack played over an electronic network. For example, a primary player may play blackjack using a video blackjack device. As another example, a primary player may play blackjack over the Internet. A secondary player may bet on the outcomes of the game of the primary player and/or on events within the game of the primary player.

In various embodiments, a secondary player may participate in the game of a primary player, but take the game in a different direction from the direction in which the primary player took the game. For example, the primary player may be involved in a game which requires a decision on the part of the primary player. The primary player may make a first decision in the game. The secondary player, meanwhile, may be participating in the game, but may prefer a different decision from the decision made by the primary player. Thus, the secondary player may have the opportunity to complete the game in a different fashion than does the primary player. For example, the outcome based on which the secondary player is paid may be different from the outcome based on which the primary player is paid. Note that the secondary player may participate in a game after the primary player has participated in the game. Thus, the secondary player may participate in a historical game. The secondary player may, nevertheless, seek to take a different direction in the game than what happened in the original game.

The following is an example of some embodiments. A primary player begins play of a game of blackjack. The primary player is dealt a nine and a three as his initial hand. The dealer shows a two face up. The primary player decides to hit. The primary player is dealt a ten and therefore busts because his point total is now 22. The secondary player, prior to seeing the ten which was dealt to the primary player, decides he would rather stand than hit. At this point, the casino server determines what would have happened had the primary player stood. The casino server may then play the dealer's hand, or at least a simulated version of the dealer's hand. The casino server may reveal the dealer's down card to be a 10, providing the dealer with an initial point total of 12. The casino server may then make a hit decision on behalf of the dealer. The casino server may then deal a 10 to the dealer (the same 10 that had gone to the primary player before). The dealer then busts, and the secondary player wins. Thus, both the primary player and the secondary player have started from the same game. However, the primary player and the secondary player have taken the game in different directions by making different decisions at a juncture in the game. As a result, the primary player has lost but the secondary player has won.

3. In various embodiments, a secondary player may replay and/or redo some aspect of a game of a primary player.
   3.1. A secondary player may redo a game knowing different information from what the primary player knew. When facing a decision in a game, a primary player may have a given amount of information available to him. For example, in a game of blackjack, a primary player facing a decision to "hit", "stand", "double down", "split" or "surrender", may know his own two cards and one of the dealer cards. However, the primary player may not know other potentially valuable information, such as the dealer's face-down card, or the next card to be dealt at the top of the deck. In various embodiments, a secondary player participating in the game of a primary player may have access to additional information that the primary player does not or did not have at the time the primary player originally plays or played the game.
      3.1.1. Know the cards yet to come. In various embodiments, a secondary player participating in the game of a primary player may be presented with information about a card that was unknown to the primary player at the same juncture in the game. For example, a secondary player participating in a game of video poker may be presented with information about the next card to be dealt in the deck. In various embodiments, a secondary player may be presented with information about a card: (a) in the dealer's hand; (b) in an opponent's hand (e.g., in the hand of an opponent in a game of Texas Hold'em); (c) in another primary player's hand (e.g., in the hand of another primary player in a game of blackjack in embodiments where primary player hands are not dealt completely face up); (d) that was burned; (e) that will not be dealt (e.g., a card at the bottom of a deck of cards may have no chance of being dealt in a game); (f) that is unlikely to be dealt (e.g., a card that is in the middle of a deck may be unlikely to be dealt in a game); and so on. Information about a card may include information about a suit of the card, and information about a rank of a card. For example, a secondary player may be told that a card is a heart, or that a card is not a spade. For example, a secondary player may be told that a card is a 10-point value card (e.g., in a game of blackjack). For example, a secondary player may be told that a card's rank is between two and six, or that a card is not a seven. In various embodiments, a secondary player may be told the exact rank and suit of a card, such as a queen of diamonds.
      3.1.2. Know the primary player made a losing decision. In various embodiments, a secondary player may be given information about the consequences of a primary player's decision in a game. For example, the secondary player may be told that the primary player's decision resulted in the primary player losing a game. For example, if a primary player in a game of blackjack decided to hit and busted, a secondary player may be told that the primary player's decision led to the primary player busting. A secondary player may be told that a primary player's decision did not achieve the best possible outcome of a game. Even if a primary player's decision led to a winning outcome, the secondary player may still be told that the primary player's decision did not lead to the best possible outcome. For example, in a game of video poker, if a primary player drew three cards and made a three-of-a-kind, the primary player may have had the potential to draw three cards in a different way and to make a straight-flush. Thus, the primary player may not have obtained the best outcome that he could of. Of course, the primary player may have made the correct decision from his point of view since he did not know that he would have been able to successfully draw to the straight-flush. In various embodiments, a secondary player may be informed of the relative merits of the primary player's decision or strategy in relation to other possible decisions or strategies. For example, regarding a game of video poker, a secondary player may be told that the primary player made the second best possible decision in terms of what outcomes the primary player could have achieved. In various embodiments, the secondary player may be told the merits of a primary player's decision or strategy assuming the primary player had perfect information about what the results of the various decisions or strategies would be. In some embodiments, the primary player will not have or have had perfect information about the consequences of his decisions, so that pronouncements on the merits of the primary player's decisions would not necessarily indicate that the primary player made a bad or wrong decision. In some embodiments, a secondary player may be provided with an indication of the merits of a strategy or decision, whether or not the primary player chose such a decision or strategy. For example, in some embodiments, a secondary player may be told that a particular strategy is a good strategy but not the best possible strategy. For example, a secondary player may be told that a particular strategy is a losing strategy. In various embodiments, the casino may have knowledge about cards that would be unknown to the secondary player in a game. Thus, the casino may be able to inform the secondary player based on such knowledge and thereby provide useful strategy recommendations to the secondary player without explicitly sharing the knowledge.
   3.2. A secondary player may redo a game with the same ordering of a deck of cards, or with a different ordering. In various embodiments, the consequences of all possible primary player decisions are determined in advance, e.g., at the beginning of a game or prior to a decision of a primary player. For example, in a game of video poker, the shuffling and ordering of a deck of cards before a game serves to determine the consequences of any decision the primary player may make in a game. For example, the shuffling leads to a particular order of the deck such that any new cards that the primary player may decide to draw can be determined deterministically by dealing cards from the top of the deck. In various embodiments, the consequences of all combinations of primary player decisions in a game may be determined in advance. For example, in a game of blackjack, the shuffling of a deck before a game may place the cards to be dealt to primary players in a deterministic order. Thus, for a given set of primary player decisions (and given rules dictating what decisions must be made by the dealer), an outcome of the game for each set of primary player decisions may be determined deterministically from the ordering of cards in the deck. In various embodiments, the symbols that will be revealed on each reel of slot machine are determined in advance and prior to the revelation of even a single symbol. For example, the symbol that will be revealed on the third reel of a slot machine may be determined even before the symbol on the first reel of the slot machine is revealed. In various embodiments, the advanced determination of all possible consequences of a primary player's decision may or may not also apply to a possible alternate decision by a secondary player. In various embodiments, the advanced determination of one or more symbols in a game may or may not apply to the secondary player prior to the revelation of the symbols to the primary player or to the secondary player.

3.2.1. Same ordering. In various embodiments, the advanced determination of all possible consequences of a primary player's decision may apply in the same way to the possible consequences of a secondary player's decision. In other words, suppose the primary player is or has played a game, and the secondary player is participating in the game. At a given juncture in the game, a particular decision by the secondary player (e.g., "hit") will have the same consequences for the secondary player as the same particular decision made by the primary player would have for the primary player. For example, a decision by the secondary player to "hit" would result in the secondary player being dealt a four of diamonds. Likewise, a decision by the primary player to hit would result in the primary player being dealt the four of diamonds. It should be noted that for the primary player and the secondary player to experience the same consequence given the same decision may mean that the primary and secondary players will experience the same outcomes or will receive the same symbols or indicia. The actual payouts received by the primary player and the secondary player may differ, in some embodiments, due to differing bets by the primary and secondary players.

In various embodiments, a secondary player may decide to continue a game that has already been started. The secondary player may decide to join a game, for example, after an event within the game has been resolved. For example, a secondary player may decide to join a game after a first symbol on reel of a slot machine has been revealed, but before symbols on a second reel or on a third reel have been revealed. Once the secondary player decides to join the game, the game may proceed exactly as it had for the primary player who originally played the game (or exactly as it will for the primary player currently involved in the game). In other words, once the secondary player joins the game, the secondary player may receive the same outcome of the game that the primary player does or has. This may occur by virtue of the outcome of the game having been determined in advance, even before the revelation of the first symbol, for example.

3.2.2. Different ordering. In some embodiments a secondary player may participate in the game of a primary player, make all the same decisions as does the primary player, yet achieve a different result. The consequences of secondary player decisions may not be the same as the consequences of primary player decisions. In some embodiments, the consequences of a secondary player's decisions are determined after the start of a game. For example, the consequences of a secondary player's decisions are determined at the juncture in a game where a secondary player makes a decision, just prior to when a secondary player makes a decision, or even after a secondary player makes a decision. The consequences of possible decisions to be made by a secondary player may be determined by shuffling a remaining portion of a deck of cards from which cards will be dealt in the game in which the secondary player is participating. For example, suppose a primary player has been involved in a game of blackjack and has received an initial two-card hand. The primary player may decide to hit, and may thereby receive a king of clubs dealt from the top of the deck. A secondary player may participate in the same game. The secondary player may also decide to hit after the initial two-card hand has been dealt. However, prior to the second player receiving a new card in his hand, the remaining portion of the deck of cards may be reshuffled. Thus, the secondary player may receive a different card than did the primary player, e.g., the secondary player may receive the five of hearts. Thus, the consequences of the secondary player's decision to hit will have been determined only after the secondary player has made his decision, the determination being made through the reshuffling of the deck of cards.

In embodiments where the secondary player does not make the same decision as does the primary player, the consequences of the secondary player's decision may not necessarily be determined at the beginning of the game. For example, in a game of video poker, a primary player may decide to discard the fourth and fifth cards from a starting hand. The secondary player, who is participating in the same game as the primary player and therefore has the same starting hand, may instead decide to discard the first and second cards from the starting hand. The primary player may be dealt a ten of diamonds and a queen of clubs. The secondary player may be dealt a jack of hearts and a nine of hearts. The secondary player may receive different cards than does the primary player because the cards to be dealt to the secondary player after the initial hand may be determined using a separate randomization process from that used to determine the cards dealt to the primary player after the initial hand. For example, after the initial cards in a game of video poker have been dealt, the remaining cards in the deck may be reshuffled from the order they had in the deck used in the game of the primary player. In some embodiments, the remaining cards in the deck may be reshuffled in both the game of the primary player and in the game of the secondary player. The two reshufflings may be different from one another, however, so that the order of the remaining cards in the deck for the primary player is different from the order of the remaining cards in the deck for the secondary player.

In various embodiments, a copy of a game, a deck, or of other game elements may be used in completing a game of a secondary player. For example, when a primary player begins a game, the deck of cards used in the game of the primary player may be copied. The deck may be copied so that the order of the cards within the deck is copied as well. The primary and the secondary player may then play out the remainder of the game from the two separate copies of the deck, without interfering with one another. In one embodiment, both the primary player and the secondary player start out using the same deck to generate, e.g., an initial hand. Thereafter, the remaining portion of the deck (e.g., the part of the deck that hasn't been dealt yet), is copied. This part of the deck may then be reshuffled, or it may not be reshuffled. The secondary player may then play out the remainder of the game using the copied portion of the deck. Thus, the secondary player may play out the remaining portion of the game separately from the primary player without interfering with the game of the primary player.

In various embodiments, a secondary player may participate in slot machine game. A first symbol from the slot machine game may be revealed. The secondary player may wish to continue the game from the point after the first symbol has been revealed. However, the secondary player may wish to continue the game in a different fashion from that in which the primary player has continued the game. In other words, the secondary player may want the remaining symbols of his outcome to be generated randomly using a different random process than that used to generate the remaining symbols for the primary player. Thus, in some embodiments, the casino (or the gaming device working on behalf of the casino) may randomly determine additional symbols to generate and display for the secondary player, where such symbols need not necessarily be the same as those generated and displayed for the primary player. In various embodiments, a casino may randomly determine a way to generate additional symbols as follows. A casino may determine all outcomes containing the one or more symbols that have already been generated. Such outcomes may be probability weighted so that, for example, it is understood that some are more likely to occur than others. The casino may then select from among the probability weighted outcomes randomly and in proportion to their weightings. Thus, for example, an outcome with twice the probability weighting of another outcome would be twice as likely to be selected.

3.3. A secondary player may redo the game after the fact. In various embodiments, a secondary player may replay a game from a certain juncture after the game has already been completed. For example, one hour after a game of video poker has been completed, a secondary player may replay the game starting after the initial hand has been dealt but before any decision has been made as to which cards to discard. As described above, a secondary player may replay a game with different outcomes or consequences than those experienced by the primary player, even if the secondary player and the primary player made the same decisions in the game. This is because the replayed game may be replayed with a different randomization process used than was used for the original game.

3.3.1. Replay a live game. In various embodiments, a secondary player may replay a game that was originally played with multiple primary players. For example, the secondary player may replay a game of Texas Hold'em poker in which there were originally 9 primary players. The secondary player may wish to play the hand of one of the 9 players.

3.3.1.1. The casino uses AI. In various embodiments, in order for the secondary player to have the opportunity to replay a multi-player game, other entities may take the positions of primary players other than the player who the secondary player has replaced. Thus, in some embodiments, the casino may use computer algorithms to take the place of the other primary players. The computer algorithms may be programmed to make decisions in a game, such as in a game of poker. For example, the computer algorithms may include a set of rules detailing what actions to take for any given game situation. When replaying the game, the secondary player may thus play against one or more computer algorithms. In some embodiments, the casino may disclose to the secondary player one or more attributes of a computer algorithm used in a multi-player game. The casino may disclose the rules used by the computer algorithm. The casino may disclose a personality of the algorithm, such as "aggressive" or "tight". In various embodiments, the casino may be required to disclose one or more attributes of a computer algorithm. The requirements may come from casino regulators, for example.

3.3.1.2. Secondary player plays against other secondary players. In various embodiments, if a first secondary player replays a game involving multiple primary players, the positions of other primary player may be filled with other secondary players. Thus, in some embodiments, the first secondary player may replay a game against other secondary players. In some embodiments, a first secondary player may replay a game against one or more other secondary players and against one or more computer algorithms.

3.3.1.3. Other players are not opponents. In some embodiments, a secondary player may replay a game that included multiple primary players. However, the primary players may not have been opponents of one another. For example, a secondary player may replay a game of blackjack from a live table game which originally included 6 primary players. The primary players were not opponents, but rather were competing against the casino. When the secondary player replays the game, the secondary player may wish for positions of the other primary players at the game to be filled as well. Thus, in some embodiments, computer algorithms may fill the places of other primary players. In some embodiments, other secondary players may fill the places of other primary players.

3.4. A secondary player may make a different decision in real time and diverge into a different game. In various embodiments, a secondary player may participate in a game that is currently being played by a primary player. Thus, the secondary player may participate in a game of a primary player in real time. However, at a particular point in a game, the secondary player may wish to diverge from the course of the primary player. For example, the secondary player may wish to make a different decision in the game than does the primary player. In some embodiments, the secondary player may not know which decision the primary player will make. However, the secondary player may wish to make his own decision anyway, even if it turns out that the decision of the secondary player will be the same as the decision of the primary player. Once the games of both the primary player and the secondary player have finished, the secondary player may rejoin the primary player for the next game. In other words, the secondary player and the primary player in the next game may receive the same symbols, indicia, or other event resolutions. If the primary player finishes his game before the secondary player does, the primary player may be delayed by the casino until the secondary player has an opportunity to bet on the next game.

3.5. Searching for games with certain characteristics. In various embodiments, a secondary player may search for games with particular characteristics. As described elsewhere herein, a secondary player may search for the games of a particular primary player, for games played at a particular gaming device, for games played at a particular time of day, for games played at a particular casino, for games played right before a big win, and so on. However, the secondary player may also search for games which would give the secondary player an opportunity to proceed from a certain starting point in a beneficial fashion. Once the secondary player finds a game in a search, the secondary player may have the opportunity to play out the game from a certain point in the game, such as from a decision point in the game.

3.5.1. The wrong decision was made. In some embodiments, a secondary player may search for a game in which a primary player made a decision that met or failed to meet one or more criteria. A secondary player may search for a game in which the primary player: (a) did not make a decision which generated the highest expected winnings for the primary player; (b) did not make a decision which made the primary player eligible for the highest paying outcome that the primary player could have been eligible for; (c) did not make a decision that followed a generally recommended strategy (e.g., the primary player did not make a decision in blackjack that followed basic strategy); (d) did not make a decision that followed a strategy of interest to the secondary player; and so on. For example, a secondary player may search for a game of blackjack in which the primary player has a point total of 13 with no aces, in which the dealer shows a 3 up-card, and in which the primary player chose to stand. The secondary player may choose to search for such games because, under various rules, the basic strategy recommendation would be to hit. Thus the secondary player will have searched for a game in which the primary player has not made the correct decision according to the recommendations of basic strategy.

3.5.2. There is a certain starting hand. In various embodiments, a secondary player may search for a game of a primary player in which there was a particular starting hand or in which there was a particular category of starting hand. For example, a secondary player may search for a game of a primary player which was a game of video poker and which included an initial hand with exactly four hearts in it. A secondary player may search for a video poker game in which the primary player has an initial hand with a pair of jacks. A secondary player may search for a video poker game in which the primary player has an initial hand which includes the ace of spades, king of spades, queen of spades, jack of spades, and the four of hearts. A secondary player may search for a game of blackjack in which the primary player had a particular point total, such as 11. A secondary player may search for a game of blackjack in which the primary player had a first point total or a first combination of cards, and in which the dealer showed a second card. For example, the primary player had a point total of 14 and the dealer showed a 4. A secondary player may search for a game of blackjack in which the primary player had already hit twice and still had a point total of less than 14. In various embodiments, a secondary player may search for a game in which one or more symbols occurred at a slot machine. In replaying the game, the secondary player may have the opportunity to obtain additional symbols where such symbols differ from the ones obtained by the primary player in the same game.

3.5.3. A primary player had a near miss. In various embodiments, the secondary player may search for games in which the primary player had a near miss. The secondary player may search for games in which: (a) an outcome obtained by the primary player differed by X or fewer symbols from a high-paying outcome (e.g., there was only one symbol different between the outcome achieved by the primary player and a jackpot outcome); (b) a primary player had four cards to a royal flush in video poker but did not obtain the fifth card; (c) an outcome obtained by a primary player differed by one symbol from a jackpot outcome, and the symbol necessary for the jackpot outcome was just one position removed on a reel from the pay-line; and so on. A secondary player may keep the symbols of an outcome from a game of a primary player that would contribute to a high-paying outcome, and may have any additional symbols regenerated in an attempt to obtain all the symbols necessary for obtaining the high-paying outcome.

3.6. Adjust the odds of a game based on what situation the secondary player is starting from. In various embodiments, a secondary player who begins play from the middle of a game, or who begins play in a game after finding out any information about a possible final outcome of the game, may have different probabilities of achieving a given final outcome from what any player would have had at the start of a game. For example, if a secondary player starts a game of video poker at the midpoint after an initial hand with four cards to the royal flush has been dealt, the secondary player will have a greater chance of achieving the royal flush than if the secondary player were starting the game from the beginning. As described herein, a house advantage may be derived from the products of payout ratios and probabilities corresponding to outcomes. Thus, in some embodiments, if the probabilities of paying outcomes go up, then the payout ratios associated with such outcomes must go down in order to maintain a constant house advantage, or in order to maintain any house advantage at all. Thus, in some embodiments, the payout ratios associated with an outcome may change when a secondary player begins a game after some information has been revealed in the game. For example, a payout ratio for a royal flush may be 500 for a game of video poker in which a player starts from the beginning. However, if a player starts the game with an initial hand that contains the ace of spades, king of spades, queen of spades, jack of spades, and 3 of hearts, then the payout ratio for the royal flush may be set to 25 rather than 500. In various embodiments, payout ratios for outcomes may be adjusted for a game started in the middle so that the house advantage for the game started in the middle is the same (or nearly the same) as for the same game started from the beginning. For example, suppose the house edge on a game of video poker is 2% with perfect play. If a secondary player is allowed to start in the middle of a game (e.g., after an initial hand of poker is dealt), then payout ratios for one or more outcomes may be adjusted so that the house advantage over the secondary player is still approximately 2% (e.g., between 1% and 3%). As will be appreciated, the payout ratio for a game may be adjusted in several ways, any of which are contemplated in various embodiments. In various embodiments, a payout ratio may be changed by changing a required bet from a secondary player while maintaining constant payouts on outcomes. In various embodiments, a payout ratio may be changed by changing the payouts for one or more outcomes while maintaining the same required bet amount. In various embodiments, a payout ratio may be changed by changing both the payouts for one or more outcomes, and the amount of a required bet.

3.6.1. Odds adjustments in a game of Hold'em. In various embodiments, a secondary player may wish to participate in a game that involves multiple primary players. The secondary player may wish to take the place of a first primary player in the game and to make one or more decisions in the game going forward from a particular point. However, probabilities for possible outcomes of a multi-player game may not be readily quantifiable since the outcomes may depend on the actions of human beings, each with their own independent wills. As such, it may be difficult for the casino to set a payout ratio for a secondary player who is joining in the middle of a multi-player game. Further, the secondary player will not necessarily be interacting with the other primary players in the game (e.g., the primary players in the game other than the primary player whose place the secondary player has taken), since the game may have been played in the past, or since the primary player whose place the secondary player will be filling may still be in the real game. Thus, the secondary player may complete the remainder of the game against computer algorithms which fill in for other primary players. The secondary player may complete the remainder of the game against other secondary players who fill in for other primary players.

3.6.1.1. Assume all players will stay in and then decide? In some embodiments, a probability that a secondary player wins a game may be derived or estimated based on an assumption that all other players in a game (e.g., all algorithms filling in for primary players; e.g., all secondary players filling in for primary players) remain in the game. In other words, there may be an assumption that no player folds after the point at which the secondary player has joined the game. Based on an assumption that no further player will fold in a game, the probability that a secondary player will win can be derived in a straightforward fashion. In one embodiment, all possible combinations of additional cards to be dealt can be tested. For example, in a game of Texas Hold'em in which the flop has been dealt already, all possible combinations of turn and river cards may be tested. The proportion of the combinations that lead to a win for the secondary player may then be used to determine the probability that the secondary player will win. In some embodiments, a large number of deals of additional cards in the game may be simulated in order to determine the proportion of such simulations which the secondary player wins. Such a proportion may be used to estimate the probability that the secondary player will win. It will be appreciated that a probability that the secondary player will tie may be determined in a similar fashion to the way a probability of winning may be determined. For example, all possible combinations of additional cards to be dealt may be tested, and the proportion of such combinations which lead to a tie may be used to estimate the probability that the secondary player will tie.

3.6.1.2. Do a simulation with good AI players? In some embodiments, a probability that a secondary player will win in a multi-player game may be determined using a simulation in which computer algorithms fill in for each of the primary players in the original game. For example, 1000 simulated games may be run using computer algorithms filling in for each of the primary players. The proportion of the time that the computer algorithm wins while filling in at the position desired to be played by the secondary player may be used to determine the probability that the secondary player will win. In some embodiments, the average amount won or lost by the computer algorithm filling in at the position desired to be played by the secondary player may be used to estimate an expected amount that will be won or lost by the secondary player in the game. In various embodiments, once a probability that a secondary player will win and/or tie in a game is determined, a payout ratio for the game may be determined. In various embodiments, once an expected amount that a secondary player will win or lose is determined, a required bet amount for the secondary player may be determined. A payout ratio or required bet amount may be determined for any manner in which a secondary player completes a game from the point or juncture at which the secondary player joins. For example, a payout ratio or required bet amount may be determined whether a secondary player completes a game against other secondary players, whether a secondary player completes a game against computer algorithms, or whether the secondary player completes a game against any combination of the two.

3.7. If a secondary player does diverge in time, then there may be some catch-up, or the secondary player may skip to the current outcome. For example, the secondary player may be busy on a bonus round while the primary player goes off playing more games. In various embodiments, a secondary player may complete a game in a different manner from the way in which a primary player completes the game. For example, a secondary player may be participating in real time in a game of a primary player. At some point in the game, the primary player may make a first decision and the secondary player may make a second decision. As a result of the different decisions, or for any other reason, the game of the secondary player may last longer than does the game of the primary player. For example, in a game of blackjack, a decision to "hit" by a primary player may lead to the primary player busting, and thereby to an immediate end to the game of the primary player. On the other hand, a decision to "stand" by the secondary player may cause the dealer in the game of the secondary player to make one or more decisions, thereby prolonging the game of the secondary player. If the game of a secondary player lasts longer than the game of a primary player in whose games the secondary player has been participating, then the primary player may on occasion begin a new game before the secondary player has completed an old game.

3.7.1. The secondary player sits out the next game and joins a future game. In some embodiments, if a primary player begins a new game before a secondary player has completed a prior game he started with the primary player, then the secondary player may sit out the new game. The secondary player may sit out any number of new games until the old game of the secondary player has finished. The secondary player may then join in the next game to be started by the primary player.

3.7.2. The secondary player gets involved in two games simultaneously. In some embodiments, even if a secondary player has not completed a prior game, the secondary player may still participate in a new game of a primary player. For example, the secondary player may follow the progress of his old and new games using a split-screen view on his terminal. As will be appreciated, the secondary player may be involved in more than one old game even as a new game is started. The secondary player may potentially view the progress of one or more old games along with the new game.

3.7.3. The old game is finished quickly. In various embodiments, once when a primary player finishes a first game and/or begins a second game, the older game of the secondary player (e.g., the offshoot from the first game of the primary player) may be sped up. For example, the casino may cause outcomes to be generated or displayed more rapidly or instantaneously. For example, rather than showing renditions of cards being dealt, the house may show cards appearing instantly in the hand of the secondary player. In various embodiments, the house may make decisions for the secondary player automatically. For example, the house may make decisions for the secondary player according to one or more strategies, such as according to optimal strategy or according to basic strategy.

3.7.4. The games of the primary player are stored and the secondary player can participate in the games later on. In various embodiments, a secondary player who is still involved in an older game may not immediately participate in a new game of a primary player. However, data about the new game may be stored by the casino. The secondary player may then, at a later time, choose to participate in the game. The casino may store a record of which games of the primary player the secondary player missed and may then give the secondary player the option of participating in such games.

3.7.5. The secondary player gets the EV of a game. In various embodiments, a secondary player may not complete a game in the standard fashion, but may rather receive a settlement payment. The settlement payment may be based on an average amount that the secondary player might have expected to win had he completed the game. In various embodiments, a secondary player may be involved in a bonus round (e.g., the bonus round of a slot machine game). The secondary player, rather than playing out the bonus round, may receive a settlement amount for the bonus round. The secondary player may thereby save the time of playing through the entire bonus round, and may therefore be able to participate in a new game that the primary player would otherwise have started without the secondary player's participation.

3.8. The secondary player may bet different pay-lines. In various embodiments, a secondary player may choose to bet on different pay-lines from those on which the primary player bet or bets. For example, the primary player may bet a first pay-line and a second pay-line at a slot machine while a secondary player bets only the first pay-line. For example, a primary player may bet a first pay-line at a slot machine while a secondary player bets a first pay-line and a second pay-line. For example, a primary player may bet a first and second pay-line while a secondary player bets a second and third pay-line. For example, a primary player may bet a first pay-line while a secondary player bets a second pay-line at a slot machine.

3.9. The secondary player may bet different amounts than did the primary player. For example, the secondary player may bet the full three coins rather than just one. In various embodiments, a secondary player may bet a different amount than does a primary player. For example, in a game of poker, such as in a multiplayer game of Texas Hold'em, a secondary player may decide he would rather raise by $20 instead of the $10 raise made by a primary player. Accordingly, the secondary player may play out the remainder of the game, taking the position of the primary player, and playing against computer algorithms taking the place of other primary players. In various embodiments, a primary player may bet a first amount at the start of the game, while the secondary player may bet a second amount on the same game.

Embodiments described herein, where applicable may be performed based on games played electronically as well as based on games played using physical tokens, devices, instruments, tables, etc. In various embodiments, a primary player may play a game using physical tokens (e.g., physical cards and chips), while a secondary player may participate in the game and view an electronic version of the game. In some embodiments, a primary player may play an electronic version of a game and a secondary player may participate in the game via an electronic version of the game. In some embodiments, primary player may play a physical version of a game and a secondary player may participate in the game using physical tokens. For example, when a secondary player makes a decision in a game that is different from the decision made by the primary player, the a deck of cards used in the primary player's game may be duplicated by taking another physical deck of cards and putting the cards in the same order as are the cards in the deck used in the game of the primary player.

4. Aggregate and display all data from across the casino. Allow people to make bets accordingly. For example, show all the reds and the blacks across all the roulette games. This might then influence how people bet in the future on red and black. Cumulative wins and losses in blackjack can be displayed. For instance, players have won 500 hands and lost 510. In various embodiments, data about two or more games at a casino may be gathered. The data about two or more games may be combined or aggregated. In some embodiments, a single statistic may be used to describe data about two or more games. In some embodiments, more than one statistic may be used to describe data about two or more games. In some embodiments, statistics used to describe data about two or more games may represent a compression or condensation of the data. Statistics may represent a way to allow a human being, such as a secondary player, to gain an understanding about large amounts of data about games. Exemplary statistics may indicate an average amount won in a set of games, a prevalence of a particular outcome in a set of games, an excess occurrence of a first outcome over a second outcome in a set of games, and so on. Statistics may be presented to players. For example, a prominent display screen at a casino may indicate the total number of occurrences of "red" in roulette in the entire casino during the last 10 minutes. Data about games may be presented to a player in many different forms. Data may also be presented to a casino representative, such as a casino employee. Data may also be presented to a regulator, such as a gaming regulator. Data may be presented in graphical form. For example, a bar graph may show the number of "red" outcomes, the number of "black" outcomes and the number of "green" outcomes in roulette as three separate bars on a graph. Data may be presented in the form of highlights or fast action replays. For example, video footage of outcomes may be shown sped up to 10 times the original speed. Data about games may aid players in deciding which bets to make in the future. For example, a player may believe that a "red" outcome is likely to follow a long string of "black" outcomes. Accordingly, the player may be interested in viewing data or summary statistics about games of roulette.

4.1. Types of data. In various embodiments, many types of data may be gathered, generated, recorded, displayed, presented and/or stored. Data about different games may be gathered. Data about different players may be gathered. Data about gaming devices may be gathered. Data about casinos may be gathered.

4.1.1. Number of times primary players have won/lost. For an individual game, win, loss, or tie data may be gathered. A game may be considered a win for a primary player if the primary player receives any positive payout and/or if the primary player receives a payout that is greater than the amount he bet on the game. A game may be considered a win if a primary player receives more than an average amount that would typically be paid in a game. Other criteria may be used in considering whether a game is a win or not. For example, if the particular rules of a game indicate that a primary player is a winner, the game may be considered a win for the primary player. For example, in a game of blackjack, a primary player may be considered the winner if the point total of his hand is 21 or less, and if the dealer has busted or has a point total less than that of the primary player. A game may be considered a tie if a primary player receives a payout that is equal to the amount he bet on the game. A game may be considered a tie if a primary player neither wins nor loses money in a game. A game may be considered a tie if the rules of the game indicate that the game is a tie. A game may be considered a loss if a primary player receives no payout for the game. A game may be considered a loss if a primary player receives a payout that is less than the amount he bet on the game. A game may be considered a loss if a primary player receives less than an average amount that is typically paid in a game. A game may be considered a loss if it is not considered a win or a tie.

In some embodiments, each pay line within a game may be considered separately. For example, a primary player may bet 1 coin and win 3 coins on a first pay line. The primary player may bet 1 coin and win 0 coins on a second pay line. In this example, the results of the bet on the first pay line may be considered a winning game, while the results of the bet on the second pay line may be considered a losing game. Thus, in some embodiments, the placing of a bet, the generation of an outcome, and the collecting of winnings for a given pay line may be considered a complete and separate game, even if multiple pay lines were enabled for a given spin of a slot machine. In some embodiments, each hand of video poker played may be considered a separate game. For example, if a primary player plays 3 hands of video poker at a time, the three hands of video poker may be considered separate games. In some embodiments, even if 3 hands of video poker each include the same starting hand (e.g., the initial five cards are the same for each hand), the hands may still be considered to be separate games. In some embodiments, each bet made is considered to define a separate game. For example, a bet on a first pay-line of a slot machine may define a different game from a bet on a second pay-line for the slot machine. In some embodiments, two bets are considered to constitute separate games if the payouts from the bets are not perfectly correlated. For example, if the payout stemming from a second bet cannot be determined with certainty even knowing the payout stemming from a first bet, then the two bets may be considered to define separate games. In some embodiments, two bets made at a craps table may be considered to define separate games even if payouts for both bets are dependent on the same roll or rolls of the dice. For example, a pass bet may be considered to define a different game from a hard way bet.

Win, loss, and tie data may be aggregated over two or more games. The aggregated data may be stored and/or presented as a statistic, as a graph, or in any other fashion. In some embodiments, a statistic may indicate the number of games won by one or more primary players over the last X games (e.g., over the last 100 games). In some embodiments a statistic may indicate the number of games lost by one or more primary players over the last X games (e.g., over the last 100 games). In some embodiments, a statistic may indicate the number of games tied. In some embodiments, a statistic may indicate the difference between the number of games won and the number of game lost by one or more players over the last X games. For example, a value of a statistic at −7 may indicate that over the last 100 games, a set of primary players has lost seven more games than they have won. As will be appreciated, data may be aggregated over any number of games, such as the last 100, the last 1000, all the games of the day, all the games of a year, etc. As used herein, the term "last" need not necessarily reference the present time. For example, a statistic that describes the number of primary player wins over the "last" 100 games may describe the number of primary player wins out of 100 games leading up to some point in the past. Thus, the term "last" may be used with reference to the point in the past. The point in the past may be, for example, the time during which a statistic was created. In various embodiments, data may be aggregated for a single primary player. For example, a statistic may indicate the number of games won by a particular primary player during the past three days. In some embodiments, data may be aggregated over multiple primary players.

For example, a statistic may indicate the number of games won in the last hour by all primary players at a particular blackjack table. In various embodiments, data may be aggregated for games meeting one or more criteria. For example, win/loss/tie data may be aggregated for games meeting one or more criteria. Such criteria may include: (a) the games were played during a particular period of time; (b) the games were played most recently; (c) the games were played by a particular primary player; (d) the games were played by one of a set of primary players; (e) the games were played by any primary player having a particular characteristic (e.g., the games were played by any primary player who is a small business owner); (f) the games were played at a particular gaming device; (g) the games were played in a particular area of a casino; (h) the games were played in a particular casino; (i) the games were of a particular type (e.g., slot machine; e.g., video poker; e.g., Addam's Family slot machine); (j) the games had a certain minimum bet required (e.g., the games required a $1 minimum bet); (k) the games each had a bet of a particular amount placed on them (e.g., the games all had bets of $0.25 placed on them); and so on.

4.1.2. Amounts of money won/lost. For an individual game, data may be gathered for the amount of money won or lost by a player. For an individual game, data may be gathered for the amount of money won or lost by the house. For example, in a game with multiple primary players against the house, the winnings of a given player are not necessarily the inverse of the winnings for the house. Data may be gathered in relation to gross winnings. In other words, data may be gathered for winnings without regard to any amounts paid by the player, e.g., in the form of a bet. For example, if a primary player inserts $1 into a slot machine as a bet and receives a payout of $5, the primary player has gross winnings of $5. Data may be gathered in relation to net winnings. In other words, data may be gathered for winnings after accounting for amounts paid by the primary player. In the prior example, after having bet $1 and receiving a payout of $5, the primary player may have net winnings of $4. In a similar fashion, data may be gathered for gross and net winnings of a casino. Data related to winnings and losses may be aggregated over multiple games. A statistic may describe the gross winnings of one or more primary players over multiple games. For example, a statistic may take the value of $83, indicating that a primary player has received payouts totaling $83 during the last 100 games. A statistic may describe the net winnings of one or more primary players over multiple games. For example, a statistic may take the value of –$17, indicating that a primary player has paid $17 more in bets than he has received in winnings over the last 100 games. A statistic may describe the winnings and losses of multiple primary players. For example, a statistic may take the value of $25, indicating that a group of 20 primary players who have played blackjack have average net winnings of $25 over the last hour. In some embodiments, data about winnings and losses may be displayed graphically. For example, the size of a primary player's bankroll may be graphed over time. As the primary player wins, the graph may move upwards. As the primary player loses, the graph may move downwards. The primary player's bankroll may start at an arbitrary value, such as zero, or at a value equal to the amount for which the primary player has bought in to a game.

4.1.3. Number of hands/games played. In some embodiments, data may be gathered describing the number of games played. For each game played, a statistic may be incremented. The statistic may be a simple counter of the number of games played. In some embodiments, a statistic may keep track of the number of games played over a particular period of time. Thus, for every game played, an associated time may be stored, e.g., in a database of the casino server. Once a game has been played more than X hours in the past, the statistic may be decremented by one to reflect that the game was no longer played in the last X hours, which are the hours covered by the statistic. Data about the number of games played may be aggregated over multiple players. For example, a statistic may describe the number of games played by all roulette players in a casino over the last 20 minutes. In some embodiments, data about the number of hands played may be kept. In some embodiments, data about the number of pay-lines may be kept. In some embodiments, data about the number of outcomes generated or received may be kept. For example, a statistic may track the number of outcomes generated for a player at a slot machine, with each pay-line enabled counting as a separate outcome.

4.1.4. Number of a particular outcome obtained. For example, number of jackpots, number of payouts over X, etc, number of cherry-cherry-cherry outcomes, etc. For an individual game, outcome data may be recorded. Outcome data may include data describing what symbols were generated for a game. Outcome data may include data describing what symbols were used in determining a payout for a player. An outcome may include a set of symbols, such as "cherry-cherry-cherry" or "bar-bell-lemon". Outcome data may include a payout amount. For example, a payout of $1 may be an outcome. Outcome data may include a point total. For example, in a game of blackjack, an outcome may be that the player received 21 points. Outcome data may include a point total for a dealer and/or for an opposing primary player. In a game of blackjack, outcome data may include data describing the point total of the dealer. In a game of poker, outcome data may include data describing the hands of other primary players against whom a primary player of interest is competing. Outcome data may further include data describing one or more common symbols. For example, in a game of Texas Hold'em, outcome data may include data about what cards were dealt on the flop, turn and/or the river. Outcome data may include the results of rolls of the dice. For example, outcome data may describe the numerical total of rolls of the dice in a game of craps. In a game of roulette, outcome data may include data describing the number that came up when the wheel was spun. In various embodiments, outcome data may be aggregated over a plurality of games. The games may include the games of one or more primary players. In some embodiments, a statistic may describe the number of times a particular outcome has occurred. For example, a statistic may describe the number of times the outcome "cherry-cherry-cherry" has occurred.

For example, a statistic may describe the number of times "black" has occurred at a roulette wheel. A statistic may also describe the number of times an outcome has occurred per unit time or per game. For example, a statistic may take the value of 48, indicating that a roulette wheel has generated a "red" outcome 48 times in the last 100 spins. In some embodiments, a statistic may express the occurrence of an outcome per spin in terms of a percentage. For example, a statistic may indicate that an outcome of "flush" or better has occurred in 4% of the last 1000 games in a game of video poker. In various embodiments, data about outcomes may be aggregated over multiple primary players. For example, a statistic may describe that a group of primary players has obtained 100 blackjacks during the last hour, or out of the last 2000 hands played by primary players in the group. In various embodiments, data about outcomes may be aggregated over multiple tables, gaming devices, or other outcome generators. For example, a statistic may indicate that, at a group of gaming devices, 3 jackpot outcomes have occurred in the last month. For example, regarding a group of 5 roulette tables in a casino, a statistic may indicate that the number 12 has come up 5 times in the last hour. In various embodiments, a statistic may indicate a comparison between the number of occurrences of a first outcome and the number of occurrences of a second outcome. For example, a statistic may indicate a difference in the number of occurrences of straights versus flushes in a game of video poker over a given period of time. For instance, a value of a statistic of 10 may indicate that 10 more straights than flushes have occurred in the past hour at a group of video poker machines.

4.1.5. Number of a particular symbol obtained. For an individual game, data may be obtained regarding what symbols occurred during the game. For example data may be obtained that an ace of spades, jack of hearts, king of diamonds, queen of clubs, and seven of hearts was obtained as an initial hand in a game of video poker. For example, data may be obtained that a "cherry" symbol was obtained in a reel slot machine game. In various embodiments, such data may be aggregated, such as over multiple games, over multiple primary players, and/or over multiple gaming devices. For example, a statistic may describe the number of times an ace of spades has been dealt at a video poker machine in the past hour. For example, a statistic may describe the number of times any player from California in a casino has obtained a red card in any game of cards in the past 20 minutes. For example, a statistic may describe the number of times a bell symbol has been generated at any slot machine in a bank of slot machines in the last day. For example, a statistic may describe the number of times a six has been rolled in a game of craps. In various embodiments, a statistic may indicate a comparison between the number of times a first symbol has occurred and the number of times a second symbol has occurred. For example, a statistic may indicate that a "lemon" symbol has occurred X more times than has a "plum" symbol in a given period of time. In various embodiments, positional data may be obtained. Positional data may include data describing the position of a symbol within an outcome, within a display area, or within any other area. In various embodiments, positional data may include data about whether a symbol was the leftmost symbol in an outcome, the middle symbol in an outcome, or the rightmost symbol in an outcome, e.g., as displayed in the viewing window of a gaming device. For example, in the outcome "lemon-bell-bar", the "lemon" symbol may be considered to be in the first position, the "bell" symbol in the second position, and the "bar" symbol in the third position. In various embodiments, data about a symbol may be recorded even if the symbol does not form part of an outcome. For example, data about a symbol may be recorded even if the symbol does not contribute to the determination of a payout for a player. For example, a viewing window of a slot machine may show a grid of 3 by 5 symbols, whereby each of 5 reels has 3 symbols visible. The player of the slot machine may have enabled only one pay-line so that only the symbol visible in the middle of each reel is applicable to the payout determined for the player. Nevertheless, data indicative of the other symbols may still be recorded. For example, the fact that a "dog" symbol was visible at the top of the first reel may be recorded even if the "dog" symbol did not contribute to the payout determined for the primary player. In various embodiments, data about symbols that were not visible may also be obtained and/or recorded. For example, data about symbols that occurred one position above a viewing window on a reel may be recorded. Such symbols may not have been visible to a primary player at the conclusion of a game. However, such symbols may still have been present on a reel, e.g., in the form of a printed graphic or in the form of data in the memory of a gaming device describing the composition of a virtual or electronic reel. For example, a gaming device may maintain a data structure describing all the symbols on a reel, even if there is no physical embodiment of the reel. Thus, although not all of the symbols on the reel are displayed at one time (e.g., on the display screen of the gaming device), the positions of all symbols relative to the displays screen (e.g., the viewing window) of the gaming device may be known to the gaming device. In various embodiments, data about positional information may be aggregated. Data may be aggregated, for example, over multiple games, over multiple primary players, over multiple gaming devices, over multiple locations, over multiple time periods, and so on. For example, a statistic may indicate the number of times that a cherry symbol has occurred in the second position of an outcome at a particular gaming device in the last hour. For example, a statistic may indicate the number of times that the third card in an initial hand of video poker has been a jack for a group of primary players in the last hour. In various embodiments, a statistic may indicate the number of times that a "Yosemite Sam" symbol has occurred in the upper right hand corner of a viewing window of a gaming device in the last hour. In various embodiments, data about a chronological order in which symbols occur may be obtained and/or stored. In a game of cards, data about which card was dealt first, which card was dealt second, and so on, may be kept. A statistic may describe the number of times a particular symbol appeared in a particular chronological order. For example, a statistic may describe the number of times that an ace was the tenth card dealt in a table game of blackjack over the last two hours.

4.1.6. Data about the ordering of a deck, order of symbols on a reel. In various embodiments, data may be obtained about the order of cards in a deck. For each card in a deck, a position may be recorded. For example, a position of the two of clubs may be recorded as "10", indicating that the tenth card from the top of a deck was the two of clubs. Data about the position of a card in a deck may be obtained or stored even if such card never appeared in a game. For example, regarding a game of video poker, the rank and suit of the card at the bottom of the deck may be recorded, even though the card may have no chance of being dealt in the game of video poker. In various embodiments, data may be obtained or recorded about the order of symbols on a reel of a gaming device. For example, from an arbitrary location on a reel, each symbol on the reel may be attributed to a different position. For example, a "lemon" symbol is in the first position. An adjacent "cherry" symbol is in the second position. An adjacent "plum" symbol is in the third position, and so on. In various embodiments, data about the order of symbols may be aggregated. For example, a statistic may indicate the number of times that the jack of hearts has been in the fifth position of a deck of cards in that last 200 game of video poker.

4.1.7. Top performing players. E.g., players who have won the most in the last 100 outcomes, the last hour, etc. For an individual game, data about a primary player's performance may be gathered. Data about performance may include data indicating a gross amount won, a net amount won, an outcome obtained, a strategy used, and so on. Data about performance may be aggregated over multiple games, over multiple players, over multiple gaming devices, and so on. In some embodiments, a numerical score may be assigned to the strategy used by a primary player in a game. For example, a primary player who uses an optimal or a recommended strategy may receive a high score. A primary player who uses a strategy that is not recommended or not optimal may receive a lower score. For example, in a game of video poker, a primary player may receive an integer score from 1 to 32, each score corresponding to a possible strategy that could be used by the primary player in the game of video poker. It should be noted that in a game of video poker where primary players can discard any combination of cards from an initial five-card hand, there are two to the fifth power, or 32 possible ways in which the primary player may choose cards to discard. Thus, each way in which the primary player may select discards may be considered a separate strategy, and may therefore correspond to a different score. The strategies may be ranked according to which provide the highest expected winnings for the player. The strategy which provides the highest expected winnings may correspond to a score of 32. The strategy which provides the next highest expected winnings may correspond to a score of 31, and so on. As will be appreciated, scores need not be integers or any other particular numbers. In various embodiments, data about the strategies used by a player over multiple games may be aggregated. In various embodiments, scores assigned to a player based on his choice of strategy in a game may be aggregated. For example, the scores obtained by a primary player during individual games may be added up to describe an aggregate score over multiple games. In some embodiments, scores obtained by a primary player during individual games may be averaged. As will be appreciated, in various embodiments, low scores might correspond to good strategies while high scores might correspond to poor strategies. In various embodiments, a data may be recorded about a primary player's choice of strategy during a game of blackjack. Such a primary player may be given a relatively high score, for example, if he follows the recommendations of basic strategy, and relatively low score, for example, if he does not.

Data about other performance metrics may be aggregated, in various embodiments. In various embodiments, data about amounts won may be aggregated over multiple games. A statistic may indicate the total amount won by a primary player, for example. A statistic may indicate the total number of times a primary player has won.

In various embodiments, data about the performance of multiple primary players may be aggregated. A statistic may indicate which primary player or players has had a distinguishing performance from among a group of primary players. For example, a statistic may indicate which primary player from a group of primary player has had the best performance, according to some metric. For example, a statistic may indicate which primary player has had the highest gross winnings over the last hour, or which primary player has used the best strategy over the last hour. In various embodiments, the top X primary players may be listed according to some performance metric. In some embodiments, the bottom Y primary players may be listed according to some performance metric.

In various embodiments, the top performing primary player may be periodically determined. The top performing primary player may be determined using any metric, such as gross winnings, net winnings, best strategy, or any other metric or combination of metrics. The top performing primary player may be determined, for example, every minute, every ten minutes, every hour, etc. In various embodiments, the top performing primary player may be determined after each game played by any primary player. For example, after a primary player completes a game, the casino server may determine whether that primary player has just accumulated enough gross winnings to become the top performing primary player. In various embodiments, the top performing primary player is determined at irregular intervals. For example, a first top performing primary player may be determined. Five minutes later, a second top performing primary player may be determined. Nine minutes later, a third top performing primary player may be determined. It will be appreciated that as primary players continue to gamble, their relative performance may change, and thus a primary player who used to be an average performing primary player may become the top performing primary player. For example, a primary player may win a large jackpot and thereby become the top performing primary player.

In various embodiments, a secondary player may participate in the games of the current top performing player. A secondary player may be continuously or periodically informed of who is the top performing primary player. For example, a name or other identifier of the top performing primary player may be displayed on the display screen of the secondary player's terminal or mobile gaming device. The name of the primary player may remain displayed on the display screen of the secondary player until a new top performing primary player is determined. The secondary player may elect or decide to participate in the games only of the current top performing primary player. In various embodiments, the secondary player may elect to automatically participate in the games of the current top performing primary player. For example, the secondary player may make a bet. It will then be understood by the casino server that the bet is to be applied to a game of the currently top performing primary player. Thus, for example, if the currently top performing primary player wins, the secondary player may win as well. If the currently top performing primary player loses, the secondary player may lose as well. In various embodiments, the casino server may make it easiest or most convenient for the secondary player to participate in the games of the currently top performing primary player. For example, the casino server may allow the secondary player to press only a single button in order to place a bet and participate in the game of the currently top performing primary player. The secondary player may be able to participate in the games of other primary players as well, but may be required to perform extra steps in order to do so. Thus, in various embodiments, participation in games of the top performing primary player may be the default option for a secondary player.

In various embodiments, an identifier (e.g., a name; e.g., a handle) of the top performing primary player who is currently active may be displayed. The casino server may allow a secondary player to readily participate in the games of such a primary player, (e.g., by making participation the default option for the secondary player). A primary player who is currently active may include a primary player who has recently played a game. For example, a primary player who is active may include a primary player who has played a game in the last 10 seconds, the last minute, or within the most recent predetermined time interval. In various embodiments, a primary player who is currently active may include a primary player who has a credit balance in a gaming device. In various embodiments, a primary player who is currently active may include a primary player who has been playing at a certain rate (e.g., at 30 or more games per minute). It will be appreciated that the top performing primary player who is currently active may include vary from moment to moment. For example, a first primary player may initiate a game and may thereby be the top performing currently active primary player. That primary player may then pause for a few moments after his game. Another primary player may, in the meantime, initiate play of a game. That other primary player may, as it happens, then be the top performing currently active player.

In various embodiments, a secondary player may place a bet. The bet may then count for the first game to be initiated from among a group of primary players. For example, a secondary player may place a bet of $1. The casino server may determine which are currently the top five performing primary players. The bet of the secondary player may count towards the game of the first of the five primary players to initiate a game. In this way, the secondary player may enjoy a fast paced gaming experience. Rather that following the pace of a single player, the secondary player may participate in the first game to start from any of a group of players. The group of primary players may be defined by other characteristics than just performance. For example, a group of primary players may include a five players from Mississippi. The secondary player may make a bet which counts towards the first game to be initiated by any of the five primary players. After the first game has come to a conclusion, the secondary player may place a second bet. The second bet may again count towards the first game to be initiated by one of the five primary players from Mississippi following the placement of the second bet. However, the second bet may count towards a game of a primary player other than the primary player for whose game the first bet counted.

In various embodiments, a secondary player may participate in the games of the second highest performing primary player. For example, the secondary player may participate in the games of the primary player who has won the second most amount of money in the last hour. In various embodiments, a secondary player may participate in the games of the third highest performing primary player. It will be appreciated that a secondary player may participate in games of a primary player who falls anywhere in the rankings according to some metric, such as winnings, etc. In various embodiments, a secondary player may automatically participate in a game of a primary player who is second in the rankings (e.g., second in terms of net winnings). For example, the secondary player may place a bet and then participate in the game of whatever primary player happens to be second in terms of gross amounts won in the last ten minutes. As another example, the secondary player may have a bet placed for him automatically (e.g., by the casino server) for a game of a primary player who is third among all primary players in terms of consecutive games won.

In various embodiments, a secondary player may participate in a game of a primary player who is the best performer among a subset of all primary players. The subset of primary players may include primary players of a particular demographic, primary players playing a certain type of game (e.g., video poker), primary players located in a certain area of the casino (e.g., on the first floor), primary player located in a particular casino, primary players located in a particular geographic region (e.g., in a particular city; e.g., in a particular neighborhood), and so on. The best performing primary player among the subset may be identified and displayed to the secondary player. The secondary player may automatically participate in the games of such a primary player.

In various embodiments, the secondary player may automatically participate in a game of a primary player who is the top performing primary player among primary players playing a particular game of interest. For example, the secondary player may wish to participate in a game of blackjack. Accordingly, the secondary player may place a bet which automatically counts towards a blackjack game of a primary player who uses the best strategy (e.g., as compared to optimal basic strategy) in blackjack. In various embodiments, a top performing primary player who is playing a particular game may be identified and/or displayed to the secondary player. The secondary player may then decide whether to participate in the game of the primary player. In various embodiments, the secondary player may participate in the games of a top performing primary player among primary players playing a particular denomination of game. For example, the secondary player may wish to participate in games being played at dollar denomination gaming devices. The secondary player may thus participate in the top performing primary player of all primary players at dollar denomination gaming devices.

In various embodiments, a secondary player may participate in the games of a top performing primary player not just of the present, but of times in the past as well. For example, a secondary player may participate in the games of a primary player who played the prior day. The primary player may have had the best performance during a one-hour period of any primary player during the past week. Accordingly, the secondary player may participate in the games of the primary player. The secondary player may participate in the games of the primary player which occurred subsequent to the one hour of top performance. For example, the secondary player may participate in the game played by the primary player immediately after the one-hour period in which the primary player recorded the best performance of any primary player during the past week.

In various embodiments, a secondary player may participate in the games of a primary player who is currently playing and who had the top performance during some time in the past. For example, the secondary player may participate in the games of a primary player who was the best performing primary player over a day-long period of any primary player within the past week. The primary player may not necessarily be the best performing player during the current day or during the most recent day. Nevertheless, the secondary player may participate in the current games of the primary player.

In various embodiments, a secondary player may automatically participate in the current games of primary players who were the top performers during some moving window of time in the past. For example, suppose the current time is 4:00 pm. The secondary player may participate in a game of the currently active primary player who was the best performer the prior day in the hour from 3:00 pm to 4:00 pm. At 4:01 pm, the secondary player may participate in a game of the currently active primary player who was the best performer the prior day in the hour from 3:01 pm to 4:01 pm, and so on.

In various embodiments, the secondary player may participate in games of the worst performing primary player. The secondary player may, for example, expect that the luck of the worst performing primary player will change. The secondary player may, for example, bet against the worst performing primary player. In various embodiments, a secondary player may automatically bet against the currently worst performing primary player. In various embodiments, the casino server may make it easy for the secondary player to bet against the currently worst performing primary player. For example, the casino server may allow the secondary player to bet against the currently worst performing primary player with only a single button press.

In various embodiments, a secondary player may automatically bet on a primary player who meets certain criteria. The secondary player may bet without the necessity of taking any action prior to the game. For example, at the beginning of an hour, the secondary player may indicate that he wishes to place one bet every ten seconds for the next hour. The bet is to be placed on a game of a primary player who is the top performing primary player as of the time the bet is placed. Thus, for the next hour, bets may be made for the secondary player automatically without any further input from the secondary player. As will be appreciated, the secondary player may bet automatically on the best performing player from a subset of players, on the second best performing player, on the worst performing player, against the worst performing player, and so on.

In various embodiments, a secondary player may bet on best performing game, the best performing gaming device, the best performing dealer, the best performing table, the best performing sector of the casino, and so on. For example, a secondary player may place a bet on the gaming device that has paid the most in the last hour. The secondary player may thus bet on different gaming devices at different times. The secondary player may automatically bet on the best performing gaming device. For example, at the beginning of an hour, the secondary player may indicate that he wishes his bets to be placed automatically in games of the best performing gaming devices. The secondary player may thus not be required to make any further inputs for the next hour. As another example, the casino server may make it especially easy to place a bet on the best performing gaming device at any given time. However, the secondary player may be required to take some action, even a minimal action, such as pressing a button.

In various embodiments, primary players meeting one or more criteria may be listed. For example, the top ten performing primary players may be listed. The primary players may be listed, for example, on a prominent display screen in a casino, or on a display screen of a terminal used by a secondary player. A listing of a primary player may reveal various information about the primary player. For example, the listing may reveal the first name of the primary player, the last name of the primary player, the full name of the primary player, an alias for the primary player, an amount won by the primary player, and any other information about the primary player.

In various embodiments, a primary player may indicate how much information he is willing to reveal about himself. Information that may be displayed or otherwise revealed about a primary player may include: (a) a name; (b) a first name; (c) a nickname; (d) a maiden name; (e) a last name; (f) a middle name; (g) a full name; (h) an initial; (i) an age; (j) a place of residence; (k) a picture (e.g., a picture of the primary player); (l) a performance metric of the primary player (e.g., gross winnings; e.g., net winnings; e.g., number of consecutive wins; e.g., largest amount won; e.g., current credit balance); (m) a handle that that the primary player has chosen (e.g., "Topdog"; e.g., "Sportsnut"); (n) an alias for the primary player; (o) a player tracking number; (p) a date of birth; (q) a social security number; (r) a handle that the casino server has generated for the primary player (e.g., "player 1032"); (s) a handle that the gaming device of the primary player has generated for him (e.g., "slot player 125"); (t) a gaming device identifier (e.g., an identifier for the gaming device at which the primary player is playing or has played); (u) an amount of profits that the primary player has made; and any other information.

In various embodiments, the primary player may indicate information he is willing to reveal in various ways. For example, the primary player may check off boxes next to information he is willing to reveal. In various embodiments, the primary player may fill out a profile, such as a form with blank spots for receiving information about the primary player. In various embodiments, the primary player may inform a casino representative about which information he is willing to reveal.

Either before, during, or after a primary player indicates information he is willing to reveal, the casino may verify that the primary player truly wishes to reveal such information. The casino may verify that the primary player is competent to reveal such information. In various embodiments, the casino may verify that the primary player is of a certain minimum age before presenting information about the primary player to others (e.g., to secondary players). For example, a representative of the casino may ask to see a driver's license in order to verify the age of the primary player. In various embodiments, the casino may verify that the primary player is sober. For example, the casino may give the primary player a sobriety test. In various embodiments, the casino may reveal information indicated by the primary player only if the primary player is sober. In various embodiments, the casino may reveal information indicated by the primary player only if alcohol levels of the primary player fall within certain limits (e.g., are less than a certain level). In various embodiments, the casino may verify that the primary player is not sick. For example, the casino may have a doctor examine the primary players, or may ask the primary player basic health questions. In various embodiments, the casino may verify that the primary player is in a sane or competent state of mind. For example, the casino may administer a cognitive test to the primary player. The casino may only present information about the primary player if the primary player passes the cognitive test, for example. In various embodiments, the casino may use other criteria for determining whether to present information that a primary player has indicated he is willing to reveal. In various embodiments, the casino may use various criteria, such as those described above, to determine whether or not to ask the primary player to reveal information in the first place.

In various embodiments, once a primary player has indicated which information he is willing to reveal, the primary player may be asked to confirm one or more times. For example, the primary player may be presented with a list of information about himself that will be revealed. The primary player may then be asked to press a button, sign an area of a touch screen, apply a thumb print, or to provide any other indication that he agrees to reveal the information. In various embodiments, the primary player may be presented with a display that shows how his information will appear to others (e.g., when displayed on a public display screen; e.g., when displayed on the terminal of a secondary player). The primary player may be asked to confirm whether he really would like his information displayed, and/or whether he would like his information displayed in such a manner. The primary player may then have the opportunity to confirm or not.

In various embodiments, when a primary player gives permission for information about himself to be revealed, the permission may remain valid for a limited period of time. For example, permission may remain valid for a day. After the permission has expired, any information for which the permission applies and which is currently being displayed (e.g., on the terminal of a secondary player) may be taken down. In various embodiments, there may be a default period of validity for permission to reveal information about a primary player. For example, the default period may be 1 hour.

In various embodiments, a primary player may indicate limitations on how his information will be revealed. For example, the primary player may allow information to be displayed on individual terminals or mobile gaming devices, but not on more prominent public display screens. The primary player may allow his information to be displayed in certain areas of a casino but not in others. For example, the primary player may only give permission for his information to be revealed in high-limit areas of the casino.

In various embodiments, the primary player may indicate people to whom information may or may not be revealed. For example, a primary player may only wish information to be revealed to secondary players of a certain gender. For example, a primary player may only wish information to be revealed to people from a particular state. For example, a primary player may wish that no person from his home state be able to see certain information about him.

In various embodiments, a primary player may be paid based on the information he reveals. A primary player may be paid for each piece of information he allows to be revealed. A primary player may be paid based on the length of time that he allows information about himself to be presented. A primary player may be paid based on the forum in which he allows information to be presented. For example, the primary player may be paid extra for allowing information to be displayed on a prominent public display screen.

In various embodiments, a primary player may reveal information gradually, and/or over time. For example, a primary player may reveal a nickname. The primary player may later decide to reveal his first name. Later, the primary player may allow the revelation of his first and last name. For example, as the primary player achieves better performance, the primary player may take pride in revealing his identity as a top performer. In various embodiments, the primary player may be prompted to reveal more information. For example, if a primary player breaks into the top ten in terms of performance, the casino may ask him whether he would like to reveal more information. In various embodiments, the casino may prompt the primary player to reveal performance metrics, such as an amount won.

4.1.8. Top performing machines or dealers. E.g., the dealer that is dealing the best hands for the player. For an individual game, data about the performance of a gaming device may be gathered. Performance data about a gaming device may describe whether an outcome was a winning outcome or a losing outcome, the amount paid for an outcome, the amount paid for a game, the number of winning outcomes that occurred during a game (e.g., the number of pay-lines that included winning outcomes), whether or not a gaming device was played, and so on. Performance data about individual games at a gaming may be aggregated over multiple games at a gaming device. A statistic may indicate a total amount paid out by a gaming device over a period of time or over some number of games. A statistic may indicate a gross amount of winnings paid out or a net amount of winnings paid out over a period of time or over some number of games. A statistic may indicate how many games were played at a gaming device over some period of time. A statistic may indicate a total number of winning outcomes or a total proportion of winning outcomes over some number of games or over some period of time. In some embodiments, data about a player may be recorded for an individual game. An aggregate statistic may indicate the number of different players who have played a gaming device over some period of time. A statistic may indicate the average number of games played by a player at the gaming device over some period of time. For example, in the last day, the average number of games played by a player at a gaming device may be 60. In various embodiments, data about the performance of multiple gaming devices may be aggregated. Top performing gaming devices may be listed. For example, the 10 gaming devices which have paid the most in the last hour may be listed. For example, the 10 gaming devices which have paid the most as a multiple of the average amounts bet may be listed. For example, the 10 gaming devices which have paid out the least in the last 3 hours may be listed. For example, all the gaming devices which have made payouts of more than X amount in the last hour may be listed. In various embodiments, performance data about a game with a particular dealer may be gathered. Performance data may include data describing the payouts provided for a game with the dealer, the net winnings for one or more primary players in the game with the dealer, the speed of the game with the dealer, the presence of high-paying outcomes in the game of the dealer, the amount of a tip or tips given to the dealer, and so on. Performance data about a dealer may be aggregated over multiple games. For example, a statistic may indicate the average number of games dealt per unit time for the dealer. A statistic may indicate the total payouts received by primary players who have been in the games of the dealer during the last hour. A statistic may indicate the total amount of tips given to the dealer in the last half hour.

4.1.9. Top performing sectors of a casino. E.g., the slot machines in this bank have done the best. In various embodiments, data about games which have occurred in a sector or region of a casino may be aggregated. Data may be aggregated for games played at a group of slot machines, such as for a group of slot machines at a bank of slot machines. Data may be aggregated for a set of gaming tables, such as for a set of tables overseen by a single pit boss or other casino employee. Data may be aggregated for a floor of a casino or for a room of a casino. For example, data related to the games played in a high-limit slot machine room may be aggregated. In some embodiments, data may be aggregated for slot machines of a given betting denomination. For example, data may be aggregated for all nickel slots. Data may be aggregated for all slot machines with particular types of payouts. For example, data may be aggregated for slot machines with progressive payouts. For example, data may be aggregated for slot machines with top payout ratios of 800 or more. In some embodiments, data may be aggregated for slot machines of a particular type. For example, data about games at mechanical slot machines may be aggregated. For example, data about games at video slot machines may be aggregated. Data may be aggregated for slot machines which feature a particular game. For example, data may be aggregated for all slot machines with a Scrabble™ theme. Thus, for example, the five video poker machines which have paid the most in the last hour may be listed. The five nickel slot machines which have provided primary players with the highest winnings in the last hour may be listed.

4.1.10. A list of current progressive amounts. In some embodiments, data related to a current amount of a progressive prize may be gathered. The size of one or more progressive prizes at a given moment in time may be listed. Progressive prizes may be listed in order of size. For example, the Jumbo Bucko's progressive prize may be listed as $50,149.75. The Super Gold Vein progressive prize may be listed as $40,984.05, and so on.

4.1.11. Number of people at a casino or in particular areas of a casino. In various embodiments, data about the number of people at a casino or within a given area of a casino may be gathered. Data may be gathered about: (a) the number of people at a particular bank of slot machines; (b) the number of people at a table game; (c) the number of people in a restaurant; (d) the number of people on a particular floor of the casino; (e) the number of people in the lobby of the casino hotel; (f) the number of people at the casino swimming pool; (g) the number of people in the room of the high limit slot machines; (h) the number of people in the poker room of the casino; (i) the number of people attending a show; (j) the number of people at a boxing match at a casino; and so on. In various embodiments, data may be gathered in relation to the number of people with a certain characteristic. For example, data may be gathered describing the number of people from New Mexico, or the number of people between the ages of 40 and 50 at a casino.

4.1.12. Slot machines that are most popular—e.g., most heavily occupied. In various embodiments, data may be gathered describing the use of a gaming device, such as a slot machine or video poker machine. The number of games played at a gaming device may be tracked. The number of games played at a gaming device in a particular period of time may be tracked. The amount wagered at a gaming device may be tracked. Other items that may be tracked may include: (a) the number of pay lines played; (b) the average number of coins bet per pay-line; (c) the number of primary players who play a gaming device in a particular period of time; (d) the duration of a waiting period between when one player gets up from a gaming device and when the next player sits down; (e) the number of people in the vicinity of a gaming device; and so on. In various embodiments, data about the use or popularity of a gaming device may be aggregated over multiple gaming devices. The aggregation may occur over gaming devices that feature the same game; over gaming devices that feature the same betting denomination; over gaming devices from the same manufacturer; over gaming devices with the same broad theme (e.g., over gaming devices featuring any Monopoly® related game); over gaming devices falling within the same broad category (e.g., over video poker machines; e.g., over mechanical slot machines; e.g., over video slot machines; e.g., over video bingo machines); over gaming devices in the same area of a casino; and so on. In some embodiments, a statistic may describe the percentage of time that a particular type of slot machine was occupied during the last day. For example, a statistic may indicate that video poker machines were occupied 40% of the time, on average, over the last hour. In some embodiments, a statistic may describe the average amount won at all dollar denominated gaming devices in a casino in the last three hours. In some embodiments, a statistic may describe the average amount of money won by the casino per machine for all machines based on the Wheel of Fortune® theme. In some embodiments, a statistic may indicate the average amount of time that elapsed between when one player got up and when the next player sat down at a particular group of progressive slot machines. In various embodiments, information about slot machine utilization may be transmitted to one or more financial markets for use in evaluating the performance of a slot machine manufacturer.

4.1.13. All manners in which the player interacted with the machine. In some embodiments, data may be gathered describing how a primary player interacted with a gaming device. Such data may provide insight into the mood of a player. For example, a player who is slamming the button of a gaming device may be frustrated or impatient.

4.1.13.1. He pressed the button hard. In various embodiments, data may be gathered about how much physical pressure a primary applied to a gaming device. A primary player may apply pressure to a "spin" button, to another button, to a handle, or to a touch screen, for example. Pressure sensors or other sensors in the gaming device may sense the pressure applied by a player. Pressure may be detected as applied to any other surface of a gaming device. For example, the pressure of a drink or the pressure of a primary player leaning on the surface of a gaming device may be detected with pressure sensors. Sensors may detect strikes or blows to the gaming device as well. For example, pressure sensors or vibration sensors may detect kicks to the base of the gaming device. Data about pressure may be aggregated over multiple games, gaming devices, players, etc. For example, a statistic may indicate that the average pressure applied to a button was X pounds per square inch for all gaming devices across the casino in the last hour.

4.1.13.2. What is the precise time at which he presses the button? In various embodiments, the time may be recorded as to when a button was pressed at a gaming device. For example, data may indicate that a button was pressed at 11:45:02 µM. Data about the times when buttons were pressed may be aggregated over multiple games. For example, data about the times buttons were pressed may allow the derivation of a statistic describing the average length of time between games at a gaming device. In some embodiments, a graph may show the number of button presses across a casino as a function of time. For example, each bar on the graph may represent the number of button presses at a casino over a period of time. The graph may indicate times of heavy activity and times of light activity at a casino. For example, activity may die down near the end of an hour as gamers stop to make an appointment or find an activity starting on the hour.

4.1.13.3. Does he press the button or pull the handle? In some embodiments, data for a game may be gathered describing how a primary player initiated play of the game. Data may indicate whether a primary player pressed a button, pulled a handle, had a game initiated automatically on his behalf, or otherwise initiated a game. Data about the way in which a game may be initiated may be aggregated over multiple games. Such data in aggregated form may be described by a statistic. For example, a statistic may describe the number of times a particular primary player pressed the button to initiate a game during a particular period of time. For example, a statistic may describe the number of times any primary player in a casino pulled a handle to initiate play at a gaming device during the day of Jan. 14, 2003.

4.1.13.4. How quickly does he pull the handle? In various embodiments, data for a game may be gathered describing how quickly a primary player initiated a series of games at a gaming device. Data may include the time at which a primary player initiated play of a game. Data may include a time difference between the initiation of a first game and the initiation of a second game. Data may be aggregated over multiple game intervals. For example, a statistic may describe the average time between when a primary player initiates a first game and when the primary player initiates a second game. Data may be aggregated over multiple primary players. For example, a statistic may describe the average time between game initiations for a group of primary players. In various embodiments, data may be gathered for the time at which a payout is made, the time when an outcome appears on the screen or in the viewing window, or for any other event during a game. A time between games may thereby be derived.

4.2. API. In various embodiments, APIs may be used to facilitate data exchange and system interaction in accordance with various embodiments. Sensors used to gather data may communicate data gathered via APIs. For example, a software application may use an API associated with a camera to retrieve image data from the camera. A software application may use an API associated with a pressure sensor to retrieve data from the sensor, e.g., data about the weight of chips placed over the sensor. A software application may use an API associated with a card reader to retrieve data about the cards that have passed over the reader. For example, the reader may be attached to a card shoe and may thereby gather data about the cards dealt from the card shoe. In various embodiments, a display may include an API. A software application may interact with the display's API in order to cause the display to display text, graphics, or animations.

4.3. Betting on aggregates of data. E.g., more than 200 reds on roulette in a day, or 100 blackjacks. In various embodiments, a secondary player may place a bet that a statistic will take a certain value or range of values. The statistic may represent an aggregate of data from two or more games. For example, a secondary player may bet that a statistic describing the number of "red" outcomes at any roulette wheel across a casino in the next hour will have a value in the range of 200 to 250. In other words, the secondary player may bet that there will be between 200 and 250 "red" outcomes at any roulette wheel in the casino over the next hour. If, in the next hour, there are in fact between 200 and 250 "red" outcomes, the player may receive his bet back plus an additional payout. The additional payout may be some function of the bet size, such as one times the bet size, two times the bet size, or any other multiple of the bet size.

Embodiments described herein may apply to statistics about the future or to historical statistics. For example, a secondary player may bet that in the next hour, there will be two payouts won at a casino exceeding $1000. Such a bet may constitute a bet on a statistic about the future. As another example, a secondary player may bet that between the hours of 3:00 pm and 6:00 pm on Oct. 12, 2003, at a particular machine at a particular casino, there were 200 losing outcomes generated. Such a bet may constitute a bet on a statistic about the past. Although a secondary player may make a bet about the past, the bet may still be based upon a random or uncertain set of events, since the secondary player may not be aware of what happened in the past which was relevant to the statistic. Embodiments described herein may apply to statistics about the present. For example, a secondary player may bet that, for all video poker games currently in progress, there are twenty games in which the initial five-card hand dealt contains three-of-a-kind or better. Embodiments described herein may apply to statistics that encompass the past and the present, to statistics that encompass the present and the future, to statistics that encompass the past and the future, and to statistics that encompass the past, present and future. For example, a secondary player may bet that at a point in time 30 minutes into the future, there will have been twenty bonus rounds achieved at a bank of slot machines in the past 50 minutes (i.e., in the period beginning 20 minutes before the present and stretching to 30 minutes into the future).

4.3.1. Times and statistic initiations. In various embodiments, a bet may be based on the value of a statistic at certain times. In some embodiment, the bet is based on an initialization value for a statistic. A statistic may take an initial value of 0, for example. A statistic may take a certain initial value at a designated time. The designated time may be, for example, the time at which the bet is placed, one minute after the bet is placed, the start of the next hour (e.g., 8:00; e.g., 2:00), the start of the next day, the start of the next month, and so on. For example, a statistic may represent the number of times a royal flush has been dealt at any video poker machine in a bank of machines. The statistic may be initialized to zero at a designated time and date, such as at 12:00 am on Oct. 1, 2010. The statistic may then increment by one for each royal flush dealt at the bank of machines. In various embodiments, a bet may be based on a second value of a statistic. The second value of the statistic may be the value of the statistic at a designated time. For example, the second value of the statistic may be the value the statistic takes one hour after the time of the initialization value of the statistic. The second value of the statistic may be the value the statistic takes three hours, two days, or any designated time after the initialization value of the statistic. To continue with a prior example, the statistic which was initialized to 0 on Oct. 1, 2010 may take its second value at 12:00 am on Nov. 1, 2010. Thus, a secondary player may bet that a statistic which is initialized to the value of 0 at 12:00 am on Oct. 1, 2010 will take a value of between 30 and 40 at 12:00 am on Nov. 1, 2010.

In various embodiments, a secondary player may bet on the value that a statistic will take at a certain period of time, without any initialization time or value being specified. The statistic may represent an ongoing statistic, for example, that is updated generally whether or not any bets are placed on the value of the statistic. For example, a statistic may describe the value of a particular progressive jackpot. A secondary player may bet that the value of the statistic (and thus, the value of the progressive jackpot) will be over $1.2 million at 3:00 pm on Oct. 4, 2010. In some embodiments, a casino may keep track of the number of "red" outcomes and the number of "black" outcomes that occur at all roulette wheels at a casino. For example, at a particular point in time, a statistic describing the number of "red" outcomes (e.g., since the beginning of the week) may read "1204", and a statistic describing the number of "black" outcomes may read "1154". A secondary player may place a bet which wins if the statistic describing the number of "red" outcomes reaches 1300 in the next hour. A secondary player may place a bet which wins if the difference between the value of the "red" statistic and the value of the "black" statistic is more than 100 one hour after the bet is placed. In some embodiments, an ongoing statistic may be transformed into a statistic with a desired initialization value, e.g., through a simple mathematical transformation. For example, a second statistic may be defined as the value of a first statistic less 1204. Thus, the aforementioned statistic indicating that 1204 "red" outcomes had occurred at a casino in some prior period may be converted into a second statistic which will describe the number of "red" outcomes to occur at a casino going forward from the time the second statistic has been defined.

In various embodiments, a secondary player may bet that the value of a statistic will fall into a non-continuous range. For example, a secondary player may place a bet on the value of a statistic describing the number of times a dealer busts at any blackjack game in a casino during the next hour. The secondary player may bet that the dealers will bust a total of between 50 and 75 times, or between 100 and 125 times. Thus, the secondary player may win if the dealers bust 60 times or 110 times, but not if the dealers bust 90 times, for example.

4.3.2. Bets on statistical values at multiple times. In various embodiments, a secondary player may bet that a statistic will take on different values at different times. In various embodiments, a secondary player may bet that a statistic will fall into different ranges of values at different times. In various embodiments, a secondary player may bet on a path that a statistic will take. For example, if the value of a statistic is plotted as a function of time, the secondary player may bet that the plot will follow a certain path and/or take a certain shape. In various embodiments, a secondary player may bet that the value of a statistic will fall within a first range at a first time and within a second range at a second time. In various embodiments, a secondary player may bet that the value of a statistic will fall within a first range at a first time, within a second range at a second time, and within a third range at a third time. For example, a secondary player may bet that a statistic describing the number of sevens rolled at a craps table starting from 8:00 am will fall between 15 and 20 at 9:00 am, and between 40 and 50 at 10:00 am. Thus, the secondary player will win his bet if there have been 18 sevens rolled at 9:00 am and 44 sevens rolled at 10:00 am. However, the secondary player will not win his bet if there have not been between 15 and 20 sevens by 9:00 am or if there have not been between 40 and 50 sevens by 10:00 am.

In some embodiments, a secondary player may win a bet if the value of a statistic satisfies a first condition at a first time or a second condition at a second time. For example, suppose that a statistic describes the number of times any primary player has received a blackjack at a particular blackjack table since 4:00 pm. The secondary player may place a bet which wins if the statistic has a value between 10 and 20 at 4:30, or which wins if the statistic has a value between 30 and 40 at 5:00.

In various embodiments, a secondary player may place a bet which wins based on the value of the statistic meeting any defined condition or combination of conditions. For example, a secondary player may win a bet if a statistic satisfies any 3 of 4 defined conditions.

In various embodiments, a secondary player may bet that a statistic will take on a particular value during a particular period of time. For example, a secondary player may bet that the total number of "bell" symbols to appear at a particular slot machine since 7:00 pm will reach 40 between 8:00 pm and 8:10 pm. If the value of the statistic reaches 40 at 8:01 pm, for example, then the secondary player will win. However, if the value of the statistic reaches 40 at 8:13 pm, then the secondary player will lose. In various embodiments, a secondary player may bet that the value of a statistic will fall within a certain range of values during a certain time period. For example, a particular statistic may describe the number of outcomes with payouts of more than 30 coins that have occurred at a particular slot machine since 9:00 am. The secondary player may bet that the value of the statistic will be in the range of 5 to 10 sometime between 9:30 am and 9:35 am. The secondary player would win his bet, for example, if the value of the statistic was at 5 at 9:35 am, or was at 10 at 9:30 am. However, the secondary player would lose his bet, for example, if the value of the statistic had already reached 11 by 9:30 am, or hadn't yet reached 5 by 9:35 am.

4.3.3. Bets on combinations of statistics. A first statistic will take a first range of values and a second statistic will take a second range of values. In some embodiments, a secondary player may bet on the values of two or more statistics. For example, a secondary player may bet that a first statistic will reach a first value and that a second statistic will reach a second value at a designated time. For example, a secondary player may bet that the ace of spades will be dealt 200 times in the next hour at a bank of video poker machines, and that the ace of hearts will be dealt 210 times in the next hour at the same bank of machines. The secondary player may win his bet if both the ace of spades is dealt 200 times in the next hour and the ace of hearts is dealt 210 times in the next hour. If the ace of spades is not dealt exactly 200 times, or the ace of hearts is not dealt exactly 210 times, then the secondary player may not win the bet. In some embodiments, a secondary player may bet that either a first statistic will reach a first value or a second statistic will reach a second value. For example, a secondary player may bet that either the number 3 will occur 20 times at a roulette wheel in the next day, or that the number 7 will occur 20 times at a roulette wheel in the next day. In various embodiments, a secondary player may bet that any combination of conditions will be met by a set of one or more statistics. For example, a secondary player may place a bet involving four statistics in which a separate condition applies to each statistic. The secondary player may win the bet if at least two of the conditions are met. For example, the secondary player may win a bet if at least two of the following are true: (a) there are at least 20 outcomes that occur at a gaming device between 3:00 pm and 4:00 pm that pay more than 20 coins; (b) there are at least 3 bonus rounds that occur at the gaming device between 3:00 pm and 4:00 pm; (c) the net winnings of a primary player at the gaming device between 3:00 pm and 4:00 pm are less than 5 coins; and (d) there are between 20 and 30 payouts at the gaming device between 3:00 pm and 4:00 pm that consist of an odd number of coins.

4.3.4. Conditional bets. The player bets there will be between 95 and 105 reds if there are 200 spins. In some embodiments, a secondary player may make a bet that pays based on a statistic having a particular range of values, but which is conditional on some other circumstance. For example, a secondary player may bet that there will be between 200 and 250 losing outcomes at a gaming device during the period between 4:00 pm and 5:00 pm on Nov. 12, 2001, but only if there are at least 300 games played at the gaming device. If the condition is not met, then the bet may be considered void or a tie. If the condition is not met, then a different condition may apply. For example, a secondary player may bet that there will be between 200 and 250 losing outcomes if there are at least 300 games played, and that that there will be between 100 and 125 losing outcomes if there are less than 300 games played.

4.3.5. The statistic may pay differently for different values. In various embodiments, a secondary player may make a bet which pays a first amount if a statistic has a first value, a second amount if a statistic has a second value, and a third amount if a statistic has a third value. For example, a secondary player may bet on a statistic describing the number of times the banker wins in a game of baccarat during a particular one-hour period. If the banker wins between 15 and 20 times, the secondary player may receive his bet back plus an additional amount equal to his bet. If the banker wins more than 20 times, the secondary player may receive his bet back plus an additional amount equal to twice his bet. If the banker wins less than 15 times, the secondary player may lose his bet. In some embodiments, a secondary player may win an amount that is a linear or affine function of a statistic over a certain range of possible values of the statistic. For example, a secondary player may bet on the number of times that a particular primary player's two-card hand in a game of pai gow poker will beat the banker's two-card hand, in a particular one-hour period. The secondary player may win an amount equal to $B \times 0.1 \times (N-15)$, for any $N>15$, where N represents the number of times that the particular primary player's two-card hand wins, and B represents the bet amount made by the secondary player. For example, if N is equal to 25, then the secondary player will win $B \times 0.1 \times (25-15)$, or B. If $N<=15$, then the secondary player may win nothing and, e.g., lose his bet. It will be appreciated that a statistic could simply be defined to equal $B \times 0.1 \times (N-15)$, or any other function of a simpler statistic. In the former case, the secondary player's payout might be defined by the statistic.

In various embodiments, a secondary player may make a bet. The bet may designate a particular value of a statistic. For example, a statistic may represent the number of times that the banker wins during a particular hour at a particular table of pai gow power. The designated value of the statistic may be 20. The payout to the secondary player may increase by a certain amount for each unit by which the statistic exceeds the designated amount. For example, for each number of times above 20 that the banker wins, the secondary player's payout may go up by $1. In some embodiments, the payout to a secondary player may increase for each unit below a designated value that a statistic falls. For example, a statistic may represent the number of times that a war is initiated in the game of casino war at a particular table during a particular three-hour period. The designated value may be 10. A payout to a secondary player may increase by $5 for each unit below 10 that the statistic falls. For example, if the value of the statistic is 9, then the secondary player may win $5. If the value of the statistic is 8, the secondary player may win $10, and so on. If the value of the statistic is 10 or above, then the secondary player may win nothing. The secondary player may lose his bet.

In various embodiments, a secondary player may lose more than the amount of his bet depending on the value of a statistic. For example, if a statistic reaches a certain value, the secondary player may lose twice the amount of his bet. Thus, the secondary player may lose the original amount of his bet and may be further obligated to supply an additional amount equal to the original amount of his bet. In various embodiments, a secondary player may lose more money the further the value of a statistic departs from a designated value. For example, a designated value for a statistic may be 20. The secondary player may lose $1 if the actual value of the statistic is 19, $2 if the actual value of the statistic is 18, $3 if the actual value of the statistic is 17, and so on.

In various embodiments the secondary player may make a spread bet based on the value of a statistic. A spread bet may include a designated value of the statistic. If the actual value of the statistic is greater than the designated value, then the secondary player may be paid in proportion to the amount by which the actual statistic is greater. If the actual value of the statistic is less than the designated value, the secondary player may lose an amount that is proportional to the amount by which the actual statistic is less. A secondary player may also lose if the actual value of a statistic is greater than a designated value, and win if the actual value of the statistic is less than the designated value. For example, a secondary player may win an amount that is proportional to the amount by which the actual value of the statistic is less than the designated value of the statistic. The secondary player may lose an amount that is proportional to the amount by which the actual value of the statistic is greater than the designated value of the statistic.

In various embodiments, a spread bet may include a constant that is added to a payout or to an amount owed by a secondary player. For example, a secondary player may be paid an amount which is proportional to the difference between an actual value of a statistic and a designated value of a statistic plus a constant. The constant may be positive or negative. For example, a secondary player may be paid an amount equal to $\$1 \times (A-D)+c$, where A is the actual value of a statistic, D is the designated value of the statistic, and c is a constant. In various embodiments, the secondary player may be paid an amount equal to $\$1*k*(A-D)+c$, where k is a constant. In various embodiments, the secondary player may be paid $\$1*k*(A-D)+c_1$ if $A>D$, and $\$1*k*(A-D)+c_2$ if $A<D$, where $c_1$ and $c_2$ are two different constants. In various embodiments, the secondary player may be paid $\$1*k*(A-D)+c_1$ if $A>D$, $\$1*k*(A-D)+c_2$ if $A<D$, and $c_3$ if $A=D$, where $c_1$, $c_2$, and $c_3$ are three different constants.

4.3.6. Betting on the aggregation of craps rolls. In various embodiments, a statistic may describe a summation of numbers that arise from two or more games or from two or more events. For example, a statistic may represent the sum of the point totals a player has achieved in three games of blackjack. For example, if a player achieves a hand with a point total of 16 in a first game of blackjack, a hand with a point total of 21 in a second game of blackjack, and a hand with a point total of 14 in a third game of blackjack, then the value of the statistic may be 51. A statistic may represent the sum of point totals from two or more primary players in a single game of blackjack. For example, a statistic may represent the sum of point totals from the hands of Bob, Joe, and Sam, all of whom participate in the same game at a particular gaming table in a casino. In some embodiments, a statistic may represent the sum of point totals for both player and dealer hands. In some embodiments, a statistic may represent the sum of dealer point totals from multiple games. In some embodiments, a statistic may represent a sum of card point totals. For example, a statistic may represent the sum of points from every card dealt during a game, or for every card dealt during a plurality of games.

In some embodiments, a statistic may represent the sum of numbers revealed on tiles or dominoes in a game. For example, a statistic may represent the sum of numbers revealed on dominoes in the game of pai gow.

In some embodiments, a statistic may represent the sum of numbers achieved during two or more rolls of dice. Such dice rolls may occur in craps, in sic bo, or in any other game. In a game of craps, a statistic may represent the sum of two or more dice rolls during a game. For example, a statistic may represent the sum of all dice rolls made between when a pass-line bet is made and when the pass-line bet is resolved (e.g., in the player's favor, e.g., in the dealer's favor). As another example, a statistic may represent the sum of a fixed number of rolls made during a game. For example, a statistic may represent the sum of the first three rolls made during a game of craps. In some embodiments, a statistic may represent the sum of rolls made in two or more separate games. For example, a statistic may represent the sum of the rolls made in five consecutive games of craps.

In various embodiments, a secondary player may place a bet with a payout that depends on the value of statistic representing the sum of points, dice rolls, or any other numbers. For example, a secondary player may place a bet that a statistic representing the sum of three dice rolls in craps will have a value in excess of 21. The secondary player may win the amount of his bet if the value of the statistic exceeds 21, and lose the value of his bet otherwise. Suppose, to continue the above example, that the three dice rolls are 10, 6, and 8. The value of the statistic would then be 24, which is the sum of 10, 6, and 8. The secondary player would therefore win the amount of his bet.

In another example, a secondary player may place a bet on the value of a statistic that represents the sum of the first roll of the dice from each of the next five craps games.

The player may win if the value of the statistic is less than 32, but lose otherwise. Suppose, for the next five games, the first rolls occur as follows: 4, 7, 9, 5, 9. Accordingly, the value of the statistic would be 34. Thus, in this example, the secondary player would lose.

In various embodiments, a statistic may represent the sum of rolls from multiple different craps tables. For example, a statistic may represent the sum of all rolls at every craps table at a casino during a given five-minute period. For example, a statistic may represent the sum of the next roll at each of five craps tables.

In various embodiments, a statistic may represent the sum of numbers rolled on individual dice. For example, a statistic may represent the sum of the lowest die in each of the next three rolls. For example, let the ordered pair (x, y) represent a single roll with x representing the number on one die in the roll and y representing the number on the other die in the roll. Suppose the next three rolls occur as follows: (3, 5); (6, 4); (1, 3). The value of the statistic would be equal to the sum of 3, 4, and 1, which is equal to 8.

In various embodiments, a statistic may represent any function of points, rolls of the dice, or other numbers. For example, a statistic may represent the product of dice rolls. For example, if three dice rolls are 4, 3, and 10, the statistic may take the value of 120, which is equal to the product of 4, 3, and 10.

In various embodiments, a secondary player may make a bet whose payout depends on the actual value of a statistic relative to a designated value. In some embodiments, a secondary player may make a bet whose payout is proportional to a difference between the actual value of a statistic and a designated value of the statistic. Such a bet may be referred to as a spread bet, in some embodiments. For example, a secondary player may place a bet on the value of a statistic representing the sum of three rolls of dice in a game of craps. The designated value may be 21. The player may receive $1 for every unit that the actual value of the statistic exceeds the designated value of 21. For example, if the actual value of the statistic turns out to be 24, then the player may receive $3. In some embodiments, a secondary player may owe an amount that is proportional to the amount by which the actual value of the statistic is less than the designated value. For example, if the actual value of the statistic turns out to be 14, then the player may owe an amount equal to $10. Any amount previously provided by the secondary player may count towards the amount owed. For example, the amount of a bet previously placed by the secondary player may count towards the amount owed.

Mobile Device Interacts with a Proximate Game

In various embodiments, a player (e.g., a primary player; e.g., a secondary player) may carry a mobile device. The mobile device may provide an interface via which the player may participate in a game. The mobile device may receive data from a casino server, from a gaming device, from a gaming table, or from any other source. The data may include game data. Based on the data, the mobile device may create or recreate a depiction of a game. For example, the data received by the mobile device may include data indicating cards that have been dealt in a game, numbers that have been rolled on dice, numbers which have been determined in a roulette game, and so on. Based on the data, the mobile device may create or recreate a depiction of a slot machine game, a video poker game, a roulette game, or any other game. In some embodiments, the mobile device may indicate, e.g., via text on a display screen, the events that occurred in a game without graphically depicting the game. The mobile device may include input devices such as buttons, touch pads, track bolls, keys, touch screens, microphones, and so on. The mobile device may accept commands and other inputs from the player via the input devices. The mobile device may receive from the player inputs indicating an amount to bet on a game, a strategy to be used in a game, a decision to be made in a game, a bet to be made in a game, and so on. The mobile device may transmit any inputs received from the player to the casino server, to a gaming device (e.g., to a slot machine), to a gaming table, to a dealer, to a croupier, or to any other entity that is conducting a game. The mobile device may communicate via an intermediary with an entity conducting a game. For example, the mobile device may transmit data to and receive data from a casino server. The casino server may, in turn, transmit data to and receive data from a table game. In this way, the table game and the mobile device may communicate through the casino server.

Using the mobile device, the player may participate in a live game. If the player is acting as a primary player, then the player may initiate the play of the game and make decisions in the game. If the player is acting as a secondary player, then the player may place a bet on a game of a primary player.

In various embodiments, the mobile device may be configured to select an entity conducting a game based on the location of the entity and/or based on the location of the game. For example, a mobile device may be configured to select a table game of blackjack that is located within 100 feet of the mobile gaming device. Accordingly, the mobile device may begin receiving data from the table game and transmitting data to the table game. The mobile device may transmit to the table game an indication that the player wishes to make a bet and start a new game. A dealer at the table game may receive instructions from the mobile device. For example, a wireless receiver at the table game may receive instructions from the mobile device and cause them to be displayed on a monitor at the table game. The dealer may follow the instructions. For example, the dealer may deal cards at a new position at the table. The position may remain physically unoccupied. Nevertheless, the cards may represent the cards of the player who is playing via the mobile device. As events occur in the table game, data about such events may be transmitted to the mobile device. For example, the cards dealt to the hand of the player may be read by a reader on the card shoe as they are dealt. Data indicative of the cards may be transmitted to the mobile device via a wireless transmitter at the table. The mobile device may receive the data and display game information to the player based on the received data. The player may input game decisions, such as hit or stand decisions, after which such decisions may be transmitted back to the game table by the mobile device. The process may continue through one game or through a whole series of games.

In various embodiments, a mobile device may initiate communication with a table game, gaming device, or other entity that is most proximate to the mobile device. For example, the mobile device may determine that a particular slot machine is the closest slot machine to the mobile device. Accordingly, the mobile device may initiate communication with the slot machine. The player with the mobile device may then participate in the games of the slot machine. The player may participate as a primary player or as a secondary player, in various embodiments. If the player participates as a primary player, the mobile gaming device may receive an amount of a bet from the player and then transmit a signal to the gaming device, thereby triggering the gaming device to generate an outcome. Thus, the gaming device may be triggered to spin and generate an outcome without the physical presence of a player directly in front of the gaming device. For example, the player may be located ten feet away from the gaming device, yet the gaming device may initiate a game and generate an outcome in response to a signal from the mobile device.

In various embodiments, the mobile device may initiate communication with a table, gaming device, game, or other computing device that relays information to and from a game, based on the proximity of the game and based on the type of game. For example, the mobile device may initiate communication with the closest game that is a video poker game. For example the mobile device may initiate communication with the closest game that is a blackjack game. For example, the mobile device may initiate communication with the closest game that is a craps game.

In various embodiments, the mobile device may initiate communication with a game based on the presence of a primary player at the game. For example, the player with the mobile device may wish to act as a secondary player in a game of blackjack. Accordingly, the player may wish to find the nearest game of blackjack in which there is already a primary player participating. The player with the mobile device may then act as a secondary player and participate in the game of the existing primary player. In various embodiments, if the player with the mobile device wishes to act as a primary player, the mobile device may initiate communication with a game where there is a spot available for a primary player. For example, a player with a mobile device may wish to participate in a game of blackjack as a primary player. The mobile device may initiate communication with a blackjack table at which at least one seat is unfilled. The player with the mobile device may play in the game of blackjack as a primary player. However, in various embodiments, the player with the mobile device need not actually sit down at the table. The dealer may simply deal cards to a particular spot which is understood to belong to the player with the mobile device. The player with the mobile device may make game decisions and key them into the mobile device. The mobile device may communicate the decisions to the blackjack table (e.g., to a computing device with transmitting/receiving antenna situated on the blackjack table). The decisions of the player may then be communicated to a dealer who may then act based on the decisions, e.g., by dealing or not dealing cards.

In various embodiments, a mobile device may initiate communication with a game, a gaming device, a device which is associated with a game, etc., based on a number of factors. A mobile device may communicate with a game based on: (a) the type of game (e.g., poker; e.g., blackjack; e.g., slot machine); (b) based on the amount of the bet required at the game (e.g., the mobile device may initiate communication with a game only if the minimum bet required is less than $25; e.g., the mobile device may initiate communication with a game only if the minimum bet required is greater than $1); (c) the availability of a spot at the game; (d) based on the presence of a particular dealer (e.g., the mobile device may initiate communication with a game if dealer Joe Smith is dealing); (e) based on historical outcomes of the game (e.g., the mobile device may initiate communication with a game if the last 5 games played were winning games; e.g., the mobile device may initiate communication with a game if primary players at the game have lost more than $100 in the last hour); (f) based on the proximity of the game to the mobile device; (g) based on the location of the game; (h) based on the location of the mobile device; and so on.

In various embodiments, the mobile device may initiate communication with a game automatically once a triggering condition has been met. For example, when the mobile device comes within ten feet of a blackjack game, communication may be automatically initiated between the game and the mobile device. Communication may be triggered without input from the player with the gaming device. The triggering conditions may, however, have been previously entered or defined by the player with the mobile device.

The mobile device may have various ways of determining if the mobile device is proximate to a game. The mobile device may include a location sensor or detector. For example, the mobile device may include a GPS reader. For example, the mobile device may receive signals from multiple fixed beacons with known locations and triangulate its own location based on arrival times of the signals from the fixed beacons. The mobile device may store records of the locations of various games. For example, the mobile device may include an internal map detailing the locations of various games. If the mobile device determines that it is at a particular location, and finds that the particular location happens to be close to the location of a game (e.g, as determined from the internal map), then the mobile device may determine that the mobile device is proximate to the game. The mobile device may thereby initiate communication with the game.

In various embodiments, a game (e.g., a gaming device; e.g., a table game) may include a beacon or antenna that broadcasts signals within a short range. For example, a game may include a radio frequency identification (RFID) tag. The signal broadcast by the game may be detectable within a certain radius of the game. The mobile device may include a receiver which is capable of detecting the signal broadcast from the game. If the mobile device detects the signal, the mobile device may initiate communication with the game.

In various embodiments, a game (e.g., a gaming device; e.g., a table game) may initiate communication with a mobile device. In various embodiments, a game may detect when the mobile device is proximate.

For example, the mobile device may contain an antenna that broadcasts signals within a short radius of the mobile device. For example, the mobile device may include a radio frequency identification (RFID) tag. A game may detect the presence of the tag and may initiate communication with the mobile device.

In various embodiments, the mobile device may broadcast signals. The signals may be detected at fixed detectors at known locations, e.g., at known locations in a casino. The position of the mobile device may then be triangulated using methods well known to those skilled in the art. For example, based on the travel time of the signal to a fixed detector, a circle may be drawn around the detector indicating possible locations of the mobile device. With several detectors in place, multiple circles may be drawn. The mobile device may be assumed to be located where the circles all intersect, or come close to intersecting. The casino server may be in communication with the detectors. The casino server may thereby derive the location of the mobile device. The casino server may compare the location of the mobile device to known locations of a game. If the mobile device is found to be proximate to a game, the casino may alert the game and/or the mobile device of the proximity. The mobile device may thereupon initiate communication with the game or vice versa.

In various embodiments, a player may participate at a table game via a mobile device. The player may enter bets into the mobile device. The player may have an account balance with the casino. For example, the player may have $10,000 on deposit with the casino. As the player enters a bet, the amount of the bet may be deducted from the player's account balance. When the player wins money in a game, the amount of the win may be added to the player's account balance. In various embodiments, the player may place bets through the mobile device without such bets being revealed to other players. For example, the player with the mobile device may enter bets into the mobile device (e.g., by keying in an amount of the bet) without having to actually place chips on a gaming table. The player with the mobile device thus avoids a situation where other players can see how many chips are being bet by the player with the mobile device. The ability to place a bet without the amount of the bet being revealed to other players (or to spectators) may be important to a player. A player who is betting a lot of money may wish to avoid attracting attention of potential thieves, for example. A player may also benefit from not having to carry large amounts of money away from a table. For example, a player may win $40,000 at a table. Rather than gathering his $40,000 in chips and leaving, the player may have his winning stored in his account with the casino, where they cannot easily be stolen.

The ability of a mobile device to communicate with a game and to allow the player with the mobile device to participate in the game may offer additional benefits. In some embodiments, a table game may be full. For example, every seat at a blackjack table may be currently occupied by players. The player with the mobile device may nevertheless be able to participate in a game at the table. For example, the dealer may deal an extra hand for the player with the mobile device and place such a hand in a spot with no seat in front of it (e.g., in a spot close to the dealer).

In various embodiments, a player may use a handheld device whether the device is used to play a primary game (e.g., against the dealer) or whether the device is used to play a secondary game.

In various embodiments, a player participating in table game using a mobile device may send a tip to the dealer of the game using the mobile device. For example, the player may use input devices (e.g., keys; e.g., a touch screen) on the mobile device to indicate a desire to provide a tip and to indicate an amount of a tip. The amount of the tip may be deducted from an account balance that the player has with the casino. The amount of the tip may be credited to an account of the dealer. The dealer may be authorized to take an amount of chips equal to the tip from the table and put such chips in his pocket, for example. Using a mobile device, a player may indicate: (a) an amount of a tip to provide; (b) a message to be associated with the tip (e.g., "Hi, this tip is from Joe"; e.g., "Hi, thanks for the cards last hand!"); (c) a dealer to which to provide the tip (e.g., the player may be simultaneously participating in games at two or more tables and may need to specify a dealer); (d) whether or not the tip will be provided anonymously; and so on. In various embodiments, when a tip is sent to a dealer, the dealer is informed of the originator of the tip. In this way, the player sending the tip can receive his due appreciation from the dealer. A screen at a game table may provide a message indicating who provided the tip. For example, the screen may display a message for the dealer saying, "John Brown just gave you a $5 tip." In some embodiments, the dealer may view a picture of the player providing the tip. In this way, the dealer may be able to see visually who among the players standing near the table provided the tip. In various embodiments, a dealer may receive a message saying that a tip came from a mobile device player in the area. For example, the message might say, "a mobile device player in the area has just given you a tip of $1".

In various embodiments, a player may participate in a game via a remote device or terminal. A player may participate via a fixed terminal containing a display screen, processor, memory and communication device, for example. A player may also participate via a mobile device. In various embodiments, a remote terminal can play a game on behalf of the player. In various embodiments, a remote device may make game decisions on behalf of the player. Such game decisions may include decisions of whether to hit or stand in blackjack and decisions on which cards to draw in a game of video poker. In various embodiments, a remote device may make decisions as to how much to bet. Decisions about amounts to bet may include decisions about how much to bet at the start of a game, decisions about whether or not to add to a bet (e.g., decisions about whether to double down in a game of blackjack) and decisions about how much to bet during the course of a game (e.g., during the course of a game of poker).

The player at the remote terminal may authorize the remote device to make decision in a game on his behalf. The player may, for example, type in his initials to indicate that he is authorizing the terminal to make game decisions on his behalf. The player may specify constraints or parameters for the decisions. For example, the player may specify an amount of a bet to be made on any given game, a maximum amount of a bet to be made on any given game, a total number of games to be played, and so on. In some embodiments, a player may authorize the remote device to make bets on games until the player has won or lost a certain amount. For example, the player may authorize the device to continue betting on behalf of the player until the player has either doubled his current bankroll (e.g., an amount the player has on deposit with the casino) or until the player has lost half of his bankroll. In various embodiments, the player may specify a strategy to be used in a game. For example, the player may specify what action should be taken in a game of blackjack should the player have 10 points and should the dealer have a three face up. In some embodiments, the player may select from two or more pre-defined strategies. For example, a player may tell indicate that he wishes to use a predefined "risky" strategy or a predefined "conservative" strategy. In some embodiments, the player may authorize the terminal to play according to an optimal strategy and/or to play according to a strategy that maximizes a parameter, such as an expected amount to be won from a game.

A player at a remote terminal may specify various rules for betting. Rules for betting may include one or more of the following; (a) the terminal is to bet a fixed amount on every game (e.g., $2 on every game); (b) the terminal is to bet an amount on a given game which depends on the result (e.g., win, lose) of the prior game; (c) the terminal is to bet an amount which doubles after every loss, but which is $1 after every win; (d) the terminal is to bet until X amount in total is won; (e) the terminal is to bet until X amount in total is lost; (f) the terminal is always to bet the maximum possible amount; (g) the terminal is to bet X pay-lines (e.g., in a slot machine game); and so on. Rules for betting may further include a number of games to play at once (e.g., 3 games are to be played at once; an amount of time to wait between playing games, and so on. If the player at the remote terminal is a secondary player, rules for the terminal to follow may include rules detailing the way primary players will be selected. Rules for selecting primary players may include rules for selecting primary players based on demographic information; rules for selecting primary players based on the games being played by the primary players; rules for selecting primary players based on historical outcomes of the players; rules for selecting primary players based on amounts being wagered by the primary players; rules for selecting primary players based on a strategy being used by the primary players, and so on.

Random Generators

In various embodiments, a card shoe may automatically deal cards. In various embodiments, a card show may automatically deal cards that are face up so that the cards are visible to a camera that is located above the cards. In various embodiments, cards may be placed into a card shoe face-up. In this way, the cards may be automatically dealt face-up. In various embodiments, a card shoe may show cards without expelling the cards from the shoe. The card shoe may, for example, maintain two internal stacks of cards. Cards may be transferred from the first stack to the second stack, each card shown through a viewing window of the shoe as it is transferred. Once the first stack is depleted, the second stack may be shuffled and put in the place of the first stack. The card from the newly shuffled first stack may then be transferred once again to the place of the second stack. In this way cards may be repeatedly shuffled and dealt without the necessity of a human gathering up expelled cards and placing them back into the shoe. As will be appreciated, many other card shoes may be used. Any card shoe capable of automatically dealing cards may be used, for example. Further, a card shoe may be used in conjunction with any device which can make cards visible to a camera, e.g., by flipping cards over once dealt. A card shoe may be used in conjunction with a card reader. Cards may contain special markings, such as bar codes or other patterns which are machine readable and which serve to identify the rank and suit of the cards. Cards may contain RFID tags which offers signals that identify the rank and suit of the cards.

In various embodiments, a card shoe may deal or reveal cards with variable speed. For example, a card shoe may be capable of dealing cards at a rate between 5 cards per second and 1 card every 3 seconds. The card shoe may include controls which allow a human and/or a computer to increase or to decrease the rate at which cards are dealt. In various embodiments, a card shoe may be slowed down if the card shoe is generating cards for a game with a relatively slow pace. For example, a card shoe may be slowed down when a game using the cards is a high stakes baccarat game. A card shoe may be sped up when a game using the cards is a game of blackjack with many experienced players.

In various embodiments, the cards dealt by a card shoe may serve as a basis for the play of one or more games. For example, a remote player may be involved in a game of video poker. The cards used in the game of video poker may first be dealt from the cards shoes. The rank and suit of the cards dealt may be captured, e.g., by an overhead camera. Depictions of the cards may then be recreated at a remote terminal of the player.

In various embodiments, a card shoe may be under manual control. For example, a human or computer may indicate to the card shoe when to deal a new card. In this way, a new card may be dealt only when necessary in a game. For example, if a player is using the cards dealt from a card shoe for a game of video poker then the remote terminal of the player may instruct the card shoe to deal new cards only when the player has indicated which cards to discard from an initial hand. The cards dealt from the shoe may then be used as replacement cards for the cards discarded. Further, the shoe may be instructed only to deal as many cards as are needed to replace the cards being discarded by the player.

In various embodiments, a card shoe may deal cards at a constant rate. In various embodiments, a card shoe may deal cards according to a set schedule. The card shoe may, for example, deal one card every second. Any player and/or any game may be welcome to access the cards dealt from the card shoe. For example, a player at a remote terminal may require 10 cards for a game of blackjack. The terminal may then retrieve data about the next 10 cards dealt from a card shoe. The data about the cards may then be used to recreate images of the cards, to deal representations of cards, and to determine whether the player won in the game of blackjack or not.

In various embodiments, data about cards dealt from a card shoe may be stored. The data may be stored at a casino server, at a remote terminal conducting games for players, or at any other location. When data about cards are needed for a game, the data may be retrieved. Data may be retrieved about cards that had been dealt in the past, such as 10 minutes prior to a game being conducted, such as 1 day prior to a game being conducted, or such as a year prior to a game being conducted.

Cards dealt from a card shoe may be read in various ways. Image processing algorithms may recognize the characteristic card patterns or images. For example, an image processing algorithm may be used to count the number of pips on a card and/or to determine the suit of the card from the shape of the pips. For example, optical character recognition technology may be used to discern the rank of a card based on a letter or numeral printed on the card. In various embodiments, a card may include a bar code or other pattern. A laser may be used to read the bar code. A card may contain an RFID chip or other signaling device for communicating the identity of the card.

In various embodiments, a live human dealer may deal cards. The dealer may deal cards for a live game at a casino. In various embodiments, a dealer may simply deal cards. There may be no live players, e.g., primary players, near the dealer. However, the cards dealt by the dealer may be used as the basis for other games, such as for remote games. Accordingly, in some embodiments, a human dealer may deal cards face up. The cards may be read by a camera or other device. In some embodiments, the dealer may key in the identities of the cards. The cards may then be used in the games of remote players.

In some embodiments, multiple card shoes, live human dealers, or other card dealing entities may deal cards. In some embodiments, a first remote game may use cards from a first card shoe and a second remote game may use cards form a second card shoe. In some embodiments, a first remote game may use cards from two or more card shoes. For example, a remote game may use three cards dealt from a first shoe and two cards dealt from a second shoe in order to create an initial hand of poker. It will be appreciate that the use of cards from multiple shoes may result in the possibility of different outcomes. For example, if cards are used from a single shoe containing only one deck in a game of poker, hands with five-of-a-kind may not be possible. However, if cards are used from two different shoes, then a five-of-a-kind hand may be possible even if both shoes are only dealing a single deck of cards.

In some embodiments, a game and/or a player may use cards in alternating fashion from two shoes. For example, a game may use the first, third, and fifth cards dealt from a first shoe, and a second and fourth cards dealt from a second shoe. In various embodiments, a single game may use cards from any number of shoes, such as from five different shoes. In various embodiments, a the same card may be used in two different games. For example, a card dealt from a shoe may be used in a remote game of blackjack and in a remote game of video poker. In various embodiments, a card dealt from a shoe may be used in a first game of blackjack and in a second game of blackjack. In various embodiments, historical data about cards dealt from a shoe or about cards dealt by a human dealer may be recorded. The historical data may be made available for viewing, for searching, for analysis, or for any other use by a player. A player may select a shoe to use for a game. For example, a player may view data about the last 100 cards dealt at each of two shoes. The player may decide that the second shoe is the luckier shoe because it has dealt cards that have lead more often to player wins in a game of blackjack.

In various embodiments, a card shoe may deal to a certain penetration and no more. For example, a card shoe may contain 312 cards. However, following a shuffle, the card may deal less than the full 312 cards in the shoe. This may prevent a player from counting cards. For example, a card shoe with 312 cards may only deal 100 of the cards before reshuffling. In some embodiments, a card shoe may continuously shuffle cards. For example, following the deal of a set of cards, each card may be randomly inserted into the remainder of the deck. For example, following each deal, the entire deck of cards may be reshuffled.

In various embodiments, a card shoe or other card dealing device may have an associated applications programming interface (API). The API may include various commands that may be given by remote terminals to the shuffler. There may be commands for dealing a new card, for shuffling, for increasing the dealing speed, and for decreasing the dealing speed, among other commands. In various embodiments, an API may define the way in which a card shoe will communicate to a remote terminal which cards have been dealt. For example, the API may allow a remote terminal to understand a particular sequence of data as the ace of spades.

In various embodiments, one or more APIs may define the communication between a card shoe and a casino server. The casino server may, in turn, relay information about cards dealt to a terminal which is conducting a game for a player. In various embodiments, one or more APIs may define the communication between a server and a terminal. The APIs may define commands by which the terminal can request a card from the server, can request an increase in dealing speed, can request a decrease in dealing speed, or can make any other command or request.

Various games employ the use of dice. Examples include craps and Sic Bo. In various embodiments, machines may be used to roll dice automatically. A reader may determine the results of the dice rolls. For example, an image may capture the rolls of the dice and may determine what number has been rolled on each die. Data about what number has been rolled on a die or dice may be transmitted to a remote terminal. The remote terminal may conduct a game using data from the dice. For example, the remote terminal may use data about what numbers were rolled on three dice in order to allow determine the results of a game of Sic Bo played by a remote player.

In various embodiments, a basket may include one or more dice. The basked could be a cylinder, a tube, a parallelepiped, or any other enclosure, including any enclosure with two flat opposing surfaces. The basket may be transparent in one or more of its surfaces. In various embodiments, the entire basket may be transparent. In various embodiments, the basket may include two normal resting positions. In a first resting position, one of two flat opposing surfaces is parallel to the ground and is the closest surface to the ground. In a second resting position, the other of the two flat opposing surfaces is parallel to the ground and is the closest surface to the ground. As will be appreciated, in each of these two resting positions, the dice within the basket will most likely come to rest on the lower of the two flat opposing surfaces (i.e., the surface closest to the ground). When the basket has come to one of the normal resting positions, the dice within the basket may be read by a reader. Once the dice have been read, the basket may be flipped 180 degrees so that the surface that was closest to the ground is now closest to the sky, and the surface that was closest to the sky is now closest to the ground. The flipping of the basket should then cause the dice to fall to the surface that is now closest to the ground. The dice will presumably fall in a chaotic or unpredictable way so that when they land on the new bottom surface, a new set of random numbers will have been generated. In various embodiments, the basket may be controlled by a stepper motor. The stepper motor may accurately control the flipping of the basket so that, at rest, the opposing flat surfaces can be parallel to the ground. It will be appreciated that in various embodiments, other basket shapes may be used. For example, the basket may include a single surface which is always held substantially parallel to the ground. To randomize the dice, the basket may be shaken. In various embodiments, the dice contained in the basket may include RFID tags. Each face of the die may include its own RFID tag, for example, a detector located above the basket may detect which RFID tag is the closest of the six on a given die, and may thereupon determine which number has been rolled on the die, for example.

In various embodiments, a random event may be used to supply data for use in one or more games. For example, as described herein, the shuffling and dealing of cards may determine a number of random events. The results of the random events may include which cards end up being dealt. In various embodiments, the random events may generate results from a limited set of enumerated outcomes. For example, the result of the roll of a die is an outcome from the set of integers 1, 2, 3, 4, 5, and 6. For example, the result of the dealing of a card from a standard set of 52 cards is a card that with one of only 52 unique identities. In various embodiments, data describing one of a first set of enumerated outcomes may be transformed into data describing one of a second set of enumerated outcomes. In various embodiments, several outcomes from a first set may be combined to create one outcome from a second set of possible enumerated outcomes. In various embodiments, one outcome from a first set of enumerated outcomes may be decomposed into several outcomes from a second set of enumerated outcomes. For example, a first random event may be the dealing of a card. A card may be used to generate the outcomes of two dice. For example, the two of clubs may correspond to a roll of two dice where each die shows the number 1 on its top face.

In another example, three dice are rolled. The three dice are used to define the rank and suit of a card. For example, a first die is rolled. If the first die shows a one, then the card is a club. If the first die shows a two, then the card is a heart. If the first die shows a three, then the card is a diamond. If the first die shows a four, then the card is a spade. If the first die shows a five or a six, then the die is rolled again until it shows a 1 through 4. The second die is then rolled. If the second die shows a one, two, or three, then the third die is rolled. If the second die shows a four, five, or six, then the second die is rolled again. The second die is continually rolled until the second die shows a 1 through 3. If the second die shows a three and the third die shows a 2 through 6, then the second and third die are rolled again. In other words, the second die will have to be rolled again until it shows a 1 through 3. The third die will also be rolled again under the same circumstances as it had been originally. If, however, the second die shows a three and the third die shows a 1, then the rolling stops. In the end, if the second die shows a 1, then the card rank will be ace if the third die shows a 1, 2 if the third die shows a 2, 3 if the third die shows a 3, four if the third die shows a 4, five if the third die shows a 5, and six if the third dies shows a six. If second die shows a 2, then the card rank will be 7 if the third die shows a 1, 8 if the third die shows a 2, 9 if the third die shows a 3, 10 if the third die shows a 4, jack if the third die shows a 5, and queen if the third die shows a six. If the second die shows a 3 and the third die shows a 1, then the rank of the card will be king. No other dice combinations are possible since the dice would have been re-rolled if such combinations occurred.

It will be appreciated that there may be many other algorithms for transforming data describing one set of enumerated outcomes into data describing another set of enumerated outcomes. Any other such system may be used. Thus, in various embodiments, cards dealt from a shoe may be used to conduct a game of craps. Dice rolled in a basket may be used to conduct a game of video poker. Coin flips may be used to conduct a game of Sic Bo or casino war. In general, any set of outcomes may be used, either individually or in combination, to generate data describing any other set of outcomes.

Verification of Random Event Generators

In various embodiments, a player may be engaged in a game that relies upon data from random events. The random events may occur at a location separate from the location of the player. For example, the player may play a game on his mobile gaming device in New Jersey, where such game relies upon random events that occurred in Nevada. The random events may also occur at a different time from the time when the player is playing. For example, a player may play a game of video poker. The cards the player receives may be based on cards dealt three weeks ago from a card shoe in a casino warehouse. The random events may also occur in a different type of game than that being played by the player. For example, the random events may occur in a game of craps, while the player is playing a game of blackjack.

In various embodiments, a player may wish to verify the authenticity of random events which determine the outcomes and payouts of the player's game. For example, if the player repeatedly loses games, the player may come to suspect that the outcomes of his games where not generated fairly. The player may therefore wish to receive some assurance that the outcomes were, in fact, generated fairly.

In various embodiments, a player may request to see verification of an outcome, payout, and/or result of a random event. The player may use one or more input keys, buttons, or devices to request authentication. For example, an area on the touch screen of a player's mobile gaming device may include a button. The button may be labeled "authenticate", "verify game outcome", "check outcome", "view source of outcome", or other labels. The player may touch the button in order to view or otherwise receive information about the outcome, payout and/or result of his game.

In some embodiments, video may be generated depicting the manner by which random events generated the results used in the player's game. For example, when random events are used to generate results, the events may be filmed. For example, the rolling of dice may be filmed. As another example, the dealing of cards may be filmed. The film may be stored, e.g., as a digital file in a database of the casino. The film may be indexed or otherwise labeled in such a way that it is associated with a particular result or event. For example, the file name of a video file may be "Event 93048200 of Dec. 13, 2010".

In various embodiments, a player may request to see video depicting the random events which generated the results used in the player's game. The player may then be shown the video. The video may show cards being dealt, dice being rolled, roulette wheels being spun, or whatever was the source of the results that led to the outcome of the player's game. The video may be transmitted from the casino server to the player's mobile gaming device, for example. The mobile gaming device may show the video to the player on its display screen.

Variable Inputs to Outcome Generators

In various embodiments, a machine, device, or other entity that generates random outcomes may be under the control of a player. The control may be either direct or indirect. For example, a player may have the opportunity to physically spin a roulette wheel so as to generate a random roulette outcome. For example, the player may have the opportunity to physically jostle a basket with dice so as to generate a new roll of the dice. A player may exert indirect control over a machine that generates random outcomes by sending commands to the machine. Commands may be sent via a terminal, such as via a mobile device. For example, a player may press a button at a remote terminal that instructs a machine-controlled roulette wheel to spin. The remote terminal may relay the request of the player to the casino server. The casino server may, in turn, instruct the machine controlling the roulette wheel to spin the roulette wheel.

In various embodiments, a player may not only issue commands to generate an outcome, but may also issue commands as to how the outcome should be generated. The player may specify, for example, a degree of physical force that will be applied with an outcome generating device. For example, a player may specify that speed (e.g., in terms of revolutions per second) with which a roulette wheel will be spun. A player may specify that amount of time that a basket with dice will be shaken before the dice are allowed to come to rest. A player may specify the amount of time cards must be shuffled before they can be dealt. Thus, in various embodiments, a player may specify inputs that fall along a range of possible inputs. For example, the speed or the force with which a roulette wheel is spun may vary over a continuous range. The player may specify a speed or force. The player may specify a force using a dial, a mouse, or another input device which can provide a continuous range of inputs. For example, a player may use a mouse to manipulate the level of a bar on a display screen of the terminal. If the bar is at a high level, then a roulette wheel will be spun with a high initial speed. If the bar is at a low level, then the bar will be spun with a low initial speed.

In various embodiments, a player's status may determine what kind of control he is allowed to exert over an outcome generating device. For example, in various embodiments, if a player is a high-roller (e.g., if the player places more than a predetermined total amount of wagers per visit to a casino), then the player may be allowed to define a variable input into an outcome generating device. However, a player who is not a high-roller may be allowed only to tell a device whether or not to generate an outcome.

Index of Gaming Data

In various embodiments one or more statistics may be used to summarize a set of games, outcomes, player earnings, or other occurrences at a casino. The statistic may be called an index. Thus, for example, there may be a "Roulette Red Index" which summarizes the proportion of the time that roulette wheels across the casino have landed on red in a given time period. There may be a "Blackjack Index" which summarizes the proportion of times that a Blackjack has been dealt to a player across the casino. Other indexes may summarize data about: (a) the number of times a particular outcome has occurred (e.g., the number of times the a jackpot outcome has occurred); (b) the amount of money one or more players have won (e.g., the average amount of money slot machine players have won in the last hour); (c) the number of times a particular symbol has occurred (e.g., the number of times a "cherry" symbol has occurred at a bank of slot machines); (d) the number of times a particular intermediate outcome has occurred (e.g., the number of times a particular starting hand of video poker has occurred); (e) the number of times a player has achieved a certain hand (e.g., the number of times a player of Texas Hold'em has achieved a full-house; e.g., the number of times a player at blackjack has achieved a point total of 20); (f) the number of times a dealer has achieved a certain outcome (e.g., the number of times a dealer has achieved a point total of 20 in a game of blackjack); (h) the number of times a particular score has been reached in a game of sports (e.g., in a game of sports on which players can bet in a sports book); (i) the number of number of players who have won more than $100; and so on. An index may summarize data from a given time period, such as from the current day. For example, an index may summarize the proportion of times that a seven has been rolled on the first roll in craps during the current day. An index may summarize data in absolute numbers. For example, an index may describe the total number of spins at a roulette wheel that have resulted in the number 12 during the current day. Such an index may be called the "12" index, for example. An index may summarize data as a proportion. The index may indicate a ratio of the occurrence of one outcome to the occurrence of another outcome. The index may indicate the ratio of the occurrence of one outcome to a number of games played. For example, an index value of 2.7% may indicate that the number 12 has occurred in 2.7% of roulette spins during the current day.

In various embodiments, an index may summarize data from a particular area of a casino. For example, an index may summarize player winnings from the first floor of a casino, or from a particular bank of slot machines. An index may summarize data from a particular type of machine. An index may summarize data from slot machines. An index may summarize data from video poker machines. An index may summarize data from table games. An index may summarize data from progressive slot machines. An index may summarize data from video slot machines.

In various embodiments, an index may include a weighting of certain events, games, or outcomes over others. An outcome may be weighted depending on the number of bets that have been placed on it. For example, if the number 17 occurs at a roulette wheel with 5 people playing, the "17" index may increase by 5 times as much as does the "8" index when it occurs at another roulette wheel at which only one person is betting. In various embodiments, game or outcome may be weighted in the index based on the size of the wager placed on the game or index. For example, if a person bets $100 and receives a blackjack, a "blackjack" index may go up by 10 times as much as it would when a person places a $10 bet and receives a blackjack. A game or outcome may also be weighted according to the size of one or more payouts that are possible in the game. For example, an outcome at a game which has a jackpot of $10,000 may receive twice the weighting as does an outcome which has a jackpot of $5,000.

In various embodiments, there may be an index associated with a particular player. For example, a primary player may have an index. A secondary player may decide whether or not to participate in the games of the primary player based on the level of the index.

In some embodiments, there may be an index for a group of players. For example, there may be an index for all players within a certain age range, for all people from a certain geographic location, for all people of a certain gender, for all people that prefer a particular type of game (e.g., blackjack), and so on. In some embodiments, there may be an index for groups of players based on their amounts wagered. For example, a "large cap" index may summarize statistics about players who bet $25 or more per game. A "small cap" index may summarize statistics about all other players.

Improved Odds and Commission

In various embodiments, a player may be given improved payout odds on a game in return for paying a fixed commission. For example, in a game of roulette, a player who has bet $1 on a winning number might typically receive his $1 back plus an additional $35. In some embodiments, the payout for achieving a winning number in a game of roulette might increase to $37. In this way, a player could expect to lose $1 with probability 37/38, and to make $37 with probability 1/38, assuming an American roulette wheel with 38 spaces on it. The player would thus have expected winnings and expected losses of 0, making the bet a bet with true odds. However, in general, a casino may wish to maintain a house advantage on a bet so as to generate profits for the casino. Accordingly, the casino may offer a payout of $37 when the player wins, but may charge the player a $2 commission whenever the player wins. Thus, the casino may maintain a house advantage by charging a commission even though the bet was made at true odds.

Thus, in various embodiments, a player may place a bet with true odds. In other words, a player may place a bet such that his expectation from the game is zero. However, for one or more outcomes, the player may owe a commission to the casino. The commission may be deducted from the amount paid in a winning outcome.

In various embodiments, a player may make a bet with a positive expectation. In other words, the player may make a bet such that the player has an advantage, i.e., such that the player can expect to win, on average, more than the amount of his bet. However, the house may profit from the game by charging a commission to play the game. The commission may exceed the amount that the player might expect to profit from the game. For example, a player may make a $1 bet in a game in which the player can expect to win $1.05, on average. Thus, the player has an advantage in the game. However, the casino may charge the player a $0.10 commission to play the game. Thus, accounting for the commission, the casino will still be able to profit from the game, on average.

In some embodiments, a player may make a bet in a game in which the player is guaranteed to win back more than the amount of his bet. For example, if the player places a bet of $1, the player may be guaranteed to win back at least $1.05, for a net profit of $0.05. However, the player may be charged a commission for the game. For example, the commission may be equal to $1.05. The commission may serve to make the game profitable for the casino when the commission is taken into account.

Displaying Data

Any data generated or gathered at a casino or from any other source may be displayed to one or more players. The data may also be displayed for viewing by one or more casino representatives. Data may also be communicated in other ways, such as through announcements over a public address system, or such as over radio waves. As described herein, the data displayed may include data about historical outcomes, summary statistics, data about the performance of one or more players, data about the performance of one or more gaming devices, data about the performances of one or more dealers, data about the size of one or more jackpots, data about data trends, data about one or more outcomes, data about one or more historical outcomes, and so on.

Data may be displayed in a number of areas. Data may be displayed: (a) on the display screens of gaming devices (e.g., on the display screens of gaming devices that are not currently in use); (b) on wall-mounted monitors; (c) on electronic signs; (d) on walls, ceilings, or other services via projection displays; (e) on the screens of terminals at which secondary players participate in games; (f) on the screens of mobile devices; (g) on the televisions screens of hotel-room televisions; (h) on display screens inside elevators; and so on. Data or representations of data (e.g., graphs, tables, etc.) may be printed on paper or other materials, and may be distributed or otherwise made available. Data may be printed on restaurant menus. For example, a restaurant menu may feature the name of the primary player who won the most consecutive games of blackjack during the day. Data may be posted on signs located above gaming devices. For example, a sign above a gaming device may indicate that the gaming device has paid out more than $2000 in the past 24 hours. Data may be displayed on signs located above banks of gaming devices. For example, above a bank of gaming devices, a sign may indicate the name of the player who has had the best record of winnings at the bank of gaming devices within the past 24 hours.

In various embodiments, data gathered or recorded may be made available on a network, such as on the Internet. A person may access the data by going to a particular address on the network, such as to a particular Uniform Resource Locator (URL) address. The address may contain data viewable in a particular format, such as in HTML format. The data may be accessible by an Internet browser, such as via Internet Explorer®. In various embodiments, data may be accessible through various links. Each link may lead to a different address on the network. A given link may provide access to data of a certain type. For example, a given link may lead to data about individual players' performances. Another link might provide access to data about the performances of gaming devices. Another link might provide access to data about the performance of a dealer. In various embodiments, a first link might lead to data gathered at a first casino (e.g., data about games at the first casino) and a second link might lead to data gathered at a second casino.

In various embodiments, a casino that is associated with a hotel might transmit gaming data over one or more television channels. For example, a channel on a cable television system might be devoted to providing or displaying casino data. In some embodiments, a first channel might be devoted to a first type of data, a second channel to a second type of data, and so on. For example, a first channel might display data about the outcomes generated at a set of blackjack tables. A second channel might display data bout the outcomes generated at a set of roulette tables.

In various embodiments, data may be displayed with a certain prominence if the data is of a certain level of significance. For example, a casino may contain a large sign in a central location that is widely visible throughout the casino. The sign may be used to display only the most significant data. For example, the sign may display the last ten people to have won more than $1000. The casino may contain further signs in less prominent locations. For example a digital sign may be visible only in the general area of a particular bank of slot machines. The sign may display the names of the last ten players to win more than $100 at the bank of slot machines. Thus, in various embodiments, data may be displayed at a particular location if the data has been gathered in the vicinity, such as at nearby gaming devices or table games.

In various embodiments, deductions or conclusions based on data may be displayed. For example, suppose that during the last 15 minutes, blackjack players across a casino have won 60% of the blackjack games played. The deduction may be made that blackjack players in general are on a hot streak. Thus, a message may be displayed (e.g., on a sign; e.g., on the screen of a mobile device; e.g., on the screen of a terminal)

that blackjack players are hot. Examples of other messages include, "Dealer Joe Smith is dealing great hands tonight", "Sue Baker is having the night of her life", "Red is the in color at roulette", "Billy Bob just won a doozy of a jackpot at slots", "Sue Smith is going home rich tonight", and so on.

In various embodiments, data may be printed on pamphlets, receipts, or other paper document or material. A player or other person may desire a certain type of data. For example, a player may wish to have a record of his own outcomes for a period of time. For example, a player may wish to have a record of all the hands of video poker he has been dealt throughout the day. Accordingly, the player may request such a record. For example, the player might go to a casino cage and provide identification (e.g., in the form of a player tracking card). The casino cage may access data stored about the player on the casino server. The casino may then print out data about the player's outcomes from the day. The casino may then provide the player with the records. In various embodiments, a first person might wish to have a record of data about one or more other people. For example, the person might want a pamphlet showing the results of the top 100 players at the casino for the day. The pamphlet might show a name or alias of each of the 100 people together with an amount won by each person. In various embodiments, a person might want a record about a particular machine, a particular dealer, a particular sector of a casino, a particular gaming table, or a particular group of people. The record may contain data about the requested people, device, or entity, such data including outcomes achieved, winnings, losses, number of games won in a row, number of games lost in a row, strategy used, and so on.

In various embodiments, an alert may be generated based on events or outcomes that occur in a game or at a casino. For example, a secondary player may wish to be alerted when any primary player has won more than 5 games in a row at a slot machine. Accordingly, the casino server, the device of the secondary player (e.g., a mobile gaming device), or any other device, may track data as it is received (e.g., from gaming devices). The casino server may process the data and determine whether alert criteria have been met. For example, the casino server may determine whether a win for a primary player constitutes a fifth consecutive win by examining data from the most recent game of the primary player plus data from the four prior games of the primary player. If all of the games were winning games for the primary player, then the casino server may generate an alert for the secondary player. An alert may take the form of a message transmitted to a secondary player. For example, a text message may pop up on the screen of a mobile gaming device of the secondary player. An alert may also be displayed or broadcast for a wider audience. For example, an alert may be broadcast on an electronic sign hanging in a casino. An alert may also be broadcast over radio or other channel for audio broadcasts.

Trends

In various embodiments, a trend may comprise a set of games or outcomes that have a common characteristic and which occur proximate in time and/or which occur consecutively. Common characteristics of outcomes may include: (a) the outcomes are all the same; (b) the outcomes have one or more common symbols; (c) the outcomes have the same associated payout; (d) the outcomes have a positive associated payout; (d) the outcome all have a payout above a certain level (e.g., above 10 units); (e) the outcomes all lead to bonus rounds; (f) the outcomes are all losing outcomes; (g) the outcomes are all winning outcomes; (h) the outcomes are all near-misses; and so on. Common characteristics of games may include: (a) the games have the same outcome; (b) the games have the same payout; (c) the games have a common intermediate outcome (e.g., games of video poker all start out with three cards to a flush); (d) the games all have winning payouts; (e) the games all have losing payouts; (f) the games each contain multiple winning outcomes; (g) the games all reached bonus rounds; (h) the games were all near-misses, and so on.

In various embodiments, a player may bet that a trend will continue. A player may bet that an outcome which will be generated in the future will share a common characteristic with a set of outcomes that had been generated in the past. For example, a player may bet that the same outcome which has occurred in the last five games at a craps table (e.g., the pass line has won) will occur in the sixth game. For example, a player may bet that a point total that a dealer has achieved in the last 5 games of blackjack (e.g., a point total of 18) will be achieved by a dealer in the next game of blackjack. In various embodiments, a player may bet that a trend will continue for a particular length of time. For example, a player may bet that a trend will continue for three more games. A player may bet on the exact number of games for which a trend will continue. For example, a player may bet that a trend will continue for the next two games before the trend is broken. A player may bet on a minimum number of games for which a trend will continue. For example, a player may bet that a trend will continue for a minimum of the next five games. A player may also bet on the maximum number of games that a trend will continue. For example, a player may bet that a trend will continue for no more than 3 games. In various embodiments, a player may bet that a trend will not continue. The player may bet that an outcome which will be generated in the future will not share a common characteristic with a set of outcomes that had been generated in the past.

In various embodiments, a player may bet on the continuance or discontinuance of a trend that had occurred in the past. For example, a secondary player may find a series of consecutive games of roulette played by a primary player in which the outcome was red for 10 consecutive games. The secondary player may not be informed of the results of the game following the 10 consecutive games of red. However, the results of the $11^{th}$ game may be on record (e.g., in a memory of the casino server). The secondary player may then place a bet on the continuance of the trend. For example, the secondary player may place a bet that the $11^{th}$ game also resulted in a red outcome. For example, the secondary player may place a bet that the next five games also resulted in a red outcome. The secondary player may also bet on the discontinuance of the trend. For example, the secondary player may bet that the $11^{th}$ game would not result in a red outcome.

In various embodiments, a trend may describe a number of consecutive wins or a number of consecutive losses. The consecutive wins or losses may represent those of a player, those of a dealer, those of a particular gaming device and/or those of a particular type of game. For example, a statistic may describe the number of consecutive games that have been won at a particular slot machine, regardless of who has played those games. For example, a statistic may describe the number of consecutive games that a dealer has won at a blackjack table. A player, such as a secondary player, may bet on the continuance or the discontinuance of a trend of consecutive winnings and losses. For example, a secondary player may bet that a primary player who has just lost 10 games in a row will lose the $11^{th}$ game in a row. For example, a secondary player may bet that a craps game will end up with the pass-line bet losing even though the pass-line bet has won for the past 10 games.

In various embodiments, a trend may describe a regular pattern of characteristics among a series of outcomes. The pattern of characteristics need not be such that each outcome has the same characteristic. Rather, the pattern may indicate a regularly varying set of characteristics. For example, a trend may consist of a series of outcomes at a roulette wheel such that every second outcome is a red outcome, and every outcome between red outcomes is a black outcome. In other words, the trend represents a pattern whereby after each red outcome a black outcome occurs, and after each black outcome a red outcome occurs. A player, such as a secondary player, may bet on the continuance of such a trend. For example, if the most recent outcome has been a red outcome, then the player may bet that the next outcome will be a black outcome. A player may bet that such a trend will continue for multiple outcomes. For example, a player may bet that outcomes will alternate between red and black for the next 10 consecutive outcomes.

In various embodiments, a trend may include any pattern. A player may bet on the continuance or discontinuance of any pattern. The player may bet that a pattern will continue for any number of games in the future, or that the pattern will discontinue at a designated point in the future. A payout provided to a player who has bet correctly may depend on the nature of the pattern and on the number of games or outcomes into the future that the player has bet the pattern will continue. For example, a winning player who has bet that a pattern will continue relatively far into the future may receive a higher payout than does a player who has bet that a pattern will continue one or only a few games into the future. For example, if each outcome that would continue a pattern is a relatively rare outcome (e.g., the player has bet that a pattern of green outcomes occurring will continue at a roulette wheel), then the player may receive a larger payout than does a player who bets on the continuation of a pattern with relatively common outcomes (e.g., a pattern of blackjack games where the dealer wins).

In various embodiments, a secondary player may bet on a trend or pattern in the winnings of a primary player. For example, a secondary player may bet that a primary player will have positive net winnings for each of the next four five-minute periods. The primary player may have achieved positive net winnings for the prior 10 five-minute periods, or the secondary player may simply be betting on a new trend occurring. In various embodiments, a secondary player may bet on a trend in a primary player's balance or bankroll. For example, a secondary player may bet that a primary player's bankroll will increase in every ten minute period for the next hour. In various embodiments, a secondary player may bet on a see-saw trend in the winnings or in the bankroll of a primary player. For example, a secondary player may bet that the bankroll of a primary player will increase in the next five-minute period, decrease in the following five-minute period, then increase in the following five-minute period, and so on. In various embodiments, a secondary player may bet that the bankroll of a primary player (or the bankroll of another secondary player) will reach certain points, one after the other. There may, however, be no particular designated time period when the bankroll has to reach the points. For example, a secondary player may bet that the bankroll of a primary player will reach 100, then will reach 50, then will reach 150, then will reach 25, then will reach 155, and so on. The secondary player may win if the primary player's bankroll reaches those points in order. However, the secondary player may lose his bet if the bankroll of the primary player reaches the points out of order. For example, the secondary player may lose his bet if the primary player's bankroll reaches 155 before it reaches 25. Embodiments described herein with respect to a bankroll may also apply to a balance at a gaming device, to an amount of chips at a gaming table, to an amount of net winnings, and so on. For example, a secondary player may bet that the net winnings of a primary player will reach a first point, followed by a second point, followed by a third point, and so on.

Sports

In various embodiments, data may be gathered for sports. For example, data may include a sports score, a number of yards rushed by a particular player in a game of football, a number of runs hit by a particular baseball player, a number of aces served by a tennis player, a number under par achieved by a golf player, and so on. Data may be aggregated over various games. For example, the total runs hit by any player in major league baseball during a particular day may be added up and may define the value of a statistic. A secondary player may bet on values of the statistic. Other exemplary data may include the number of punches connected in a boxing match, the number or three-pointers shot in a game of basketball, the number of collisions in a car race, and so on.

Secondary Player Chooses a Characteristic of a Game

In various embodiments, a secondary player may designate a category for a game of a primary player in which to participate, such that a game falling into the category has certain characteristics. The game may be a game with a certain beginning state. The game may be a game for which certain resolutions have occurred for events in the game. In some embodiments, a secondary player may designate a particular starting hand or category of starting hand in a game of video poker. For example, a secondary player may designate a hand that includes three cards of the same rank. Accordingly, the casino server may search for a game of a primary player which has featured a starting hand with three cards of the same rank. In some embodiments, the secondary player may designate a particular starting point total in a game of blackjack. Accordingly, the casino server may search for a game of a primary player which has featured a starting hand with the particular starting point total. For example, a secondary player may designate a particular dealer up-card in a game of blackjack. Accordingly, the casino server may search for a game of a primary player in which the designated dealer up-card has been dealt. In some embodiments, a secondary player may designate a category of game at a slot machine in which a "cherry" symbol has occurred on the first reel of the slot machine. Accordingly, the casino server may search for a game of a primary player in which a "cherry" symbol has occurred on the first reel of the slot machine. In various embodiments, a secondary player may place a constraint on games in which he wishes to participate. The casino server may then find one or more games for the secondary player meeting such constraints. In some embodiments, the secondary player may place a constraint such that the primary player has won at least X amount in the game. In some embodiments, the secondary player may place a constraint on the game such that the primary player has received a particular card in the game. As will be appreciated, many other constraints may be placed on the game.

Adjusting Game Rules for a Game that has been Chosen for a Particular Characteristic In various embodiments, a category of game that a secondary player has designated may have an increased likelihood of ending with a particular outcome than does a game chosen purely at random. In various embodiments, a category of game that a secondary player has designated may have an increased likelihood of ending with a particular outcome than does a game started from scratch. For example, if a secondary player indicates a desire to participate in a slot machine game where the first symbol is "cherry", then the secondary player may be more likely to finish the game with a winning outcome than he would be had he participated in a game started from scratch. For example, if a secondary player indicates a desire to participate in a video poker game where the initial hand contains three cards of the same rank, then the secondary player is guaranteed, if he so desires, to finish the game with three-of-a-kind.

Thus, in various embodiments, when a secondary player has the opportunity to participate in a certain category of game designated by the secondary player, the secondary player may derive an increased advantage in the game, all else being equal. For example, the secondary player may assure that he will participate in a winning game by designating a category of game that will always be winning. In various embodiments, the house may alter a game chosen according to a secondary player's designation in such a way as to increase the house advantage in the game. The house may alter the game in such a way as to provide the house with an equal or approximately equal advantage to what the house would have had if a game had been started from scratch. For example, if the house normally has an advantage of 5% in a slot machine game, and a secondary player chooses to play a particular game in which a "cherry" symbol will occur on the first reel, then the house may alter the probabilities of various subsequent symbols, payouts associated with one or more outcomes, or required bet amounts in such a way as to maintain the house advantage for the game near 5%.

In some embodiments, a secondary player may choose a constraint on a game. For example, a secondary player may apply a constraint on a game such that the game must be a game of blackjack in which the initial hand has a point total of 11. The house may make an alteration to the game such that the probabilities of various outcomes of the games shift in the favor of the house. For example, in the aforementioned example of a blackjack game in which the initial primary player hand has a point total of 11, the house may alter the remaining portion of the deck of cards by removing all ten-valued cards. This may shift the advantage towards the house (though not necessarily make the house the favorite) because it would lessen the player's chance of achieving 21 points and would also lessen the dealer's chance of busting. Thus, the house may have made an alteration to the game that decreases the player's chance of achieving a particular outcome or category of outcome. At the same time, the alteration may increase the player's chance of achieving a particular outcome or category of outcome (e.g., a hand with less than a 21 point total). In various embodiments, the house may make an alteration to a game in order to increase or decrease the probability of one or more outcomes. In various embodiments, the house may alter a probability directly (e.g., by changing probabilities used in a random number generator used to create game outcomes), or may make an alteration which has the effect of altering a probability of an outcome (e.g., the house adds or removes cards from a deck of cards which has the effect of changing the probability of an outcome).

In some embodiments, a payout associated with an outcome may change. For example, suppose a secondary player indicates a desire to participate in a game in which the point total for the primary player's initial hand was 11. In response, the house may reduce the payout associated with a player win. Rather than paying $10, for example, a winning outcome may only pay $10.

In some embodiments, a required bet amount may change. For example, suppose a secondary player wishes to participate in a slot machine game in which the first two symbols are "bell" symbols. Rather than requiring the secondary player to bet $1, as might be typical for the game, the house may require the secondary player to bet $5. Meanwhile, the payouts may not change vis-à-vis a game in which the secondary player set no particular constraint.

In some embodiments, a rule of the game may change. For example, a secondary player wishes to participate in a game of blackjack in which the dealer begins with a point total of 13. A rule may change which allows the dealer to make any decision at any time, including hitting with an 18 if a player has a 19. By changing a rule of a game, the house may effectively alter the probabilities of one or more outcomes.

In some embodiments, a payout ratio may change. For example, a particular outcome may pay 5 to 1 given a constraint imposed by a secondary player, whereas ordinarily the same outcome might pay 20 to 1.

In various embodiments, changes made to rules, probabilities, payouts, and payout ratios may favor the player. For example, the secondary player may apply a constraint to a game which is unfavorable to the secondary player. For example, the secondary player may indicate a desire to participate in a game of blackjack where he begins with a point total of 15, with no aces. Such a starting hand is considered a bad hand and significantly lowers the secondary player's chances of winning. According, for example, a payout associated with a player win may be increased so as to compensate the secondary player for the disadvantageous starting hand.

In various embodiments, a secondary player may indicate desired odds for achieving one or more outcomes in a game. In various embodiments, a secondary player may indicate desired odds for achieving any of a set of outcomes, such as desired odds for achieving any winning outcome. For example, a secondary player may indicate that he wants his odds of achieving a winning outcome to be 1:2, i.e., he wishes to achieve one winning outcome for every two losing outcomes, on average. The casino may accordingly select a set of games of a primary player such that within the set of games, there is one winning game for every two losing games. The casino may then randomly select a game from among the set of games and allow the secondary player to participate in the selected game. In various embodiments, the casino may adjust or determine a payout of an outcome of a game in response to the secondary player selecting the odds for an outcome of the game. Note that the payout adjustment need not necessarily occur for the same outcome for which the secondary player has selected odds. For example, the secondary player may indicate desired odds for a first outcome and the casino may adjust the payout for a second outcome. In various embodiments, the casino may adjust the payout for one or more outcomes so as to counteract the advantage that the secondary player may obtain from selecting the odds of an outcome. For example, if the secondary player indicates desired odds for achieving an outcome, where such odds are greater than the standard or typical odds of achieving such outcome, then the casino may reduce a payout for one or more outcomes from what the typical payout would be. If a secondary player indicates desired odds for an outcome, where such odds work to the secondary player's disadvantage (e.g., the secondary player has indicated desired odds for a winning outcome that are less than the typical odds for the winning outcome) then the casino may change a payout associated with one or more outcomes in the secondary player's favor, e.g., the casino may increase one or more payouts. In some embodiments, the casino may adjust one or more payouts so as to maintain a constant or near constant house advantage. For example, the casino may change payouts so as to assure that the house advantage after adjustments in the odds of an outcome and in payouts is nearly the same as the house advantage was before the adjustments in odds and payouts. In some embodiments, if the secondary player indicates a desire for increased odds of a first outcome, then the casino may decrease the odds of a second outcome. For example, the casino may find a set of games of a primary player in which the first outcome occurs more than usual, but in which the second outcome occurs less than usual. The casino may then select a game at random from the set of games so as to allow the secondary player to participate. It will be appreciated that in the embodiments described herein, the secondary player could just as readily indicate a desired probability for one or more outcomes instead of indicating desired odds. It will be appreciated that a simple mathematical transformation can transform odds into probabilities, and vice versa.

In various embodiments, a secondary player may indicate desired payout for an outcome. For example, the secondary player may indicate a desire for a payout that is greater than the payout ordinarily associated with the outcome. Accordingly, the casino may adjust the probability of the outcome occurring. For example, the casino may reduce the probability of the outcome occurring. In various embodiments, the casino may reduce the probability of an outcome by selecting a pool of games of one or more primary players in which the outcome has occurred less frequently than would ordinarily be expected. The casino may then select a game at random from among the pool of games and allow the secondary player to participate in the selected game. In various embodiments, the casino may adjust the probability of an outcome that is different from the outcome whose payout the secondary player has asked to be adjusted. For example, the secondary player may indicate that he wishes to increase the payout for a first outcome. The casino may then adjust the probability of a second outcome. The second outcome may be a winning outcome. In various embodiments, the casino may make an adjustment to the probability of occurrence of one or more outcomes so as to counteract adjustments made to payouts in the secondary player's favor. In various embodiments, the casino seeks to maintain the same or nearly the same house advantage before and after any adjustments made by the secondary player and the house. For example, if a house advantage is ordinarily 5% for a game, then the house may seek to counteract any adjustments made to payouts by the secondary player so as to maintain the house advantage for the game at 5%.

In various embodiments, a secondary player may set a payout, a probability, and/or odds using a dial. The dial may allow the secondary player to adjust a setting along a continuum or near continuum by turning the dial to the appropriate degree. The secondary player might also use a scroll bar, a mouse, an arrow key, or any other input device in order to indicate a setting. In response to the secondary player adjusting a first setting, the house may adjust a second setting so as, for example, to maintain a constant house advantage. The house may adjust a setting for a probability by selecting an appropriate pool of games of a primary player such that a frequency of occurrence of one or more outcomes is equal to a desired frequency. The house may adjust a payout by simply providing a different payout than is typical in the event of the occurrence of a particular outcome.

In various embodiments, the house may change the odds of one or more outcomes by altering the composition of a deck of cards. For example, the house may add or remove cards from a deck of cards. In some embodiments, a secondary player may designate a particular category of starting hand of a game. For example, in a game of blackjack, a secondary player may indicate a desire to start with a point total of 18. The house may adjust the composition of the unused portion of the deck in response. For example, the house may add cards with rank three to the deck in order to lessen the dealer's chances of busting.

In some embodiments, a secondary player may indicate a desired starting hand for both the secondary player and for the dealer. For example, the secondary player may indicate a starting point total for the secondary player and the secondary player may indicate a particular up-card for the dealer. In some embodiments, the secondary player may indicate a starting hand for the secondary player and a complete starting hand for the dealer. In some embodiments, the secondary player may indicate a starting hand plus an additional card for the secondary player. For example, the secondary player may indicate a starting hand with two nines plus an additional card of a 10 (e.g., after the secondary has split his initial two cards). In some embodiments, a secondary player may indicate a starting hand for the dealer plus an additional card. In some embodiments, a secondary player may indicate any sequence of initial cards for the primary player and/or any sequence of initial cards for the dealer. The secondary player may specify a point total, a number of cards, the ranks of cards, particular cards (e.g., both rank and suit) and so on. For any indications provided by the secondary player, the casino may search for a game of a primary player that suits the indications. For example, if the secondary player has indicated a desire to participate in a game where a primary player has a starting point total of 18, then the house may search for a game of a primary player with the starting point total of 18.

Records of Performance

In various embodiments, a viewable record may be created for a primary player. The record may include historical performance metrics for the primary player. The record may constitute a profit and loss statement for the primary player. The record may include an indication of an amount won by the primary player over a certain period of time. The record may include an indication of an amount lost by the primary player over a certain period of time. The record may include an indication of a total amount wagered by the primary player over a certain period of time. The time period covered by the record may be: (a) a particular hour; (b) a particular day; (c) a particular week; (d) a particular weekend; (e) the duration of a primary player's stay at a casino; (f) the duration of a primary player's play session at a casino; (g) the duration of a primary player's session at a particular gaming device; and so on. The record may include a breakdown of performance metrics into various categories. The record may show performance metrics by time period, by wager amount, by gaming device, by dealer, by casino, by type of gaming device (e.g., reel slot machine versus video slot machine), or by any other category. For example, the record may include a first set of data describing the primary player's winnings at blackjack during the last day, a second set of data describing the primary player's winnings at video poker during the last day, a third set of data describing the primary player's winnings at roulette during the last day, and so on. In some embodiments, the record may include a listing of individual games played by a primary player (e.g., all games played by the primary player). The listing may include data associated with each game, including an amount wagered, an amount won, an amount lost, an outcome received, a time of the game, a decision made, an initial hand received in the game, a final hand received in the game, an action by a dealer, a hand of an opponent, a decision of an opponent, an amount raised, and so on. The listing may segregate games into different categories.

For example, data about all games played at a slot machine may be listed together, while data about all games played at a table game may be listed together.

The record for a primary player may be viewable by the primary player. For example, the primary player may be able to call up a view of the record on the screen of any gaming device, any terminal, any mobile device, any Internet connected device, and so on. The record may be printable, for example, onto a cashless gaming ticket. In some embodiments, the record for a primary player may be viewable by a secondary player. For example, the secondary player may search for the name of a primary player and then view the record for the primary player.

In various embodiments, a primary player may specify limits. The limits may be visible in the record of the primary player. A limit may include a stop limit. The limit may force or encourage the primary player to stop playing if certain criteria are met. For example, the limit may encourage the primary player to stop playing if he has lost $100. In various embodiments, an alert may be sent to a primary player once performance metrics of the primary player meet certain criteria. For example, an alert might be sent to the primary player once the primary player has accumulated winnings of $500. The alert may tell the primary player that he wanted to stop playing once his winnings reached $500.

In some embodiments, a secondary player may receive an alert based on the performance of a primary player. For example, the secondary player may receive an alert when a primary player has won 10 games in a row, when a primary player has lost 10 games in a row, when a primary player's fortunes have swung back and forth three times between winnings and losses, and/or when any other condition has been met. In various embodiments, a secondary player may specify an alert condition. The secondary player may then be alerted if the alert condition is met. For example, once a primary player satisfies an alert condition, the secondary player may be alerted that the primary player has satisfied the secondary player's alert condition. The secondary player may then be given the opportunity to participate in the next game of the primary player. A secondary player may be alerted if a primary player has just won a large payout, if the primary player has won a designated number of large payouts in a particular period of time, if the primary player has won more than a certain amount in the prior hour, and so on. A secondary player may be alerted if a primary player has lost more than a certain amount in the last hour, if the secondary player has had more than 90% of his outcomes be losing outcomes in the last 30 minutes, if the primary player has just had a near miss, and so on.

Data from One Game Used in Another

Various embodiments describe the use of data in a gaming context, such as in the context of casino gaming, mobile gaming, charity bingo, or on-line gaming. In various embodiments, data generated in a first game may be used in a second game. For example, a set of data may be generated in a first game. The set of data may be used to determine an outcome of the first game. The same set of data may also be used to determine an outcome of a second game. For example, in a game of blackjack, 14 cards may be dealt. Data indicating the ranks and suits of the 14 cards may be recorded. Such data may later be used to conduct a game of video poker. In conducting the game of video poker, data about a first 5 of the 14 cards may be presented to a player, leaving 9 cards remaining. The player may select 3 discards, after which data about 3 replacement cards may be presented to the player from the data about the 9 cards remaining. In various embodiments, data in a first game may be generated through physical means. Generation of data through physical means may include generating data through a process that is not solely based on the manipulation of electrons and photons. The generation of data through physical means may include the generating an outcome at a roulette wheel, the dealing of one or more cards from a deck of cards, the rolling of a die, or any other physical or partly physical process. The generation of data through physical means may include the generation of a roulette outcome through the manual spinning of a roulette wheel, e.g., by a casino employee. The generation of data through physical means may include the generation of a roulette outcome through the automatic spinning of a roulette wheel, e.g., by computer controlled motors. The generation of data through physical means may include the rolling of dice by a human, such as a craps player. The generation of data through physical means may include the rolling of dice automatically, e.g., through the motorized spinning of a transparent enclosure containing dice.

In various embodiments, the outcomes and/or the resolutions of events in a first game may be used as inputs for generating outcomes and or resolutions of events in a second game. For example, the outcomes and/or resolutions of events in a first game may serve as random numbers for use in an algorithm for generating outcomes and/or resolutions in a second game. In some embodiments, the outcomes and/or resolutions of events in a first game may be directly used as outcomes or resolutions in a second game (e.g., without any further transformations). In various embodiments, a first game may include a game of a player or a game that has been conducted automatically (e.g., without participation by any player). In various embodiments, a first game may include a game where outcomes or resolutions have been generated through physical processes (e.g., as opposed to electronic processes). For example, the first game may include outcomes or resolutions that have been generated through a roll of dice, through a spin of a roulette wheel, through the dealing of cards, or through any other physical process.

Readers

Data may be recorded from a first game in various ways. In some embodiments, a human may manually enter data from a game. For example, a casino employee may use a key board to key in the numbers 4 and 3, representing the numbers rolled on two dice in a game of craps. In some embodiments, a sensor or reader may detect and record data from a game. A roulette reader may detect and record the spaces in which a roulette ball has landed following a spin of a roulette wheel. An exemplary roulette sensing apparatus is described in U.S. Pat. No. 4,396,193 to Reinhardt, et al., entitled "Roulette wheel directional sensing apparatus". U.S. Pat. No. 4,396,193 is hereby incorporated by reference. A card shoe may be equipped with sensors and/or algorithms for reading cards dealt from the shoe and determining data about the cards, such as rank and suit. An exemplary such card shoe is described in U.S. Pat. No. 7,029,009 to Grauzer, et al., entitled "Playing card dealing shoe with automated internal card feeding and card reading". U.S. Pat. No. 7,029,009 is hereby incorporated by reference. In various embodiments, a camera may capture images of a game being played. Data may be extracted from such images, including data about cards dealt, data about rolls of dice, and data about a number generated at a roulette wheel. Such data may be extracted using image processing algorithms, for example. U.S. Pat. No. 4,531,187 to Uhland, entitled "Game monitoring apparatus" describes a "means for optically monitoring the cards played" in a game. U.S. Pat. No. 4,531,187 is hereby incorporated by reference.

Camera

In various embodiments, a camera may record footage of a first game being played. For example, a camera may record footage of dice being rolled, of cards being dealt, of a roulette wheel being spun, and so on. In various embodiments, the footage may be stored. In various embodiments, the footage may be stored in association with one or more tags or other data, including a date during which the filmed game was played, a time during which the game was played, a game identifier, an identifier for a player in the game (e.g., a player's name), an identifier for a dealer in the game, a location of the game, a casino in which the game was played, an indication of the type of game being played (e.g., blackjack; e.g.; craps), and so on. Subsequent to the video footage being recorded, a player involved in a second game may indicate a desire to see the video footage. The player in the second game may be involved in a game that uses data from the game depicted in the video footage. For example, the player involved in the second game may be involved in a game of video poker that uses the same cards originally dealt in a game of blackjack. The player may desire to see film footage of the game of blackjack. The player may desire to see the film footage so as to verify that the cards dealt in the game of blackjack, which are the same cards now being used in his own game, were dealt fairly. Any tags stored in association with the video footage may aid the house or casino in retrieving the video footage upon a player's request. For example, data used in a second game may be tagged with an identifier of a first game. A player in the second game may request to see video footage of how that data was generated in the first game. Accordingly, a casino may search for video footage that is stored in association with the identifier. Any such video footage may then be retrieved and shown to the player in the second game.

Skins

In various embodiments, data generated in a first game may be used in a second game. One or more algorithms may be used to transform the data from the first game into data suitable for use in the second game. For example, data from a first game may include number in a first range. Data suitable for use in a second game may include numbers in a second range. Accordingly, for example, data from the first range may be mapped to the second range using a mathematical transformation, such as multiplication or division by a constant. For example, data from a first game may include data about cards dealt in the first game (e.g., the first game is game of blackjack). Such data may take the form of numbers, where the numbers 1 through 52 each represent a different card in a standard deck of 52 cards. Data required for the second game may include numerical data in the range of 1 to 6, since the second game may be a dice game (e.g., craps). Accordingly, data from the range of 1 to 52 may be mapped to data in the range of 1 to 6. The mapping may occur as follows. It will be appreciated that many other mappings are possible. A number from 1 to 52 is completely discarded if the number is 49, 50, 51, or 52. If a number is discarded, a second number is then used (e.g., a number representing a different card that was dealt in the first game). If a number is not discarded, the number is divided by eight and the result is rounded up to the nearest integer. Thus, the number 1 will map to the number 1, the number 2 will map to the number 1, the number 8 will map to the number 1, the number 9 will map to the number 2, the number 17 will map to the number 3, and the number 48 will map to the number 6. A mapping has thus been accomplished from a game of cards to a game of dice. Two or more cards may be used from the game of cards (more than two cards may be needed if one of the cards is represented by a number greater than 48) to conduct a roll of dice in a game of craps.

Once data suitable for use in the second game is obtained, an appropriate skin may be used with the second game. The skin may include graphics and play patterns that make the second game more familiar to the player of the second game. For example, once data has been generated which includes numbers between 1 and 6, the casino (or a device of the casino, such as a gaming device) may be used to graphically render the generation of outcomes that corresponds to the data. For example, if numbers 3 and 6 have been generated as data suitable for a second game, the casino may show graphical depictions of the numbers 3 and 6 being rolled on a pair of dice. Thus, the player may engage in a game of craps.

Note that in various embodiments, data used in a second game may be based on data that has been derived from a first game which was played in the past. Thus, the outcome of the second game may be pre-determined, in some sense. However, since the player of the second game may not be familiar with the first game, or since the player may not be familiar with the algorithm used to transform data from the first game into data used in the second game, the player may be unable to take advantage of advanced knowledge of the outcome of the second game.

In various embodiments, data generated in a first game may be used in a second game that is played on a gaming device. The gaming device may be a slot machine, video poker machine, video bingo machine, mobile gaming device (e.g., a mobile gaming device as defined by Nevada bill AB 471), and so on. In various embodiments, data generated in a first game may be used in a second game that is played over a network. Data generated in a first game may be used in Internet gaming, such as in conducting a second game at an on-line casino. Similarly, video footage from the first game may be available for a player who participates in the second game at the on-line casino. By viewing the video footage, the player may become more confident that the data being used in the second game was generated fairly.

Auditing the Data Generated in the First Game

In various embodiments, data generated at a first game or a first series of games may be tested or audited to provide verification that the data is fair. In various embodiments, a test may be performed to verify that the data conforms to some statistical distribution. The statistical distribution may be a distribution that is generally thought to govern in the one or more random processes used to generate the data. For example, a set of data may include data about 10,000 outcomes generated at one of a group of roulette wheels, each roulette wheel having 38 spaces. An applicable statistical distribution may predict that each possible outcome of the roulette wheel would occur approximately once every 38 outcomes, or approximately 263 times out of the data set of 10,000 outcomes. Thus, a test of the data about the 10,000 outcomes might test that each of the 38 possible outcomes of a roulette wheel occurred approximately 263 times out of the 10,000 outcomes. The tests may allow for some deviation. For example, it may be considered acceptable for an outcome to occur from 213 to 313 times. However, if an outcome occurs a number of times that is not between 213 and 313, then the data may be considered suspicious. Data may be required to pass one or more tests, such as tests of statistical distribution, before the data will be permitted to be used in a second game.

The invention claimed is:

1. A method comprising:
  determining, by a computer system configured to perform actions related to gaming activities, a respective performance metric for each of a first plurality of players, in which each performance metric relates to play of a plurality of respective casino games;

determining, by the computer system, based on the performance metrics determined for each of the first plurality of players, a first player of the first plurality of players who has the highest performance metric;

receiving, by the computer system, a first bet from a third player;

determining, by the computer system, that the first bet should be placed on the first player based on the determination that the first player has the highest performance metric;

determining, by the computer system, a first outcome of a game played by the first player;

providing, by the computer system, a payment to the third player based on the first bet and based on the first outcome;

determining, by the computer system, a respective second performance metric for each of a second plurality of players, wherein the second performance metric for each of the second plurality of players is determined after payment has been provided to the third player based on the first bet, and in which the second plurality of players includes at least some players from the first plurality of players that have played a game in a period of time before determining the second performance metric;

determining, by the computer system, based on the second performance metrics determined for each of the second plurality of players, a second player of the second plurality of players who has the highest second performance metric;

receiving, by the computer system, a second bet from the third player;

determining that the second bet is associated with the second player based on the determination that the second player has the highest second performance metric;

determining, by the computer system, a second outcome, wherein the outcome is an outcome of a second game played by the second player; and providing, by the computer system, a payment to the third player based on the second bet and based on the second outcome.

2. An apparatus comprising:

a non-transitory memory which stores a program, the program programmed to cause a computer processor to offering a betting opportunity to a second player, in which the betting opportunity includes a wager related to a game played by another player that has not been identified at the time when the offering is made;

evaluate performance metrics determined based on past performance for each of a plurality of players, select a first player from among the plurality, in which the selected first player is selected based on having the highest performance metric;

receive a bet from the second player, in which the bet is a response to the betting opportunity and does not identify the first player;

place the bet on the first player on behalf of the second player;

providing a payment to the second player based at least in part on the bet and the outcome of a future game played by the first player.

3. The apparatus of claim 2, in which receiving the bet includes receiving an indication from the second player of a desire to participate in a game of the highest performing player from among the plurality of players.

4. The apparatus of claim 3, in which receiving the bet includes receiving an indication from the second player of a desire to have the computer processor select the highest performing player from among the plurality of players to be associated with the bet.

5. The apparatus of claim 2, wherein:
the plurality of players includes all players who have played games in a casino within the last minute.

6. The apparatus of claim 2, wherein the performance metric is at least one of:
a gross amount won;
a net amount won;
a number of consecutive wins;
a skill level; and
a largest payout won.

7. The apparatus of claim 6, wherein the performance metric includes at least the gross amount won.

8. The apparatus of claim 6, wherein the performance metric includes at least the net amount won.

9. The apparatus of claim 6, wherein the performance metric includes at least the number of consecutive wins.

10. The apparatus of claim 6, wherein the performance metric includes at least the skill level.

11. The apparatus of claim 6, wherein the performance metric includes at least the largest payout won.

12. The apparatus of claim 6, wherein providing the payout further comprises:
providing a non-zero payment to the second player if the first player's outcome is a winning outcome; and
providing a payment of zero to the second player if the first player's outcome is a losing outcome.

13. The method of claim 1, in which the respective casino games include at least one of a game of blackjack, a game of video poker, and a game played at a particular type of electronic gaming machine.

14. The method of claim 1, in which the plurality of respective casino games includes a plurality of respective casino games played by the respective player in a desired time period.

15. The method of claim 14, in which the time period includes an hour.

16. The method of claim 1, in which the plurality of respective casino games includes different types of games.

17. The method of claim 1, comprising determining a random time interval; and determining the second player when the random time interval has passed after determining the first player.

18. The method of claim 1, in which each performance metric includes a measure of how well a respective player uses a particular strategy.

19. The method of claim 1, in which each performance metric includes a net amount won.

20. The method of claim 1, in which each performance metric includes a largest payout won.

21. The method of claim 1, in which each performance metric includes a number of consecutive wins.

22. The apparatus of claim 2, in which the respective casino games include at least one of a game of blackjack, a game of video poker, and a game played at a particular type of electronic gaming machine.

23. The apparatus of claim 2, in which the respective casino games includes different types of games.

24. The apparatus of claim 2, in which the performance metrics include respective measures of how well each player uses a particular strategy.

25. The apparatus of claim 24, in which the measure of how well a respective player uses the particular strategy includes an indication of how often a player's decisions diverges from the particular strategy.

26. The apparatus of claim 24, in which the particular strategy includes an ideal strategy.

27. The method of claim 2, in which the performance metrics include measures of performance at a plurality of games played by the players in a desired time period.

28. The method of claim 27, in which the time period includes an hour.

29. The method of claim 1, in which the program includes
determining that the at least some of the first plurality of players are active players when the second performance metrics are determined; and including the at least some of the first plurality of players in the second plurality of players based on the determination that the at least some are active players.

30. The method of claim 29, in which determining that the at least some of the first plurality of players are active players includes at least one of determining that the at least some first plurality of players has placed a bet within a desired period of time, and determining that the first plurality of players has a credit balance at a gaming device.

31. The method of claim 1, wherein providing the payment further comprises:
providing a non-zero payment to the second player if the first player's outcome is a winning outcome; and
providing a payment of zero to the second player if the first player's outcome is a losing outcome.

32. The method of claim 18, in which the measure of how well a respective player uses the particular strategy includes an indication of how often a player's decisions diverges from the particular strategy.

33. The method of claim 32, in which the particular strategy includes an ideal strategy.

34. The method of claim 1, in which receiving the first bet includes receiving an indication from the second player of a desire to participate in a game of the highest performing player from among the plurality of players.

35. The method of claim 34, in which receiving the first bet includes receiving an indication from the second player of a desire to have the computer system select the highest performing player from among the plurality of players to be associated with the bet.

36. The apparatus of claim 2, in which the program comprises determining a random time interval; and offering a second betting opportunity after the random time interval has passed after offering the betting opportunity, in which the second betting opportunity includes a wager related to a game played by another second player that has not been identified at the time when the offering is made, and in which the other second player includes a player associated with performance metrics when the random time interval has passed.

37. The apparatus of claim 2, in which the program includes
determining that the plurality of players are active players when the performance metrics are evaluated; and including the players in the plurality of players based on the determination that players are active players.

38. The apparatus of claim 37, in which determining that players are active players includes at least one of determining that each player has placed a bet within a desired period of time, and determining that each player has a credit balance at a gaming device.

39. The method of claim 16, in which at least one first game of the plurality of respective games includes a card game and at least one second game of the plurality of respective games includes a non-card game, in which the highest performance metric is determined based on performance across the different types of games.

40. The apparatus of claim 23, in which at least one first game of the plurality of respective games includes a card game and at least one second game of the plurality of respective games includes a non-card game, in which the highest performance metric is determined based on performance across the different types of games.

41. The method of claim 1, further comprising:
in response to determining the first player, presenting the first player with a mental state test; and
in which determining that the first bet is associated with the first player includes determining that the first bet is associated with the first player in response to determining that the first player passes the mental state test.

42. The apparatus of claim 2, in which the program further includes:
in response to selecting the first player, presenting the first player with a mental state test; and
in which placing the bet includes placing the bet in response to determining that the first player passes the mental state test.

43. The method of claim 1, further including:
determining the second plurality of players, in which determining the second plurality of players includes determining a subset of a third plurality of players, in which the subset includes the players from the third plurality of players that meet a second performance metric criteria;
determining that the second player is the next player of the second plurality of players to place a bet after receiving the second bet; and
in which determining that the second bet is associated with the second player includes determining that the second bet is associated with the second player in response to determining that the second player is the next player.

44. The apparatus of claim 2, in which the program includes
determining the plurality of players, in which determining the plurality of players includes determining a subset of a second plurality of players, in which the subset includes the players from the second plurality of players that meet a performance metric criteria;
determining that the first player is the next player of the plurality of players to place a bet after receiving the bet; and
in which placing the bet includes placing the bet in response to determining that the first player is the next player.

* * * * *